United States Patent
Kwak et al.

(10) Patent No.: US 11,516,758 B2
(45) Date of Patent: *Nov. 29, 2022

(54) METHOD AND APPARATUS FOR TRANSMITTING DIFFERENT UPLINK CONTROL INFORMATION IN WIRELESS COMMUNICATION SYSTEM

(71) Applicant: Samsung Electronics Co., Ltd., Gyeonggi-do (KR)

(72) Inventors: Youngwoo Kwak, Gyeonggi-do (KR); Sungjin Park, Incheon (KR); Cheolkyu Shin, Gyeonggi-do (KR); Donghan Kim, Gyeonggi-do (KR); Younsun Kim, Gyeonggi-do (KR); Hoondong Noh, Gyeonggi-do (KR); Jeongho Yeo, Gyeonggi-do (KR); Jinyoung Oh, Seoul (KR); Juho Lee, Gyeonggi-do (KR); Seunghoon Choi, Gyeonggi-do (KR); Heedon Gha, Gyeonggi-do (KR); Youngbum Kim, Seoul (KR); Taehyoung Kim, Seoul (KR)

(73) Assignee: Samsung Electronics Co., Ltd

( * ) Notice: Subject to any disclaimer, the term of this patent is extended or adjusted under 35 U.S.C. 154(b) by 14 days.

This patent is subject to a terminal disclaimer.

(21) Appl. No.: 17/135,432

(22) Filed: Dec. 28, 2020

(65) Prior Publication Data

US 2021/0120510 A1 Apr. 22, 2021

Related U.S. Application Data

(63) Continuation of application No. 16/324,024, filed as application No. PCT/KR2017/008615 on Aug. 9, 2017, now Pat. No. 10,880,847.

(30) Foreign Application Priority Data

Aug. 9, 2016 (KR) .................. 10-2016-0101178
Oct. 14, 2016 (KR) .................. 10-2016-0133420
Jun. 15, 2017 (KR) .................. 10-2017-0075886

(51) Int. Cl.
*H04W 56/00* (2009.01)
*H04L 25/02* (2006.01)
(Continued)

(52) U.S. Cl.
CPC ....... *H04W 56/001* (2013.01); *H04J 11/0073* (2013.01); *H04J 11/0076* (2013.01);
(Continued)

(58) Field of Classification Search
CPC ............. H04L 25/0224; H04L 27/2613; H04L 5/0005; H04W 56/001; H04W 72/005;
(Continued)

(56) References Cited

U.S. PATENT DOCUMENTS 9,735,942 B2 8/2017 Xu et al.
2009/0252109 A1 10/2009 Kim et al.
(Continued)

FOREIGN PATENT DOCUMENTS

CN 101431368 5/2009
CN 101771655 7/2010
(Continued)

OTHER PUBLICATIONS

Chinese Office Action dated Dec. 2, 2021 issued in counterpart application No. 201780049272.2, 14 pages.
(Continued)

*Primary Examiner* — Awet Haile
(74) *Attorney, Agent, or Firm* — The Farrell Law Firm, P.C.

(57) ABSTRACT

The present disclosure relates to a communication method and system for converging a 5th-Generation (5G) commu-
(Continued)

nication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention presents a method for efficiently estimating a physical channel and, according to the present invention, a terminal of a communication system receives a synchronization signal from a base station, receives a broadcast channel from the base station, and can estimate the broadcast channel on the basis of the synchronization signal.

12 Claims, 76 Drawing Sheets

(51) Int. Cl.
    *H04J 11/00*     (2006.01)
    *H04L 25/00*     (2006.01)
    *H04W 52/02*     (2009.01)
    *H04W 72/00*     (2009.01)
    *H04L 5/00*     (2006.01)
    *H04J 13/00*     (2011.01)
    *H04W 48/10*     (2009.01)
    *H04B 7/00*     (2006.01)
    *H04W 88/02*     (2009.01)
    *H04W 88/08*     (2009.01)

(52) U.S. Cl.
CPC .......... *H04L 25/00* (2013.01); *H04L 25/0202* (2013.01); *H04W 52/0216* (2013.01); *H04W 52/0245* (2013.01); *H04W 56/0015* (2013.01); *H04W 72/005* (2013.01); *H04B 7/00* (2013.01); *H04J 13/00* (2013.01); *H04L 5/0023* (2013.01); *H04L 5/0048* (2013.01); *H04L 5/0053* (2013.01); *H04W 48/10* (2013.01); *H04W 88/02* (2013.01); *H04W 88/08* (2013.01)

(58) Field of Classification Search
CPC ..... H04W 72/04; H04W 48/10; H04W 48/16; H04J 11/0076
See application file for complete search history.

(56) References Cited

U.S. PATENT DOCUMENTS

| | | | |
|---|---|---|---|
| 2010/0034301 | A1 | 2/2010 | Chang et al. |
| 2010/0091826 | A1 | 4/2010 | Chen et al. |
| 2010/0309797 | A1 | 12/2010 | Lindoff et al. |
| 2012/0099632 | A1 | 4/2012 | Bury |
| 2014/0036804 | A1 | 2/2014 | Chen et al. |
| 2014/0226650 | A1 | 8/2014 | Miao et al. |
| 2014/0341051 | A1 | 11/2014 | Gaal et al. |
| 2015/0092768 | A1 | 4/2015 | Ng et al. |
| 2015/0117291 | A1 | 4/2015 | Seo et al. |
| 2015/0189574 | A1* | 7/2015 | Ng .......... H04W 24/08 370/254 |
| 2015/0280872 | A1* | 10/2015 | Berggren ............ H04L 5/005 370/330 |
| 2015/0326335 | A1* | 11/2015 | Chen ................ H04J 11/0079 370/252 |
| 2016/0043850 | A1 | 2/2016 | Chen et al. |
| 2016/0308636 | A1* | 10/2016 | Deng ............... H04L 5/0035 |
| 2016/0337931 | A1* | 11/2016 | Wang ............... H04W 36/36 |
| 2017/0180085 | A1* | 6/2017 | Balasubramanian ........................ H04L 1/1867 |
| 2017/0215097 | A1* | 7/2017 | Park ............. H04B 17/318 |
| 2018/0199351 | A1 | 7/2018 | Ro et al. |

FOREIGN PATENT DOCUMENTS

| | | |
|---|---|---|
| EP | 2 445 155 | 4/2012 |
| KR | 1020140109891 | 9/2014 |
| KR | 1020160060654 | 5/2016 |
| WO | WO 2007/073116 | 6/2007 |
| WO | WO 2008/060123 | 5/2008 |
| WO | WO 2014/086409 | 6/2014 |
| WO | WO 2014/165838 | 10/2014 |
| WO | WO 2015/080486 | 6/2015 |

OTHER PUBLICATIONS

PCT/ISA/210 Search Report issued on PCT/KR2017/008615 (pp. 7).
PCT/ISA/237 Written Opinion issued on PCT/KR2017/008615 (pp. 5).
European Search Report dated Jan. 28, 2020 issued in counterpart application No. 17839801.2-1220, 8 pages.
Korean Office Action dated Apr. 22, 2021 issued in counterpart application No. 10-2017-0075886, 9 pages.
Korean Office Action dated Sep. 28, 2022 issued in counterpart application No. 10-2022-0008953, 9 pages.

* cited by examiner

FIG. 19

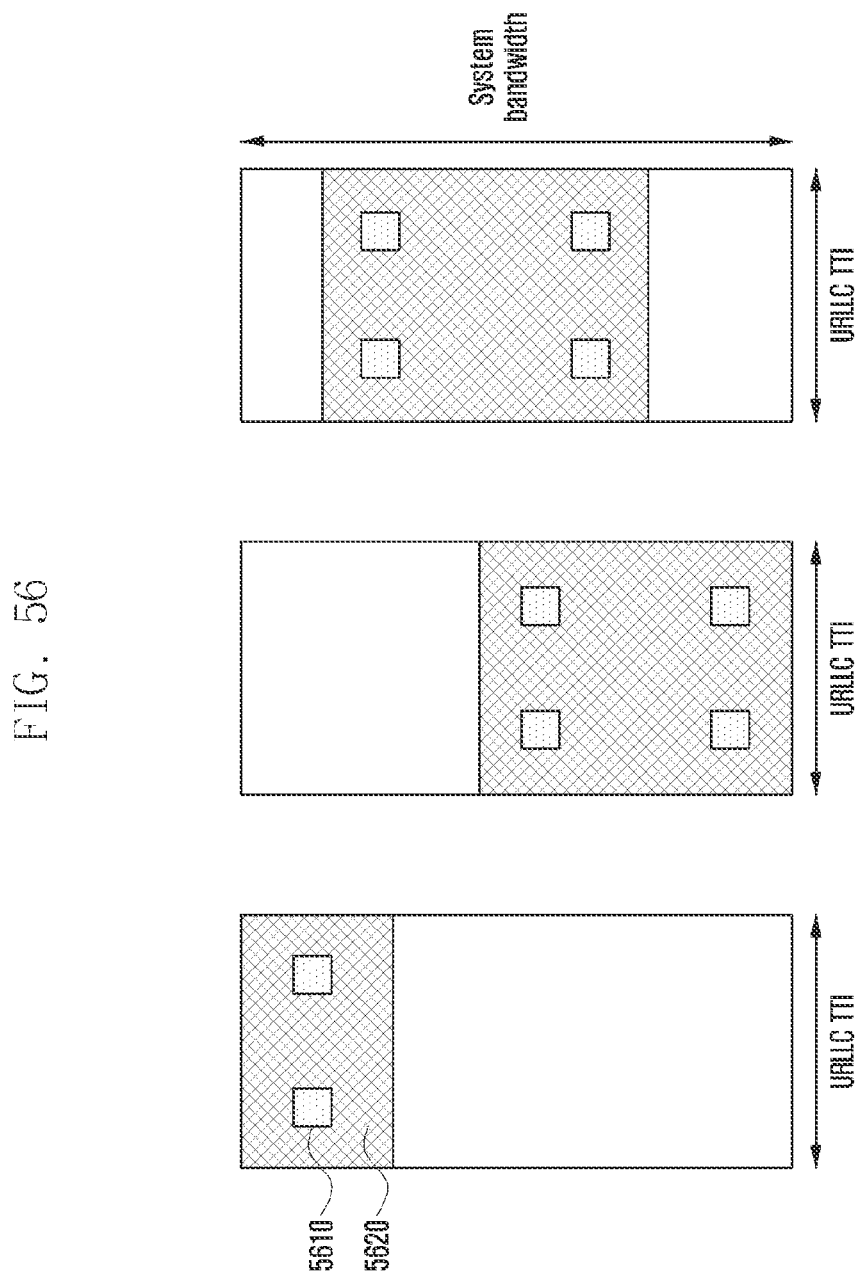

METHOD AND APPARATUS FOR TRANSMITTING DIFFERENT UPLINK CONTROL INFORMATION IN WIRELESS COMMUNICATION SYSTEM

PRIORITY

This application is a Continuation Application of U.S. patent application Ser. No. 16/324,024, filed in the U.S. Patent and Trademark Office on Feb. 7, 2019 as a National Phase Entry of PCT International Application No. PCT/KR2017/008615 which was filed on Aug. 9, 2017, and claims priority to Korean Patent Application Nos. 10-2016-0101178, 10-2016-0133420, and 10-2017-0075886, which were filed on Aug. 9, 2016, Oct. 14, 2016, and Jun. 15, 2017, respectively, the content of each of which is incorporated herein by reference.

TECHNICAL FIELD

The present disclosure relates to a wireless communication system. More specifically, the present disclosure relates to a method and apparatus for efficiently performing communication in a 5G communication system after 4G communication system commercialization.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, a 5G communication system, that is, a future communication system after LTE, has a goal of ultra-high speed data services reaching several Gbps using a wide ultra-wideband. Furthermore, the 5G communication system has a goal of high transmission efficiency compared to the existing communication system. As described above, the beamforming technology for providing ultra-high speed data services is emerging. In order to support high transmission efficiency, active research is carried out on a method of reducing overhead of a reference signal.

DISCLOSURE OF INVENTION

Technical Problem

The present disclosure proposes an uplink channel structure in a 5G frame structure design. The present disclosure is to propose an uplink control channel structure for supporting sufficient uplink coverage.

The present disclosure is to propose a channel state information report method optimized for a channel state information subset and service according to a frequency unit for the measurement and report of channel state information and interference characteristic according to a service characteristic.

The present disclosure is to propose various methods of matching an antenna port with a synchronization signal in order to estimate a physical channel using a synchronization signal.

The present disclosure is to propose a method and apparatus for allowing services of different types to be provided within the same time-space period by adaptively supporting services of the existing type by checking whether a given type service has occurred when simultaneously providing services of different types.

Solution to Problem

In the present disclosure, a method of a base station in a communication system includes transmitting a synchronization signal to a terminal and transmitting a broadcast channel to the terminal, wherein channel estimation based on the synchronization signal is performed on the broadcast channel. The synchronization signal may be at least one of a primary synchronization signal and a secondary synchronization signal. The antenna ports of the synchronization signal and the broadcast channel may be the same.

Furthermore, a method of a terminal in a communication system includes receiving a synchronization signal from a base station, receiving a broadcast channel from the base station, and performing channel estimation on the broadcast channel based on the synchronization signal.

Furthermore, a base station of a communication system includes a transceiver unit configured to transmit and receive signals and a controller configured to control the transceiver unit to transmit a synchronization signal to a terminal and to transmit a broadcast channel to the terminal, wherein channel estimation based on the synchronization signal is performed on the broadcast channel.

Furthermore, a terminal of a communication system includes a transceiver unit configured to transmit and receive signals and a controller configured to control the transceiver unit to receive a synchronization signal from a base station and receive a broadcast channel from the base station and to control channel estimation to be performed on the broadcast channel based on the synchronization signal.

Advantageous Effects of Invention

In accordance with an embodiment of the present disclosure, a system in which uplink coverage is sufficiently supported can be configured and transmission timing of an uplink channel can be flexibly set for scheduling flexibility.

Furthermore, in accordance with an embodiment of the present disclosure, an FCR for serving a newly designed service can be designated in given time and frequency resources. Accordingly, a control channel, data and a reference signal can be efficiently transmitted.

Furthermore, in accordance with an embodiment of the present disclosure, overhead of a reference signal additionally used for operations can be minimized by providing a method of performing the operations, such as channel estimation and measurement for major physical channels and signaling for DL transmit power, using a synchronization signal.

Furthermore, in accordance with an embodiment of the present disclosure, data can be effectively transmitted using services of different types in a communication system. Specifically, transmission time latency can be reduced or at least one of frequency-time and space resources can be efficiently used.

BRIEF DESCRIPTION OF DRAWINGS

FIG. 19 is a diagram showing the assumption of a case where services have been multiplexed in time-frequency resources in the NR system.

FIG. 56 is a diagram showing a position relation between data for URLLC and an indicator providing notification of a corresponding position in the frequency and time aspects.

MODE FOR THE INVENTION

Figure 1:
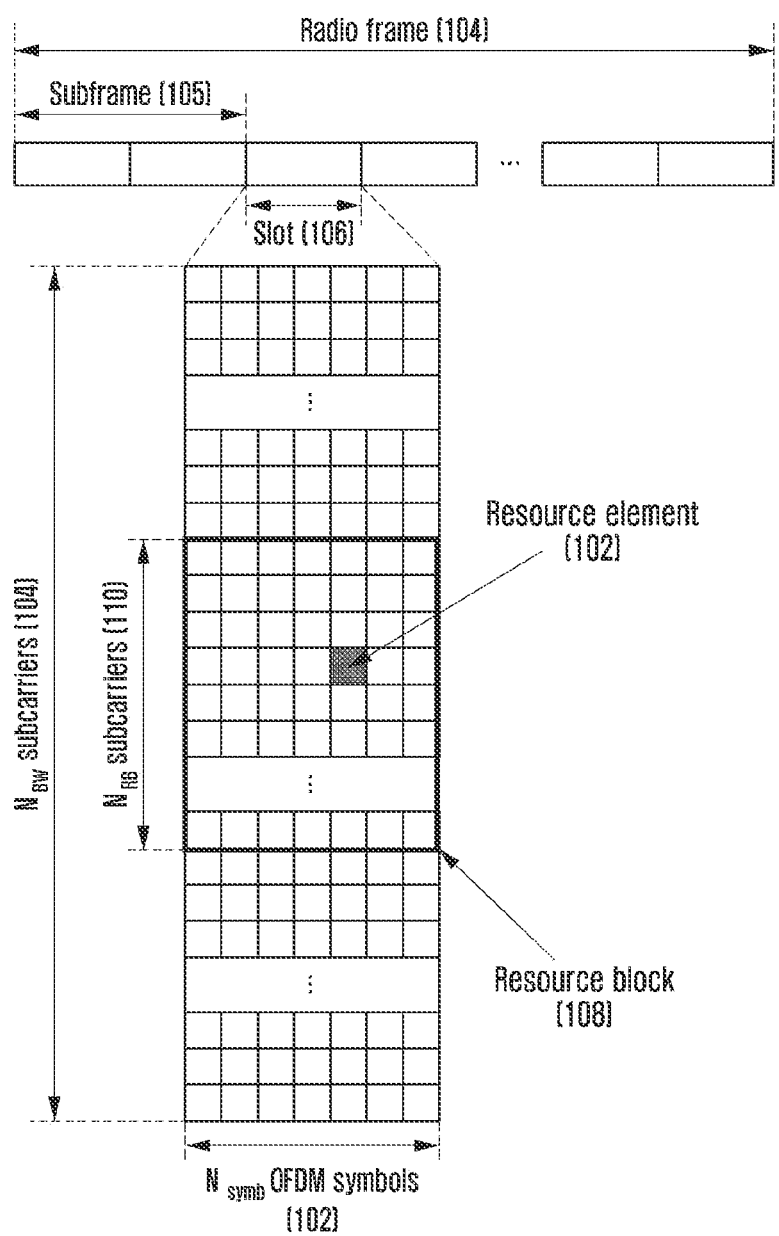
FIG. 1 is a diagram showing a basic structure of a time-frequency resource region, that is, a radio resource region of the existing LTE and LTE-A systems.

Hereinafter, embodiments of the present disclosure are described in detail with reference to the accompanying drawings.

In describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. The same reference numerals will be used to refer to the same or similar elements throughout the drawings.

In the present disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, The term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operation on one or more CPUs within a device or a security multimedia card.

The First Embodiment

Hereinafter, embodiments of the present disclosure are described in detail with reference to the accompanying drawings. Furthermore, in describing the present disclosure, a detailed description of a related known function or configuration will be omitted if it is deemed to make the gist of the present disclosure unnecessarily vague. Furthermore, terms to be described hereunder have been defined by taking into consideration functions in the present disclosure, and may be different depending on a user, an operator's intention or practice. Accordingly, each term should be defined based on contents over the entire specification.

Furthermore, in describing embodiments of the present disclosure specifically, orthogonal frequency-division multiplexing (OFDM)-based a wireless communication system, specifically, the 3GPP evolved universal terrestrial radio access (E-UTRA) standard is a major target, but a main gist of the present disclosure may be slightly modified in a range not greatly deviated from the range of the present disclosure and applied to other communication systems having a similar technical background and channel form. This may be possible by a determination of a person having skilled in the art in the technical field of the present disclosure. Hereinafter, a base station is the subject of resource assignment to a terminal, and may be at least one of an eNode B, a Node B, a gNB, a base station (BS), a radio access unit, a BS controller and a node in a network. A terminal may include a user equipment (UE), a mobile station (MS), a terminal, a cellular phone, a smartphone, a computer and a multimedia system capable of performing a communication function. In the present disclosure, downlink (DL) means the radio transmission path of a signal transmitted from a BS to a UE, and uplink (UL) means the radio transmission path of a signal transmitted from a UE to a BS. Furthermore, an embodiment of the present disclosure may be applied to other communication systems having a technical background or channel form similar to that of the following embodiments of the present disclosure. Furthermore, an embodiment of the present disclosure may be slightly modified in a range not greatly deviated from the range of the present disclosure and applied to other communication systems.

In order to process explosively increasing mobile data traffic, recently, a 5.sup.th generation (5G) system, that is, a next-generation communication system after long term evolution (LTE) or E-UTRA and (LTE-A (LTE-advanced or E-UTRA Evolution) is actively discussed. The bandwidth of a system transmission bandwidth per a single carrier (interchangeably used with a carrier) in the existing LTE and LTE-A is restricted to a maximum of 20 MHz, whereas the 5G system has a goal of providing ultra-high speed data service that reaches several Gbps using a very wide ultra-wideband. In frequency bands included in several hundreds of MHz to several GHz used in the existing mobile communication system, it is difficult to secure such a ultra-wideband frequency. Accordingly, in the 5G system, an ultra-high frequency band of several GHz or several tens of GHz is considered as a candidate frequency.

Radio waves of such a ultra-high frequency band has a wavelength of a several mm level and are called mmWave. However, in the ultra-high frequency band, coverage of a mobile communication system is reduced because the path-loss of radio waves increases in proportion to the frequency band.

In order to overcome the disadvantage of such a coverage reduction, a beamforming technology or increasing the arrival distance of radio waves by concentrating the radiation energy of radio waves on a given target point using multiple antennas is emerging importantly. The beamforming technology may be applied to a transmission stage and a reception stage. The beamforming technology has an effect of reducing interference in areas other than a beamforming direction in addition to the coverage increase effect. In order for the beamforming technology to properly operate, there is a need for an accurate measurement and feedback method for transmitted and received beams.

Another requirement for the 5G system includes ultra-low latency service for which transmission latency between the transmission and reception stages is about 1 ms. As a method for reducing transmission latency, there is a frame structure design based on a short transmission time interval (TTI)

compared to LTE and LTE-A. The TTI is a basic unit by which scheduling is performed. A TTI in the existing LTE and LTE-A systems is 1 ms corresponding to the length of one subframe. In contrast, the short TTI for satisfying the requirement for the ultra-low latency service of the 5G system may include 0.5 ms, 0.2 ms or 0.1 ms shorter than that of the existing LTE and LTE-A systems. In the following description, a TTI and a subframe are interchangeably used as meanings indicative of a given predetermined time period as basic units of scheduling unless otherwise described.

Hereinafter, restrictions of the LTE and LTE-A systems are described with reference to drawings, and the design direction of the 5G system is described.

FIG. 1 is a diagram showing a basic structure of a time-frequency resource region, that is, a radio resource region of the existing LTE and LTE-A systems.

In FIG. 1, a horizontal axis indicates a time domain, and a vertical axis indicates a frequency domain. A minimum transmission unit in the time domain of the existing LTE and LTE-A systems is an OFDM symbol in DL and an SC-FDMA symbol in UL. N.sub.symb symbols 102 gather to form one slot 106, and two slots gather to form one subframe 105. The length of the slot is 0.5 ms, and the length of the subframe is 1.0 ms. Furthermore, a radio frame 114 is a time domain unit having 10 subframes. A minimum transmission unit in the frequency domain is a subcarrier of a 15 kHz unit, and the bandwidth of a full system transmission bandwidth is a total of N.sub.BW subcarriers 104.

In the time-frequency domain, a basic unit of a resource is a resource element (RE) 112 and may be indicated as an OFDM symbol or an SC-FDMA symbol index and a subcarrier index. A resource block (RB) or a physical resource block (PRB) 108 is defined by the contiguous N.sub.symb OFDM symbols or SC-FDMA symbols 102 in the time domain and N.sub.RB contiguous subcarriers 110 in the frequency domain. Accordingly, one RB 108 consists of N.sub.symb.times.N.sub.RB REs 112.

In the LTE and LTE-A systems, data is mapped in an RB unit, and a BS performs scheduling on a given UE in an RB-pair unit forming one subframe. The number of SC-FDMA symbols or the number of OFDM symbols N.sub.symb is determined depending on the length of a cyclic prefix (CP) added to each symbol in order to prevent interference between symbols. For example, if a normal CP is applied, N.sub.symb=7. If an extended CP is applied, N.sub.symb=6. N.sub.BW is proportional to the bandwidth of a system transmission band. A data rate increases in proportion to the number of RBs scheduled in a UE.

Figure 2:
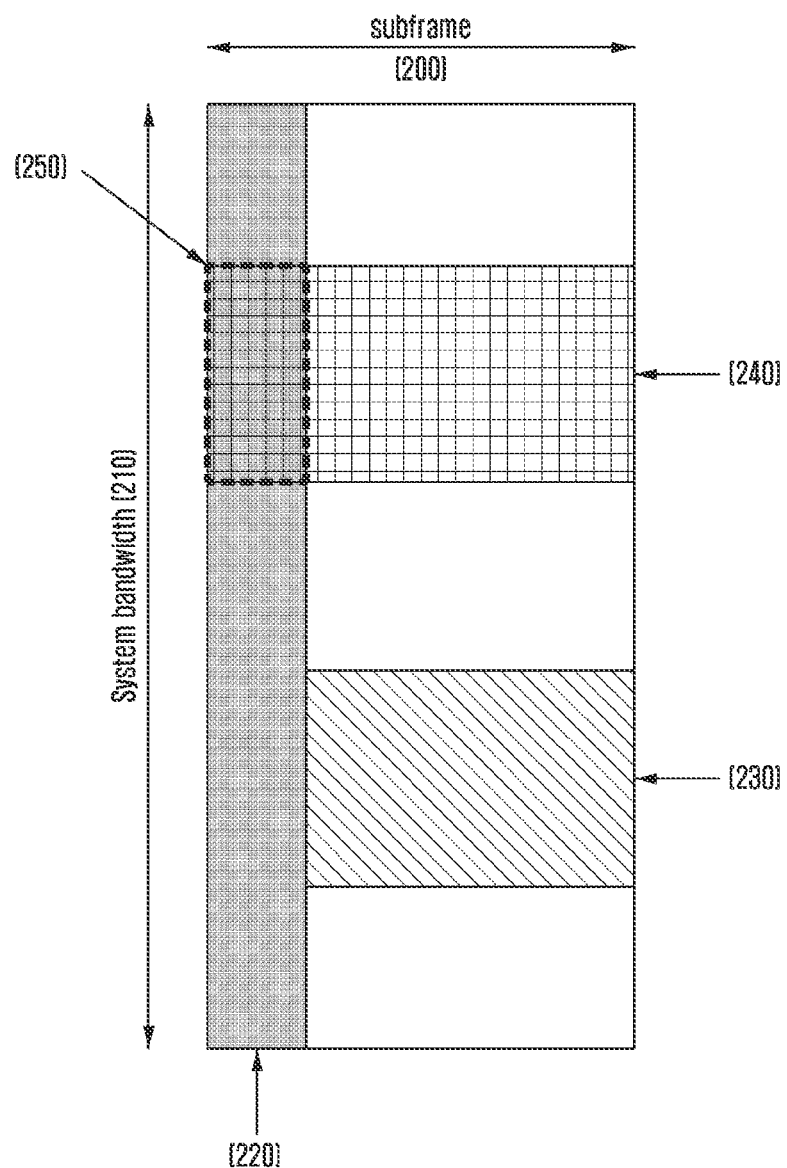
FIG. 2 is a diagram showing an example of a method of mapping a control channel and data channel of the LTE and LTE-A systems to a time-frequency resource region of the LTE and LTE-A systems.

FIG. 2 is a diagram showing an example of a method of mapping a control channel and data channel of the LTE and LTE-A systems to a time-frequency resource region of the LTE and LTE-A systems. In FIG. 2, a horizontal axis indicates a time domain, and a vertical axis indicates a frequency domain. In the LTE and LTE-A systems, a basic unit of scheduling is a subframe 200. In general, a BS determines whether scheduling has been performed on a UE every subframe, and transmits a control channel, including scheduling information about a data channel and a data channel, based on the results of scheduling determination. The control channel is commonly mapped to the first one to three OFDM symbol intervals within a subframe in the time domain, distributed and mapped to the full system transmission bandwidth 210 in the frequency domain, and transmitted to a UE (220). Accordingly, UE processing for the control channel can be completed as early as possible, and reception performance of a control channel can be improved because a frequency diversity effect is maximized.

The data channel scheduled by the control channel is mapped from a next OFDM symbol of an OFDM symbol for which the mapping of the control channel has been completed to the last OFDM symbol of a corresponding subframe in the time domain. The data channel is mapped within a range not exceeding a system transmission bandwidth based on a result of a scheduling determination of a BS in the frequency domain and transmitted to a UE (230). Accordingly, the UE must always have a reception capability for a full system transmission bandwidth regardless of the size of the frequency domain occupied by a data channel that is actually scheduled. In this case, there is no great difference in terms of a UE implementation in the LTE or LTE-A system having a relatively narrow system transmission bandwidth, but complexity may be excessively increased in terms of a UE implementation in the 5G system whose system transmission bandwidth is an ultra-wide band.

For example, in the early introduction stage of the 5G system, for the early spread of a 5G UE, a UE supporting only some bandwidth (subband 240) within a 5G system bandwidth in which a complexity increase is not relatively great may be introduced. In this case, if a 5G control channel is distributed and mapped to a full system transmission bandwidth as in the existing LTE and LTE-A systems, there is a problem in that a 5G UE supporting only a subband cannot receive the 5G control channel. Accordingly, there is inefficiency in which a 5G UE supporting only the subband does not use a radio resource corresponding to a 250 region. Likewise, if a channel occupying a full system transmission bandwidth is defined as in the existing LTE and LTE-A systems, there is a restriction in efficient resource utilization for various 5G services that may be introduced in the future. That is, there is a restriction in providing forward compatibility.

Hereinafter, control channel transmission may be understood to transmit control information on a control channel Data channel transmission may be understood to transmit data on a data channel Specifically, the transmission of UL control information (UCI) on a PUCCH may be described as PUCCH transmission, and the transmission of UL data on a PUSCH may be described as PUSCH transmission. Furthermore, DL control information (DCI) transmission on a PDCCH may be described as PDCCH transmission, and the transmission of DL data on a PDSCH may be described as PDSCH transmission. Furthermore, UCI may also be transmitted on a PUSCH.

Figure 3:
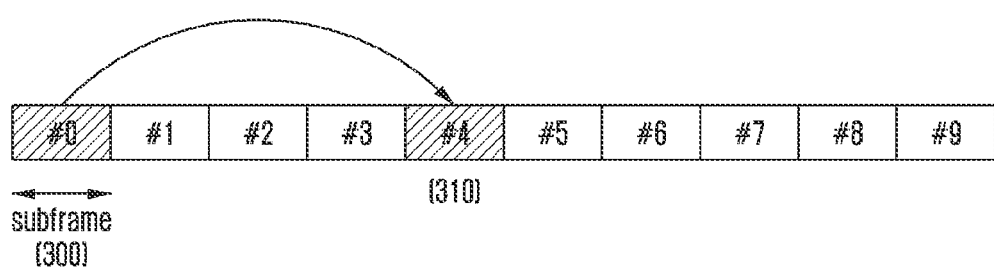
FIG. 3 is a diagram showing an example of HARQ feedback timing in the existing LTE and LTE-A systems.

FIG. 3 is a diagram showing an example of HARQ feedback timing in the existing LTE and LTE-A systems. The LTE and LTE-A systems may support a frequency division duplex (FDD) scheme and a time division duplex (TDD) scheme. The FDD scheme uses separate frequency bands in DL and UL. In contrast, the TDD scheme uses a frequency band common to DL and UL, but separately operates the transmission and reception of an UL signal and DL signal in the time domain. In the case of the TDD scheme, since UL and DL signals are separately transmitted for each subframe, several types of TDD UL-DL configurations are defined and operated so that subframes for UL/DL are equally divided and operated in the time domain or more subframes are assigned to DL or more subframes are assigned to UL depending on traffic loads of UL and DL.

In the LTE and LTE-A systems of the FDD scheme, when a BS transmits data and a control signal to a UE on a data channel and related control channel in an n-th subframe (300), the UE transmits HARQ acknowledgement or negative-acknowledgement (ACK/NACK) feedback, indicating whether the reception of the data channel is successful, to the BS in an (n+4)-th subframe (310). In the LTE and LTE-A systems of the TDD scheme, HARQ ACK/NACK feedback timing corresponding to each subframe is defined and operated for each TDD UL-DL configuration. Furthermore, the HARQ ACK/NACK feedback timing may be additionally defined depending on whether a carrier aggregation (CA) technology is supported and a combination thereof. That is, implementation complexity attributable to various types of HARQ ACK/NACK feedback timing may increase.

As described above, in the 5G system, unlike in the existing LTE and LTE-A systems, in order to efficiently support various 5G services that may be introduced in the future, forward compatibility needs to be guaranteed and the complexity of transmission and reception timing for reducing the implementation complexity of a UE and system compared to the existing LTE and LTE-A systems needs to be improved.

The present disclosure provides a scheduling method and control channel transmission and reception operation for solving the aforementioned problems. Hereinafter, a major gist of the present disclosure is described with reference to FIG. 4.

Figure 4:
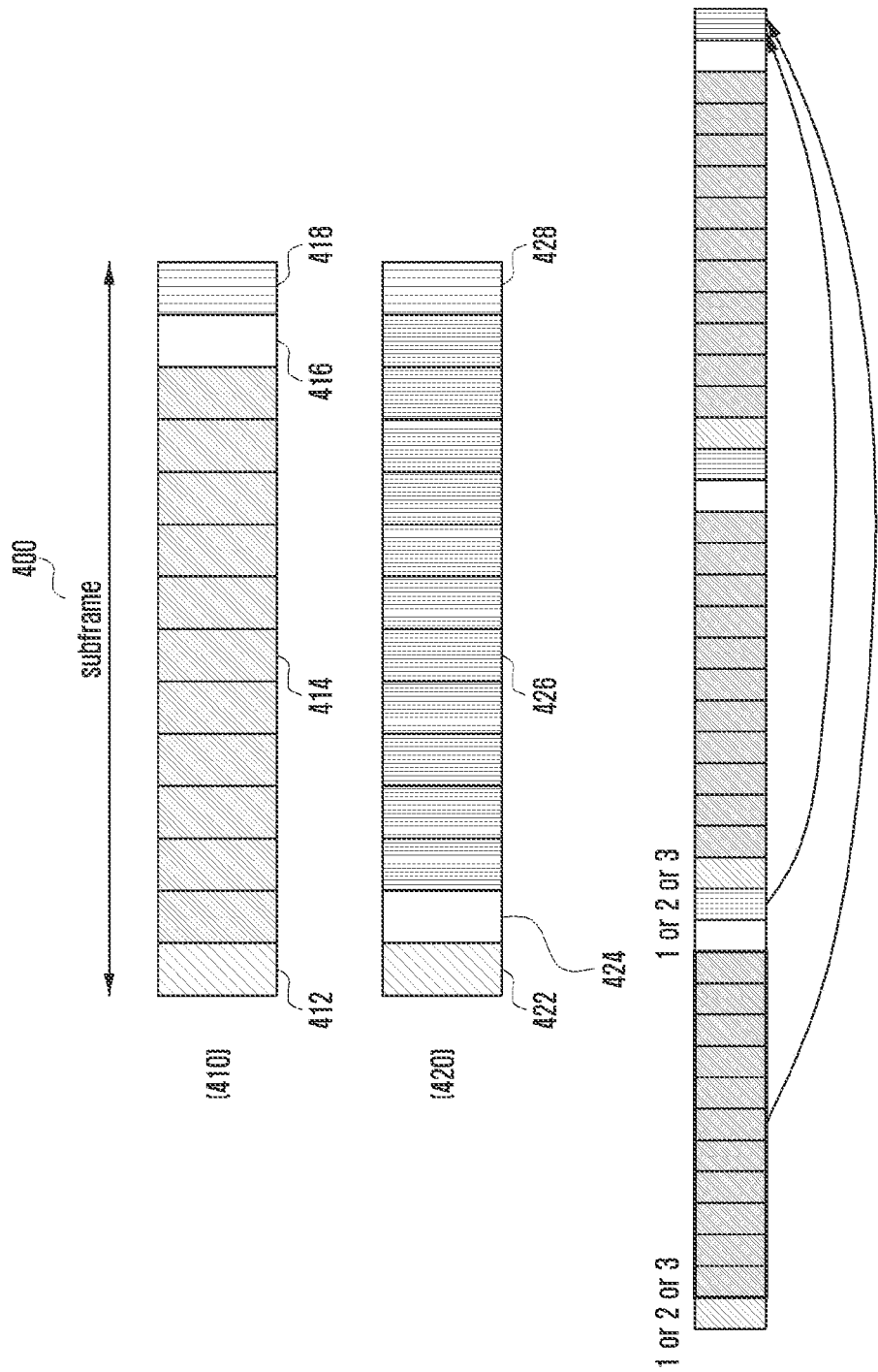
FIG. 4 is a diagram showing a frame structure considered for forward compatibility.

In the above, the 5G system has been described as being designed by considering forward compatibility. FIG. 4 is a diagram showing a frame structure considered for forward compatibility. 400 indicates a subframe, that is, a basic unit for transmission of the 5G system. The subframe is a transport unit having a given length. A time period, a time interval, a TTI, a slot or given terms may be used as the name of the subframe in addition to the subframe. In the 5G system, an UL signal and a DL signal are present within one subframe, and this is described assuming that they have been applied to a TDD system. However, it is assumed that the present disclosure may be identically applied to an FDD system.

410 is example of a frame structure in which a DL data channel is transmitted. In 410, a DL control channel (this is called a physical DL control channel (PDCCH) 412, DL data channels (they are called physical DL shared channels (PDSCHs) 414, and a guard period 416 and an UL control channel (this is called a physical UL control channel (PUCCH) 418 may be included in one subframe. A data transmission procedure includes a process for a BS to transmit control information about DL data to a UE through the PDCCH 412 and to perform DL data transmission in the PDSCH 414 and for the UE to notify the BS of HARQ ACK/NACK for the PDSCH through the PUCCH 418 after the guard period 416. Information transmitted through the PUCCH may include various types of UL control information, such as channel state information, scheduling request information or a combination of the information, in addition to HARQ ACK/NACK information.

420 is an example of the frame structure in which an UL data channel is transmitted. A DL control channel 422, a guard period 424, UL data channels (they are called physical UL shared channels (PUSCHs) 426, and an UL control channel 428 may be included in one subframe of 420. In a data transmission procedure, a BS transmits control information about UL data to a UE through the PDCCH 422. After the guard period 424, the UE performs UL data transmission to the BS through the PUSCHs 426 and then may additionally transmit the PUCCH 428.

The aforementioned frame structure is one example that may be adopted by the 5G system, and the configuration of one subframe may be various. That is, some of the channels included in the aforementioned example may not be transmitted. Accordingly, the length of other channels may be different. Furthermore, the length of one subframe, the number of OFDM symbols, and subcarrier spacing may be different depending on the state of a system.

The aforementioned PUCCH 418 or 428 has been assumed to be transmitted using one OFDM symbol. This is a size selected to minimize the guard period for a control channel so that all of a PDCCH, PDSCH and PUCCH can be transmitted together within one subframe or all of a PDCCH, PUSCH and PUCCH can be transmitted together within one subframe.

Figure 5:
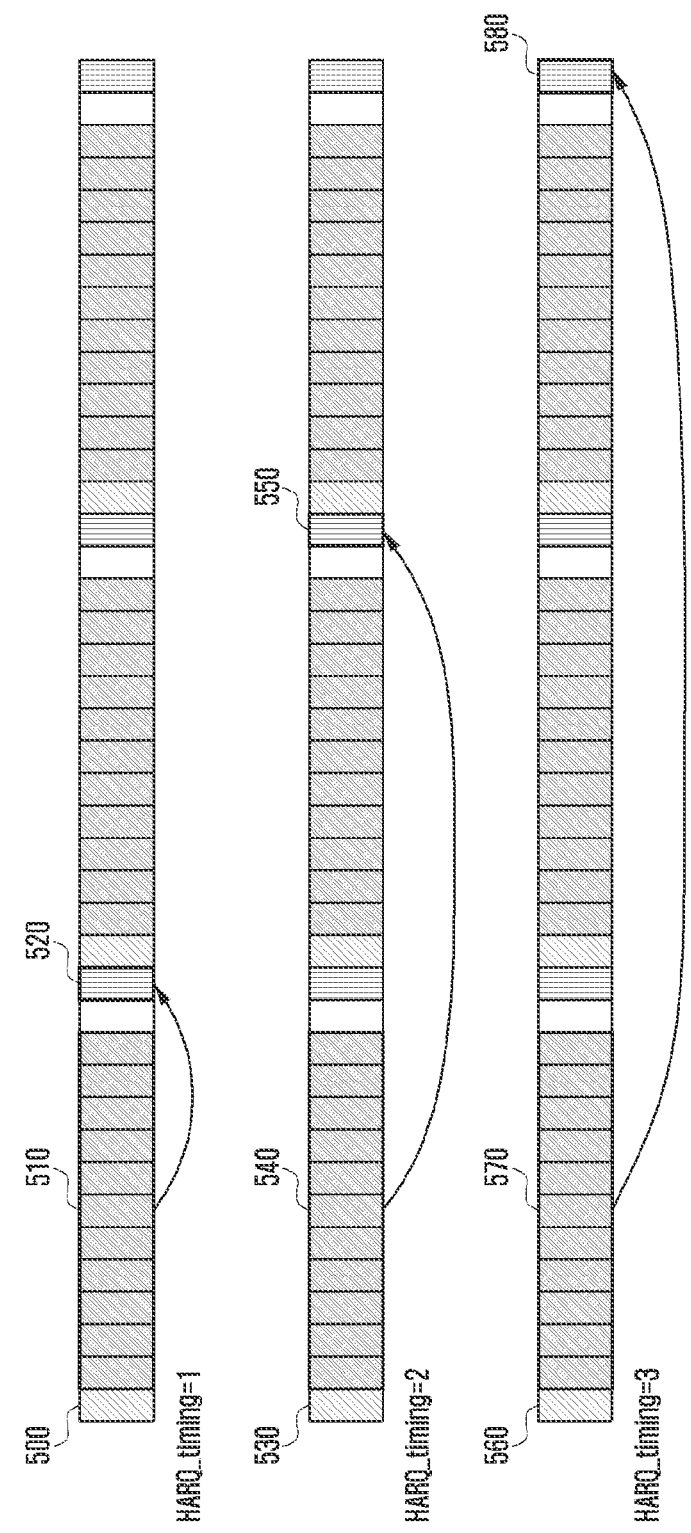
FIG. 5 is a diagram showing the timing of an uplink control channel in the aforementioned frame structure for downlink data transmission.

FIG. 5 is a diagram showing the timing of an UL control channel in the aforementioned frame structure for DL data transmission. In the above, it has been described that the UE transmits PDSCH transmission-related HARQ ACK/NACK to the BS through the PUCCH after it receives the PDCCH and the PDSCH. FIG. 5 shows the timing of PUCCH transmission connected to the transmission of a PDCCH and a PDSCH. It is assumed that the timing may be different depending on configurations. That is, HARQ ACK/NACK information according to PDCCH transmission of 500 and PDSCH transmission of 510 may be transmitted through a PUCCH within the same subframe like 520.

Furthermore, HARQ ACK/NACK information according to PDCCH transmission of 530 and PDSCH transmission of 540 may be transmitted in a PUCCH after one subframe like 550. That is, HARQ timing may occur after one subframe. Furthermore, HARQ ACK/NACK information according to PDCCH transmission of 560 and PDSCH transmission of 570 may be transmitted after multiple subframes like 580. That is, HARQ timing may occur after multiple subframes.

As described above, FIG. 5 shows that timing for PUCCH transmission may be different depending on configurations. A BS may notify a UE of such PUCCH transmission timing through higher layer signaling (this may be interchangeably used with RRC signaling) or a BS may dynamically notify a UE of PUCCH transmission timing through DCI information on the PDCCH 500, 530, 560 or a BS may notify a UE of PUCCH transmission timing MAC signaling or a combination of the signaling methods. FIG. 5 shows an example in which HARQ timing information is included in the PDCCH 500, 530, 560.

The transmission of a channel in which UL control information is transmitted, that is, a PUCCH, has been described on the assumption that the channel is transmitted during only one OFDM symbol period. An UL channel, specifically, an UL control channel is a channel to determine the transmission range (hereinafter called coverage) of a system. That is, if coverage of an UL control channel is restricted, coverage of a system using the UL control channel is inevitably restricted.

UL coverage depends on a transmitted time period. That is, a given channel may be transmitted during a long time period. If a given channel is transmitted during a long time period, coverage may be increased because energy capable of transmitting the channel sufficiently using power of a UE for a long time can be accumulated. In contrast, if a channel is transmitted during a short time period, coverage is reduced. Accordingly, if a PUCCH is transmitted using one OFDM symbol as in the PUCCH structure, coverage is inevitably restricted compared to a case where a PUCCH is transmitted during the entire subframe period in the LTE system. Accordingly, coverage of the 5G system is also restricted.

Accordingly, the present disclosure proposes a scheme for configuring a PUCCH transmitted for one symbol period with respect to a UE that does not require large coverage, that is, a UE positioned close to a BS, and additionally designing and configuring a PUCCH transmitted for a longer time with respect to a UE that requires sufficient coverage, that is, a UE positioned far from a BS, because it may be difficult to transmit PUCCH transmitted in the one symbol period.

Figure 6:
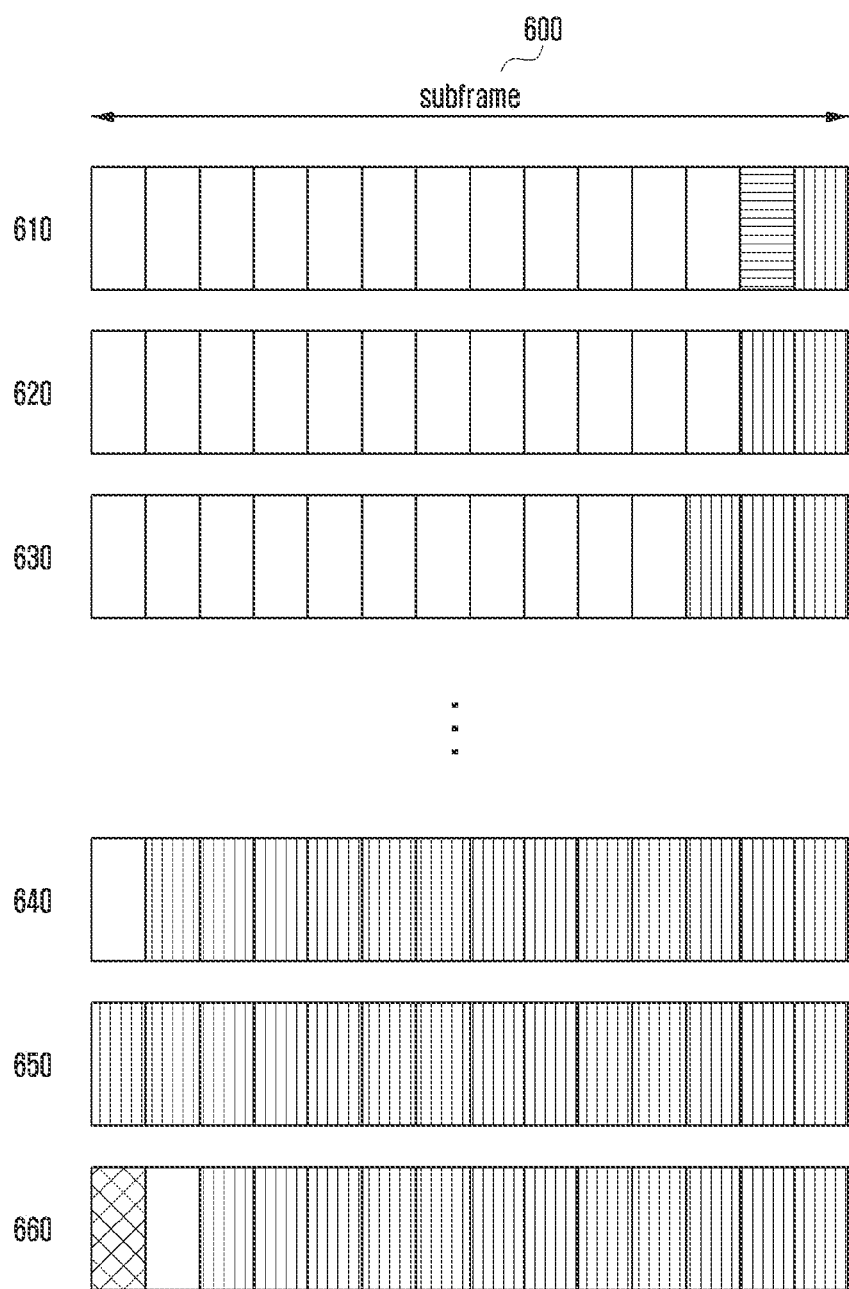
FIG. 6 is a diagram showing a PUCCH structure having time periods of various sizes.

FIG. 6 is a diagram showing a PUCCH structure having time periods of various sizes. In 600, it may be assumed that 14 OFDM symbols are present in one subframe. The number of OFDM symbols is one example, and the number of OFDM symbols may be determined in various ways depending on the design. In this case, a PUCCH may be transmitted during a time period of at least one OFDM symbol length like 610. 610 may be a PUCCH for a UE having the smallest coverage. In order to support a UE positioned far from a BS, a PUCCH may be transmitted during a time period of a two-OFDM symbol length like 620. Furthermore, a PUCCH may be transmitted during a time period of a three-OFDM symbol length like 630 and may be transmitted using a time period having the number of OFDM symbols greater than the three OFDM symbols.

A PUCCH structure may be determined in various ways depending on the number of OFDM symbols. The simplest structure may be a PUCCH structure that is designed assuming one OFDM symbol and repeatedly transmitted identically as many as the number of OFDM symbols. In 650, it is assumed that a PUCCH is transmitted through the entire one subframe. A PUCCH may be transmitted using all of the remaining periods within one subframe by considering a DL control channel and a time period like 660.

If PUCCHs having various time period sizes are present as described above, a configuration for a PUCCH length is necessary. In this case, PUCCHs of different sizes need to be configured for each UE. A method of configuring a PUCCH may include various methods, such as a configuration method through RRC signaling, a configuration method through MAC signaling and a configuration method using a combination of the signaling, in addition to a dynamic method of including PUCCH configuration information in DCI and transmitting it on a PDCCH.

Additionally, other configuration information necessary for a UE to transmit a PUCCH, for example, frequency resource information may be received from a BS through L1 signaling, may be received from a BS through a higher layer signal (RRC or MAC signaling), or may be received through a combination of the signaling.

As in FIG. 6, in the present disclosure, it is assumed that a PUCCH having a different time period is configured depending on the position of a UE. For easiness of description, it is assumed that PUCCHs having two types of time period size are present in a system. That is, the PUCCHs include a PUCCH of one OFDM symbol size (hereinafter called an S-PUCCH) like 610 and a PUCCH (hereinafter called an L-PUCCH) using the entire remaining period after a DL control channel and a guard period are considered within one subframe like 660. It is assumed and described that a system uses the two types of PUCCHs. Various cases may be assumed, such as a case where two or more PUCCHs are used or a case where two PUCCHs of different sizes are used, because a PUCCH length may be determined in various ways as described above.

Figure 7:
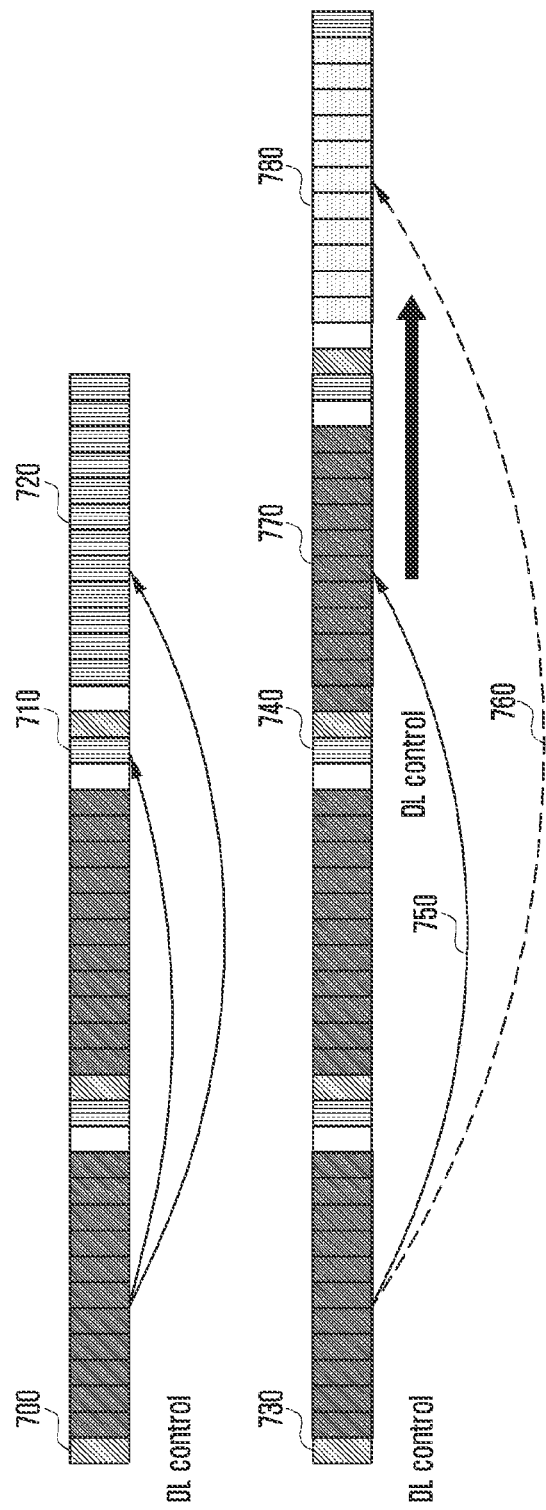
FIG. 7 shows a method of selecting and transmitting a proper PUCCH when PUCCHs having two different lengths are used.

FIG. 7 shows a method for a BS to include PUCCH configuration information in DCI and transmit the DCI through a PDCCH if PUCCHs having two different lengths are used as described above and for a UE to identify PUCCH configuration information and to select and transmit a PUCCH suitable for the UE based on a configured time period length every PDCCH reception.

700 is a PDCCH including DCI. Configuration information of a PUCCH has been included the DCI. When PUCCH information included in the 700 indicates an S-PUCCH, a UE that has received the PDCCH transmits UCI in an S-PUCCH form like 710. In contrast, when the PUCCH information included in the 700 indicates an L-PUCCH, the UE transmits the UCI in an L-PUCCH form like 720. Transmission timing of a PUCCH has been illustrated as being capable of being configured. Accordingly, the UE may select the S-PUCCH and the L-PUCCH based on a PUCCH configuration at set timing, and may transmit it.

Furthermore, although timing when an S-PUCCH and an L-PUCCH are transmitted has been configured, the timing may need to be changed depending on the situation. That is, in FIG. 7, a PDCCH is transmitted in 730, and an L-PUCCH of 770 is transmitted depending on set timing and a PUCCH transmission length. In this case, the resource of the 770 may need to be changed into DL and used depending on the situation of a BS. In this case, one channel of PDCCHs of 740 may be defined as a channel that must be received by all of UEs, and whether a current subframe is an UL subframe or a DL subframe is notified through a common PDCCH. Accordingly, a UE that must transmit the L-PUCCH first receives a common PDCCH within a subframe in which the transmission of the L-PUCCH has been configured, and transmits the L-PUCCH in a next subframe, that is, at a position of 780, if the UE identifies that a subframe in which the 770 has been positioned has been assigned as a DL subframe.

That is, the UE first receives a common PDCCH within a subframe including a given PUCCH depending on RRC or a configuration of a PDCCH, identifies whether the subframe is UL or DL, transmits a PUCCH at preset timing if it is found that the subframe has been configured as UL, and transmits a PUCCH after one subframe if it is found that a current subframe has been configured as DL. In order to subsequently transmit a PUCCH in a subframe, a task of receiving a common PDCCH within the same subframe in order to identify whether the corresponding subframe has been configured as UL must be first performed.

(1-1) Embodiment

In the present embodiment, a method of indicating whether the configuration of a PUCCH for a given UE is an S-PUCCH or an L-PUCCH through DCI as described above is described. Operations of a BS and a UE are described through FIGS. 8 and 9.

Figure 8:
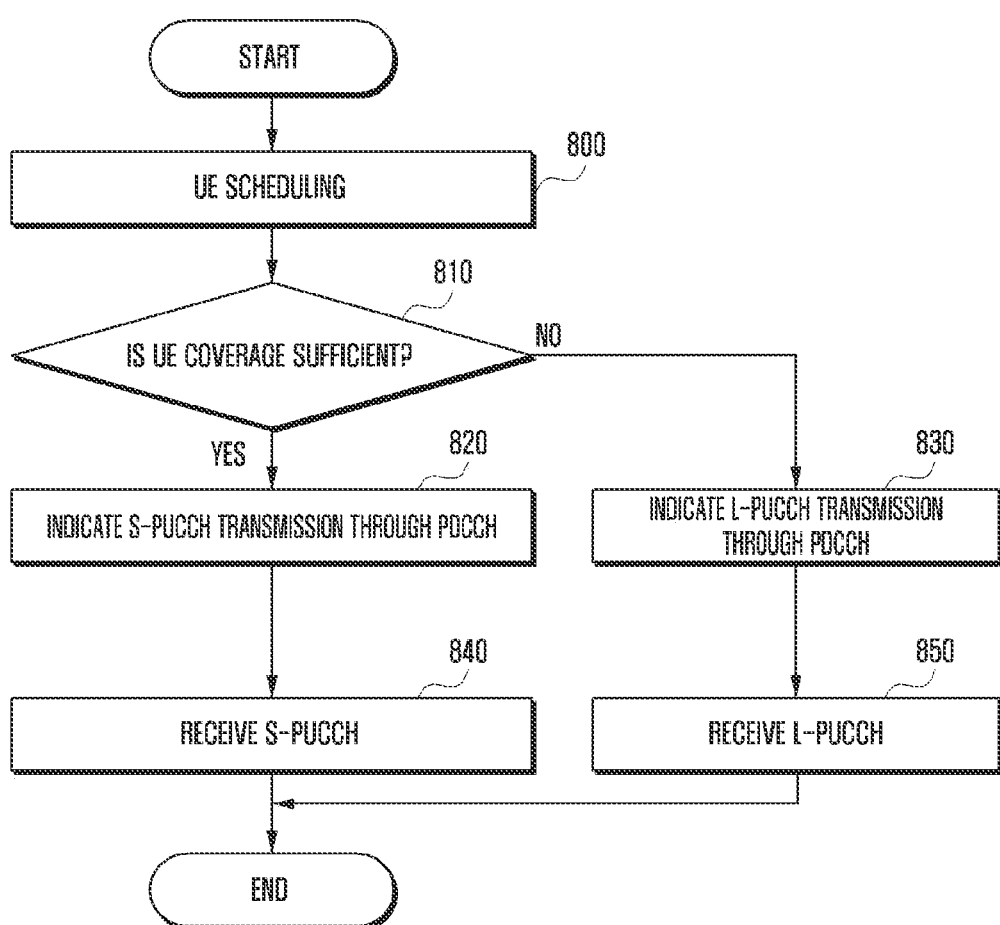
FIG. 8 is a diagram showing an operation of a base station according to a (1-1) embodiment.

FIG. 8 is a diagram showing an operation of a BS according to the (1-1) embodiment. The BS performs scheduling on UEs at operation 800. Next, when the BS attempts to transmit a PDSCH to a given UE, it determines whether coverage state of the UE is sufficient through S-PUCCH transmission at operation 810. That is, the BS determines whether the coverage state of the UE can be covered by the S-PUCCH transmission. The coverage determination of the UE may be made based on information regarding how far the UE has been separated from the BS or how much a signal experiences channel attenuation through the reception of channel state information and SRS transmitted by the UE.

If the BS determines that it is reasonable to configure an S-PUCCH, the BS includes indication information configuring the S-PUCCH in DCI on a PDCCH for the UE, and transmits the DCI at operation 820. Next, the BS receives the S-PUCCH at timing when the S-PUCCH is transmitted at operation 840. In contrast, if the BS determines that it is reasonable to configure an L-PUCCH because there is a problem in coverage if the S-PUCCH is configured, the BS includes indication information that configures the L-PUCCH in DCI on a PDCCH for the UE and transmits the DCI at operation 830. Next, the BS receives the L-PUCCH at timing when the L-PUCCH is transmitted at operation 850.

Figure 9:
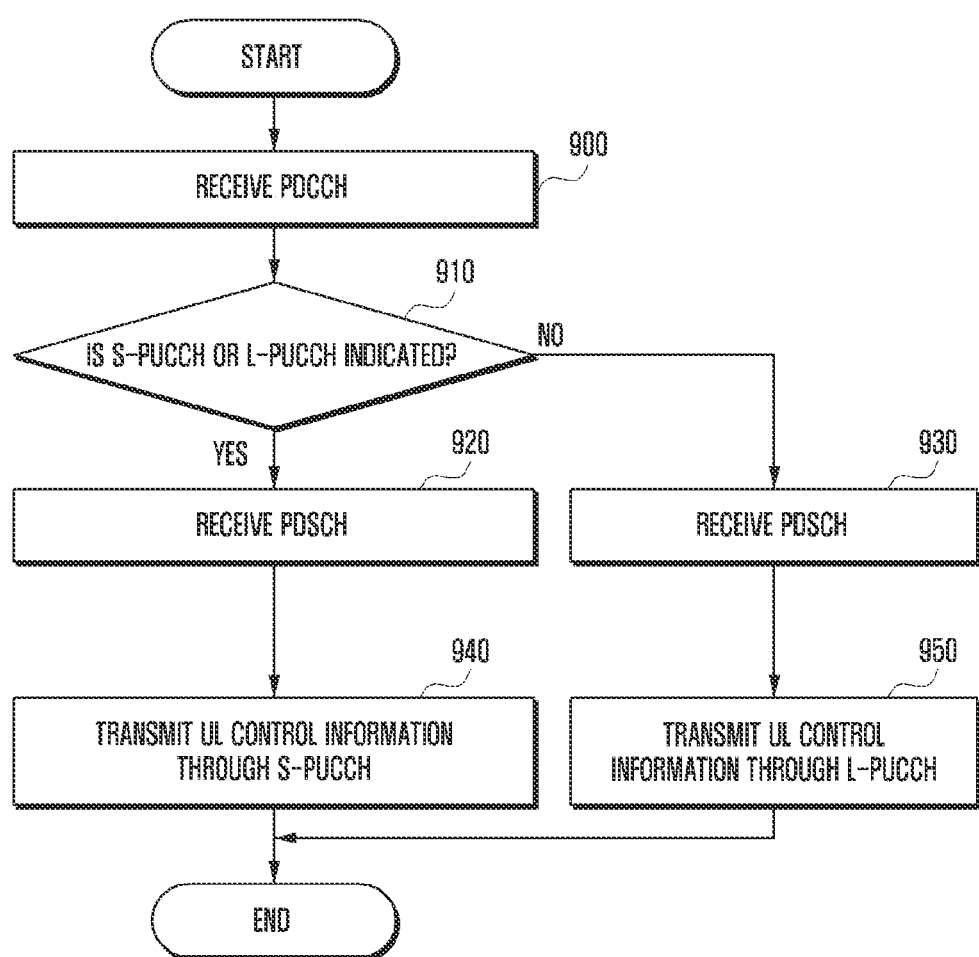
FIG. 9 is a diagram showing an operation of a terminal according to a (1-1) embodiment.

FIG. 9 is a diagram showing an operation of a UE according to the (1-1) embodiment. The UE receives a PDCCH at operation 900. Next, at operation 910, the UE determines that DCI included in the PDCCH indicates that which one of an S-PUCCH and an L-PUCCH will be configured. If the S-PUCCH is to be configured, at operation 920, the UE receives a PDSCH related to the PDCCH, decodes the PDSCH, determines whether the decoding is successful, and transmits UL control information, such as HARQ ACK/NACK, through the S-PUCCH at preset timing at operation 940. In contrast, if an L-PUCCH is to be configured based on the DCI on the PDCCH, at operation 930, the UE receives a PDSCH related to the PDCCH, decodes the PDSCH, determines whether the decoding is successful, and transmits UL control information, such as HARQ ACK/NACK, through the L-PUCCH at preset timing at operation 950.

(1-2) Embodiment

In the present embodiment, a method of configuring whether the configuration of a PUCCH for a given UE is an S-PUCCH or an L-PUCCH through RRC signaling as described above is described. Operations of a BS and a UE are described through FIGS. 10 and 11.

Figure 10:
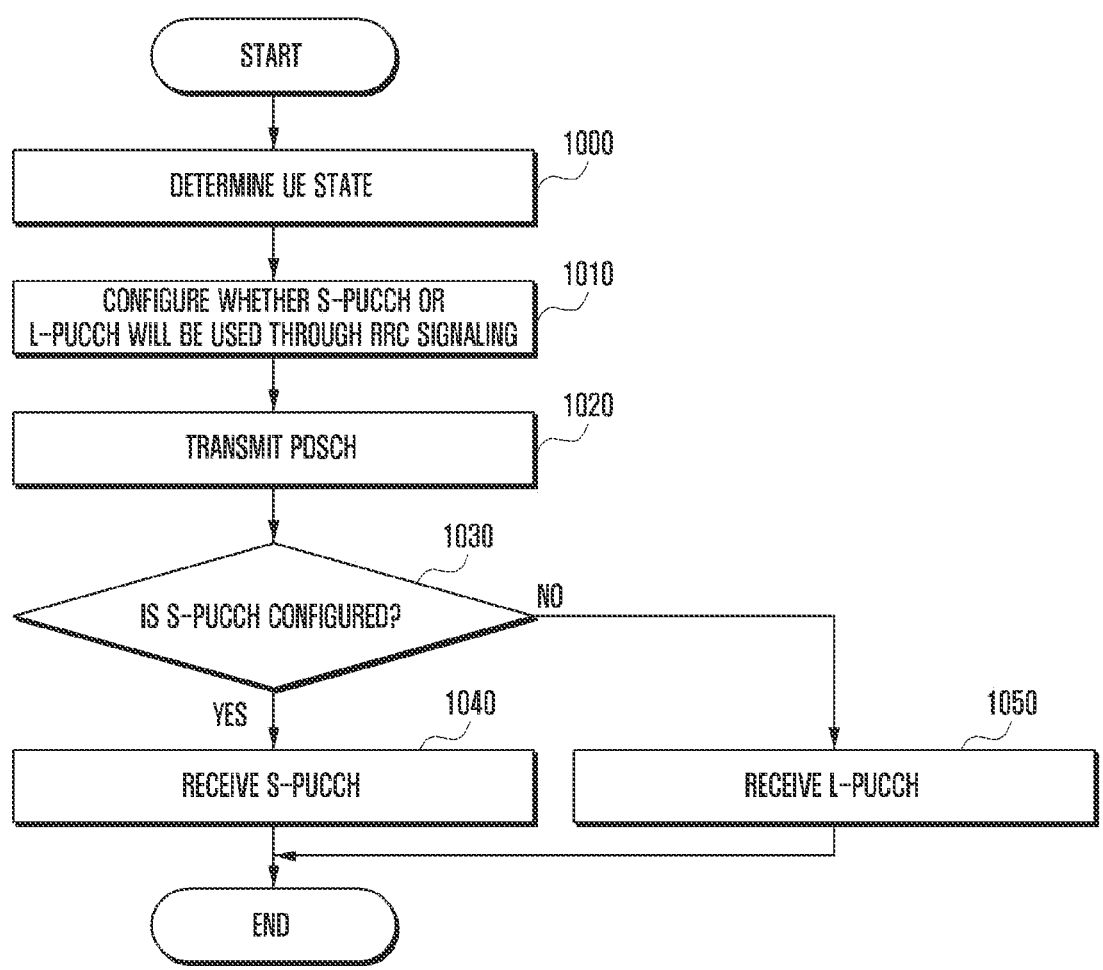
FIG. 10 is a diagram showing an operation of a base station according to a (1-2) embodiment.

FIG. 10 is a diagram showing an operation of a BS according to a (1-2) embodiment. The BS determines a coverage state of a UE at operation 1000. The coverage determination of the UE may be made based on information regarding how far the UE has been separated from the BS or how much a signal experiences channel attenuation through the reception of channel state information and SRS transmitted by the UE. Next, at operation 1010, the BS previously configures whether an S-PUCCH will be configured or an L-PUCCH will be configured with respect to the UE through RRC signaling. Thereafter, the BS performs scheduling on UEs and transmits a PDSCH to the UE at operation 1020.

Next, in the reception of a PUCCH transmitted by the UE, the BS determines whether an S-PUCCH has been configured at operation 1030. If a value set through the RRC is an S-PUCCH, at operation 1040, the BS receives an UL control channel in an S-PUCCH form at the reception timing of the S-PUCCH. In contrast, in the reception of the PUCCH of the UE, if a value set through the RRC is an L-PUCCH, the BS receives an UL control channel in an L-PUCCH form at the reception timing of the L-PUCCH at operation 1050.

Figure 11:
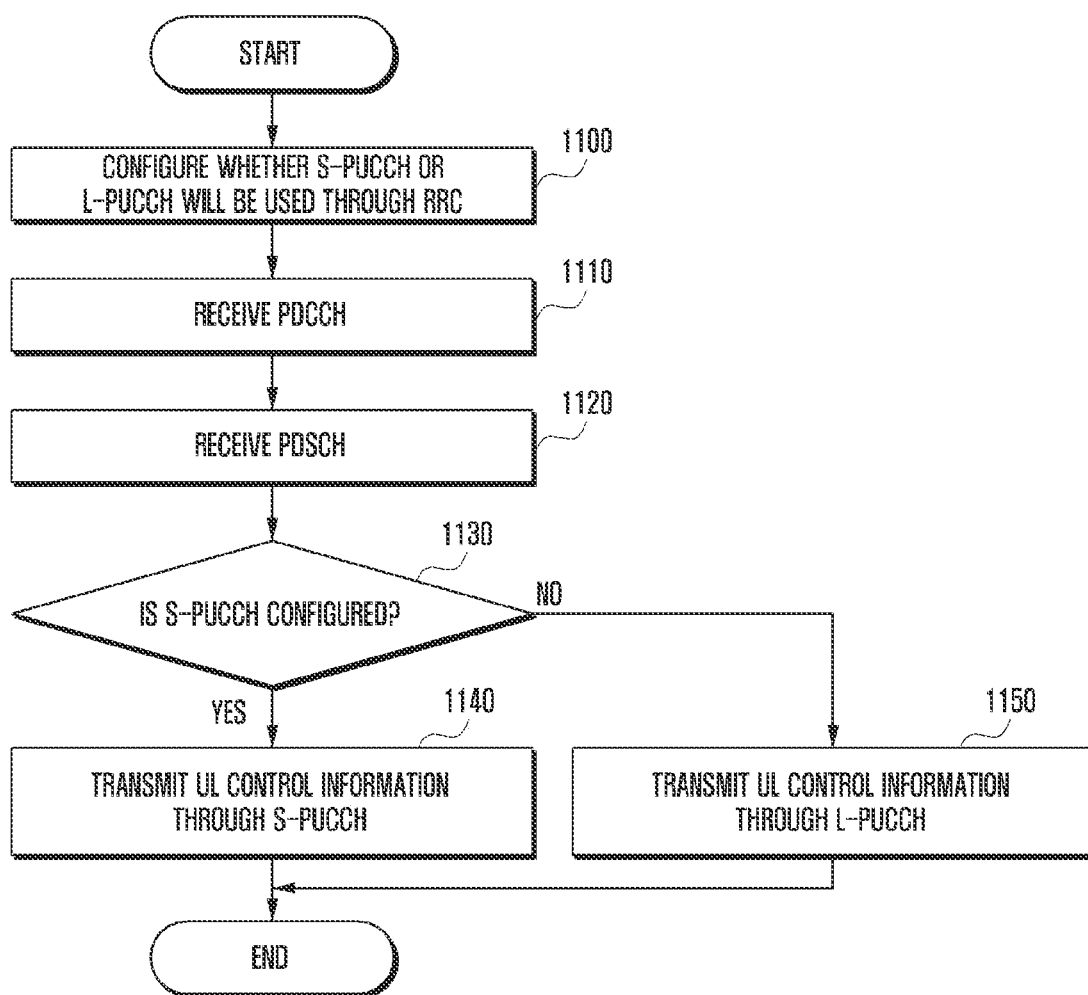
FIG. 11 is a diagram showing an operation of a terminal according to a (1-2) embodiment.

FIG. 11 is a diagram showing an operation of a UE according to the (1-2) embodiment. The UE determines whether a PUCCH configured for the UE is an S-PUCCH or an L-PUCCH through RRC signaling at operation 1100. Next, the UE receives a PDCCH at operation 1110, and receives a related PDSCH at operation 1120. Next, at operation 1130, the UE determines whether an S-PUCCH has been configured at timing when PUCCH transmission is necessary. If the S-PUCCH has been configured, the UE transmits UL control information, such as HARQ ACK/NACK, through the S-PUCCH at operation 1140. In contrast, if an L-PUCCH has been configured, the UE transmits UL control information, such as HARQ ACK/NACK, through the L-PUCCH at operation 1150.

(1-3) Embodiment

It has been described above that a mobile communication system differently configures an S-PUCCH and an L-PUCCH for each UE depending on coverage. A channel structure of an S-PUCCH and an L-PUCCH and a channel multiplexing method between UEs are described below.

Figure 12:
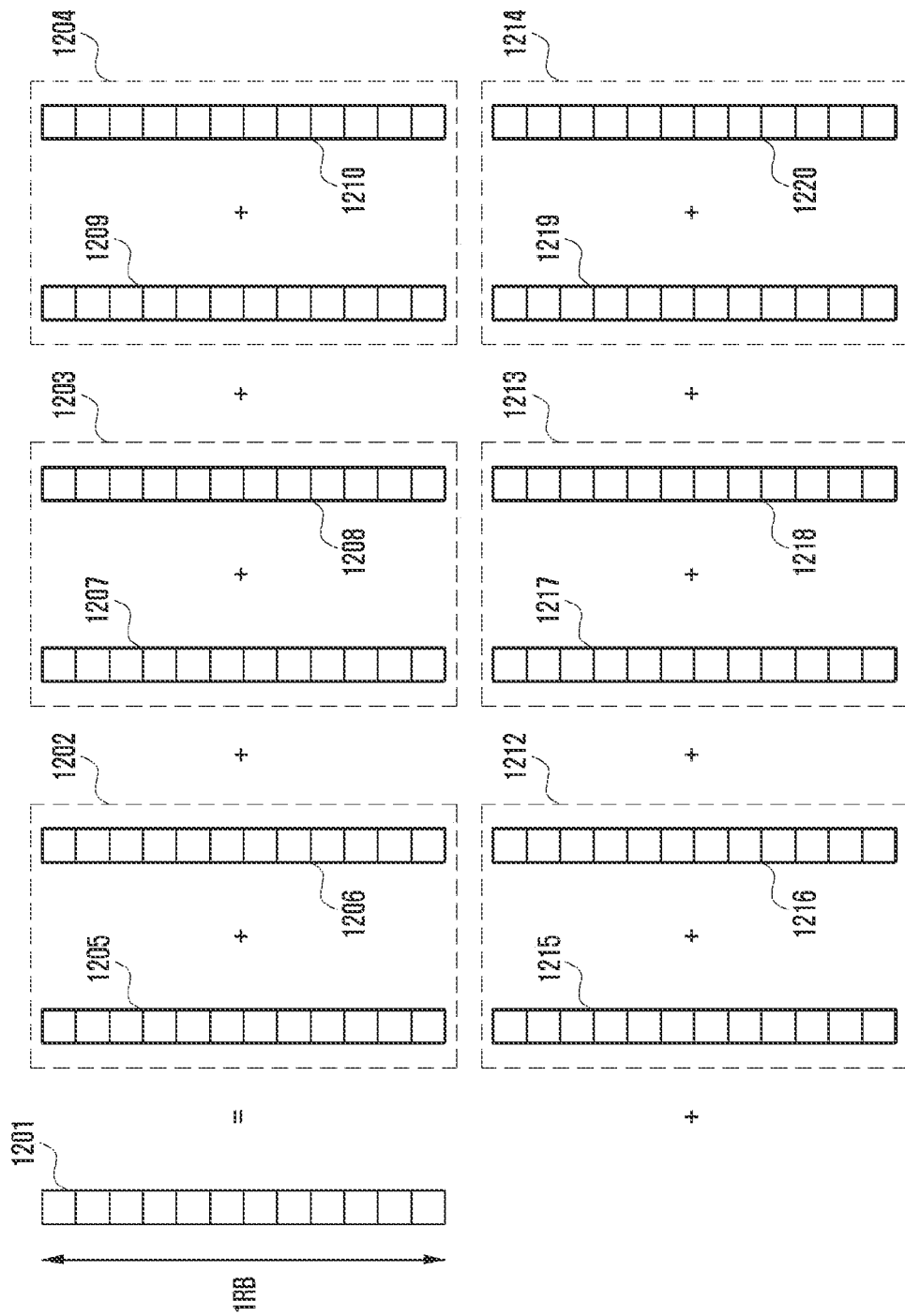
FIG. 12 is a diagram showing a channel structure for an S-PUCCH and a channel multiplexing method.

FIG. 12 is a diagram showing a channel structure for an S-PUCCH and a channel multiplexing method. It is assumed that the S-PUCCH is transmitted using one OFDM symbol only, for example. Accordingly, a structure in which as many UEs as possible can be multiplexed within one OFDM symbol and transmitted needs to be proposed. Accordingly, the present disclosure proposes multiplexing between UEs, and a code division multiplexing method for the multiplexing of control information about one UE and a demodulation reference signal (DMRS) for the decoding of a PUCCH, that is, a code division multiplexing (CDM) method.

In FIG. 12, one RB consists of 12 REs. If resources classified into the 12 REs are CDMed, 12 orthogonal codes may be generated. A code having 12 different cyclic shift values may be used as an orthogonal code based on a Zadoff-Chu (ZC) sequence, or 12 orthogonal codes may be generated using an orthogonal cover code, such as a Walsh code.

When the 12 orthogonal codes are generated, one UE needs to transmit 1-bit information. If it is assumed that the DMRS of one antenna port is necessary for the UE, 2 orthogonal codes may be assigned to the UE so that one code is used for UL control information and the other code is used for the DMRS. That is, in FIG. 12, a UE 1 transmits UL control channel data (i.e., control information) of 1 bit using a code of 1205 like 1202, and the DMRS of an antenna port transmitted by the UE is transmitted using a code of 1206. In this case, transmit power of 1205 and transmit power of 1206 may be different. The relative transmit power value may be set by a BS using several methods, such as DCI on a PDCCH, RRC signaling and MAC signaling.

Next, the UE transmits UL control channel data (i.e., control information) of 1 bit to a UE 2 using a code of 1207 like 1203, and the DMRS of an antenna port transmitted by the UE is transmitted using a code of 1208. The UE transmits UL control channel data of 1 bit to a UE 3 using a code of 1209 like 1204, and the DMRS of an antenna port transmitted by the UE is transmitted using a code of 1210. The UE transmits UL control channel data of 1 bit to a UE 4 using a code of 1215 like 1212, and the DMRS of an antenna port transmitted by the UE is transmitted using a code of 1216. The UE transmits UL control channel data of 1 bit to a UE 5 using a code of 1217 like 1213, and the DMRS of an antenna port transmitted by the UE is transmitted using a code of 1218. The UE transmits UL control channel data of 1 bit to a UE 6 using a code of 1219 like 1214, and the DMRS of an antenna port transmitted by the UE is transmitted using a code of 1220.

In the CDM scheme proposed in the present embodiment, the number of codes used may be different depending on the number of bits of UL control channel data and the number of antenna ports of a UE as basic parts. Furthermore, a resource assigned to one S-PUCCH is not 1 RB, but may be multiple RBs. In this case, the number of bits of UL control channel data that may be transmitted may be increased because available REs may be increased. Furthermore, the CDM code size has been assumed to be 12, but a code smaller than 12 or greater than 12 may be used by considering a channel environment, a multiplexing channel number, etc. It may be said that CDM and frequency division multiplexing (FDM) are used together because a CDMed resource and another CDMed frequency resource can be multiplexed. In the above, S-PUCCH resource assignment directly transmitted by a given UE may be directly indicated by DCI or mapped to the index of a PDCCH, and thus the resource of an S-PUCCH may be automatically mapped depending on the transmission of the PDCCH.

(1-4) Embodiment

Figure 13:
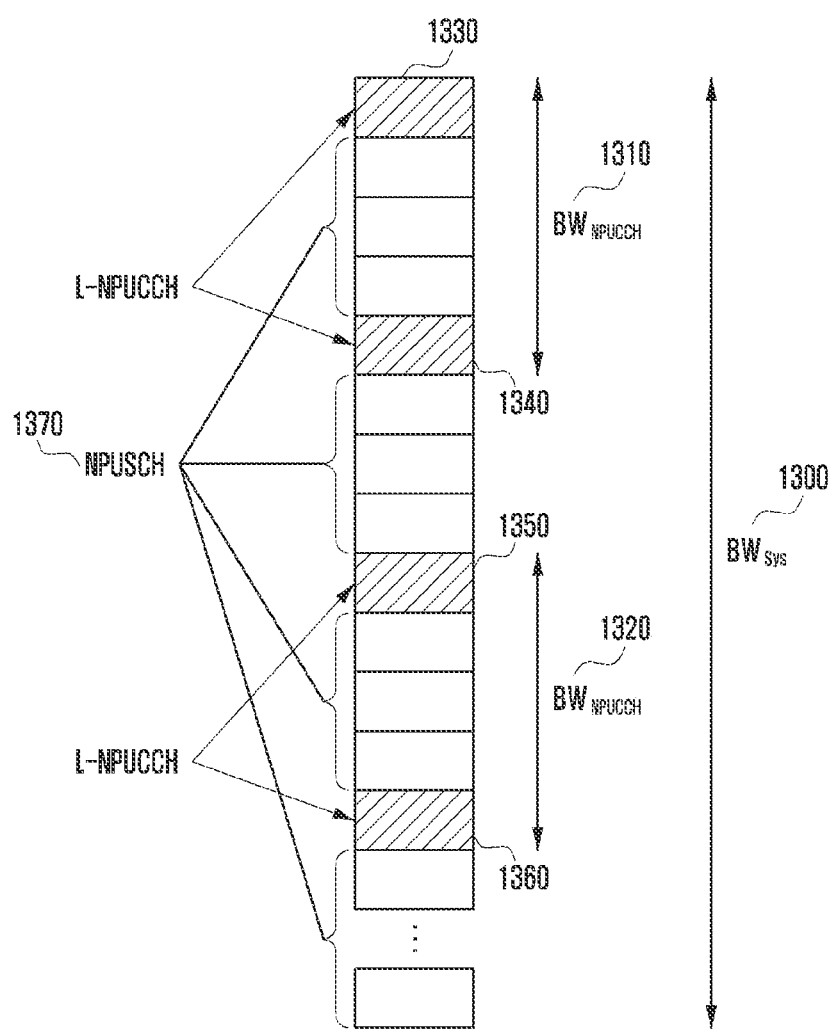
FIG. 13 is a diagram showing a channel structure for an L-PUCCH and a channel multiplexing method.

FIG. 13 is a diagram showing a channel structure for an L-PUCCH and a channel multiplexing method. An L-PUCCH uses the entire period fully or almost fully within one subframe. In this case, a channel needs to be designed by considering resource utilization and multiplexing between the L-PUCCHs of multiple UEs. Furthermore, a frequency band supported by a UE needs to be additionally considered. In the 5G system, a frequency band capable of transmission and reception supported by a UE may be smaller than a system band. Accordingly, there may be a UE to which a method of transmitting an L-PUCCH over a full band of a system is difficult to apply depending on the UE.

FIG. 13 proposes a method of configuring some region as an L-PUCCH region within a system band and multiplexing multiple L-PUCCHs within the L-PUCCH region. Assuming that 1300 is a system frequency band, the frequency band of a UE may be configured like 1310 or 1320. In this case, the size of the frequency band of the UE is smaller than the system frequency band. Accordingly, L-PUCCH resources may be assigned to both ends so that frequency diversity is the greatest within an available frequency band size of the UE. That is, an RB 1330 and an RB 1340, that is, RBs positioned at both ends within the frequency band 1310, are assigned as PUCCH resources. Furthermore, additionally, an RB 1350 and an RB 1360, that is, RBs positioned at both ends within the frequency band 1320, are assigned as L-PUCCH resources. After multiple L-PUCCH resources are configured by considering an available frequency band size of a UE as described above, an L-PUCCH used by the UE may be assigned. In order to multiplex several L-PUCCHs within one RB, CDM may be used. For the CDM scheme, a method of making different cyclic shift value of a ZC sequence or a method using an orthogonal cover code may be used. A CDM scheme may be used so that both data and a DMRS are multiplexed.

L-PUCCH resource assignment directly transmitted by a given UE may be directly indicated by DCI or may be mapped to the index of a PDCCH, and thus the L-PUCCH resource may be automatically mapped depending on the transmission of the PDCCH. Other resource 1370 other than the resource used as the L-PUCCH may be used for other PUSCH transmission, that is, for UL data transmission.

(1-5) Embodiment

In the above, it has been described that a PUCCH transmission resource for a given UE has been mapped to a PDCCH resource index and determined. Furthermore, it has been described that the timing of the PUCCH resource may be different depending on a value set by DCI or RRC signaling. In this case, there is a possibility that the resource of a PUCCH transmitted by a UE that has received a PDCCH 1 transmitted in a subframe 1 may overlap the resource of a PUCCH transmitted by a UE that has received a PDCCH 2 transmitted in a subframes 2 different from the subframe 1. That is, if the indices of the PDCCH 1 and the PDCCH 2 have the same value within the respective subframes, the frequencies of the PUCCH1 and the PUCCH2 and the positions of code resources are the same. The transmission timing of the PUCCH1 and the PUCCH2 may become the same when the transmission timing of the PUCCHs is different set. Accordingly, the present embodiment proposes a method capable of distinguishing between the PUCCH1 and the PUCCH2.

Figure 14:
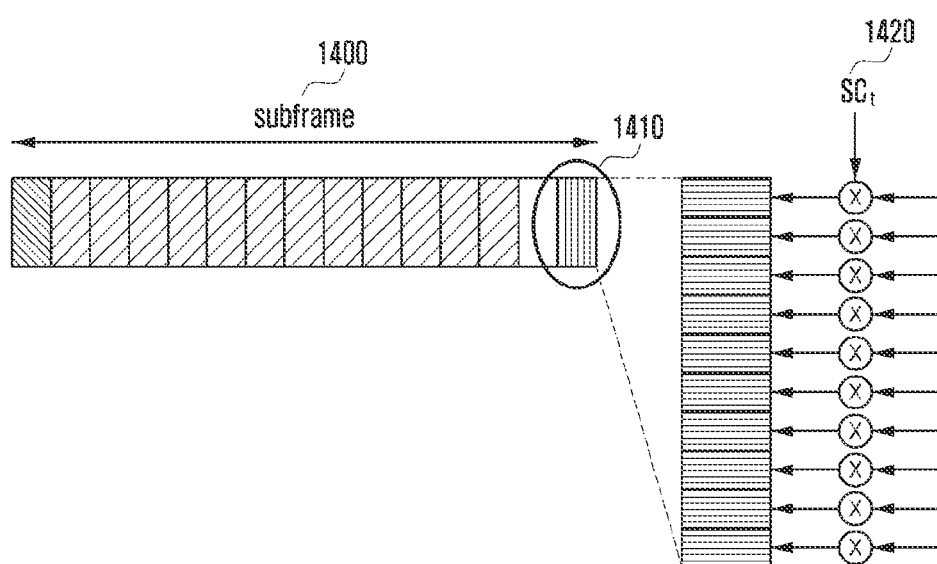
FIG. 14 is a diagram showing a method of distinguishing between PUCCHs according to a (1-5) embodiment.

FIG. 14 is a diagram showing a method of distinguishing between PUCCHs according to the (1-5) embodiment. As in FIG. 14, a UE transmits an S-PUCCH in OFDM symbols 1410 within one subframe 1400. There is a case where a UE 1 and a UE 2 have received PDCCHs in different subframes, but the resource positions of S-PUCCHs, that is, a frequency resource and a code resource, are identical because set PUCCH timing is different and a PDCCH index is the same. In this case, additionally, UEs may be distinguished by introducing a non-orthogonal scrambling code 1420. That is, the scrambling code is assigned based on PUCCH timing. Specifically, a different scrambling code may be configured depending on timing in such a manner that if a PDCCH and a PUCCH are transmitted in the same subframe, a UE performs scrambling on the PUCCH based on a scrambling code 0 and then transmits them, if a PDCCH and a PUCCH are transmitted with 1 subframe difference, a UE performs scrambling on the PUCCH based on a scrambling code 1 and then transmits them, and if a PDCCH and a PUCCH are transmitted with a 2-subframe difference, a UE performs scrambling on the PUCCH based on a scrambling code 2 and then transmits them.

Additionally, a scrambling code capable of having maximum orthogonality needs to be selected. A BS may use an interference cancellation receiver scheme in order to receive multiple PUCCHs received in the same resource. For a noise cancellation receiver operation, a method of making different received power of a PUCCH received in the same resource may be considered at the same time. That is, an offset-0 is set in PUCCH transmit power in a PUCCH using a scrambling code 0. An offset-1 is set in PUCCH transmit power in a PUCCH using a scrambling code 1. An offset-2 is set in PUCCH transmit power in a PUCCH using a scrambling code 2. An offset-3 is set in PUCCH transmit power in a PUCCH using a scrambling code 3. In the above, the offset-0 to the offset-3 may be set as different values. In the present embodiment, only an S-PUCCH has been assumed to be a PUCCH to which scrambling is applied, but an L-PUCCH may also be identified using a different scrambling mode if an L-PUCCH transmitted in the same resource can be present.

Figure 15:
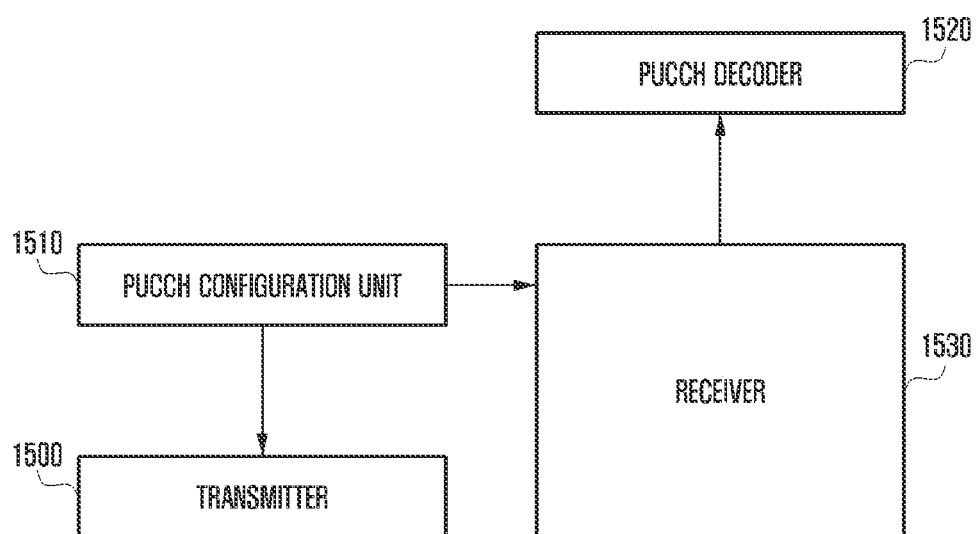
FIG. 15 is a diagram showing a base station apparatus for the present disclosure.

FIG. 15 is a diagram showing a BS apparatus for the present disclosure. In the BS, a PUCCH configuration unit 1510 determines whether an S-PUCCH will be configured or an L-PUCCH will be configured with respect to a given UE. A transmitter 1500 transmits the PUCCH to a UE through DCI or RRC signaling. Furthermore, the BS receives a PUCCH, transmitted by the UE based on a PUCCH format configured in the PUCCH configuration unit 1510, using a receiver 1530, and a PUCCH decoder 1520 decodes an UL control signal.

Figure 16:
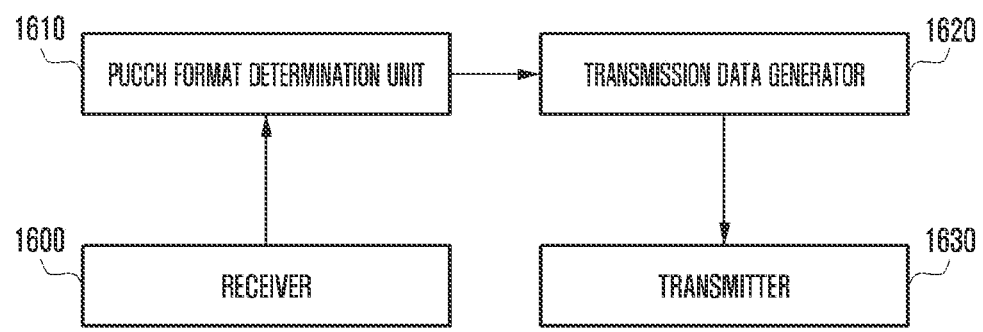
FIG. 16 is a diagram showing a terminal apparatus for the present disclosure.

FIG. 16 is a diagram showing a UE apparatus for the present disclosure. In the UE, a receiver 1600 receives configuration information from a BS. A PUCCH format determination unit 1610 identifies the configuration information regarding whether the format of a PUCCH is an S-PUCCH or an L-PUCCH, and determines a PUCCH format. A transmission data generator 1630 generates an UL control channel in an S-PUCCH or L-PUCCH form using the PUCCH format and transmits it to a transmitter 1630.

Second Embodiment

The present disclosure relates to a common wireless mobile communication system. Specifically, the present disclosure relates to a method of mapping a reference signal in a wireless mobile communication system to which a multiple access scheme using a multi-carrier, such as orthogonal frequency division multiple access (OFDMA), has been applied.

A current mobile communication system deviates from the provision of initial services based on voice, and evolves into a radio packet data communication system of high speed and high quality for providing data service and multimedia service. To this end, in several standardization organizations such as 3GPP, 3GPP2, and IEEE, a third generation evolved mobile communication system standardization task to which a multi-access scheme using multiple carriers has been applied is in progress. Recently, various mobile communication standards, such as long term evolution (LTE) of 3GPP, ultra mobile broadband (UMB) of 3GPP2, and 802.16m of IEEE, have been developed to support radio packet data transmission services of high speed and high quality based on a multi-access scheme using multiple carriers.

The existing third generation evolved mobile communication systems, such as LTE, UMB and 802.16m, are based on a multi-carrier multi-access scheme, and is characterized in that they apply multiple input multiple output (MIMO) in order to improve transmission efficiency and use various technologies, such as beamforming, an adaptive modulation and coding (AMC) method, and a channel sensitive scheduling method. The several technologies improve transmission efficiency and improve system capacity performance using a method of concentrating transmit power transmitted by several antennas depending on channel quality or controlling the amount of transmitted data and selectively transmitting data to a user having good channel quality.

Most of such schemes operate based on channel state information between a base station (evolved Node B (eNB), BS) and a terminal (user equipment (UE), mobile station (MS)). Accordingly, an eNB or UE needs to measure a channel state between the eNB and the UE. In this case, a channel status information reference signal or channel state information reference signal (CSI-RS) is used. The aforementioned eNB means a downlink (DL) transmission and an uplink (UL) reception device positioned at a given place. One eNB performs transmission and reception on a plurality of cells. A plurality of eNBs has been geographically distributed in one mobile communication system. Each eNB performs transmission and reception on a plurality of cells.

The existing third generation and fourth generation the mobile communication system, such as LTE and LTE-Advanced (LTE-A), use an MIMO technology for transmitting a signal using a plurality of transmission and reception antennas in order to expand a data rate and system capacity. If the MIMO technology is used, a plurality of information streams can be spatially separated and transmitted because a plurality of transmission and reception antennas is used. As described above, to spatially separate and transmit a plurality of information streams is called spatial multiplexing.

In general, whether spatial multiplexing can be applied to how many information streams is different depending on the number of antennas of a transmitter and a receiver. In general, whether spatial multiplexing can be applied to how many information stream is called the rank of corresponding transmission. In the case of an MIMO technology supported in the standard up to LTE-A Release 11, spatial multiplexing is supported for a case where the number of transmission antennas is 16 and the number of reception antennas is 8, and a rank is supported up to a maximum of 8.

In the case of NR (new radio access technology), that is, a 5G mobile communication system that is now discussed, a design goal of the system is to support various services, such as the enhanced mobile broadband (eMBB), massive machine type communication (mMTC), and ultra reliable and low latency communications (URLLC). For such a goal, time and frequency resources can be flexibly used by always minimizing a transmitted reference signal and transmitting a reference signal aperiodically.

In describing the present disclosure, a detailed description of a related known function or configuration will be omitted if it is deemed to make the gist of the present disclosure unnecessarily vague. Furthermore, terms to be described hereunder have been defined by taking into consideration functions in the present disclosure, and may be different depending on a user, an operator's intention or practice. Accordingly, each term should be defined based on contents over the entire specification.

Hereinafter, in this specification, an invention is described by taking the NR system, the long term evolution (LTE) system and the LTE-advanced (LTE-A) system as examples, but the present disclosure may be applied to other communication systems using a licensed band and a non-licensed band without making separate adjustments.

Figure 17:
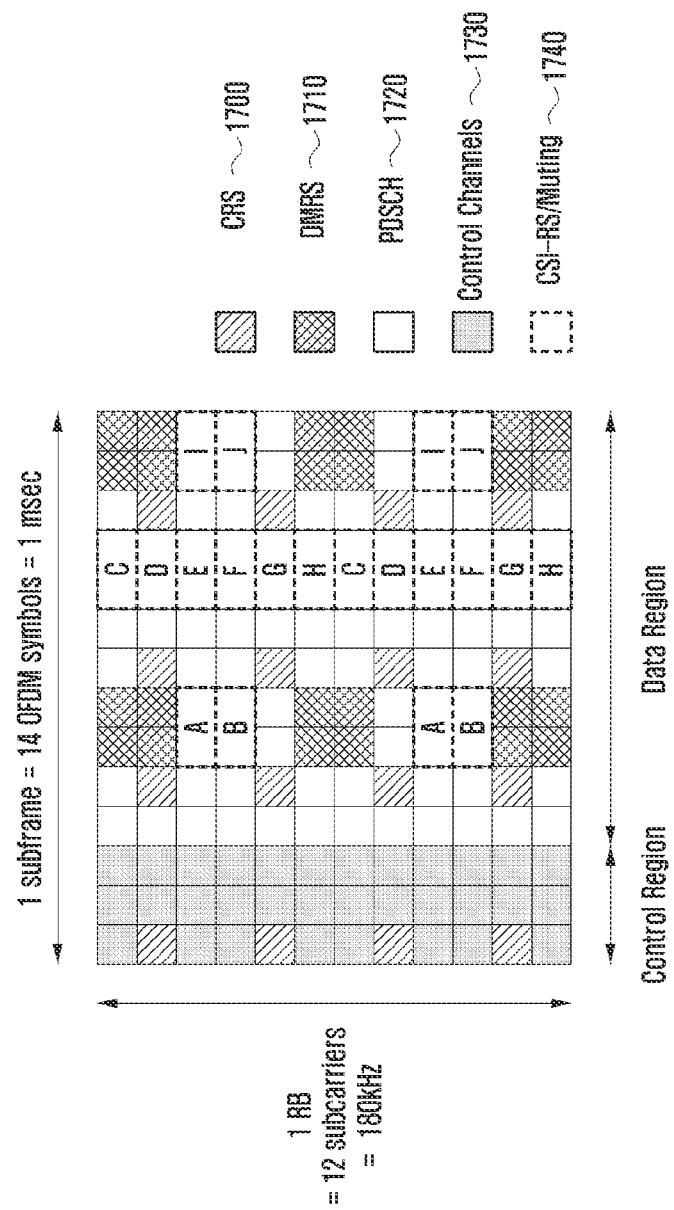
FIG. 17 is a diagram showing a radio resource of 1 subframe, that is, a minimum unit of downlink scheduling, and 1 resource block in the LTE and LTE-A systems.

The NR (new radio access technology) system, that is, a new 5G communication, is designed so that various services are freely multiplexed in time and frequency resources. Accordingly, a waveform and/or a numerology and a reference signal may be assigned dynamically or freely if a corresponding service is necessary. In the existing LTE system, a CRS is always transmitted in all of subframes, and a primary synchronization signal (PSS), a secondary synchronization signal (SSS) and a physical broadcast channel (PBCH) are transmitted in a given subframe. Accordingly, the existing LTE system has a restriction in that a resource for unwanted signals must be always used although service not using the existing signal, such as a CRS, is newly designed. In the NR system, in order to obviate such a restriction, a resource called a forward compatible resource (FCR) may be configured directly or indirectly. The present disclosure proposes a method for making efficient the transmission of a reference signal, control information, data, etc. based on a direct or indirect FCR configuration. FIG. 17 is a diagram showing a radio resource of 1 subframe, that is, a minimum unit of downlink scheduling, and 1 resource block in the LTE and LTE-A systems.

The radio resource shown in FIG. 17 includes one subframe in a time axis and includes one RB in a frequency axis. Such a radio resource includes 12 subcarriers in the frequency domain and includes 14 OFDM symbols in the time domain, and has a total of 168 unique frequency and time positions. In the LTE and LTE-A systems, each unique frequency and time position of FIG. 17 is called a resource element (RE).

The following different types of a plurality of signals may be transmitted in the radio resource of FIG. 17.

1. A cell-specific reference signal (CRS) 1700: this is a reference signal periodically transmitted for all of UEs belonging to one cell, and may be used by a plurality of UEs in common.

2. A demodulation reference signal (DMRS) 1710: this is a reference signal transmitted for a given UE, and is transmitted only when data is transmitted to a corresponding UE. The DMRS may have a total of 8 DMRS antenna ports. In the LTE and LTE-A systems, antenna ports 7 to 14 correspond to DMRS antenna ports, and antenna ports maintain orthogonality so that interference does not occur between them using code division multiplexing (CDM) or frequency division multiplexing (FDM).

3. A physical downlink shared channel (PDSCH) 1720: this is a data channel transmitted in DL. The data channel is used for a BS to transmit traffic to a UE, and is transmitted using an RE in which a reference signal is not transmitted in the data region of FIG. 17.

4. A CSI-RS 1740: this is a reference signal transmitted for UEs belonging to one cell and is used to measure a channel state. A plurality of CSI-RSs may be transmitted in one cell.

5. Other control channels (physical hybrid-ARQ indicator channel (PHICH), physical control format indicator channel (PCFICH), physical DL control channel (PDCCH)) 1730: they are used to provide control information that is necessary for a UE to receive DL data on a PDSCH or to transmit received acknowledgement or received non-acknowledgement information (ACK/NACK) for operating a hybrid ARQ (HARQ) for UL data transmission.

In addition to the signals, in the LTE-A system, muting may be configured so that a CSI-RS transmitted by other BS can be received by UEs of a corresponding cell without interference. The muting may be applied to a position where a CSI-RS may be transmitted. In general, a UE skips a corresponding radio resource and receives a traffic signal. In the LTE-A system, muting is called zero-power CSI-RS as another term. The reason for this is that from the nature of the muting, the muting is applied to the position of a CSI-RS and has no transmit power.

In FIG. 17, a CSI-RS may be transmitted using some of positions indicated by A, B, C, D, E, E, F, G, H, I and J depending on the number of antennas that transmit the CSI-RS. Furthermore, muting may also be applied to some of the positions indicated by A, B, C, D, E, E, F, G, H, I and J. Specifically, in the case of a CSI-RS, muting may be transmitted on 2, 4 or 8 REs depending on the number of transmitted antenna ports. If the number of antenna ports is 2, a CSI-RS is transmitted in half of a given pattern in FIG. 17. If the number of antenna ports is 4, a CSI-RS is transmitted in the entire given pattern. If the number of antenna ports is 8, a CSI-RS is transmitted using two patterns.

In contrast, muting always has one pattern unit. That is, muting may be applied to a plurality of patterns, but cannot be applied to only some of one pattern if its position does not overlap the position of a CSI-RS. However, muting may be applied to only some of one pattern only when the position of a CSI-RS overlaps that of muting.

If a CSI-RS for two antenna ports is transmitted, a signal of each antenna port is transmitted in two REs connected in the time axis, and the signals of antenna ports are classified based on orthogonal codes. Furthermore, if a CSI-RS for four antenna ports is transmitted, a signal for two antenna ports added according to the same method is transmitted further using two REs in addition to the CSI-RS for the two antenna ports. The same is true of a case where a CSI-RS for 8 antenna ports is transmitted. In the case of a CSI-RS supporting 12 and 16 antenna ports, a transmission resource includes a combination of three CSI-RS transmission position for the existing 4 antenna ports or a combination of two CSI-RS transmission positions for 8 antenna ports.

Furthermore, a UE may be assigned with channel state information-interference measurement (CSI-IM) or interference measurement resources (IMR) by a BS along with a CSI-RS. The resource of CSI-IM has the same resource structure and position as a CSI-RS that supports 4 antenna ports. CSI-IM is a resource used by a UE that receives data from one or more BSs to accurately measure interference from an adjacent BS. If the amount of interference when an adjacent BS transmits data and the amount of interference the adjacent BS does not transmit data are to be measured, a BS may configure a CSI-RS and two CSI-IM resources, and can effectively measure the amount of interference of the adjacent BS in such a manner that the adjacent BS always transmits a signal in one CSI-IM and the adjacent BS does always transmit a signal in the other CSI-IM.

Table 1 shows an RRC field configuring a CSI-RS configuration. The RRC field includes the contents of an RRC configuration for supporting a periodic CSI-RS within a CSI process.

TABLE 1

TABLE-US-00001 CSI-RS config CSI-IM config CQI report config Etc No. antenna ports Resource config Periodic P.sub.C Resource config Time and frequency Mode, resource, Codebook subset Time and frequency position in a subframe periodicity, offset . . . restriction position in a subframe Subframe config Aperiodic Subframe config Periodicity and subframe Mode . . . Periodicity and subframe offset PMI/RI report offset RI reference CSI Qcl-CRS-info (QCL process Type B) SubframePattern CRS information for CoMP Configurations for reporting a channel state may be classified into four types as in Table 1 based on a periodic CSI-RS within a CSI process. CSI-RS config is for configuring the frequency and time positions of a CSI-RS RE. In this case, how many antenna ports are included in a corresponding CSI-RS is configured through an antenna number configuration. Resource config configures an RE position within an RB. Subframe config configures the period and offset of a subframe in which a CSI-RS is transmitted. Table 2 is a table for a Resource config configuration supported in current LTE, and Table 3 is a table for a Subframe config configuration.

TABLE 2

TABLE-US-00002 Number of CSI reference signals configured CSI reference signal 1 or 2 4 8 configuration (k', l') n.sub.s mod 2 (k', l') n.sub.s mod 2 (k', l') n.sub.s mod 2 Frame structure 0 (9, 5) 0 (9, 5) 0 (9, 5) 0 type 1 and 2 1 (11, 2) 1 (11, 2) 1 (11, 2) 1 2 (9, 2) 1 (9, 2) 1 (9,

TABLE 2-continued 2) 1 3 (7, 2) 1 (7, 2) 1 (7, 2) 1 4 (9, 5) 1 (9, 5) 1 (9, 5) 1 5 (8, 5) 0 (8, 5) 0 6 (10, 2) 1 (10, 2) 1 7 (8, 2) 1 (8, 2) 1 8 (6, 2) 1 (6, 2) 1 9 (8, 5) 1 (8, 5) 1 10 (3, 5) 0 11 (2, 5) 0 12 (5, 2) 1 13 (4, 2) 1 14 (3, 2) 1 15 (2, 2) 1 16 (1, 2) 1 17 (0, 2) 1 18 (3, 5) 1 19 (2, 5) 1 Frame structure 20 (11, 1) 1 (11, 1) 1 (11, 1) 1 type 2 only 21 (9, 1) 1 (9, 1) 1 (9, 1) 1 22 (7, 1) 1 (7, 1) 1 (7, 1) 1 23 (10, 1) 1 (10, 1) 1 24 (8, 1) 1 (8, 1) 1 25 (6, 1) 1 (6, 1) 1 26 (5, 1) 1 27 (4, 1) 1 28 (3, 1) 1 29 (2, 1) 1 30 (1, 1) 1 31 (0, 1) 1

TABLE 3

TABLE-US-00003 CSI-RS subframe CSI-RS- CSI-RS periodicity T.sub.CSI-RS offset .DELTA..sub.CSI-RS SubframeConfig I.sub.CSI-RS (subframes) (subframes) 0-4 5 I.sub.CSI-RS 5-14 10 I.sub.CSI-RS-5 15-34 20 I.sub.CSI-RS-15 35-74 40 I.sub.CSI-RS-35 75-154 80 I.sub.CSI-RS-75

A UE may check frequency and time positions, a period and an offset where a CSI-RS is configured through Tables 2 and 3. Qc-CRS-info configures quasi co-location information for CoMP.

CSI-IM config is for configuring the frequency and time positions of CSI-IM for measuring interference. CSI-IM does not require the setting of the number of antenna ports because it is always configured based on 4 antenna ports. Resource config and Subframe config are configured using the same method as a CSI-RS.

CQI report config is information for configuring how a channel state report will be made using a corresponding CSI process. The corresponding configuration includes a periodic channel state report configuration, an aperiodic channel state report configuration, a precoding matrix indicator (PMI) and rank indicator (RI) report configuration, an RI reference CSI process configuration, and a subframe pattern configuration.

frame subset for supporting interference measurement. The measurement subframe subset has been first introduced to estimate a channel state by incorporating other interference characteristics of an almost blank subframe (ABS) and a common subframe other than an ABS in enhanced inter-cell interference coordination (eICIC). Thereafter, in order to measure different channel characteristics between a subframe always operating in DL and a subframe capable of dynamically switching from DL to UL, eICIC has evolved into enhanced interference mitigation and traffic adaptation (eIMTA) of an enhanced form in which two IMRs are configured and measurement is performed. Table 4 and Table 5 show measurement subframe subsets for eICIC and eIMTA support, respectively.

TABLE 4

TABLE-US00004 CQI-ReportConfig-r10 ::= SEQUENCE
{ cqi -ReportAperiodic-r10 CQI-ReportAperiodic-r10 OPTIONAL, -- Need ON
nomPDSCH-RS-EPRE-Offset INTEGER (−1..6), cqi-ReportPeriodic-r10
CQI-ReportPeriodic-r10 OPTIONAL, -- Need ON pmi-RI-Report-r9 ENUMERATED (setup)
OPTIONAL, -- Cond PMIRIPCell csi-SubframePatternConfig-r10 CHOICE {release NULL,
setup SEQUENCE { csi -MeasSubframeSet1-r10 MeasSubframePattern-r10,
csi-MeasSubframeSet2-r10 MeasSubframe-Pattern-r10 } } OPTIONAL -- Need ON }

TABLE 5

TABLE-US00005 CQI-ReportConfig-v1250 ::= SEQUENCE
{ csi-SubframePatternConfig-r12 CHOICE { release NULL, setup SEQUENCE
{ csi-MeasSubframeSets-r12 BIT STRING (SIZE (10)) } } OPTIONAL, -- Need ON
cqi-ReportBoth-v1250 CQI-ReportBoth-v1250 OPTIONAL, -- Need ON
cgi-ReportAPeriodic-v1250 CQI-ReportAperiodic-v1250 OPTIONAL, -- Need ON
altCQI-Table-r12 ENUMERATED { allSubframes, csi-SubframeSet1, csi-SubframeSet2,
spare1 } OPTIONAL -- Need OP }

An eICIC measurement subframe subset supported in LTE is configured using csi-MeasSubframeSet1-r10 and csi-MeasSubframeSet2-r10. MeasSubframePattern-r10 referred by a corresponding field is shown in Table 6.

TABLE 6

TABLE-US00006 ASN1START MeasSubframePattern-r10 ::= CHOICE
{ subframePatternFDD-r10 BIT STRING (SIZE (40)), subframePatternTDD-r10 CHOICE
{subframeConfig,1-5-r10 BIT STRING (SIZE (20)), subframeConfig0-r10 BIT STRING (SIZE
(70)), subframeConfig6-r10 BIT STRING (SIZE (60)), ... }, ... } -- ASN1STOP A subframe pattern is for configuring a channel received by a UE, a channel having a temporally different characteristic in interference measurement, and a measurement sub- In the field, in the case of a subframe #0 from the MSB on the left and 1, it indicates that a subframe indicated by a corresponding bit is included in a measurement subframe subset. Unlike in the eICIC measurement subframe subset in which each subframe set is configured through each field, in codebookSubsetRestriction field included in AntennaInfoDedicated of Table 9.

TABLE 9

TABLE-US00009 AntennaInfoDedicated ::= SEQUENCE { transmissionMode ENUMERATED { tm1, tm2, tm3, tm4, tm5, tm6, tm7, tm8-v920}, codebookSubsetRestriction CHOICE { n2TxAntenna-tm3 BIT STRING (SIZE (2)), n4TxAntenna-tm3 BIT STRING (SIZE (4)), n2TxAntenna-tm4 BIT STRING (SIZE (6)), n4TxAntenna-tm4 BIT STRING (SIZE (64)), n2TxAntenna-tm5 BIT STRING (SIZE (4)), n4TxAntenna-tm5 BIT STRING (SIZE (16)), n2TxAnterma-tm6 BIT STRING (SIZE (4)), n4TxAntenna-tm6 BIT STRING (SIZE (16)) } OPTIONAL, -- Cond TM ue-TransmitAntennaSelection CHOICE{ release NULL, setup ENUMERATED {closedLoop, openLoop} } } AntennaInfoDedicated-r10 ::= SEQUENCE {transmissionMode-r10 ENUMERATED { tm1, tm2 , tm3, tm4, tin5, tm6, tm7, tm8-v920, tm9-v1020, tm10-v1130, spare6, spare5, spare4, spare3, spare2, spare1}, codebookSubsetRestriction-r10 BIT STRING OPTIONAL, -- Cond TMX ue-TransmitAntennaSelection CHOICE{ release NULL, setup ENUMERATED {closedLoop, openLoop} } } the eIMTA measurement subframe subset, 0 indicates that a corresponding subframe belongs to a first subframe set and 1 indicates that a corresponding subframe belongs to a second subframe set using one field. Accordingly, an eICIC subframe set and an eIMTA subframe set are different in that in the eICIC subframe set, a corresponding subframe may not be included in two subframe sets, but in the eIMTA subframe set, a corresponding subframe must be included in one of the two subframe sets.

In addition, Pc meaning a power ratio between a PDSCH and a CSI-RS RE necessary for a UE to generate a channel state report and information, such as a codebook subset restriction that configures which codebook will be used, are present. Pc and the codebook subset restriction are configured by a p-C-AndCBSRList field of Table 7, including two P-C-AndCBSR fields of Table 8 in a list form. Each of the two P-C-AndCBSR fields means a configuration for each subframe subset.

TABLE 7

TABLE-US00007 CSI-Process-r11 ::= SEQUENCE { ... p-C-AndCBSRList-r11 SEQUENCE (SIZE (1..2)) OF P-C- AndCBSR-r11, ... }

TABLE 8

TABLE-US00008 P-C-AndCBSR-ril ::= SEQUENCE { p-C-r 11 INTEGER (-8..15), codebookSubsetRestriction-r11 BIT STRING }

The Pc may be defined like Equation 1 and may indicate a value between −8.about.15 dB.

$PC = PDSCH\ EPRE\ CSI\text{-}RS\ EPRE$  [Equation 1] ##EQU0000 ##

A BS may adjust CSI-RS transmission power for various purposes, such as channel estimation accuracy improvement, variably. A UE can be aware of how much transmit power to be used for data transmission will be lower or higher than transmit power used for channel estimation based on notified P.sub.C. Accordingly, the UE may calculate and report an accurate channel quality indicator (CQI) to the BS although the BS changes CSI-RS transmission power.

The codebook subset restriction is a function for enabling a BS to configure the codepoints of a codebook supported by the standard based on the number of CRS or CSI-RS antenna ports so that a UE does not report the codepoints to the BS. Such codebook subset restriction may be configured by a codebookSubsetRestriction field included in AntennaInfoDedicated of Table 9.

The codebookSubsetRestriction field is configured in a bitmap, and the size of the bitmap is the same as the number of codepoints of a corresponding codebook. Accordingly, each bitmap indicates each codepoint. When a corresponding value is 1, a UE may report a corresponding codepoint to a BS through a PMI. When a corresponding value is 0, a UE cannot report a corresponding codepoint to a BS through a PMI. For reference, the MSB indicates a high precoder index, and the LSB indicates a low precoder index (e.g., 0).

In the cellular communication system, a BS needs to measure a DL channel state and transmit a reference signal to a UE. In the case of the LTE-A system, a UE measures a channel state between the UE and a BS using a CRS or CSI-RS transmitted by the BS. In the channel state, some factors must be basically considered, and include the amount of interference in DL. The amount of interference in DL includes an interference signal and thermal noise occurring due to an antenna belonging to an adjacent BS, and is important for a UE to determine a channel situation in DL.

For example, if a BS having one transmission antenna transmits a signal to a UE having one reception antenna, the UE has to determine energy per symbol that may be received in DL and the amount of interference to be received at the same time in the period in which a corresponding symbol is received using a reference signal received from the BS, and to determine Es/Io (the energy ratio of symbols to the amount of interference). The determined Es/Io is converted into a data transmission speed or a corresponding value, and the BS is notified of the data transmission speed or corresponding value in the form of CQI. Accordingly, the BS may determine that it will perform transmission to the UE at which data transmission speed in DL.

In the case of the LTE-A system, a UE feeds information about a channel state of DL back to a BS so that the BS can use the information for DL scheduling. That is, the UE measures a reference signal transmitted by the BS in DL, and feeds information extracted from the reference signal back to the BS in a form defined in the LTE and LTE-A standard. In LTE and LTE-A, information fed back by a UE basically includes the following three types.

A rank indicator (RI): the number of spatial layers that may be received by a UE in a current channel state.

A precoding matrix indicator (PMI): an indicator providing notification of a precoding matrix preferred by a UE in a current channel state.

A channel quality indicator (CQI): a maximum data rate at which a UE may perform reception in a current channel state. The CQI may be substituted with a signal to interference and noise ratio (SINR), a maximum error correction code rate and modulation scheme, or data efficiency per frequency, which may be similarly used with a maximum data rate.

The RI, PMI and CQI are associated and have meanings. For example, a precoding matrix supported in LTE and LTE-A are differently defined for each rank. Accordingly, if the RI has a value of 1, when a PMI value and an RI have a value of 2, the PMI value is differently interpreted although the values are the same. Furthermore, when a UE determines a CQI, the UE determines the CQI on the assumption that a rank value and PMI value of which a BS has been notified by the UE have been applied in the BS. That is, if the UE has notified the BS of RI_X, PMI_Y, and CQI_Z, when a rank is RI_X and an applied precoding matrix is PMI_Y, this means that the UE can receive data at a data rate corresponding to CQI_Z. As described above, when a UE calculates a CQI, it assumes that which transmission scheme will be performed on a BS so that optimized performance can be obtained when actual transmission is performed using the corresponding transmission scheme.

Figure 18:
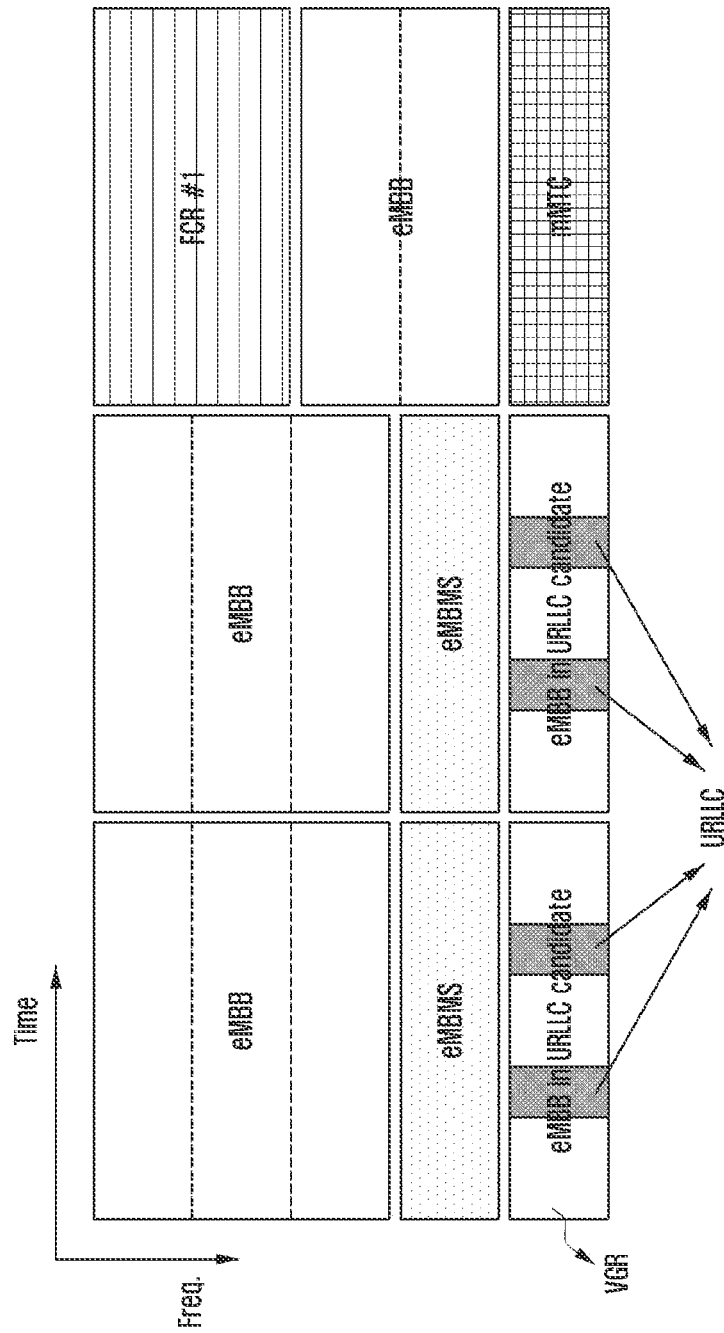
FIG. 18 is a diagram showing an example in which data for eMBB, URLLC and mMTC, that is, services considered in an NR system, is assigned in a frequency-time resource along with a forward compatible resource.

FIG. 18 is a diagram showing an example in which data for eMBB, URLLC and mMTC, that is, services considered in an NR system, is assigned in a frequency-time resource along with a forward compatible resource (FCR).

According to FIG. 18, if URLLC data occurs and URLLC transmission is necessary while eMBB and mMTC services are assigned and transmitted in a given frequency band, portions to which eMBB and mMTC have been previously assigned are emptied, and the URLLC data is transmitted. Since a short latency time, particularly, is important in the URLLC of the service, URLLC data may be assigned to part of a resource to which eMBB has been assigned and transmitted. A UE may be notified such an eMBB resource in advance. To this end, eMBB data may not be transmitted in a frequency-time resource in which eMBB data and URLLC data overlap. Accordingly, transmission performance of the eMBB data may be reduced. That is, in this case, an eMBB data transmission failure attributable to the URLLC allocation may occur. In this case, the length of a transmission time interval (TTI) used for URLLC transmission may be shorter than a TTI length used for eMBB or mMTC transmission.

Figure 19:
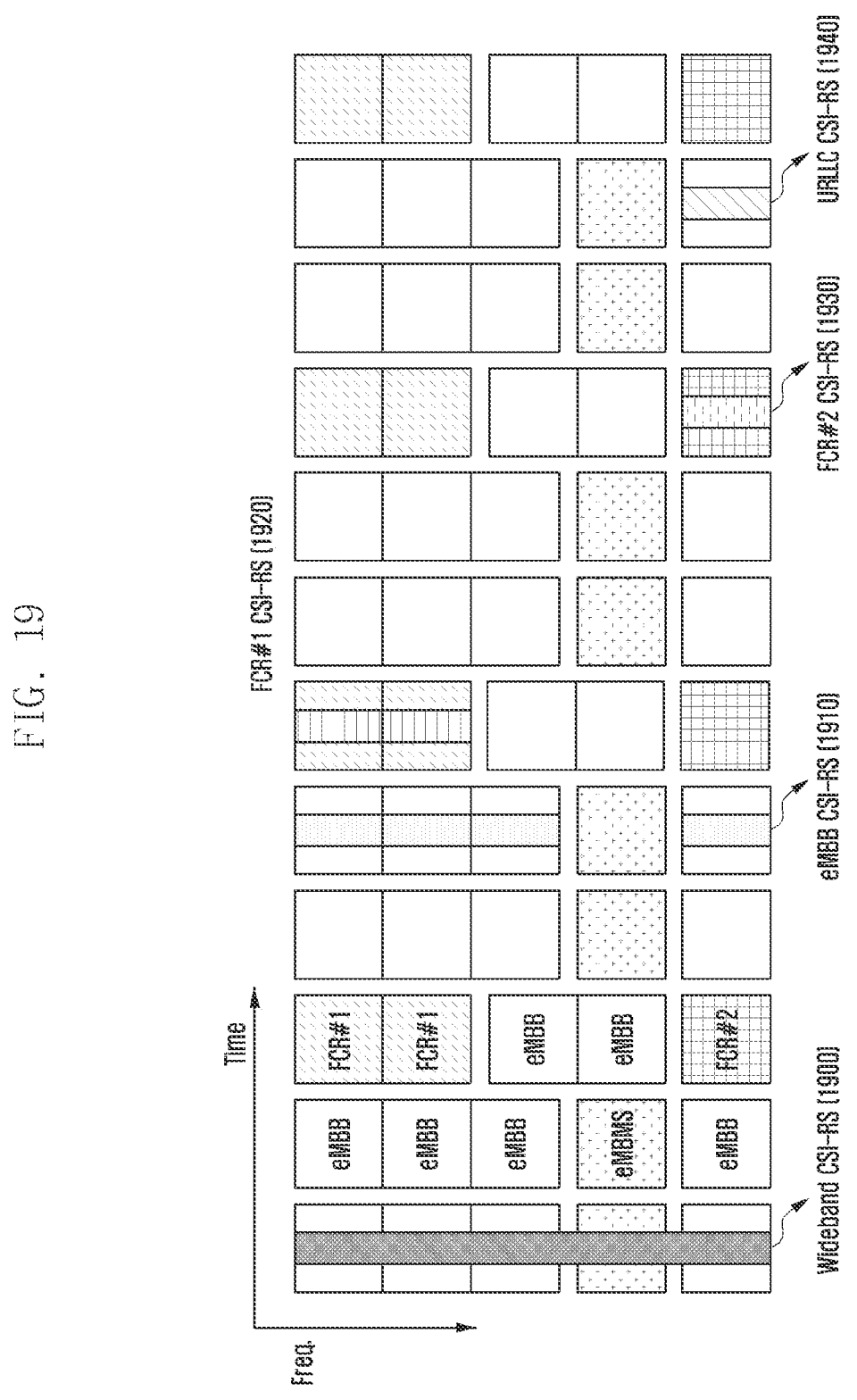

FIG. 19 is a diagram showing the assumption of a case where services have been multiplexed in time-frequency resources in the NR system.

According to FIG. 19, a BS may allocate a CSI-RS to a full band or multiple bands with respect to a UE in order to secure initial channel state information like 1900. Such a full band or wideband CSI-RS may be disadvantageous in optimizing system performance because it generates a lot of reference signal overhead, but a CSI-RS of such a full band or a plurality of bands may be essential if previously secured channel state information is not present.

After CSI-RS transmission of such a full band or multiple bands, each service may be provided with different requirements for each service. Accordingly, required accuracy and update of necessary channel state information may also be different. Accordingly, after a BS secures such initial channel state information, the BS may trigger subband CSI-RSs 1910, 1920 and 1930 for each service in a corresponding band when they are necessary for each service. FIG. 19 illustrates that a CSI-RS for one service is transmitted at one timing, but a CSI-RS for a plurality of services may be transmitted, if necessary.

As described in FIGS. 18 and 19, the service of a corresponding band may be different depending on a change in the time and frequency resources of a BS. Various channel and interference situations need to be considered by taking into consideration such a service.

Figure 20:
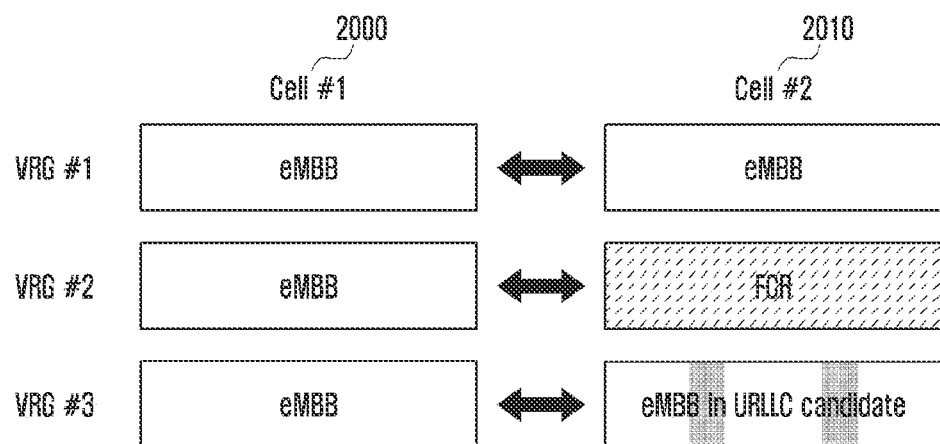
FIG. 20 is a diagram showing a service of an interference cell according to a change of time-frequency resources in the eMBB viewpoint and a corresponding interference condition change.

FIG. 20 is a diagram showing a service of an interference cell according to a change of time-frequency resources in the eMBB viewpoint and a corresponding interference condition change.

In FIG. 20, one rectangle means a vertical resource group (VRG), that is, a basic unit of a time-frequency resource configured for a UE by a BS. In FIG. 20, all of VRG resources of a first cell 2000 have been configured as eMBB. In this case, another cell (second cell 2010) may use each VRG resource as an eMBB, FCR or URLLC candidate resource. A signal transmission method may be different in the resource of the second cell depending on a service necessity. Accordingly, the characteristic of interference affecting the first cell may be different.

For example, in the case of URLLC, many resources compared to the amount of transmitted data may be used for a corresponding service because high reliability is necessary. Furthermore, since URLLC data has higher priority than other services, a corresponding UE preferentially occupies a resource at timing when URLLC must be transmitted. Accordingly, in a corresponding VRG of the first cell, a change in the frequency band may be relatively small compared to a VRG in which eMBB acts as interference. Accordingly, an interference prediction of a BS may be relatively easy. Furthermore, although not included in FIG. 20, if the service of an interference resource is mMTC, a UE having relatively low power repeatedly transmits a signal for coverage improvement. Accordingly, the amount of interference may be small compared to a case where the service of an interference resource is URLLC. For this reason, this may be relatively advantageous for the data transmission of an eMBB UE.

In FIG. 20, a case where all of the resources of the first cell have been configured for eMBB transmission has been assumed. However, there is a need for a signal and interference measurement assumed when the corresponding resources are configured for FCR or URLLC and mMTC services. Accordingly, there is a need for a channel state measurement and report method into which such a situation may be incorporated.

Furthermore, for an effective coordinated multipoint (CoMP) operation and a subband beamformed (BF) CSI-RS operation, signal and interference measurement according to time-frequency resources are necessary.

Figure 21:
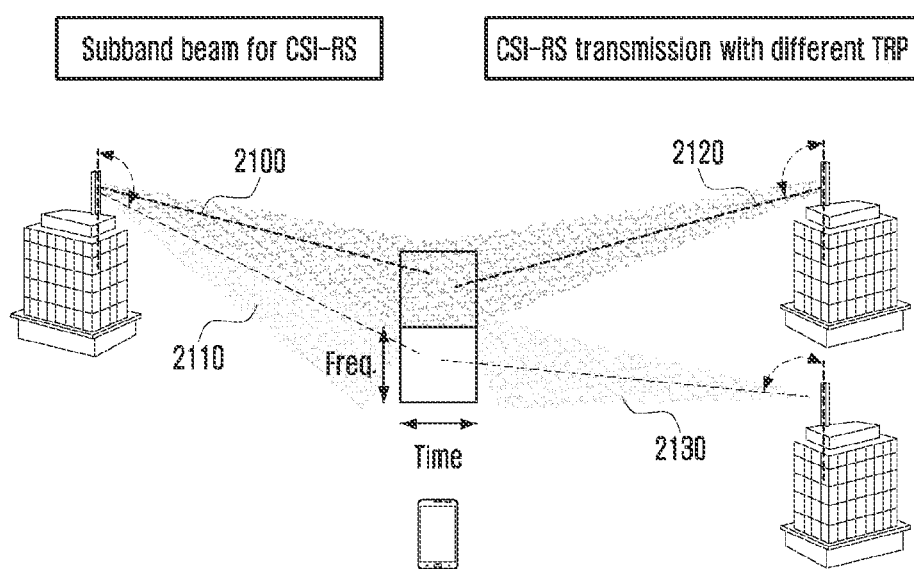
FIG. 21 is a diagram showing an example in which a base station transmits a CSI-RS in order to effectively measure and report channel state information in the NR system.

FIG. 21 is a diagram showing an example in which a BS transmits a CSI-RS in order to effectively measure and report channel state information in the NR system.

The best beam direction may be different for each frequency band. Accordingly, it may be effective to transmit a different analog beam and digital beam depending on each frequency band. In the case of an analog beam, a different signal cannot be transmitted for each frequency band due to a hardware limit. In contrast, in the case of a digital beam, the phase of a corresponding signal has only to be different. Accordingly, a BS may transmit a different beam in each frequency band as shown in 2100 and 2110 and transmit a CSI-RS based on the beam. Furthermore, a CSI-RS may be transmitted from transmission reception points (TRPs) geographically positioned at different places in addition to a different beam direction.

A CSI-RS in the existing LTE system has been designed on the assumption that the same signal is transmitted in a full band. In order for a different service or beam to be applied or for a CoMP scenario to be applied to a different time-frequency resource as described above, a CSI-RS transmission and reception and channel state information feedback method different from the existing method is necessary.

An eMBB, URLLC or mMTC resource for each of the services and a resource for supporting a channel state measurement and report on a different beam and CoMP scenario may be one physical resource block (PRB) or a plurality of PRB units. A plurality of corresponding PRB units may be called a service group (SG), a service resource group (SRG), a vertical group (VG), a vertical resource group (VRG), a frequency resource block group (FRG), a physical resource block group (PRG) or a multiple PRB group (MPG). Furthermore, a corresponding resource may also be called a time and frequency resource block group (TFRG) because the configuration may also be considered in time and frequency resources in addition to the frequency. In the following description of this specification, description is given based on a VRG, but a VRG in the subsequent description may be substituted with all of the aforementioned terms and similar terms.

The aforementioned VRG resource configuration unit needs to be designated based on a time and frequency resource. In this case, the unit of a time resource may be defined as one value in the standard or may be configured through RRC signaling. If the unit of a time resource is defined as one value on the standard, a service conversion unit of a plurality of cells may be configured as one value. Accordingly, interference affecting the signal of a BS that transmits data also has the same service conversion unit. Accordingly, a UE and a BS can predict a change in corresponding interference relatively easily.

However, if service conversion is not frequently necessary in the time resource, a BS may increase unnecessary configuration overhead if the unit of a time resource is defined as one small time unit (e.g., one slot or subframe). Furthermore, in the opposite case, likewise, if the unit of a time resource is a great time unit (e.g., several tens of ms), system performance may be deteriorated and a service requirement may not be satisfied because a service cannot be smoothly changed in the time resource according to a BS's necessity. Accordingly, a corresponding time resource unit needs to be determined by taking this into consideration.

If a time resource unit has been allowed to be configured through RRC signaling, each of a plurality of BSs or TRPs may freely change a corresponding time service unit. Accordingly, a BS and a UE may freely configure and use a corresponding time unit according to the needs of a corresponding system. However, in order to satisfy this, a UE implementation becomes complicated, and the prediction of interference may become relatively difficult because other cells also change and use time units according to the needs of service in a UE viewpoint. Accordingly, it is preferred that a corresponding configurable time unit is restricted to only given values. Table 10 illustrates a service unit designation field in time for such a VRG configuration.

In the above example, a BS may configure the size of a corresponding time resource as one of 5 ms, 10 ms, 20 ms and 40 ms with respect to a UE. The UE may check the size and number of VRG time resources based on the configuration and operate accordingly. In the above example, the number of time units that may be configured for the UE by the BS may be changed. In the above example, the number has been illustrated as being configured in a ms unit, but the corresponding unit may be various units, such as a TTI or a subframe. Furthermore, in the above example, a direct number has been illustrated as being set, but the number may be indirectly set like a type A or a type B not the direct number. In this case, such a time unit may have been included in a corresponding type configuration.

Size setting in the frequency axis of a VRG may also be defined as one value in the standard as described above or may be performed through RRC signaling. If a frequency size is defined as one value in the standard, interference also has the same service conversion unit with respect to the signal of a BS that transmits data because a service conversion unit may be set as one value in the frequency axis with respect to a plurality of cells. Accordingly, the UE and the BS can predict a change in the corresponding interference relatively easily. However, when a BS does not frequently require a service conversion in a frequency resource, unnecessary configuration overhead may be increased if a frequency resource unit has been defined as one small frequency unit (e.g., one PRB). Furthermore, in the opposite case, likewise, if a great frequency resource unit (e.g., several tens of PRBs) has been defined, service can be flexibly changed in the time resource according to a BS's necessity. Accordingly, system performance may be deteriorated, and a service requirement may not be satisfied. Accordingly, a corresponding frequency resource unit needs to be determined by taking them into consideration.

When a frequency resource unit is determined according to the standard as described above, an efficient frequency resource unit may be different depending on the size of a system band. In other words, when a system band is relatively small, it is important to finely divide a frequency band and to efficiently multiplex the corresponding band. However, if a system band is sufficient, it may be preferred to roughly divide a frequency band and efficiently use them rather than to increase configuration overhead by finely dividing the frequency band. Such a method may be applied to a system band or bandwidth part. The bandwidth part means some of a full system band that may be used by a given UE. Table 11 is a table showing an example in which a corresponding frequency resource is exemplified as a VRG and a VRG size in a frequency band is changed depending on the size of a system band. In the following table, system bands may be understood as bandwidth parts.

TABLE 11

TABLE-US-00011 System Bandwidth VRG Size in frequency (N.sub.RB.sup.DL)
(PRBs) .ltoreq.10 5 11-26 10 27-63 20 64-110 30 110-120 40 120-150 50 150-200 60 200-300 70 300-500 80

TABLE 10

TABLE-US000010 VRGInfo ::= SEQUENCE ... timeResourceGran ENUMERATED {5, 10, 20, 40} ... }

In Table 11, the size of a VRG is changed depending on a configured system band. A BS may be configured to support a different service or vertical (this may be understood to refer to a service supported in the 5G system) for each VRG with respect to a UE based on a VRG having a service unit of such a frequency band. In this case, Table 12 illustrates that a VRG size varies depending on a system band configuration. A system band range and the direct number of a VRG size in the above table may be different.

Furthermore, in a frequency unit, a VRG service unit may be configured through RRC signaling. In this case, each of a plurality of BSs or TRPs may freely change a corresponding frequency service unit. Accordingly, a BS and a UE can freely configure and use a corresponding frequency unit according to the needs of a corresponding system. However, in order to satisfy this, a UE implementation becomes complicated, and the prediction of interference may become relatively difficult because other cell also change and use a frequency service unit according to a service's needs in the UE viewpoint. Accordingly, it is preferred to restrict a corresponding configurable frequency unit to only given values. Table 12 illustrates a service unit designation field in the frequency axis for such a VRG configuration.

TABLE 12

TABLE-US-00012 VRGInfo ::= SEQUENCE { ...
frequencyResourceGran ENUMERATED {5, 10, 20, 40} ... }

In the above example, a BS may configure the size of a corresponding time resource as one 5 PRBs, 10 PRBs, 20 PRBs and 40 PRBs with respect to a UE. The UE may check the size and number of VRG time resources based on the configuration and operate accordingly. In the above example, the number of time units that may be configured for the UE by the BS may be changed. In the above example, the number has been illustrated as being configured in a PRB unit, but the corresponding unit may be various units, such as a resource block group (RBG) or a subband. Furthermore, in the above example, a direct number has been illustrated as being configured, but the number may be indirectly configured like a type A or a type B not the direct number. In this case, such a frequency unit may have been included in a corresponding type configuration. Furthermore, in the case of the indirect configuration, such as a type A and a type B, a time unit may also be included in the corresponding indirect configuration in addition to a frequency unit.

The number of VRGs supported in a corresponding system may be calculated based on the aforementioned time and frequency resource size of a VRG. This may be the same as Equation 2.

Number of VRG=Number of VRG in time .times.
Number of VRG in frequency=Number of sub-
frames in a frame FRG granularity (subframes)
in time .times. System Bandwidth FRG Size in
frequency    [Equation 2] ##EQU00002##

In the above equation, in the number of VRGs in the time axis, the number of subframes belonging to one frame has been represented as being divided by a subframe of a VRG time unit, but a subframe that is a corresponding unit may be represented as various units, such as ms or a TTI. Furthermore, in the number of VRGs in the frequency axis, a system band represented as a PRB number has been represented as being divided by a PRB number, that is, a VRG unit in the frequency axis, but a corresponding PRB may be represented as various numbers, such as an RBG or a subband. Furthermore, in the above example, if the number of VRGs of a time band is one, the number of corresponding VRG resources may be represented as only the number of VRGs in a frequency resource.

Such a method may particularly used for aperiodic CSI-RS transmission and aperiodic channel state information report support. An aperiodic CSI-RS and a channel state information report are supported based on a given subframe or TTI, and a change over time is possible by differently representing a VRG set. Accordingly, in such a case, aperiodic CSI-RS transmission and aperiodic channel state information report resources may be indicated by indicating a different VRG resource configuration without indicating a VRG resource change according to a time change. Accordingly, a VRG resource in the time axis may not be necessary.

A BS may perform a service or vertical configuration of a corresponding VRG directly or indirectly with respect to a UE based on the number of VRGs calculated using Equation 2. A method for a BS to perform a service configuration of a corresponding VRG directly or indirectly with respect to a UE includes two methods as below.

A first VRG service configuration method includes a method of configuring a service type for each VRG resource.

A second VRG service configuration method includes a method of configuring a resource included in a corresponding service set after a service type is configured for each VRG service set.

A corresponding configuration may provide configuration fields to all of VRG resources individually or may divide a field for each time and frequency and provide them to all of VRG resources. Table 13 is an example in which the service type configuration field of a VRG resource is used for the first VRG service configuration method.

TABLE 13

TABLE-US-00013 VRGInfo ::= SEQUENCE { ... VRGtypeConfig
BIT STRING ... }

If the service type configuration field of a VRG resource is used for the first VRG service configuration method, in the service type configuration of the corresponding VRG resource, the size of a corresponding bitmap may be calculated by multiplying the number of VRGs that may be calculated in Equation 2 by the number of configurable bits for each VRG. Such a method has an advantage in that a VRG service type can be configured with respect to all of possible combinations because each VRG service type can be configured for each VRG configuration. However, there is a disadvantage in that corresponding configuration overhead is increased because a bitmap of a large size is necessary for a corresponding configuration. Furthermore, such a disadvantage is further maximized if a service is configured for each band or band combination by taking into consideration a carrier aggregation (CA) or other band. The method has been illustrated on the assumption that a corresponding bitmap is configured at a time with respect to all of VRGs of a corresponding system, but such a configuration field may be divided for each VRG and provided.

In order to configure a service type for each VRG resource using the field, both a method of directly configuring a service type for each resource and a method of indirectly configuring a service set may be considered. Table 14 and Table 15 illustrates fields in which a configuration or vertical of a VRG service according to a VRG configuration field of a 2-bit or 3-bit size is directly configured.

TABLE 14

TABLE-US-00014 VRG Type indication field Type 00 eMBB 01 eMBMS 10 URLLC (or URLLC candidate) 11 FCR

TABLE 15

TABLE-US-00015 VRG Type indication field Type 000 eMBB 001 eMBMS type1 010 eMBMS type2 011 URLLC (or URLLC candidate) 100 mMTC 101 FCR 110 V2X 111 Reserved As in Table 14 and Table 15, service types may be directly configured for each VRG using a given table. Such a configuration method may be used in both a configuration field for all of VRGs and a VRG configuration field divided and configured according to time and frequency resources as described above. As may be seen from Tables 14 and 15, if many bits are used when a VRG type is directly configured as described above, a corresponding service type can be notified more specifically. For a service that may be necessary in the future, a corresponding field may be reserved using a "reserved" field. However, an increase of such indication information needs to be determined by determining the effectiveness of an overhead increase versus a service configuration because it increases corresponding configuration overhead.

Furthermore, the direct configuration method described above has advantages in that channel state information can be measured for each corresponding resource, a UE can predict an operation of a corresponding service, and the operation of the UE can be optimized based on the prediction because the type of the corresponding service is previously configured for the UE. Furthermore, in Table 15, as indicated with respect to eMBMS, a plurality of types (e.g., eMBMS type 1 and eMBMS type 2) may be supported with respect to one service. For example, in the case of eMBMS, a different type may be configured for a UE with respect to two or more MBSFN regions. In this case, although two VRGs operate for the same eMBMS service, a configuration, such as the modulation and coding scheme (MCS) of a corresponding region, may be different. A BS may support a different configuration of the same service through such a plurality of configurations.

Such a direct service configuration method has an advantage in that it can deliver a control signal, data and channel state information using a method optimized for a directly indicated corresponding service. Accordingly, a corresponding system can be efficiently used. However, assuming that a service will be newly introduced in the future for an NR system, a sufficient number of reserved fields need to be secured because many fields may need to be reserved. In this case, however, there is a disadvantage in that overhead of a corresponding field configuration may excessively increase. Table 14 and Table 15 are examples of a direct service type configuration for a VRG. The value of a direct corresponding field and a service thereof may be different. Furthermore, in the above tables, fields using 2 bits and 3 bits have been illustrated, but the number of bits in an actual field may be different from that in the tables.

A BS may provide or may be provided with an operation specified for a service type configured as described above. In the case of channel state information, URLLC has a different requirement for an operation compared to eMBB. In other words, eMBB operates at a block error rate (BLER) of 10%, whereas URLLC may require high reliability of $1.\times10.^{-5}$ in its nature. Accordingly, URLLC may operate with an error probability of $10.^{-5}$. However, a CQI in a current LTE system is not suitable for link adaptation for a URLLC operation because an MCS capable of operating at the BLER of 10% must be reported from a UE to a BS. Accordingly, if a corresponding VRG is configured for a URLLC service, a UE may report information, such as an MCS and code rate suitable for the corresponding service, to a BS.

If a corresponding service has been configured as eMBMS with respect to a UE, channel state information may not be reported. eMBMS is a service specified for broadcasting, and this does not use link adaptation and needs to allow all of UEs in a corresponding area to receive corresponding data. Accordingly, eMBMS uses an MCS suitable for a corresponding UE so that a UE having the lowest SINR can receive data. A channel state information report may not be necessary for a corresponding band by taking into consideration this. If a channel state information report is not performed according to the service configuration, information, such as corresponding RI, PMI and CQI, may be excluded from information transmission or may be fixed as a given bit, such as 0. Coverage in which corresponding information may be transmitted and transmission performance can be improved and system performance can become efficient by minimizing the amount of channel state information delivered in UL using the method.

If a corresponding service has been configured as eMBB, a more enhanced channel state report configuration may be possible. An RI, PMI and CQI supported in a current LTE system support do not provide notification of a direct channel state, but notify a BS of a rank determined to be optimal for data transmission by a UE, precoding and corresponding modulation and channel coding. Such a method is very efficient in single user multiple input multiple output (SU-MIMO) transmission, but is difficult to accurately determine the CQI of multiple users for MU-MIMO transmission because a BS cannot be aware of an accurate channel between corresponding UEs and the BS upon performing multi-user multiple input multiple output (MU-MIMO) transmission. Accordingly, such a method has low efficiency of MU-MIMO transmission. Furthermore, even in the SU-MIMO viewpoint, higher transmission efficiency can be secured by securing more accurate channel state information.

In order to provide a radio access technology (RAT) not supported in NR or forward compatibility for a function to be supported through subsequent Release of an NR system in addition the services, such as eMBMS and eMBB, a given resource may be designated as an FCR. In the LTE system, a CRS transmitted at a given position in all of subframes is present. Furthermore, synchronization signals, such as a PSS and an SSS, are transmitted in a given period at the same position. Accordingly, even in the DMRS-based data transmission system after the LTE system, a resource for CRS transmission is always used as overhead. Accordingly, there is a problem in that system performance is deteriorated because a resource for data transmission is reduced. Accordingly, in the NR system, a given time and frequency resource may be configured as FCRs, and overall system performance can be efficiently by minimizing unnecessary deterioration of performance attributable to a resource with respect to other UEs that do not require the corresponding resource assigned to a corresponding UE.

An FCR is basically a time and frequency resource for allowing a configured UE to not receive a reference signal, a control channel and data. Accordingly, a corresponding UE does not basically operate in a corresponding resource. However, if an operation in a corresponding area is not efficiently defined, the time and frequency resource of a corresponding system may be wasted and power consumption of a UE may be increased.

In order to reduce reception overhead of a UE and to facilitate a resource configuration in a system in which an FCR has been configured, a BS and the UE may not transmit and receive most of a reference signal, control information, and data in a corresponding FCR resource position.

Figure 22:
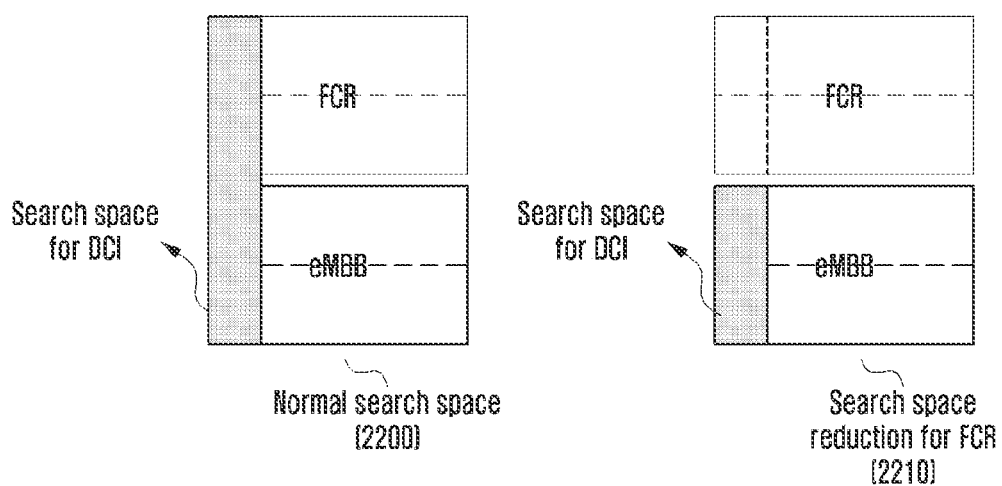
FIG. 22 is a diagram showing a case where a search space for the reception of a control channel in a terminal and a base station is reduced in such an FCR.

FIG. 22 is a diagram showing a case where a search space for the reception of a control channel in a UE and a BS is reduced in such an FCR.

In 2200 of FIG. 22, although an FCR has been configured in a UE, the UE uses a search space for a control channel identically. Accordingly, the UE must perform blind detection in more search spaces. To this end, the UE consumes more power. However, the UE may perform search in a search space other than a corresponding resource based on FCR information configured by a BS as in 2210. Accordingly, the UE can reduce power for receiving a corresponding control channel.

Such a reduction of the search space may be different depending on the type of search space. For example, a PDCCH in a UE-specific search space is transmitted to one corresponding UE based on a cell radio network temporary identifier (C-RNTI, a UE identifier) configured in the UE. Accordingly, DCI transmission based on the UE-specific search space may be performed other than a search space based on an FCR. However, in the case of a common search space, a corresponding FCR may be included in the search space because the common search space includes system information assignment information transmitted in a corresponding system in common.

Such a reduction of the search space may be different depending on the type of radio network temporary identifier (RNTI) used for corresponding DL control information (DCI) transmission. For example, DCI scrambled with a cyclic redundancy check (CRC) bit, as a system information radio network temporary identifier (SI-RNTI) transmitted in the common search space, is information used for system information allocation of a corresponding system. Such information is decoded prior to an RRC signal configuration in an initial attach procedure. Furthermore, the corresponding information may also be used for UEs served in an FCR resource. Accordingly, the corresponding information needs to be transmitted in an FCR.

However, DCI using a C-RNTI or temporary C-RNTI configured for one UE does not need to be transmitted in an FCR. An RNTI related to the DCI that needs to be transmitted in such an FCR may include a P-RNTI for allocating a paging message, an RA-RNTI for allocating a PRACH response, and a TPC-PUCCH or TPC-PUSCH-RNTI for controlling UL power. In addition to such system information, a group RNTI for transmitting information to a UE of a given group and DCI using a group search space may include an FCR as a search space. A group search space is for transmitting configuration information for configuring information that needs to be changed in a period longer than DCI and shorter than RRC signaling with respect to a UE of a series of groups. The reason for this is that in the nature of the group search space, a UE of another Release served within an FCR and a UE in which an FCR is configured can use the information in common. If such information is not allowed to be used in common, there is a disadvantage in that overhead is increased when a UE of the existing Release and a UE of a new Release separately receive DCI in order to transmit corresponding common configuration information.

In addition to a reduction of the search space, in order to increase coverage of a DL control signal, the number of resource assignment bits corresponding to an FCR may be reduced or a resource assignment bit corresponding to an FCR resource may be fixed to a given bit.

Figure 23:
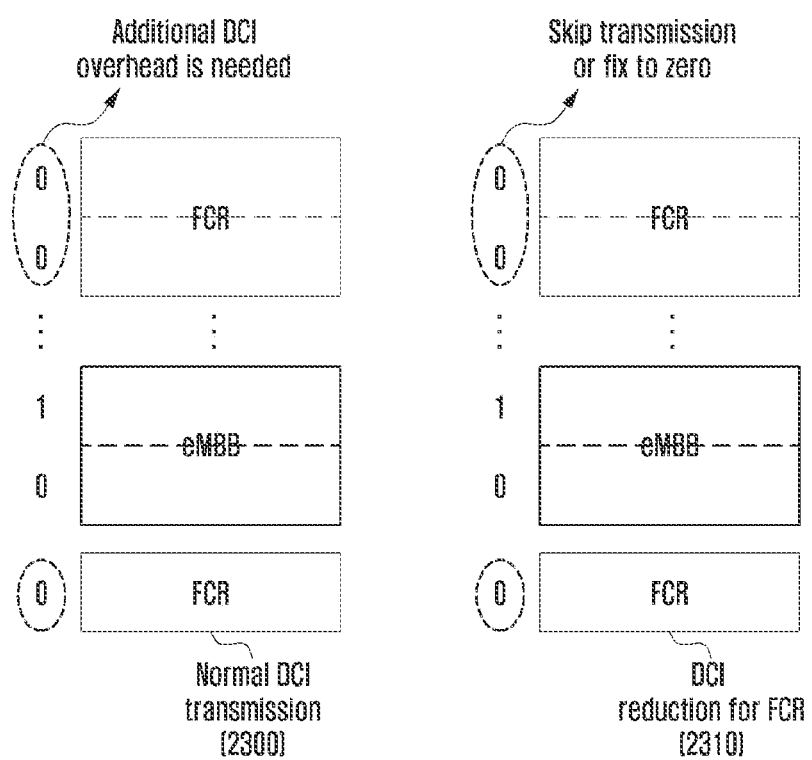
FIG. 23 is a diagram illustrating an operation of a terminal that receives FCR-related DCI.

FIG. 23 is a diagram illustrating an operation of a UE, such as that described above.

In FIG. 23, in the case of normal DCI transmission 2300, a UE receives resource assignment information (DCI) through a control channel on the assumption that a BS may transmit data in all of resources. Accordingly, although data transmission has not been performed in a corresponding resource (i.e., FCR), the UE needs to decode the resource assignment information indicative of the corresponding resource. For the transmission of such information, coverage of a DL control channel is reduced. In contrast, in order to enhance coverage of such a DL control channel, a BS and a UE may previously agree that resource assignment information corresponding to a corresponding VRG is not transmitted or is fixed to a given bit based on an FCR configuration received from the BS and the VRG of UEs corresponding to the corresponding FCR. In this case, if all of signals are configured as a given bit, a possible operation is to previously determine corresponding resource assignment information or use a sequence generated based on a C-RNTI or a cell ID because the PAPR characteristic of a control signal may not be good.

As described above, a UE does not receive data in a corresponding FCR resource.

Accordingly, the UE may not receive a DMRS and a multimedia broadcast single frequency network, multicase broadcast single frequency network (MBSFN) RS, a positioning RS, etc. However, the UE may receive a CSI-RS for channel state information or a BS may receive a sounding reference signal (SRS) transmitted by a UE.

Figure 24:
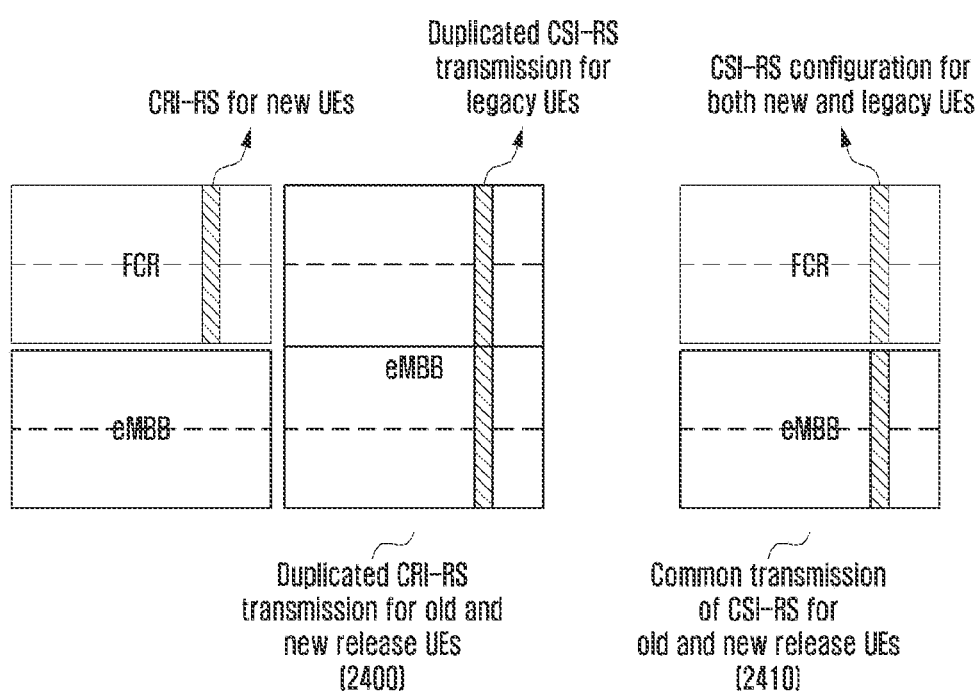
FIG. 24 is a diagram showing an example of CSI-RS transmission in an FCR.

FIG. 24 is a diagram showing an example of CSI-RS transmission in such an FCR.

If a BS supports a UE of a new Release in an FCR and supports a UE of the existing Release in other resources, the corresponding UEs may share a CSI-RS resource. Such sharing of the CSI-RS is possible although the number of CSI-RS antenna ports is different. A UE having a small number of CSI-RS ports may measure some of transmitted CSI-RS ports, and may generate and report channel state information. To this end, the corresponding UEs may receive a CSI-RS by applying a CSI-RS transmission position, Pc, a code for CDM, a transmission period and a subframe offset together.

However, if a CSI-RS for the existing Release UE is not transmitted in an FCR as in 2400, corresponding UEs must receive CSI-RSs configured therefor. Although corresponding CSI-RS transmission can be shared, CSI-RSs must be duplicated and transmitted. Such duplicated CSI-RS transmission deteriorates system performance because it becomes overhead for a system. Accordingly, as in 2410, if a BS transmits a CSI-RS even in a FCR unlike in a reference signal for data transmission, such a problem can be solved and a time and frequency resource for CSI-RS transmission can be efficiently used.

Such RS transmission may also be applied to an SRS. An SRS resource may also be used by the existing Release UE and a new Release UE in common. To this end, a bandwidth for an SRS transmission candidate band, a subframe configuration, whether simultaneous transmission with HARQ ACK/NACK is possible, and a comb type may be configured in a UE of a new Release and a UE of the existing Release in common. In this case, a bandwidth for actual SRS transmission, a hopping bandwidth, a frequency position, duration, an SRS configuration, a transmission comb, a cyclic shift, and an SRS antenna port are differently configured for each UE.

CSI-RS and SRS transmission may be shared by a UE of a new Release and a UE of the existing Release, but a need to share CSI-RS and SRS transmission may be small. Accordingly, such a reference signal transmission method may be configured by a BS. Such a configuration may be performed according to the following methods.

A CSI-RS and SRS transmission configuration method in a first FCR is to configure CSI-RS and SRS transmission through a CSI-RS and SRS transmission resource configuration through RRC.

A CSI-RS and SRS transmission configuration method in a second FCR is to use 1-bit signaling through RRC.

A CSI-RS and SRS transmission configuration method 3 in a third FCR is to use 1-bit signaling through DCI.

Specifically, the first method for a CSI-RS and SRS transmission configuration in an FCR is to configure a corresponding transmission resource through RRC. As described above, a CSI-RS and an SRS require various information configurations. For example, in the case of a CSI-RS, a CSI-RS port number, a code for CDM, resource config, and subframe config need to be configured. In the case of an SRS, an SRS port number, a cyclic shift, transmission comb, duration, a hopping bandwidth, and a transmission bandwidth need to be configured. Accordingly, if such a resource has been configured, a UE may recognize that corresponding RS transmission is necessary even in an FCR and may transmit and receive reference signals. Such a method has an advantage in that a configuration for RS transmission is not additionally necessary.

The second method for a CSI-RS and SRS transmission configuration in an FCR is a method of setting 1-bit indicating whether reference signals are directly transmitted and received in an FCR through RRC signaling. Such a method has an advantage in that a CSI-RS and SRS transmission configuration is facilitated because a corresponding RS is configured through RRC signaling in the state in which a configuration for the corresponding RS remains intact without any change.

The third method for a CSI-RS and SRS transmission configuration in an FCR is a method of signaling 1-bit indicating whether reference signals are transmitted and received in an FCR through DCI. A BS can provide notification of CSI-RS and SRS transmission in a corresponding FCR through such DCI. A BS may dynamically turn on or turn off reference signal transmission and reception, if necessary. Such transmission may be delivered to each UE using a C-RNTI, but may be delivered using group DCI based on a group RNTI.

Table 16 is a table showing a configuration of a VRG set for indirectly configuring service types for each VRG resource.

TABLE 16

TABLE-US-00016 VRG Type indication field Type 00 Service set 1 01 Service set 2 10 Service set 3 11 Service set 4

Unlike in the direct VRG service type configuration described above, a method of Table 16 is a method of designating and using an indirect service set. A BS does not need to support all of service types and may use only some services, if necessary. If the methods of Table 14 and Table 15 are used, all of BSs must use configuration bits depending on all of service types, thereby increasing configuration overhead. Accordingly, if the type of an indirect service set is notified as described above, configuration overhead can be minimized, and a BS can have a corresponding VRG effect by binding and managing VRGs as a set. In this case, in order to perform an operation specific to each service described in the direct service configuration method, an additional configuration for designating a corresponding service for each service set is necessary.

Table 17 illustrates a case where channel state information specified for a service, such as URLLC, is configured in an indirectly configured VRG service set using an additional field for the corresponding service.

TABLE 17

TABLE-US-00017 VRGInfo ::= SEQUENCE { ... AlternativeFeedbackForURLLC ENUMERATED {true} OPTIONAL, -- Need ON FCR-config ENUMERATED {true} OPTIONAL, -- Need ON AdvancedCSI ENUMERATED {true} OPTIONAL, -- Need ON ... }

As described in the direct service type, a field for URLLC or an FCR configuration may be separately placed in a VRG configuration field, and a UE may support corresponding feedback or a related operation through the configuration of the corresponding field. In this case, the AdvancedCSI field uses more overhead, but may be configured for an eMBB operation as a field for providing improved channel state information that provides accurate channel state information.

Furthermore, the direct VRG service type configuration and indirect type configuration described above may be combined and used. For example, eMBB is a service used in all of BSs in common and is frequently used. Accordingly, a method of directly configuring a field 00 s eMBB and using the remaining 3 fields as a service set is possible. Table 16 is an example of an indirect service type configuration for a VRG, and an expression of an indirect-corresponding field may be different. Furthermore, in Table 16, the field using 2 bits has been illustrated, but the number of bits in an actual field may be different from that in the table.

In the case of Table 13, a configuration field in which a service type is configured based on the VRGs of all of time and frequency resources must be placed. Accordingly, a lot of configuration overhead is necessary. In order to reduce such configuration overhead, a service type configuration of a VRG resource may be separately performed for each VRG resource as resource as possible. In other words, a service type may be separately configured for each VRG of a time unit and each VRG of a frequency unit. Table 18 is an example of a case where configuration fields are provided for each time and frequency.

TABLE 18

TABLE-US-00018 VRGInfo ::= SEQUENCE { ... VRGtypeConfig1 BIT STRING, VRGtypeConfig2 BIT STRING ... }

In Table 18, fields indicate configuration fields for VRG resources for each time and each frequency, respectively. Accordingly, overhead for a VRG configuration can be reduced. For example, if VRG resources for 10 times and for 10 frequencies are present and if a configuration field for all of the VRG resources is present, overhead of 200 bits is necessary when the corresponding configuration field is assumed to be 2 bits. However, if VRG resources are divided and configured for each time and resource, 1-bit is set for a time resource, and 2 bits are set for a frequency resource, 10 bits and 20 bits are respectively necessary. Accordingly, a configuration may be possible using only a total of 30 bit.

A corresponding time or frequency resource when VRG resources are divided are divided into time and frequency resources as described above may indicate whether one resource configuration permits a configuration of other resources. Table 19 shows such a 1-bit configuration.

TABLE 19

TABLE-US-00019 VRG Type indication field Type 0 Not configurable 1 Configurable

For example, if a 1-bit configuration is possible for a time resource using the field of Table 19, the 1-bit indicates whether the corresponding time resource is a resource that can be configured as various services. In this case, if the corresponding resource cannot be configured, the corresponding resource may revert to a given service, for example, a given service such as eMBB. If such a service is described to be not configurable in the standard (when a direct service type is used), it may be represented that the service is assumed to be eMBB or a value corresponding to eMBB. Alternatively, it may be represented that the service is assumed to be a value corresponding to a VRG set 0 (when an indirect service set is used). Furthermore, a basic service for such a non-configurable value may be directly configured, and a UE may be notified of the basic service through an RRC field as one of possible services, such as "eMBB", "mMTC" and "eMBMS." The basic service may be indirectly configured as one of VRG service set 0, set 1, . . . , set n, and the UE may be notified of the basic service. In this case, n may be a total number of configured VRG service sets.

In the above example, a case where a time resource is set as 1 bit using the table and an individual service is configured with respect to a frequency resource has been illustrated. Inversely, a frequency resource may be set as 1-bit using the table, and an individual service may be configured with respect to a time resource. Furthermore, in the above example, "not configurable" has been expressed, but a corresponding field may be described as "eMBB", "mMTC", "eMBMS", a "VRG service set 0", a "VRG service set 1" or a "VRG service set 2." In the case of "configurable", a possible operation is to follow a value of a corresponding detailed configuration.

According to the direct resource configuration, in all of services or service sets, the type of service or the index of a service set is indicated based on one configuration field. Accordingly, a configuration based on one common configuration field not for each service configuration or for each service set may be preferred.

As in Table 13 and Table 19, the method of configuring each service type or service set in a time and frequency resource has an advantage in that a service can be configured for each time and frequency resource in minute detail. However, to this end, there is a disadvantage in that configuration overhead may be excessively required. Specifically, if aperiodic CSI-RS transmission and channel state information report are assumed, such overhead needs may be relatively small. If periodic CSI-RS transmission and channel state information report are supported, such overhead is further increased. Accordingly, a method of configuring a service type for each VRG service set using the second VRG service configuration method described above and configuring a resource included in the corresponding service set may be taken into consideration.

TABLE 20

TABLE-US-00020 VRGInfo ::= SEQUENCE { VRGInfoId VRGInfoId, VRGtypeConfig BIT STRING VRGResourceConfig BIT STRING, ... }

TABLE 21

TABLE-US-00021 VRGInfo ::= SEQUENCE { VRGInfoId VRGInfoId, VRGtypeConfig BIT STRING VRGResourceConfig1 BIT STRING, VRGResourceConfig2 BIT STRING, ... }

As in the configuration fields of Table 14 and Table 15, in the VRG resource configuration fields of Table 20 and Table 21, a BS directly configures the VRG service type of a corresponding VRG using a field similar to VRGtypeConfig. In Table 20 and Table 21, VRGResourceConfig, VRGResourceConfig1, and VRGResourceConfig2 mean VRG resources included in a corresponding VRG service set. Specifically, in Table 20, VRGResourceConfig is a resource configuration for each VRG based on a two dimension, so the number of corresponding bits may be the same as the number of VRG resources described in Equation 2. A VRG service set may be indicated to be configured in such a manner that in the corresponding configuration field, a corresponding VRG is included in a corresponding VRG service set if a configuration bit corresponding to each VRG resource is 1 and is not included in a corresponding VRG service set if a configuration bit corresponding to each VRG resource is 0.

In Table 21, VRGResourceConfig1 and VRGResourceConfig2 are VRG resource configurations for each dimension. Accordingly, one of the aforementioned two configuration fields may be configured in a form, such as Table 19. In this case, Table 19 may be interpreted according to two methods. The first method is a method of indicating whether the configuration field of a different dimension for a resource indicated by a field for a given resource is a resource configurable in the VRG service set of the corresponding dimension. For example, if the configuration field of Table 19 indicates a VRG resource configuration of a time resource and a different additional field indicates a VRG resource configuration of a frequency resource, in the case of "Configurable" in which a field for a time resource is 1, a part configured as 1 in a frequency dimension configuration for the corresponding time resource may be configured as a time and frequency resource included in a corresponding VRG service set. Such a method may be usefully used if a case where all of VRG frequency resources are included in a VRG set is not much.

In the second method, in opposition to the example, if a field for a time resource is configurable as 1, all of resources of a frequency resource for a corresponding time dimension are included in a corresponding VRG service set. If not, only a part configured as 1 in a frequency resource is included in a corresponding VRG service set. Such a part may be usefully used if a case where all of VRG frequency resources are included in a VRG set is many.

Furthermore, the two VRG resource configuration methods may be interchangeably used depending on a service characteristic. For example, in the case of an eMBB service, if a corresponding field is configured as 1 in a time resource because a case where all of VRG frequency resources are included in a VRG set may be many, it may be preferred that all of corresponding frequency resources are included in a corresponding VRG service set (i.e., the second method is used). However, in the case of services such as URLLC and mMTC, it is preferred that a configuration of a corresponding resource is permitted in a frequency resource only when a corresponding field is configured as 1 in a time resource (i.e., the first method is used) because a case where a full band is used may be small.

Furthermore, in the examples, a time resource has been illustrated as having higher priority than a frequency resource, but a frequency resource may have higher priority than a time resource.

In the example, for distinguishment, indication and trigger for each VRG set, an identifier (ID) for each VRG set may be used. When a BS uses a periodic CSI-RS and channel state information report or an aperiodic CSI-RS and channel state information report through an aperiodic trigger, the BS can easily configure and trigger information related to a corresponding VRG based on the VRG configuration ID. The ID may be any one of a maximum number of configurable VRG information.

As described above, service or vertical allocation in such a frequency-time resource may be supported to be configured in a VRG unit. Such a configuration may include a semi-static configuration through RRC or a dynamic configuration through DL control information (it may be illustrated as group DCI or normal DCI) capable of delivering control information to the UEs of a given group at the same time.

Figure 25:
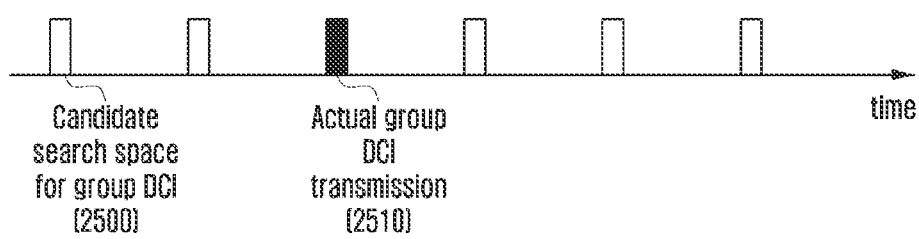
FIG. 25 is a diagram showing an example of a group DCI transmission resource configured through RRC signaling.

FIG. 25 is a diagram showing an example of a group DCI transmission resource configured through RRC signaling.

As in 2500, a UE may receive a candidate resource for group DCI transmission configured by a BS. In the corresponding candidate resource, the UE attempts to receive group DCI of the BS. As in 2510, the BS transmits a group physical downlink control channel (GPDCCH) for a configuration change of the UE. When the UE detects the GPDCCH, the UE changes information configured through the reception of the corresponding group DCI. The BS may change the configuration of the UE previously configured through such group DCI.

Such group DCI transmission enables a UE to change a configuration necessary for an operation of the UE even without reconfiguring an RRC configuration with respect to a BS. The RRC configuration is information set in a relatively long period. For the reconfiguration of RRC, an operation based on a fallback mode is necessary in order to prevent an information error during a mode change time. However, if group DCI is used, the configuration of a corresponding UE may be changed in a relatively short period. Furthermore, a BS and a UE are considered to operate based on modulation of a low dimension and a CRS in order to prevent an error from the nature of the fallback mode. Accordingly, the deterioration of system performance can be prevented.

The group DCI described above may configure the following values.

A subframe configuration: it may periodically configure DL and UL and a guard period.

An UL control signal configuration: it configures the period in which UL control information is transmitted (e.g., the number of transmittable OFDM symbols within a subframe)

A DL control signal configuration: it configures the period in which DL control information is transmitted (e.g., the number of transmittable OFDM symbols within a subframe)

A CSI-RS candidate position configuration: a transmitted periodic CSI-RS transmission period and position change, a trigger candidate change for an aperiodic CSI-RS, etc.

An SRS candidate position configuration: a candidate band change for SRS transmission, a transmitted periodic SRS transmission period and position change, a trigger candidate change for an aperiodic SRS, a comb type change, etc.

A synchronization signal and PBCH signal transmission position reconfiguration: it may reconfigure synchronization signals, such as a PSS, an SSS, and an extended synchronization signal (ESS), and the position where system information is transmitted on a PBCH.

An FCR configuration: it may designate a given resource as an FCR in order to provide forward compatibility for a function to be supported through an RAT not supported in NR or a subsequent Release of NR in addition to the services, such as eMBMS and eMBB.

A numerology configuration of a subframe: it may configure the numerology of subcarrier spacing, a CP length, etc. of each subframe.

Such group DCI may be transmitted based on a candidate resource as described above. If a UE attempts to receive corresponding group DCI information in all of subframes, resource and power consumption therefor is increased. Furthermore, if a candidate resource configuration delivered through group DCI is frequently changed, implementation complexity of UE hardware is increased. In this case, it may be preferred to solve a UE configuration through individual DCI transmission rather than group DCI. Accordingly, in order to maintain such implementation complexity to a proper level and to make efficient resource and power consumption, a group DCI transmission candidate may be configured. Table 22 and Table 23 are examples of such a group DCI candidate resource configuration.

TABLE 22

TABLE-US-00022 GPDCCH-ConfigDedicated ::= SEQUENCE { gpdcch-RNTI-r12 C-RNTI, gpdcch-NumRepetitions ENUMERATED {r1, r2, r4, r8, r16, r32, r64, r128, r256, r512, r1024, r2048, spare4, spare3, spare2, spare1}, gpdcch-StartSF-GSS ENUMERATED {v1dot5, v2, v4, v8, v16, v32, v48, v64}, gpdcch-Offset-GSS ENUMERATED {zero, oneEighth, oneFourth, threeEighth} }

TABLE 23

TABLE-US-00023 GPDCCHConfig ::= CHOICE { release NULL, setup SEQUENCE { gpdcch-RNTI-r12 C-RNTI, gpdcch-CommandPeriodicity-r12 ENUMERATED {sf10, sf20, sf40, sf80}, gpdcch-CommandSubframeSet-r12 BIT STRING (SIZE(10)) } }

In Table 22, a BS may configure a group RNTI for GPDCCH transmission for corresponding group DCI transmission, a repetition number for the corresponding transmission, and a subframe and offset in which transmission may be started with respect to a UE. Group DCI is transmitted to a plurality of UEs in common. If corresponding DCI transmission is not correctly received, a UE may not precisely recognize a field indicated in UE-specific DCI. Accordingly, reception performance of such group DCI needs to be higher than reception performance of UE-specific DCI. To this end, repetition transmission may be considered. The start subframe and offset are used for a UE to provide notification of the position of a group search space, that is, a candidate band for receiving group DCI, and provide notification of the subframe position and offset of a corresponding candidate band.

The example of Table 23 is another example of a group DCI configuration. A BS configures a period and subframe set in which a GPDCCH may be transmitted with respect to a UE. The UE may identify a group search space in a corresponding position and receive group DCI.

If a semi-static configuration is supported through RRC, a change in the interference situation is small because service or vertical allocation in such a time and frequency resource is constant for a long period. Accordingly, surrounding BSs can better check the interference situation of a corresponding cell. However, in the case of such a method, performance for service or vertical support may be deteriorated because an adaptation period according to a traffic characteristic change of a corresponding transmission-reception point (TRP) is long. For example, in the case of a BS that does not require mMTC or URLLC transmission, if such a resource is previously assigned, the deterioration of system performance may be caused. Accordingly, the deterioration of system performance can be prevented by configuring all of resources as eMBB resources.

If URLLC data needs to be suddenly transmitted by a corresponding BS, however, a corresponding service cannot be supported prior to a corresponding RRC reconfiguration. If such a possibility is present, the corresponding BS must previously configure some degree of resources as corresponding service resources. Accordingly, performance of the corresponding BS may be deteriorated.

If a service for a VRG can be dynamically configured through DL control information, the amount of time and frequency resources that are secured in advance may be small because the generation of such traffic can be handled with a rapidly shorter time. Accordingly, it may show relatively higher system performance, but there is a disadvantage in that control signal overhead through DCI occurs. Such group DCI is transmitted at timing previously agreed between a BS and a UE, may be scrambled based on a cell ID and the index of a subframe or slot, or may also be scrambled and transmitted based on a configured group RNTI.

In order to trigger an aperiodic CSI-RS transmission and channel state information report for a VRG, a BS may deliver information about a corresponding VRG set to a UE. Table 24 and Table 25 illustrates fields for triggering an aperiodic CSI-RS transmission and/or channel state information report for a VRG set.

TABLE 24

TABLE-US-00024 Value of request field Description 000 No aperiodic CSI is triggered 001 Wideband CSI-RS and corresponding aperiodic CSI report is triggered 010 CSI-RS for VRG ID 0 011 CSI-RS for VRG ID 1 100 CSI-RS for VRG ID 2 101 CSI-RS for VRG ID 3 110 CSI-RS for VRG ID 4 111 CSI-RS for VRG ID 5

TABLE 25

TABLE-US-00025 Value of request field Description 000 No aperiodic CSI is triggered 001 Aperiodic CSI-RS and corresponding aperiodic CSI report is triggered for a set of VRG(s) for serving cell c 010 Aperiodic CSI-RS and corresponding aperiodic CSI report is triggered for a 1.sup.st set of VRG(s) 011 Aperiodic CSI-RS and corresponding aperiodic CSI report is triggered for a 2.sup.nd set of VRG(s) 100 Aperiodic CSI-RS and corresponding aperiodic CSI report is triggered for a 3.sup.rd set of VRG(s) 101 Aperiodic CSI-RS and corresponding aperiodic CSI report is triggered for a 4.sup.th set of VRG(s) 110 Aperiodic CSI-RS and corresponding aperiodic CSI report is triggered for a 5.sup.th set of VRG(s) 111 Aperiodic CSI-RS and corresponding aperiodic CSI report is triggered for a 6.sup.th set of VRG(s)

Table 24 is a method of triggering an aperiodic CSI-RS transmission and channel state information report for each wideband CSI-RS or VRG ID based on previously configured VRG configuration information and a corresponding ID. Such a method has an advantage in that it can transmit a CSI-RS only in a corresponding VRG for each service that needs to be transmitted, if necessary, but has a disadvantage in that a plurality of pieces of DL control information must be transmitted in order to trigger a CSI-RS in a plurality of VRGs.

Table 25 is a method of triggering a CSI-RS and a related channel state information report based on a previously configured VRG configuration information set. Table 26 illustrates such a trigger field configuration.

TABLE 26

TABLE-US-00026 CSI-RS_CQI-ReportAperiodic-v1310 ::= SEQUENCE { trigger010 BOOLEAN, trigger011 BOOLEAN, trigger100 BOOLEAN, trigger101 BOOLEAN, trigger110 BOOLEAN, trigger111 BOOLEAN }

In Table 26, each trigger field (e.g., trigger 010 or trigger 011) is information indicating a VRG in which a CSI-RS and channel state information report will be performed through a corresponding trigger. For example, if the first and the second bits of trigger 010 are set to 1, the remaining bits are 0, and the value of the request field of Table 25 is 010, a CSI-RS and channel state information report may be performed in a VRG corresponding to Nos. 0 and 1 VRG IDs. In this case, in the above example, the number of VRG configurations and the number of trigger bits of Table 26 have been illustrated as being the same (i.e., the number of VRG IDs and the number of trigger bits are the same), but such a field may be different from that of the example.

The field may be dynamically configured through group DCI or normal DCI with respect to UEs of a given group. Table 27 is an example of such a field.

The method has an advantage in that a UE can check whether the trigger of a corresponding VRG service set has been performed even without the delivering of direct DL control information from a BS to the UE. Furthermore, the method has an advantage in that a CSI-RS transmission or channel state information report for a plurality of service sets can be performed through one DL control information transmission because a VRG-RNTI is duplicated and configured with respect to a plurality of service sets. However, it may be necessary to divide the search space of DL control information for each service set in order to transmit corresponding information. Specifically, DL control information is transmitted to UEs in common. However, DL control information needs to be divided into UEs and services in order to use the method when the transmission of the DL control information to each UE is taken into consideration.

TABLE 27

TABLE-US-00027 Value of request field Description 00 No aperiodic CSI is triggered 01 Aperiodic CSI-RS and corresponding aperiodic CSI report is triggered for a set of VRG(s) for serving cell c 10 Aperiodic CSI-RS and corresponding aperiodic CSI report is triggered for a 1.sup.st possible set of VRG(s) 11 Aperiodic CSI-RS and corresponding aperiodic CSI report is triggered for a 2.sup.nd possible set of VRG(s)

As in Table 27, a BS may deliver 2 bits to a UE through transmitted DCI. The corresponding 2 bits may indicate the lowest index and the highest index of possible VRG sets. In this case, the BS may notify the UE of a possible VRG set through group DCI. The size of a corresponding bitmap may be the same as the number of VRG set configurations. For example, if a BS delivers 01001000 and 00110000 for a first set and second set, respectively, through group DCI, a UE recognizes that the BS has configured trigger so that trigger for a VRG corresponding to a No. 1 ID and a VRG corresponding to a No. 4 ID is possible in the first set and trigger for a VRG corresponding to Nos. 2 and 3 IDs is possible in the second set. Accordingly, the UE receives a CSI-RS for Nos. 1 and 4 VRGs if a trigger bit is set to "10" and transmitted and the VRGs of Nos. 2 and 3 IDs if the trigger bit is set to "11" and transmitted based on the configuration, and measures and reports corresponding channel state information.

A method of triggering a CSI-RS transmission and channel state information report with respect to another VRG set is a method of configuring a VRG-RNTI for a corresponding service in a corresponding VRG and using DL control transmission information transmitted based on a corresponding RNTI. Table 28 illustrates that a BS configures a VRG-RNTI in VRG set configuration information for the trigger of a given VRG set based on the VRG-RNTI.

TABLE 28

TABLE-US-00028 VRGInfo ::= SEQUENCE { ... VRG-RNTI-r13 BIT STRING (SIZE(16)), ... }

As illustrated in Table 28, a BS may configure a VRG-RNTI for the trigger of a corresponding VRG service set with respect to a UE. The UE may identify search space information of a PDCCH in which corresponding DL control information is to be transmitted using a corresponding VRG-RNTI or cell ID and subframe or slot index, and may recognize that a corresponding search space resource or a CSI-RS transmission and/or channel state information report for a service set corresponding to the VRG-RNTI has been triggered.

Accordingly, a multiplexing resource for DL control information transmission may be insufficient.

A configuration field, such as Table 29, may be used for CSI-RS transmission, an IMR resource configuration, and a channel state information report configuration for each service type or service set as described above.

TABLE 29

TABLE-US-00029 VRGInfo ::= SEQUENCE { VRGInfoId VRGInfoId, csi-RS-ConfigNZPId CSI-RS-ConfigNZPId, csi-IM-ConfigId CSI-IM-ConfigId, cqi-ReportPeriodicProcId-r11 INTEGER (0..maxCQI-ProcExt-r11) OPTIONAL, -- Need OR cqi-ReportAperiodicProc-r11 CQI-ReportAperiodicProc-r11 OPTIONAL, -- Need OR ... }

As in Table 29, a corresponding field may include a CSI-RS configuration and a CSI-IM configuration. A corresponding configuration may include the number of antenna ports for a non-precoded (NP) CSI-RS, N1 and N2 that are the number of antennas for each dimension (for each direction), O1 and O2 that are oversampling factors for each dimension, one subframe config for transmitting multiple CSI-RSs, and a plurality of resource config for configuring a position if the corresponding configuration supports an aperiodic CSI-RS. Subframe config information may be additionally included in a corresponding configuration if the corresponding information supports a periodic CSI-RS. Information of the number of antenna ports of CSI-IM may be fixed in the standard. As in a CSI-RS, if a corresponding resource is aperiodic, only a resource config may be included. In the case of a periodic configuration, subframe config information may be additionally included in corresponding information.

Another CSI-RS transmission and/or channel state information report trigger method is to use DCI for CSI-RS transmission based on a CSI-RS-RNTI. Table 30 illustrates an RNTI configuration for CSI-RS transmission.

TABLE 30

TABLE-US-00030 VRGInfoCommon ::= SEQUENCE { ...
csi-RS-RNTI BIT STRING (SIZE (16)), ... }

In order to support various aperiodic CSI-RS transmissions, a BS may transmit DCI for aperiodic CSI-RS trigger to a UE. For such DCI transmission, a CSI-RS-RNTI configuration is necessary. Such an RNTI may provide notification of the search space in which corresponding DCI will be transmitted. In a conventional technology, a DCI bit may indicate the trigger using only 3 bits because only aperiodic channel state information has been triggered in DCI. However, more indication information is necessary for aperiodic CSI-RS transmission. If the indication information is included in DCI for data transmission and delivered, coverage of corresponding DCI is reduced. Accordingly, such a coverage problem can be solved by differently using an RNTI and DCI format for such CSI-RS transmission and DCI for data transmission. Furthermore, the existing DCI format has a disadvantage in that a corresponding bit must be always transmitted even when corresponding trigger does not occur because the DCI format has included a CSI-RS trigger field in DCI for data transmission. DCI transmission based on a CSI-RS RNTI proposed in the present disclosure can solve such a problem.

A CSI-RS-RNTI transmission search space may be different depending on a CSI-RS transmission form. DCI for UE-specific CSI-RS transmission may be triggered through DCI transmitted in a UE-specific search space. DCI for cell- or TRP-specific CSI-RS transmission may be triggered through DCI transmitted in a common search space or group search space. In this case, for each UE-specific CSI-RS and each TRP-specific CSI-RS, different RNTIs are configured to distinguish between search spaces. Accordingly, the form of a corresponding CSI-RS may be indirectly indicated. Furthermore, if the same CSI-RS-RNTI is configured, whether corresponding CSI-RS transmission is UE-specific CSI-RS transmission or cell-specific CSI-RS transmission can be indirectly checked depending on that corresponding DCI is transmitted in which search space.

In this case, in the case of a TRP-specific CSI-RS, the corresponding CSI-RS may support many CSI-RS port number (16 or 32) for non-precoded and a corresponding codebook or may support a plurality of CSI-RS configuration resources for beam selection. In the case of a UE-specific CSI-RS, the corresponding CSI-RS may support a small number of CSI-RS ports (8 or less) for UE-specific beamforming and a corresponding point selection codebook. To this end, the two types of CSI-RS transmission information are configured, and CSI-RS transmission information may be different depending on RNTI or search space selection.

Table 24 to Table 30 have been illustrated on the assumption of CSI-RS transmission, but a corresponding RS transmission configuration may be identically applied to an SRS. To this end, a BS may configure an SRS transmission bandwidth, hopping information, a cyclic shift, etc., and may configure periodic SRS transmission based on a VRG ID or trigger aperiodic SRS transmission. To this end, a VRG RNTI may be used. Furthermore, DCI for SRS transmission and an SRS-RNTI for the DCI may be configured. In addition, DCI and an RNTI for supporting SRS trigger and CSI-RS trigger at the same time may be used. Such an RNTI may be called a CSI-RNTI, a sounding RNTI or a channel RNTI.

A case where a CSI-RS transmission and channel state information report is performed for each VRG has been illustrated above, but a corresponding configuration may be supported as a measurement subset in order to support the aforementioned VRG. The aforementioned CSI-RS and channel state information report allocation for each VRG, including even a region in which a BS does not transmit data, may be configured for a UE. Such allocation may be waste. Accordingly, for efficient resource use, a CSI-RS configuration and a channel state information report configuration may be separated from a VRG configuration. In this case, the VRG configuration may act as a measurement subset when a channel state report is indirectly measured. Table 31 illustrates a VRG configuration for a measurement subset operation.

TABLE 31

TABLE-US-00031 VRGInfo ::= SEQUENCE { ... p-C-r13
INTEGER (-8..15), cbsr-Selection-r13 CHOICE{
codebookSubsetRestriction BIT STRING, nonPrecoded-r13
SEQUENCE { codebookSubsetRestriction1-r13 BIT STRING,
codebookSubsetRestriction2-r13 BIT STRING },
beamformedK1a-r13 SEQUENCE { codebookSubsetRestriction3-r13
BIT STRING }, beamformedKN-r13 SEQUENCE {
codebookSubsetRestriction-r13 BIT STRING } }, ... }

As described above, for a measurement subset operation, an individual codebook subset restriction and a configuration of Pc may be supported. Accordingly, if a VRG configuration is applied as a measurement subset, a codebook subset restriction and Pc may be configured within an individual VRG configuration field as in the example. A UE may individually report a CSI-RS resource indicator (CRI), a precoding type indicator (PT), an RI, a PMI and a CQI based on the configured measurement subset. As described above, channel state information, such as a CRI, RI, PTI, PMI and CQI, may be different depending n a service type configuration or a corresponding feedback type configuration. Such a method has an advantage in that additional overhead is not necessary for a subset restriction in addition to a VRG configuration, but has a disadvantage in that an interference situation is not additionally incorporated when the interference situation changes for a reason, such as a service change of other cell, within a corresponding VRG.

Furthermore, a measurement subset may be supported within a VRG for other services within the VRG, a beam direction and interference change measurement according to a CoMP scenario described above. For such support, it may be preferred to use CSI-RS and channel state information report trigger for each VRG described in Table 25 to Table 28. In such a subframe subset configuration method of a VRG, an independent field may be supported for each subset within each VRG or a separate field may be supported. Table 32 is an example when an independent field is supported for each measurement subset for a measurement subset within a VRG permitted up to three.

TABLE 32

TABLE-US-00032 VRGInfo ::= SEQUENCE { ... setup SEQUENCE
{ VRG-MeasSubset1 MeasVRGPattern, VRG-MeasSubset2
MeasVRGPattern, VRG-MeasSubset3
MeasVRGPattern } OPTIONAL -- Need ON,
p-C-AndCBSRList p-C-AndCBSRList, ... }

Unlike in the existing measurement subframe subset configuration, the number of subset configurations within a VRG may be greater than 2 because two or more interference situations are present in a frequency band. That is, the subset configuration may be configured on a frequency resource in addition to a time resource. Furthermore, a list of corresponding configurations may be indicated for individual Pc and a codebook subset restriction configuration for each subset. In this case, the list of corresponding configurations is the same as the number of configured VRG measurement subsets. In the example, a case where a configuration field is provided for each measurement subset has been illustrated, but unlike in the example, two measurement subsets may be supported using one field. In this case, however, since only two measurement subsets can be supported, there may be a restriction on an interference situation that may be measured. In order to prevent the restriction, an additional configuration field may be placed to support four measurement subsets, for example.

A UE may notify a BS of its UE capability with respect to a corresponding configuration because it may be difficult for all of UEs to support the plurality of VRG configurations. Table 33 illustrates a field for such UE capability indication.

TABLE 33

TABLE-US-00033 VRG-BeamformedCapabilities ::= SEQUENCE { VRG-Max INTEGER (1..8), MeasurementSubsetMax INTEGER (1..8), }

As described above, a UE may notify a BS of the number of VRGs supportable by the UE and a measurement subset supportable for each VRG. An implementation of a UE can be facilitated and a corresponding service can be supported more flexibly through such notification. If such capability indication is not supported, an NR UE implementation may become complicated and the price of a UE may rise due to the difficulty of a corresponding implementation.

Figure 26:
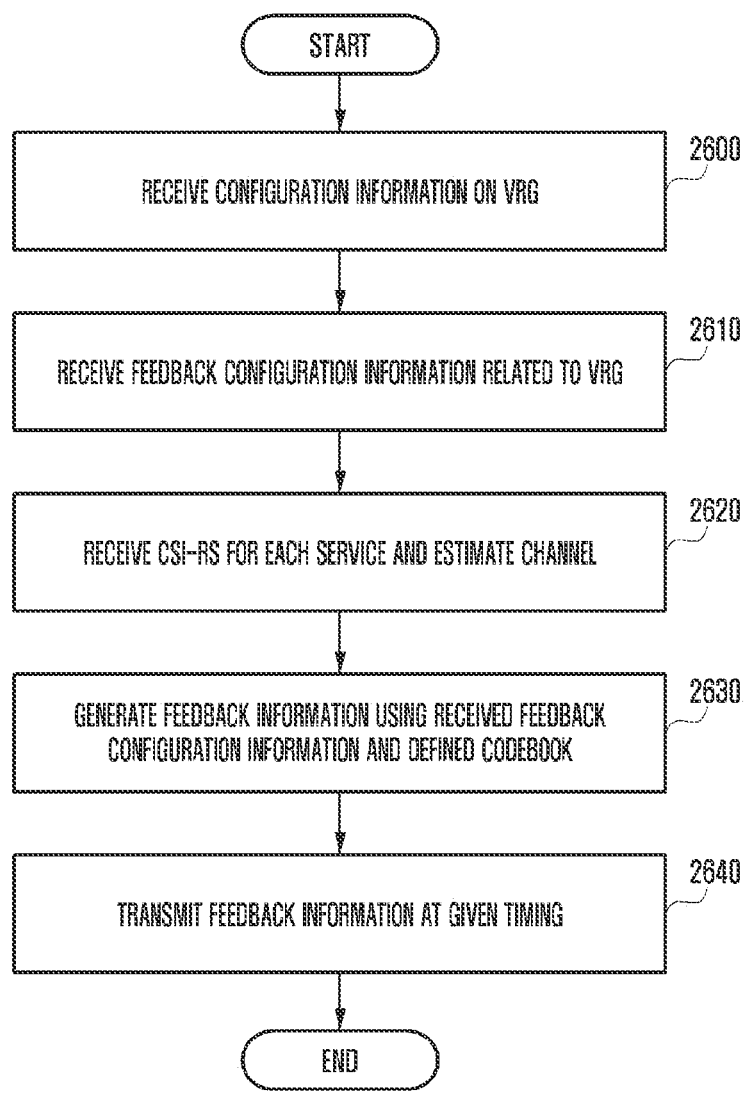
FIG. 26 is a diagram showing an operation of a terminal according to an embodiment of the present disclosure.

FIG. 26 is a diagram showing an operation of a UE according to an embodiment of the present disclosure.

Referring to FIG. 26, the UE receives configuration information on a VRG configuration at operation 2600. At least one of a VRG-related ID, the time or/and frequency resource position of each VRG, a service type, a service set, a support feedback e, and a VRG measurement subset may be configured through such information. Furthermore, the UE may identify at least one of the number of antenna ports of each NP CSI-RS, N1 and N2 that are the number of antennas for each dimension, O1 and O2 that are oversampling factors for each dimension, one subframe config for transmitting multiple CSI-RSs, a plurality of resource config for configuring a position, codebook subset restriction-related information, CSI report-related information, a CSI process index, and transmit power information (Pc) based on the received configuration information. Thereafter, at operation 2610, the UE receives a piece of feedback configuration information based on a CSI-RS position. A PMI and/or CQI period and offset, an RI period and offset, a CRI period and offset, whether it is feedback for a wideband/subband, and submod may be configured in the corresponding information. At operation 2620, the UE receives a CSI-RS based on the corresponding information, and estimates a channel between a BS antenna and the reception antenna of the UE based on the received CSI-RS. At operation 2630, the UE may generate an RI, a PMI, a CQI, etc. as feedback information using a feedback configuration received based on the estimated channel, and may select the best CRI based on the generated RI, PMI or CQI. Thereafter, at operation 2640, the UE finishes a channel feedback generation and report process by transmitting pieces of feedback information to the BS at feedback timing determined based on the feedback configuration of the BS or aperiodic channel state report trigger.

Figure 27:
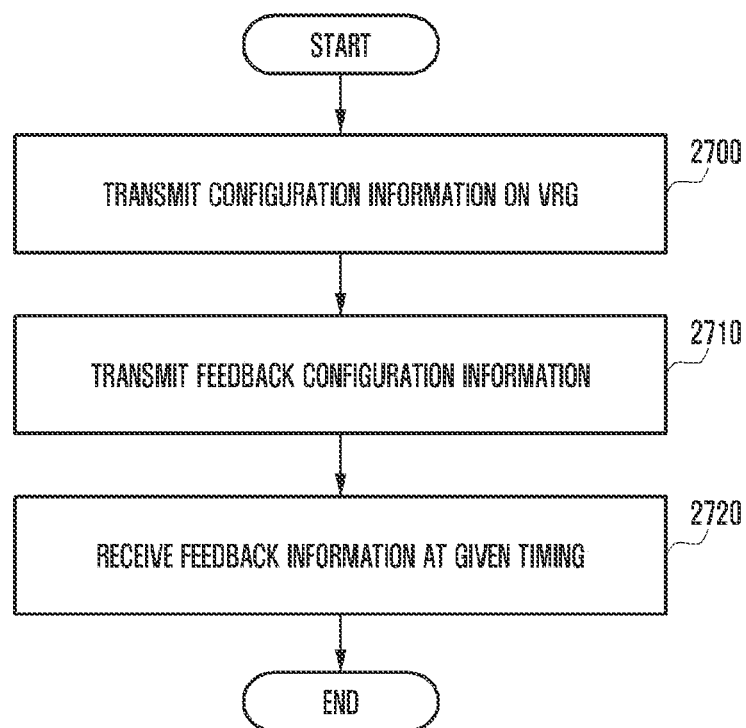
FIG. 27 is a diagram showing an operation of a base station according to an embodiment of the present disclosure.

FIG. 27 is a diagram showing an operation of a BS according to an embodiment of the present disclosure.

Referring to FIG. 27, at operation 2700, the BS transmits configuration information on a VRG for measuring a channel to a UE. At least one of the time and/or frequency resource position of each VRG, a service type, a support feedback type, and a VRG measurement subset may be configured based on the configuration information. At least one of the number of antenna ports of an NP CSI-RS, N1 and N2 that are the number of antennas for each dimension, O1 and O2 that are oversampling factors for each dimension, one subframe config for transmitting multiple CSI-RSs, a plurality of resource config for configuring a position, codebook subset restriction-related information, CSI report-related information, a CSI process index, and transmit power information (Pc) may be included in configuration information in order to transmit a CSI-RS based on the at least one. Thereafter, at operation 2710, the BS transmits feedback configuration information based on at least one CSI-RS to the UE. A PMI and/or CQI period and offset, an RI period and offset, a CRI period and offset, whether it is feedback for a wideband/subband, and submode may be configured in the corresponding information. Thereafter, the BS transmits the configured CSI-RS to the UE. The UE estimates a channel for each antenna port and estimates an additional channel for a virtual resource based on the estimated channel. The UE determines feedback, generates a CRI, PMI, RI and CQI corresponding to the feedback, and transmits it to the BS. Accordingly, at operation 2720, the BS receives the feedback information from the UE at given timing and uses the received feedback information to determine a channel state between the UE and the BS.

Figure 28A:
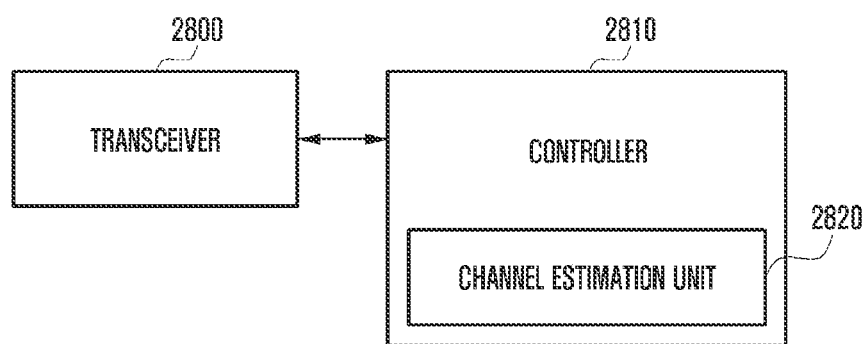
FIG. 28A is a block diagram showing the internal structure of a terminal according to an embodiment of the present disclosure.

FIG. 28A is a block diagram showing the internal structure of a UE according to an embodiment of the present disclosure.

Referring to FIG. 28A, the UE includes a communication unit 2800 and a controller 2810. The communication unit 2800 performs a function of transmitting or receiving data to or from the outside (e.g., BS). In this case, the communication unit 2800 may transmit feedback information to the BS under the control of the controller 2810. The controller 2810 controls the state and operation of all of elements configuring the UE. Specifically, the controller 2810 generates feedback information based on information assigned by the BS. Furthermore, the controller 2810 controls the communication unit 2800 to feed the generated channel information back to the BS based on timing information assigned by the BS. To this end, the controller 2810 may include a channel estimation unit 2820. The channel estimation unit 2820 determines a position in the time and frequency resource of a corresponding VRG based on a VRG service and feedback information received from the BS, and identifies necessary feedback information through a related CSI-RS and feedback assignment information. The channel estimation unit 2820 estimates a channel using the received CSI-RS based on the feedback information.

In FIG. 28A, an example in which the UE includes the transceiver 2800 and the controller 2810 has been illustrated, but the UE is not limited thereto and may further include various elements depending on a function performed in the UE. For example, the UE may further include a display unit configured to display the current state of the UE, an input unit configured to receive a signal, such as the execution of a function, from a user, and a storage unit configured to store data generated in the UE. Furthermore, the channel estimation unit 2820 has been illustrated as being included in the controller 2810, but is not essentially limited thereto. The controller 2810 may control the transceiver 2800 to receive configuration information about each of at least one reference signal resource from a BS. Furthermore, the controller 2810 may measure the at least one reference signal, and may control the transceiver 2800 to receive feedback configuration information for generating feedback information according to the measurement results from the BS.

Furthermore, the controller 2810 may measure at least one reference signal received through the transceiver 2800, and may generate feedback information based on feedback configuration information. Furthermore, the controller 2810 may control the transceiver 2800 to transit the generated feedback information to the BS at feedback timing based on the feedback configuration information. Furthermore, the controller 2810 may receive a CSI-RS from the BS, may generate feedback information based on the received CSI-RS, and may transmit the generated feedback information to the BS. In this case, the controller 2810 may select a precoding matrix for each antenna port group of the BS, and may further select one additional precoding matrix based on a relation between antenna port groups of the BS.

Furthermore, the controller 2810 may receive a CSI-RS from a BS, may generate feedback information based on the received CSI-RS, and may transmit the generated feedback information to the BS. In this case, the controller 2810 may select one precoding matrix for all of the antenna port groups of the BS. Furthermore, the controller 2810 may receive feedback configuration information from a BS, may receive a CSI-RS from the BS, may generate feedback information based on the received feedback configuration information and the received CSI-RS, and may transmit the generated feedback information to the BS. In this case, the controller 2810 may receive the feedback configuration information corresponding to each antenna port group of the BS and additional feedback configuration information based on a relation between the antenna port groups.

Figure 28B:
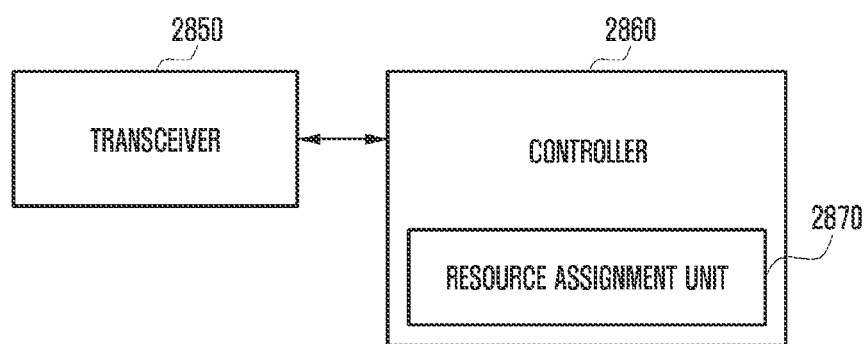
FIG. 28B is a block diagram showing the internal structure of a base station according to an embodiment of the present disclosure.

FIG. 28B is a block diagram showing the internal structure of a BS according to an embodiment of the present disclosure.

Referring to FIG. 28B, the BS includes a controller 2860 and a transceiver 2850. The controller 2860 controls the state and operation of all of elements configuring the BS. Specifically, the controller 2860 assigns a related configuration for enabling a UE to obtain VRG information and a CSI-RS resource for channel estimation to the UE, and assigns a feedback resource and feedback timing to the UE. To this end, the controller 2860 may further include a resource assignment unit 2870. Furthermore, the controller 2860 assigns a feedback configuration and feedback timing so that feedback from several UEs does not collide against each other, and receives and interprets feedback information configured at corresponding timing. The transceiver 2850 performs a function of transmitting and receiving data, a reference signal and feedback information to and from a UE. In this case, the transceiver 2850 transmits a CSI-RS to the UE through an assigned resource under the control of the controller 2860, and receives feedback for channel state information from the UE. Furthermore, the transceiver 2850 transmits a reference signal based on a CRI, an RI, some information of a PMI, and a CQI obtained from the channel state information transmitted by the UE.

The resource assignment unit 2870 has been illustrated as being included in the controller 2860, but is not essentially limited thereto. The controller 2860 may control the transceiver 2850 to transmit configuration information about each of at least one reference signal to a UE or may generate the at least one reference signal. Furthermore, the controller 2860 may control the transceiver 2850 to transmit feedback configuration information for generating feedback information based on measurement results to the UE. Furthermore, the controller 2860 may control the transceiver 2850 to transmit the at least one reference signal to the UE and to receive feedback information transmitted by the UE at feedback timing based on the feedback configuration information. Furthermore, the controller 2860 may transmit feedback configuration information to the UE, may transmit a CSI-RS to the UE, and may receive the feedback configuration information and feedback information generated based on the CSI-RS from the UE. In this case, the controller 2860 may transmit feedback configuration information corresponding to each antenna port group of the BS and additional feedback configuration information based on a relation between antenna port groups. Furthermore, the controller 2860 may transmit a beamformed CSI-RS to the UE based on feedback information, and may receive feedback information generated based on the CSI-RS from the UE.

Third Embodiment

A wireless communication system deviates from the provision of the initial voice-oriented service and evolves into a wideband wireless communication system providing a packet data service of high speed and high quality, for example, communication standards, such as high speed packet access (HSPA) of 3GPP, long term evolution (LTE) or evolved universal terrestrial radio access (E-UTRA), LTE-Advanced (LTE-A), high rate packet data (HRPD) of 3GPP2, a ultra mobile broadband (UMB) and 802.16e of IEEE. Furthermore, a communication standard of 5G or new radio (NR) is produced as a 5G wireless communication system. For a description of the present disclosure, a process for a UE to obtain synchronization in order to access a wireless communication system and a process of transmitting system information are described below.

In the process for the UE to access a wireless communication system, a synchronization signal is used to obtain synchronization with a cell within a network. More specifically, the synchronization signal means a reference signal transmitted for time and frequency synchronization and cell search when a BS and a UE are initially attached. In LTE, a signal, such as a primary synchronization signal (PSS) or a secondary synchronization signal (SSS), may be transmitted for synchronization.

Figure 29:
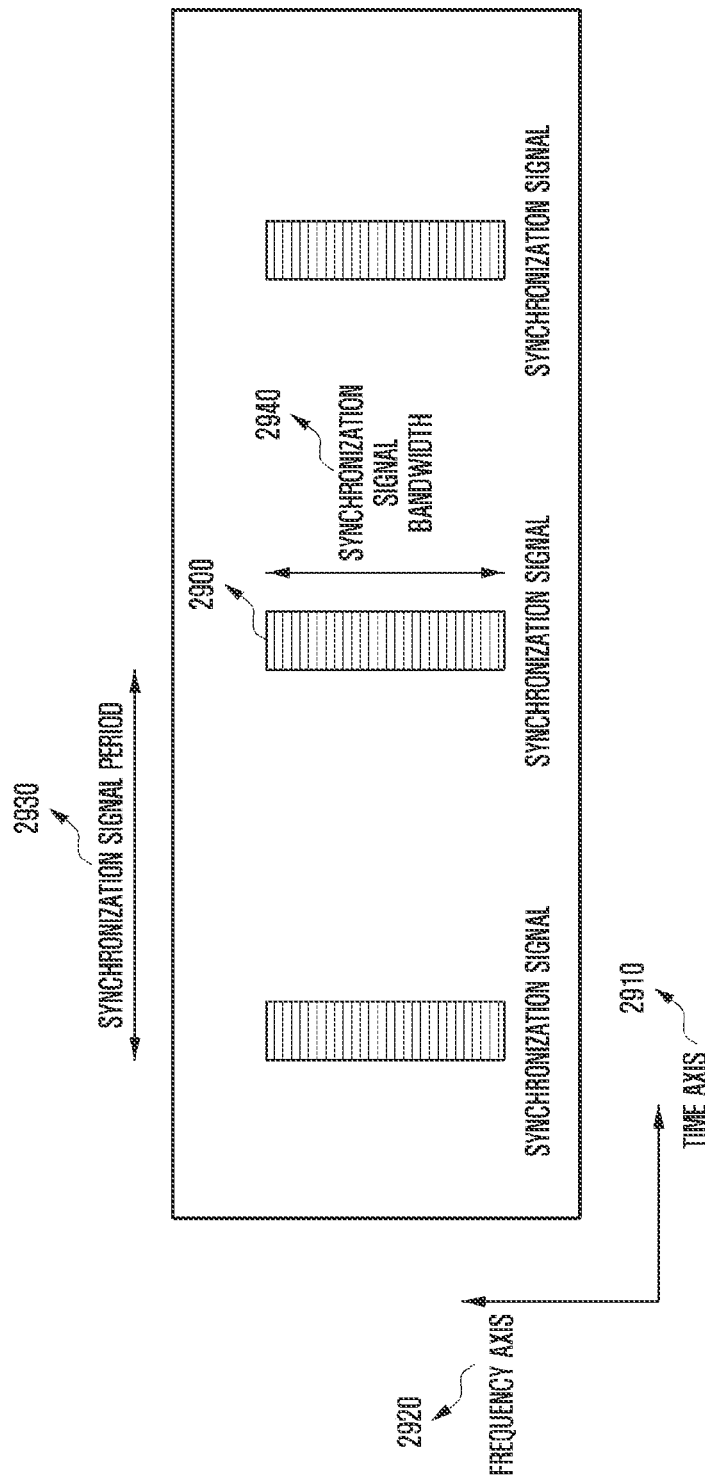
FIG. 29 is a diagram showing an embodiment in which a synchronization signal is transmitted in a 5G communication system considered in the present disclosure.

FIG. 29 is a diagram showing an embodiment in which a synchronization signal is transmitted in a 5G communication system considered in the present disclosure. In FIG. 29, a synchronization signal 2900 may be transmitted at intervals of a given period 2930 in a time axis 2910. Furthermore, the synchronization signal 2900 may be transmitted within a given synchronization signal transmission bandwidth 2940 in a frequency axis 2920. In order for the synchronization signal to indicate a cell identifier (may be interchangeably used with a cell ID), a special sequence may be mapped to a subcarrier within the transmission bandwidth 2940. A cell identifier may be mapped through one or a combination of a plurality of sequences. Accordingly, a UE may detect a cell identifier to be accessed by the UE by detecting a sequence used for a synchronization signal.

A sequence having a constant amplitude zero auto correlation (CAZAC) characteristic, such as a Zadoff-Chu sequence or a Golay sequence, or a pseudo random noise sequence, such as an M-sequence or a Gold sequence, may be used as a sequence used for a synchronization signal. In the present disclosure, the aforementioned synchronization signal has been illustrated as being used for a synchronization signal, but is not described as being limited to a given signal in the present disclosure.

The synchronization signal 2900 may be configured using one OFDM symbol or may be configured using a plurality of OFDM symbols. If a synchronization signal is configured using a plurality of OFDM symbols, sequences for a plurality of different synchronization signals may be mapped to respective OFDM symbols. For example, as in the LTE system, a PSS may be generated using three Zadoff-Chu sequences, and a secondary synchronization signal may be generated using a Gold sequence.

As described above, a UE obtains synchronization with a cell within a network, and searches for cell frame timing by obtaining a cell identifier. When they are successful, the UE needs to receive important cell system information. The cell system information is information repetitively broadcasted by a network and is information that must be known to the UE in order for the UE to access a cell and to properly operate within the cell. In the LTE system, system information is transmitted through two different transmission channels. A limited amount of system information called a master information block (MIB) is transmitted using a physical broadcast channel (PBCH). A major part of system information corresponding to a system information block (SIB) is transmitted using a physical downlink shared channel (PDSCH). More specifically, in the LTE system, system information included in an MIB includes a DL transmission bandwidth, physical hybrid ARQ indicator channel (PHICH) configuration information, and a system frame number (SFN). Hereinafter, MIB transmission may be interchangeably used with PBCH transmission.

Figure 30:
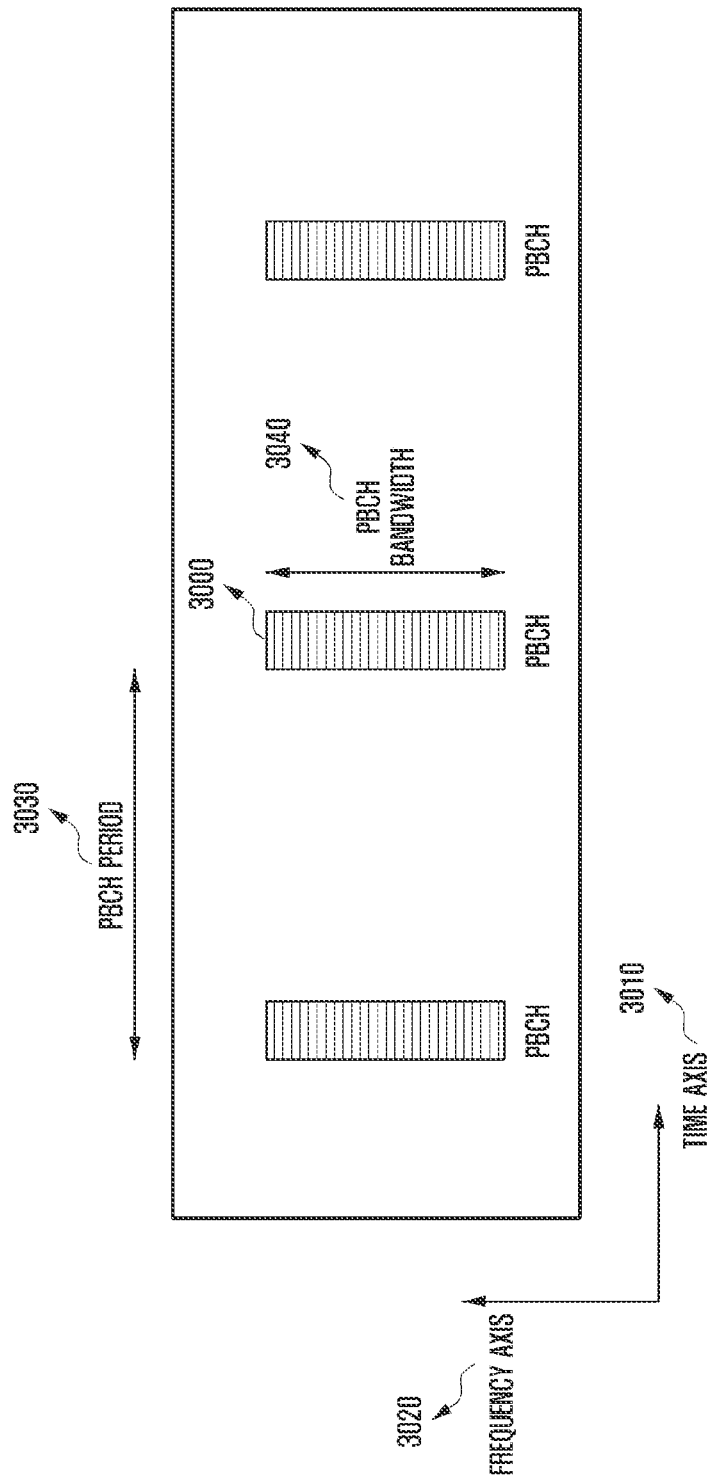
FIG. 30 is a diagram showing an embodiment in which a PBCH is transmitted in a 5G communication system considered in the present disclosure.

FIG. 30 is a diagram showing an embodiment in which a PBCH is transmitted in a 5G communication system considered in the present disclosure. In FIG. 30, a PBCH 3000 may be transmitted at intervals of a given period 3030 in a time axis 3010. Furthermore, the PBCH 3000 may be transmitted within a given PBCH transmission bandwidth 3040 in a frequency axis 3020. The PBCH transmits the same signal at intervals of the given period 3030 for coverage enhancement. A UE may receive the PBCH by combining the PBCHs. Furthermore, the PBCH may enable a diversity gain to be obtained even without providing additional information about a transmission scheme used in a reception stage by applying a transmission scheme, such as transmission diversity, using multiple antenna ports.

Figure 31A:
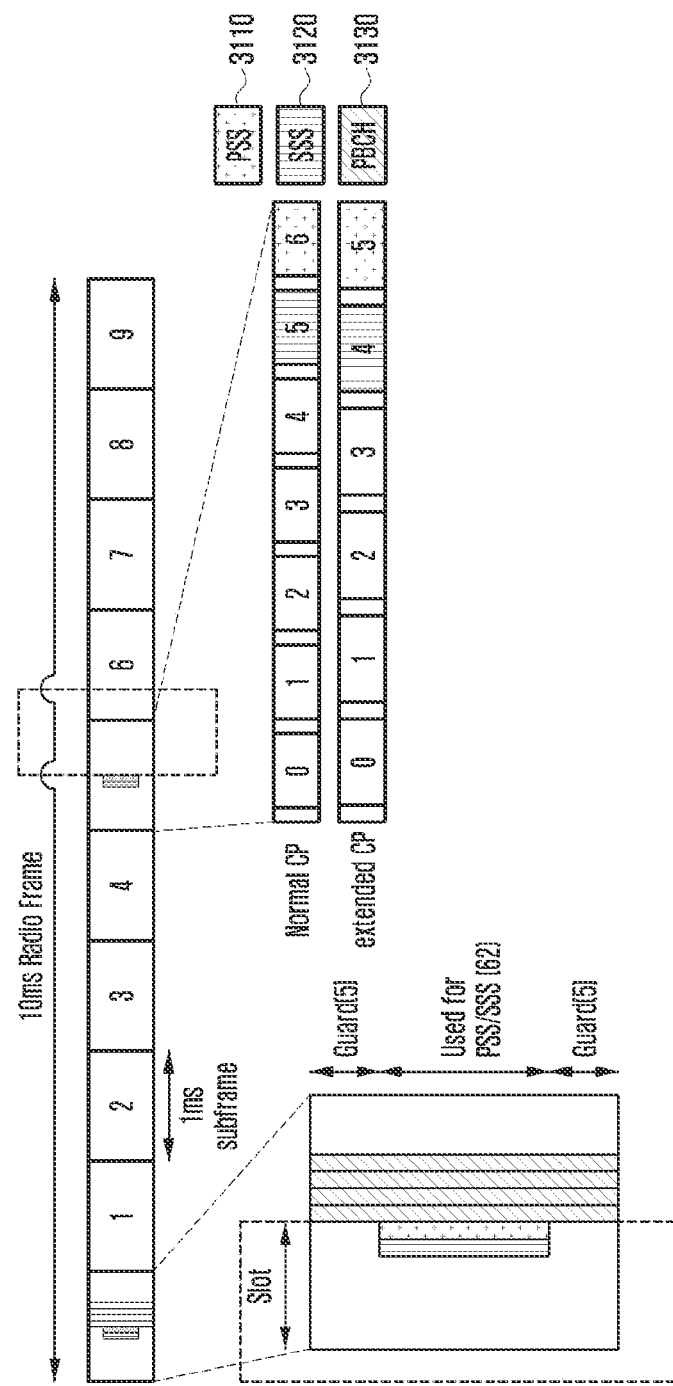
FIGS. 31A and 31B are diagrams showing the positions of synchronization signals and PBCHs in terms of time-frequency domain in the LTE system.
Figure 31B:
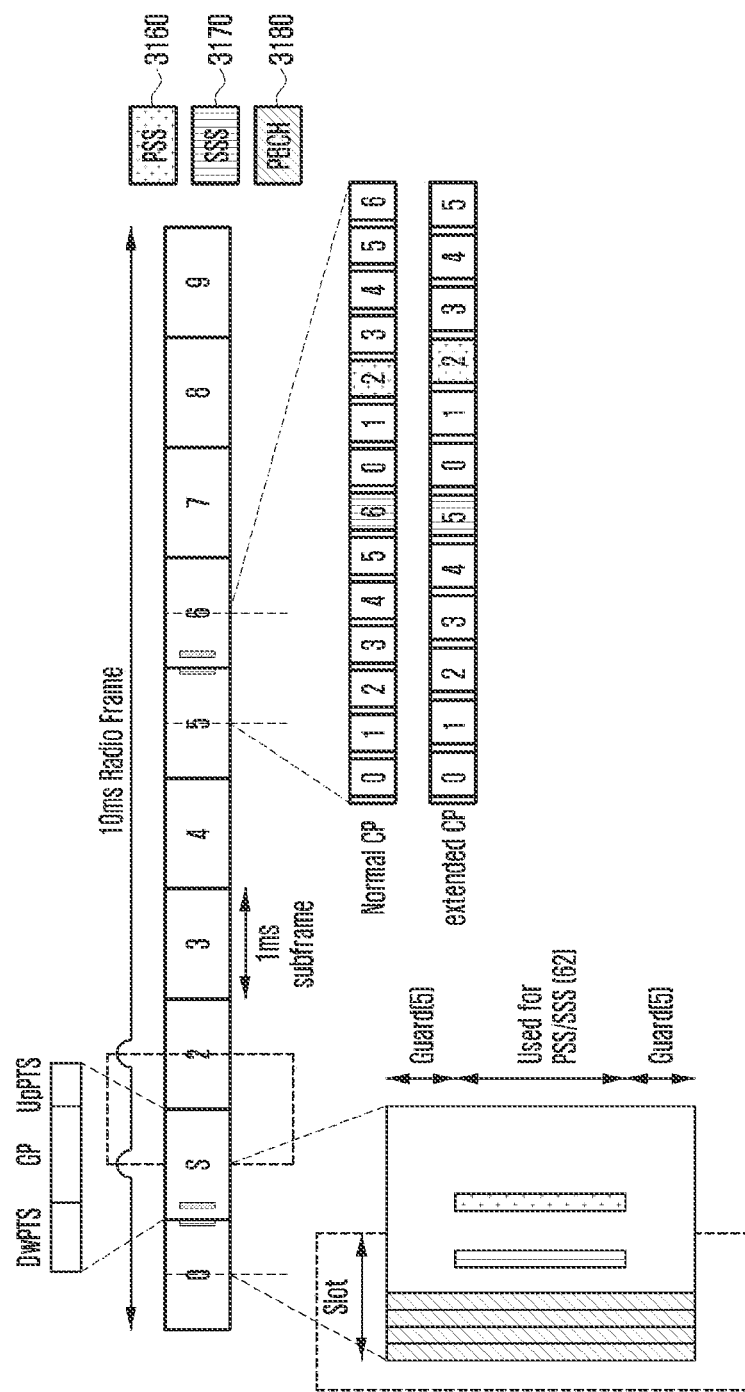

In the present disclosure, the aforementioned PBCH has been assumed to be used, but is not described as being limited to a given structure in the present disclosure. As in the current LTE system, the PBCH 3000 may be configured using a plurality of OFDM symbols in a resource of a time-frequency domain or may be distributed and configured in resources of a time-frequency domain A UE needs to receive and decode a PBCH in order to receive system information. In the LTE system, a UE performs channel estimation on a PBCH using a CRS. FIGS. 31A and 31B are diagrams showing the positions of synchronization signals and PBCHs in terms of time-frequency domain in the LTE system. First, positions in terms of frequency are 6 RBs at the center other than 10 guard subcarriers in the case of a PSS 3110, 3160 and SSS 3120, 3170 and are 6 RBs at the center in the case of a PBCH 3130, 3180. Positions where a PSS and SSS are transmitted in terms of time are different depending on whether a cell operates in frequency division duplex (FDD) or time division duplex (TDD). FIG. 31A shows the case of an LTE FDD system, and FIG. 31B shows the case of an LTE TDD system.

Positions where a PSS and SSS are transmitted are distinguished in the time domain within a frame. As in the LTE system shown in FIG. 31, if a synchronization signal and a major physical channel, such as a PBCH, are transmitted at very close positions in the time-frequency domain, accuracy in estimating a channel of a major physical layer using a synchronization signal may be improved.

A 5G communication system, that is, a future communication system after the LTE system, has a goal of high transmission efficiency compared to the existing communication system. A method of maximizing transmission efficiency includes a method of minimizing overhead of a reference signal. In the LTE system, a reference signal, such as a cell-specific reference signal (CRS), is used in DL. A CRS is used to perform operations, such as channel estimation and measurement for a major physical channel, and signaling for DL transmit power. However, a CRS has high density and is transmitted every frame in a full band, and thus has a disadvantage in that it generates overhead and interference due to the high density.

The present disclosure proposes a method of substituting the function of a CRS using a synchronization signal. The existing LTE system has not used a synchronization signal for channel estimation for a major physical channel, such as a PBCH. The reason for this is that a major physical channel, such as a PBCH, is transmitted by supporting multiple antenna ports, but an antenna port configuration is not supported in a synchronization signal of the LTE system. Accordingly, the present disclosure proposes various methods for matching an antenna port with a synchronization signal in order to substitute the function of a CRS. Furthermore, operations, such as measurement and signaling for DL transmit power, may be performed through a synchronization signal according to the present disclosure.

Hereinafter, embodiments of the present disclosure are described in detail with reference to the accompanying drawings. The embodiments of the present disclosure are described below by taking an LTE or LTE-A system as an example, but the embodiments of the present disclosure may be applied to other communication systems having a similar technical background or channel form. For example, a 5G mobile communication technology (new radio (NR)) being developed after LTE-A may be included in other communication systems. Accordingly, an embodiment of the present disclosure may also be applied to other communication systems through some modification without greatly departing from the range of the present disclosure based on a determination of a person who has skilled technical knowledge.

Furthermore, in describing the present disclosure, a detailed description of a related known function or configuration will be omitted if it is deemed to make the gist of the present disclosure unnecessarily vague. Furthermore, terms to be described hereunder have been defined by taking into consideration functions in the present disclosure, and may be different depending on a user, an operator's intention or practice. Accordingly, each term should be defined based on contents over the entire specification. Hereinafter, a base station is the subject that performs resource assignment on a UE, and may be at least one of an eNode B, a Node B, a gNB, a BS, a radio access unit, a BS controller and a node in a network. A terminal may include a user equipment (UE), a mobile station (MS), a cellular phone, a smartphone, a computer and a multimedia system capable of performing a communication function. In the present disclosure, downlink (DL) is a radio transmission path of a signal transmitted from a BS to a UE, and uplink (UL) means a radio transmission path of a signal transmitted from a UE to a BS.

The (3-1) embodiment of the present disclosure to be described below proposes various methods of matching an antenna port with a synchronization signal. In the (3-2) embodiment of the present disclosure, an operation for enhancing channel estimation performance of a UE and securing a channel sample in terms of time-frequency is described. The (3-3) embodiment of the present disclosure proposes various methods of performing measurement using a synchronization signal. In the (3-4) embodiment of the present disclosure, a method of performing a signaling operation on DL transmit power using a synchronization signal is described. Furthermore, the (3-5) embodiment of the present disclosure proposes the structure of a synchronization signal and a PBCH in terms of time-frequency for better performing the estimation of a physical channel, such as a PBCH.

(3-1) Embodiment

In the (3-1) embodiment, various technologies for matching an antenna port with a synchronization signal proposed in the present disclosure in order to substitute the function of a CRS using the synchronization signal are described. As described above, in the LTE system, when frame timing and a physical cell identifier are obtained, a corresponding CRS signal can be aware. Thereafter, a UE may estimate a major physical channel, such as a PBCH, using a CRS in order to receive important cell system information. However, if channel estimation for a major physical channel is to be performed using a synchronization signal, the physical channel is transmitted by supporting multiple antenna ports. If an antenna port configuration is not supported in the synchronization signal, to perform physical channel estimation using the synchronization signal is impossible. To this end, there is a need for various methods of matching an antenna port with a synchronization signal.

Furthermore, in order to perform channel estimation on a physical channel based on antenna port information matched with such a synchronization signal, there is a need for an assumption that the same antenna port is assumed and transmitted in the physical channel and the synchronization signal. More specifically, if a physical channel is transmitted by supporting multiple antenna ports, the following standard support may be considered.

Table 34 shows an example if the number of antenna ports for a synchronization signal is defined as 1, 2 or 4. A, B, C, and D indicate antenna port indices and may be indicated as given numbers. The number of support antenna ports for a synchronization signal may be restricted to 2 or 4 or may be extended to 4 or more depending on the performance requirement of an NR system.

Various technologies for matching multiple antenna ports with a synchronization signal are described on the assumption that a physical channel and the synchronization signal assume the same antenna port and are transmitted through the following embodiment.

In order to match multiple antenna ports with a synchronization signal, the multiple antenna ports must be basically divided into different resources of the synchronization signal. As a first method therefor, there is proposed a method of matching multiple antenna ports with different types of synchronization signals. This method is a method of matching multiple synchronization signals with different antenna ports if the multiple synchronization signals are divided into different resources.

Figure 32:
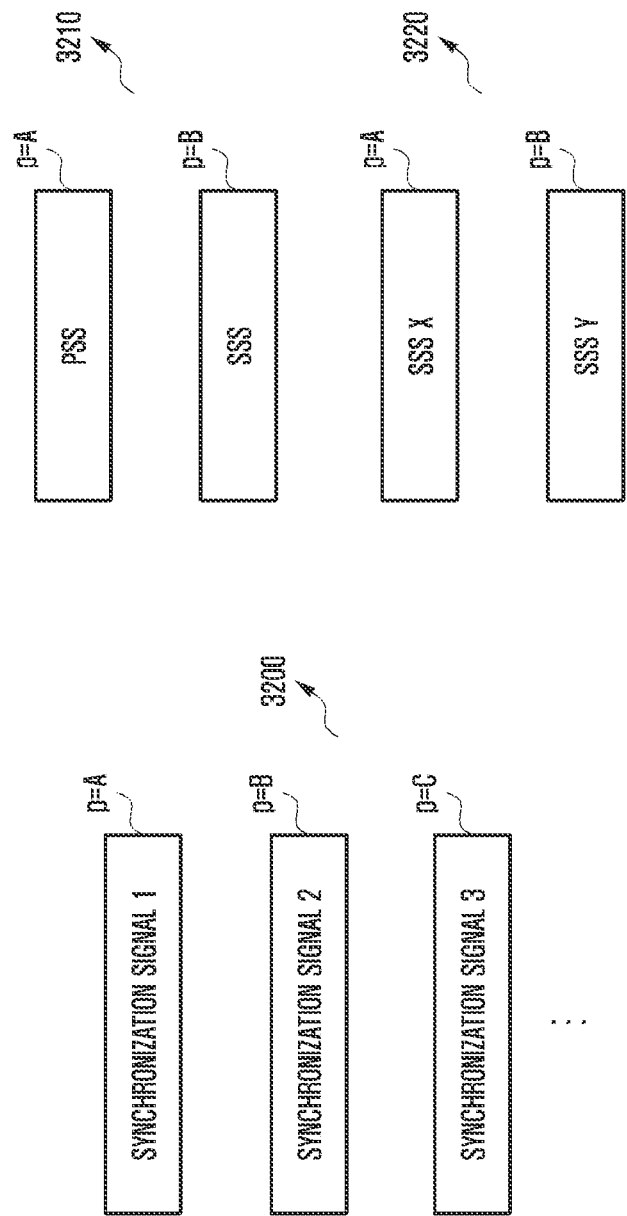
FIG. 32 is a diagram showing the first method of a (3-1) embodiment.

FIG. 32 is a diagram showing the first method of the (3-1) embodiment. For example, if two synchronization signals are supported, the synchronization signal 1 may be matched with an antenna port index A and the synchronization signal 2 may be matched with an antenna port index B. Specifically, in the LTE system, a signal divided into a PSS and an SSS is used for synchronization. As shown in FIG. 31, the positions where a PSS and an SSS are transmitted are different depending on whether a cell operates in FDD or operates in TDD. The positions where a PSS and an SSS are transmitted are divided in the time domain within a frame. Furthermore, in the case of an SSS, M-sequences X and Y of 2-length 31 are interleaved and divided in the frequency domain.

In the LTE system, a PSS and an SSS used to detect a cell identifier and timing information are described in detail. First, a PSS is described. The PSS of one cell may have 3 different values depending on a physical cell ID of the cell. Three cell IDs within one cell ID group correspond to different PSSs. Accordingly, a UE can be aware of a cell ID within a cell ID group by detecting the PSS of a cell. However, the UE is unaware that a cell ID group is which group until it detects an SSS, so the possible number of cell ID after the PSS is detected is reduced from 504 to 168. Furthermore, a UE is aware of 5 ms timing of a cell by detecting a PSS. Accordingly, as shown in FIG. 31, the UE is aware of the position of an SSS positioned ahead by a fixed offset compared to the PSS. An SSS is described below. A UE is aware of a cell ID group to which a corresponding cell belongs among 168 cell ID groups by detecting an SSS. Furthermore, the UE checks that which one of two possible frame start timings found from a PSS is the start of a true frame.

The present disclosure proposes a method of matching two or more synchronization signals, used to detect a cell identifier and timing information, with an antenna port. According to the example, a PSS and an SSS used to detect a cell ID and timing information may be matched with different antenna ports. In a similar method, the sequences X and Y of an SSS may be matched with different antenna ports based on the division of the SSS into the two sequences X and Y interleaved in terms of frequency. In accordance

TABLE 34

TABLE-US-00034 --- An antenna port is defined such that the channel over which a symbol on the antenna port is conveyed can be inferred from the channel over which another symbol on the same antenna port is conveyed. The antenna ports supported can be defined as: Synchronization signal supports a configuration of one, two, or four antenna ports and are transmitted on antenna ports p=A, p.di-elect cons.{A,B}, p.di-elect cons.{A,B,C,D}, respectively.
--- with the above method, the number of support antenna ports for a synchronization signal is restricted to two.

However, multiple antenna ports and synchronization signals may be matched according to the following proposed time, frequency or code division method. Specifically, an example of a method of matching multiple synchronization signals, divided into different resource, with different antenna ports is shown in 3210 and 3220 of FIG. 32. 3210 is the case where a PSS and an SSS divided in terms of time are matched with different antenna ports. 3220 is the case where the sequences X and Y of an SSS divided in terms of frequency are matched with different antenna ports. As described above, if multiple synchronization signals are divided into two or more times, frequencies or codes depending on a method of designing a synchronization signal, two or more antenna ports and synchronization signals may be matched.

In the present disclosure, synchronization signals, such as a PSS and an SSS for detecting a cell ID and timing information in an initial access process, may be taken into consideration as synchronization signals. Alternatively, an additional synchronization signal structure may also be taken into consideration.

Figure 33:
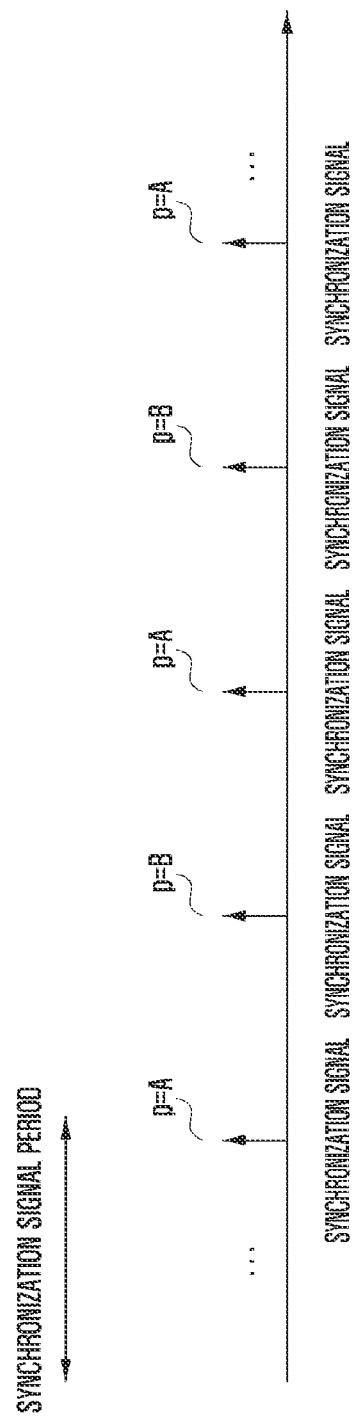
FIG. 33 is a diagram showing the second method of the (3-1) embodiment.

A method of matching multiple antenna ports with synchronization signals divided in terms of time is proposed as a second method for matching multiple antenna ports with synchronization signals. FIG. 33 is a diagram showing the second method of the (3-1) embodiment. As in FIG. 33, a synchronization signal that is periodically transmitted may be divided in terms of time and matched with multiple antenna ports. For example, as in FIG. 33, two antenna ports may be divided in terms of time, a synchronization signal at given timing may be matched with an antenna port index A, and a synchronization signal at timing different from the given timing may be matched with an antenna port index B. Through such a method, multiple antenna ports may be extended and matched with synchronization signals divided in terms of time.

Figure 34:
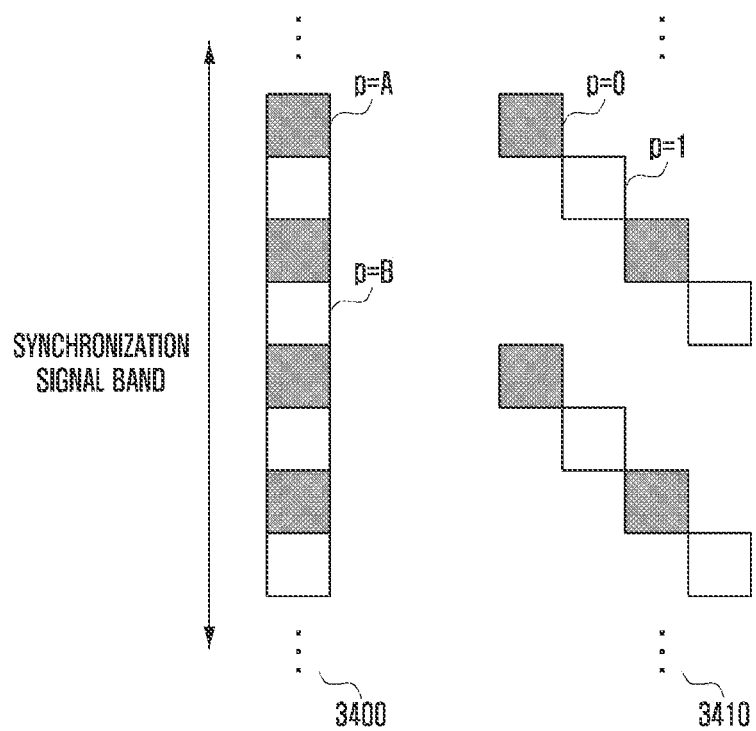
FIG. 34 is a diagram showing the third method of the (3-1) embodiment.

A method of matching multiple antenna ports with synchronization signals divided in terms of frequency is proposed as a third method for matching multiple antenna ports with synchronization signals. FIG. 34 is a diagram showing the third method of the (3-1) embodiment. As in FIG. 34, multiple antenna ports may be matched with synchronization signals divided in terms of frequency in a frequency band to which the synchronization signals have been assigned. For example, as in 3400, two antenna ports may be divided in terms of frequency, the synchronization signal of a given one of subcarriers to which the synchronization signal has been assigned may be matched with an antenna port index A, and the synchronization signal of another subcarrier different from the given subcarrier may be matched with an antenna port index B. Through such a method, multiple antenna ports may be extended and matched with synchronization signals divided in terms of frequency. For example, as described above, in the LTE system, the case of an SSS, the M-sequences X and Y of 2 lengths 31 are interleaved in the frequency domain. In this case, the X and Y of the SSS may be matched with different antenna ports.

Furthermore, in 3400, a method of configuring the subcarrier spacing of a synchronization signal differently from the subcarrier spacing of a PBCH may be used. Specifically, if multiple antenna ports are extended and matched with synchronization signals divided in terms of frequency, synchronization signals for one antenna port may be spaced at a given interval in terms of frequency. If different physical channel estimation is performed through such a synchronization signal, channel estimation needs to be additionally performed on a channel between synchronization signals through a method, such as interpolation. If the subcarrier spacing of a synchronization signal is configured smaller than the subcarrier spacing of a physical channel, such as a PBCH, there is an advantage in that performance of channel estimation can be improved when multiple antenna ports are matched with synchronization signals divided in terms of frequency as described above.

A method of matching multiple antenna ports with synchronization signals divided in terms of code may be used as a fourth method for matching multiple antenna ports with synchronization signals. In this case, a transmission stage scrambles a code by which a signal is classified into a synchronization signal and transmits the synchronization signal. A reception stage may distinguish between multiple antenna ports through a descrambling process.

Furthermore, in the present disclosure, a method of matching multiple antenna ports with synchronization signals may be possible through a combination of the proposed methods. For example, as in 3410 of FIG. 34, multiple antenna ports may be divided in terms of time-frequency and matched in a time-frequency band to which a synchronization signal has been assigned. A combination of the proposed methods of matching multiple antenna ports with synchronization signals is not limited to the above combination, and various combinations may be present.

A UE may assume a matching relation between a synchronization signal and an antenna port and perform blind detection on an antenna port number transmitted by a BS based on the proposed method of matching an antenna port with a synchronization signal. Thereafter, the UE may assume an antenna port number transmitted by the BS and perform channel estimation on a physical channel.

Unlike in the case where a physical channel is transmitted through multiple antenna ports as in the embodiment, if a physical channel is transmitted by supporting only one antenna port, a multi-antenna port configuration for a synchronization signal is not supported, but physical channel estimation using a synchronization signal may be supported on the premise that a physical channel and a synchronization signal assume the same antenna port and are transmitted. More specifically, if a physical channel is transmitted by supporting only one antenna port, the following standard support may be considered. Table 35 is an example when one antenna port for a synchronization signal is defined. Table 36 is an example when a physical layer channel and a synchronization signal assume the same antenna port without separately defining an antenna port for a synchronization signal.

TABLE 35

TABLE-US-00035 --- An antenna port is defined such that the channel over which a symbol on the antenna port is conveyed can be inferred from the channel over which another symbol on the same antenna port is conveyed. The antenna port supported can be defined as: Synchronization signal supports a configuration of one port and it transmitted on antenna port p=A. ---

TABLE 36

TABLE-US-00036 TABLE --- A UE may assume the antenna port A and the antenna port for the synchronization signal of a serving cell are same. ---

In Table 35 and Table 36, A indicates an antenna port index and may be indicated as a given number. The assumption may be applied to an environment in which system performance can be satisfied although a physical channel is transmitted by supporting only one antenna port.

In this case, a UE may perform channel estimation by assuming one antenna port without performing blind detection on an antenna port number transmitted by a BS.

(3-2) Embodiment

The (3-1) embodiment has proposed various methods of matching an antenna port with a synchronization signal and has described the method of substituting the function of a CRS using a synchronization signal through the methods. In the (3-2) embodiment, an operation of improving channel estimation performance when a UE performs channel estimation using a synchronization signal is additionally described.

Figure 35:
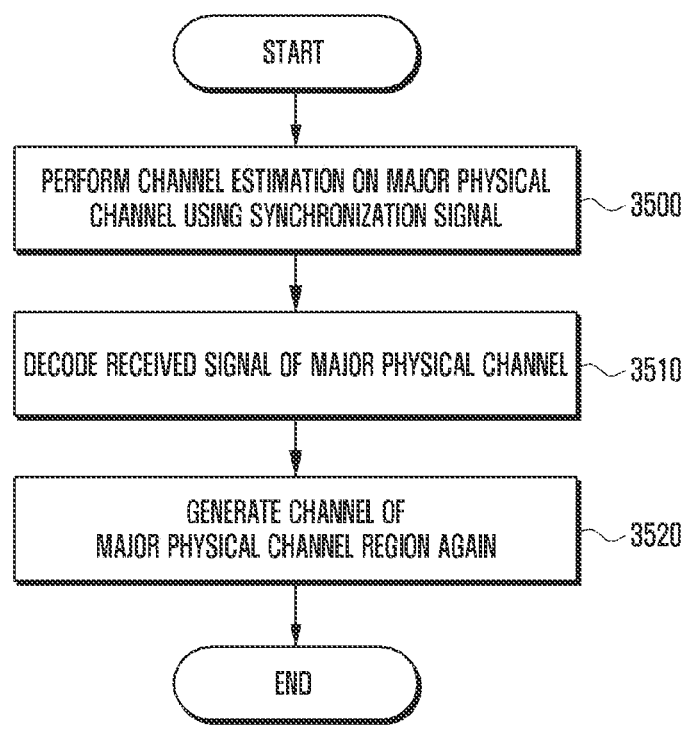
FIG. 35 is a diagram showing an operation of a terminal according to the (3-1) embodiment.

FIG. 35 is a diagram showing an operation of a UE according to the (3-1) embodiment. At operation 3500, a UE performs channel estimation on a major physical channel, such as a PBCH, using a synchronization signal according to the method proposed in the (3-1) embodiment. Thereafter, at operation 3510 the UE decodes the received signal of the corresponding major physical channel. Thereafter, at operation 3520, the UE generates the channel of a corresponding physical channel region again using the received signal decoded at operation 3510. The UE updates channel state information of the corresponding physical channel region at operation 3520 by repeatedly performing the operations. The UE can estimate the channel state of a corresponding physical channel more precisely and secure a radio channel sample of a corresponding physical channel region through the method. As a corresponding physical channel resource occupies a wider region in a time-frequency domain resource, more radio channel samples can be secured through the method.

In the 5G system, if a separate reference signal for a major physical channel is not present and channel estimation is performed on a major physical channel using a synchronization signal as proposed in the present disclosure, the method of the (3-2) embodiment may be a method for a UE to improve channel estimation performance and to secure a channel sample in the time-frequency resource region. If the method is used, the UE can perform a variety of types of measurement using a channel sample in the time-frequency resource region secured at operation 3520. More specifically, long-term channel information, such as Doppler spread or delay spread, can be estimated using the method

[(3-3) embodiment]

The (3-3) embodiment proposes various methods for a UE to perform measurement. In the LTE system, a UE measures received power using a CRS as described above. If the measurement value satisfies a set condition, a reference signal received power (RSRP) measurement report is transmitted from the UE to a BS. The BS determines whether to perform handover based on such a measurement report. The present disclosure proposes a method of substituting the function of a CRS for measurement using a synchronization signal. If the function of a CRS is substituted to use a synchronization signal as in the present disclosure, a measurement report of RSRP may be possible as in Table 37.

TABLE 37

TABLE-US-00037 Definition Reference signal received power (RSRP), is defined as the linear average over the power contributions (in [W]) of the resource elements that carry cell-specific reference signals within the considered measurement frequency bandwidth. For RSRP determination the synchronization signals R.sub.A shall be used. If the UE can reliably detect that R.sub.B is available it may use R.sub.B in addition to R.sub.A to determine RSRP. If higher layers indicate measurements based on discovery signals, the UE shall measure RSRP in the subframes in the configured discovery signal occasions. If the UE can reliably detect that cell-specific reference signals are present in other subframes, the UE may use those subframes in addition to determine RSRP. The reference point for the RSRP shall be the antenna connector of the UE. If receiver diversity is in use by the UE, the reported value shall not be lower than the corresponding RSRP of any of the individual diversity branches. Applicable for RRC_IDLE intra-frequency, RRC_IDLE inter-frequency, RRC_CONNECTED intra-frequency, RRC_CONNECTED inter-frequency In Table 37, R.sub.A and R.sub.B are synchronization signals corresponding to antenna port indices A and B, and may be determined through the matching of an antenna port with a synchronization signal as described in the (3-1) embodiment. However, in the present disclosure, the RSRP measurement method using a synchronization signal is not limited to Table 37. For example, RSRP is not measured based on the synchronization signal of a corresponding antenna port index, but may be measured based on one synchronization signal. Furthermore, as described in the (3-2) embodiment, an RSRP measurement method based on channel information of a corresponding physical channel region at operation 3520 of FIG. 35 may be defined. That is, RSRP may be measured based on channel information of a physical channel region not a synchronization signal.

(3-4) Embodiment

In the (3-4) embodiment, a method of performing a signaling operation on DL transmit power using a synchronization signal is described. As described above, in the LTE system, a UE transmits information about DL transmit power to a UE based on a CRS. The present disclosure proposes a method of substituting the function of a CRS for DL transmit power signaling using a synchronization signal. As in the present disclosure, if a CRS is substituted to use a synchronization signal, the BS may signal to a UE for DL transmit power based on definitions and assumptions, such as Table 38, Table 39 and Table 40.

TABLE 38

TABLE-US-00038 --- The eNodeB determines the downlink transmit energy per resource element. For the purpose of RSRP and RSRQ measurements, the UE may assume downlink transmit signal EPRE is constant across the downlink system bandwidth and constant across all subframes with discovery signal transmissions until different synchronization signal power information is received. --- The downlink downlink transmit signal EPRE can be derived from the synchronization signal power given by the parameter syncSignalPower provided by higher layers. The downlink synchronization signal transmit power is defined as the linear average over the power contributions (in [W]) of all resource elements that carry synchronization signals within the operating system bandwidth. ---

In Table 38, synSignalPower may be information transmitted on a higher layer, such as RRC, as in Table 39.

TABLE 39

TABLE-US-00039 --- SyncSignalPower Integer (−60..50) ---

In Table 39, synSignalPower indicates energy per resource element (EPRE) of a downlink transmit signal, and a unit thereof is dBm. However, the range of transmit power set in the present disclosure is not restricted to the value set in Table 39. Furthermore, in Table 38, downlink synchronization signal transmit power may be defined more specifically through Table 40.

TABLE 40

TABLE-US-00040 Definition Downlink reference signal transmit power is determined for a considered cell as the linear average over the power contributions (in [W]) of the resource elements that carry cell-specific reference signals which are transmitted by the eNode B within its operating system bandwidth. For DL synchronization TX power determination the synchronization signals R.sub.A and if available R.sub.B can be used. The reference point for the DL RS TX power measurement shall be the TX antenna connector.

In Table 40, R.sub.A and R.sub.B are synchronization signals corresponding to antenna port indices A and B, and may be determined through the matching of an antenna port with a synchronization signal as described in the (3-1) embodiment. However, in the present disclosure, DL synchronization signal transmission power using a synchronization signal is not restricted to Table 30. For example, the DL synchronization signal transmission power is not measured based on the synchronization signal of a corresponding antenna port index, but may be measured based on one synchronization signal.

(3-5) Embodiment

The (3-5) embodiment proposes the structure of a synchronization signal and a PBCH in terms of time-frequency for better performing the estimation of a physical channel, such as a PBCH, using a synchronization signal in an NR system. Furthermore, there is proposed an example of a method of matching an antenna port with the synchronization signal proposed in the (3-1) embodiment.

In an NR system, the structure of a synchronization signal and a PBCH in terms of time-frequency, which is different from the structure shown in FIG. 31, may be used. When the structure of a synchronization signal and a PBCH in terms of time-frequency is designed in the NR system, it is very important to design the structure in terms of system efficiency so that channel estimation is better performed on a PBCH using a synchronization signal.

Figure 36:
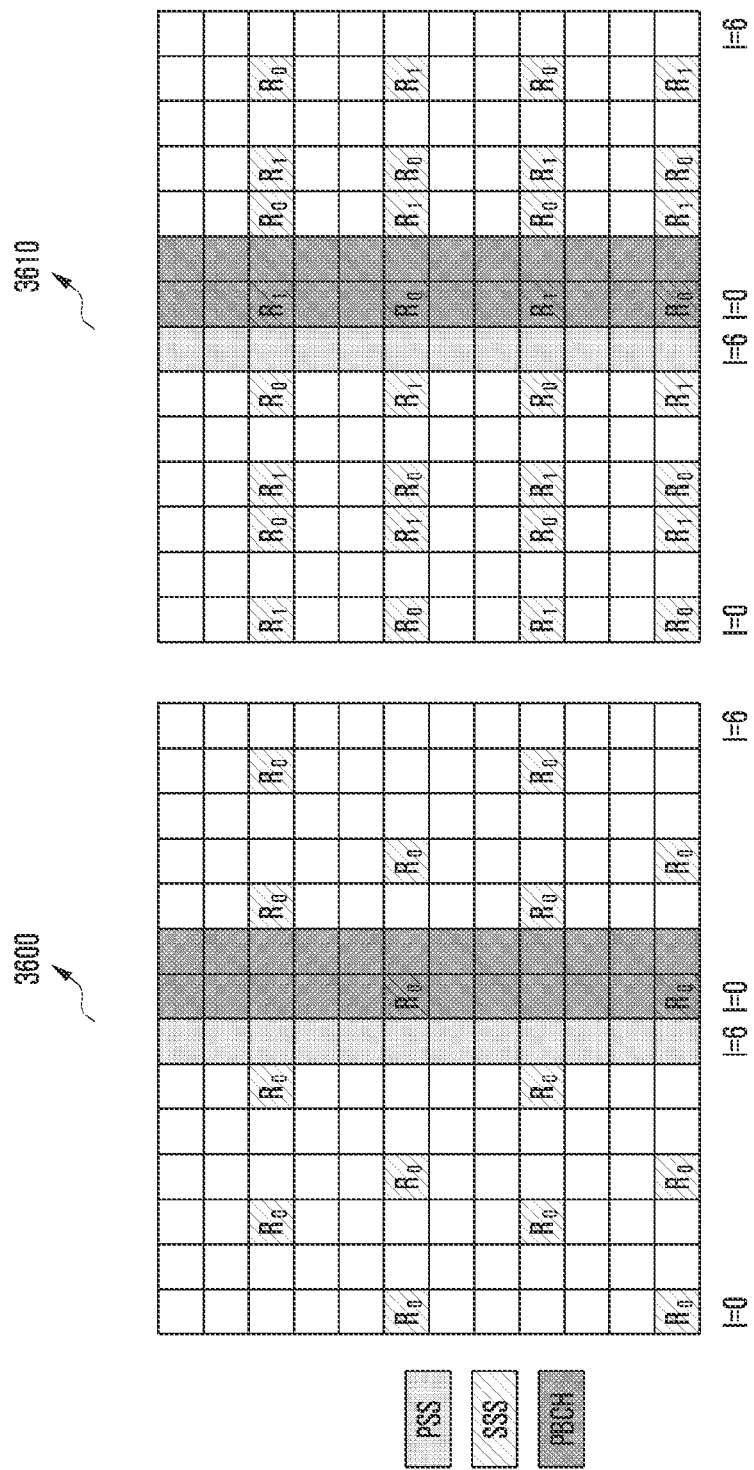
FIGS. 36, 37 and 38 are diagrams showing the structures of synchronization signals and PBCHs in terms of time-frequency in an NR system proposed in the present disclosure.
Figure 37:
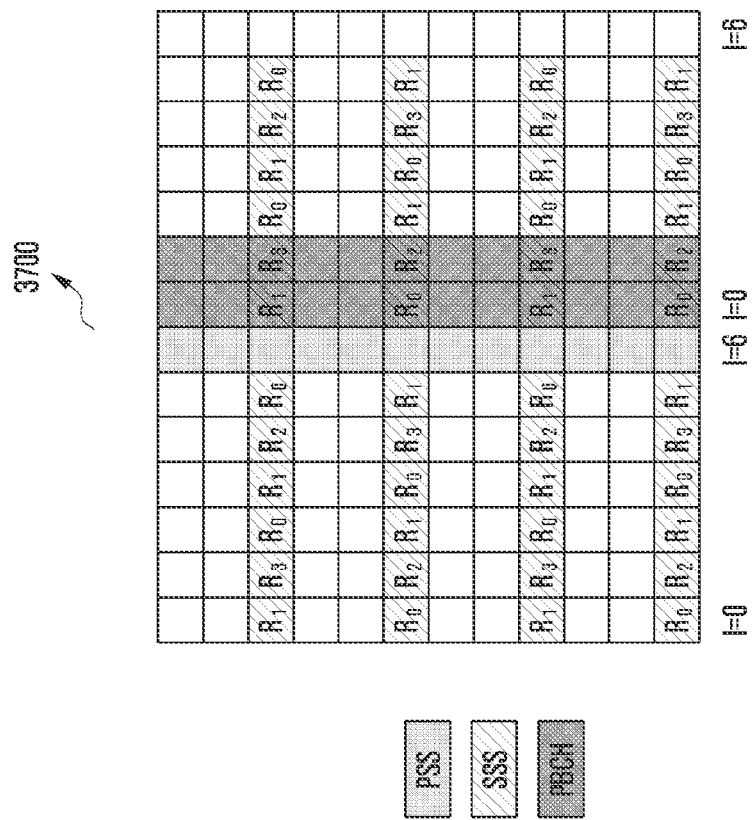
Figure 38:
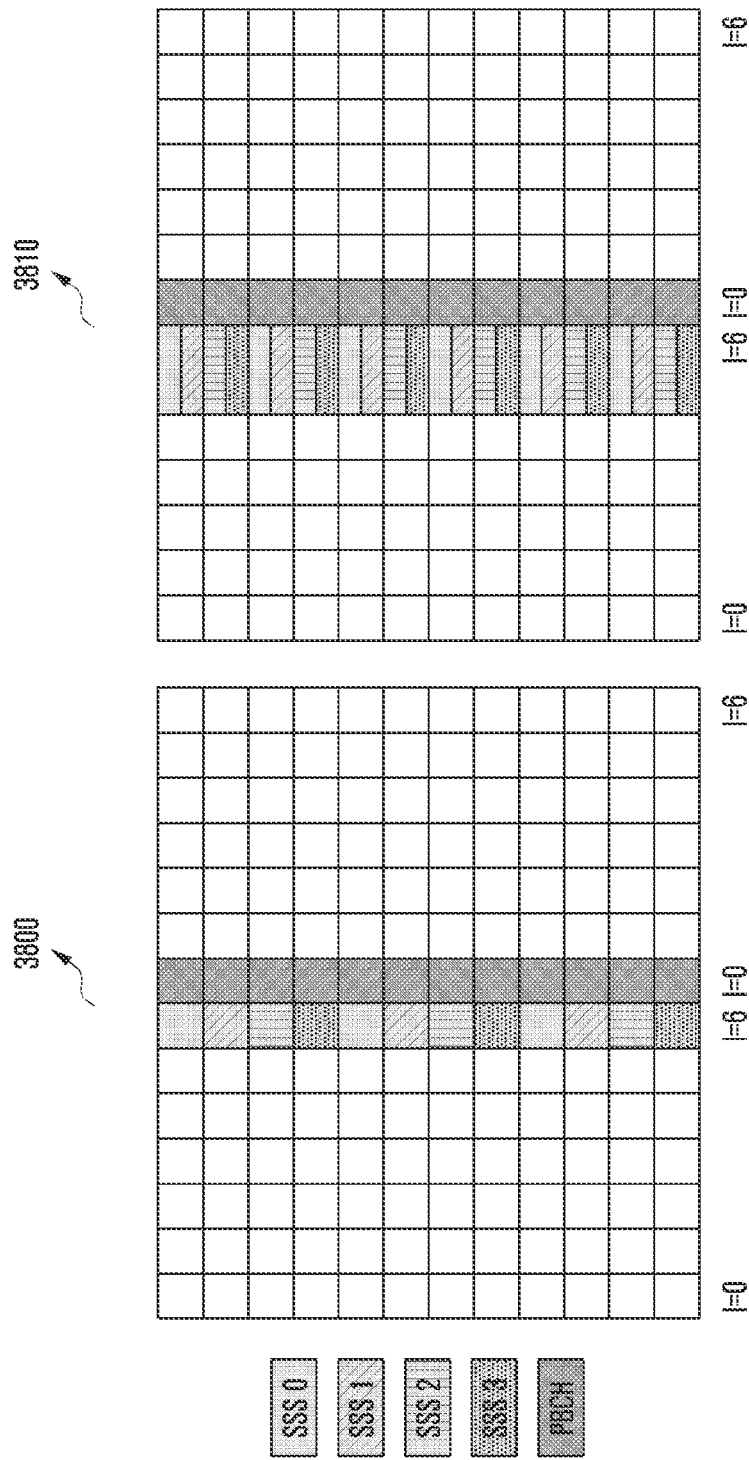

FIGS. 36, 37 and 38 are diagrams showing the structures of synchronization signals and PBCHs in terms of time-frequency in an NR system proposed in the present disclosure. As shown in FIGS. 36 and 37, SSSs may be distributed in terms of time-frequency like the CRSs of the LTE system. Furthermore, a PBCH is transmitted in four OFDM symbols in the LTE system, whereas a PBCH may be transmitted in OFDM symbols (e.g., 2) narrower than the four OFDM symbols. 3600, 3610, and 3700 show examples in which SSSs are divided in terms of time-frequency and matched with 1, 2 and 4 antenna ports, respectively. In this case, R.sub.0, R.sub.1, R.sub.2 and R.sub.3 indicate respective antenna ports. The SSSs proposed in 3600, 3610 and 3700 have a structure having high density in terms of time compared to LTE CRSs. This is for supplementing accuracy of channel estimation because an LTE CRS is transmitted every subframe to improve accuracy of channel estimation, but an SSS is transmitted in a given period.

As described above, the SSS and PBCH of the LTE system are transmitted in a bandwidth of 6 RBs in terms of frequency, but the SSS and PBCH in 3600, 3610 and 3700 may be transmitted in a wide bandwidth in terms of frequency. In this case, the possibility that a minimum support bandwidth of an NR system may be greater than 1.4 MHz has been taken into consideration. In the case of an LTE system, a PBCH is transmitted in 6 RBs in terms of frequency and 4 OFDM symbols in terms of time by taking into consideration 1.4 MHz, that is, a minimum support bandwidth. However, in an NR system, when 5 MHz is taken into consideration as a minimum support bandwidth, an SSS and PBCH may be transmitted in a bandwidth of 25 RBs, and a PBCH may be transmitted using less OFDM symbols in terms of time compared to the LTE system. Furthermore, 3600, 3610 and 3700 illustrate the cases where the PSS has been positioned in a symbol ahead of the PBCH, but the position of the PBCH may be positioned in a different frequency.

3800 of FIG. 38 shows an example in which an SSS is divided in one symbol in terms of frequency and matched with 1, 2 and 4 antenna ports, respectively. Furthermore, a PBCH may be transmitted in one OFDM symbol in terms of time. As described above, the SSS and the PBCH may be transmitted in a bandwidth wider than 6 RBs in terms of frequency. In this case, channel estimation performance of the PBCH can be improved because the SSS is transmitted by applying subcarrier spacing narrower than the subcarrier spacing of the PBCH as in 3810, as proposed in the (3-1) embodiment. 3800 shows a case where the subcarrier spacing of an SSS is ½ of the PBCH.

Figure 39:
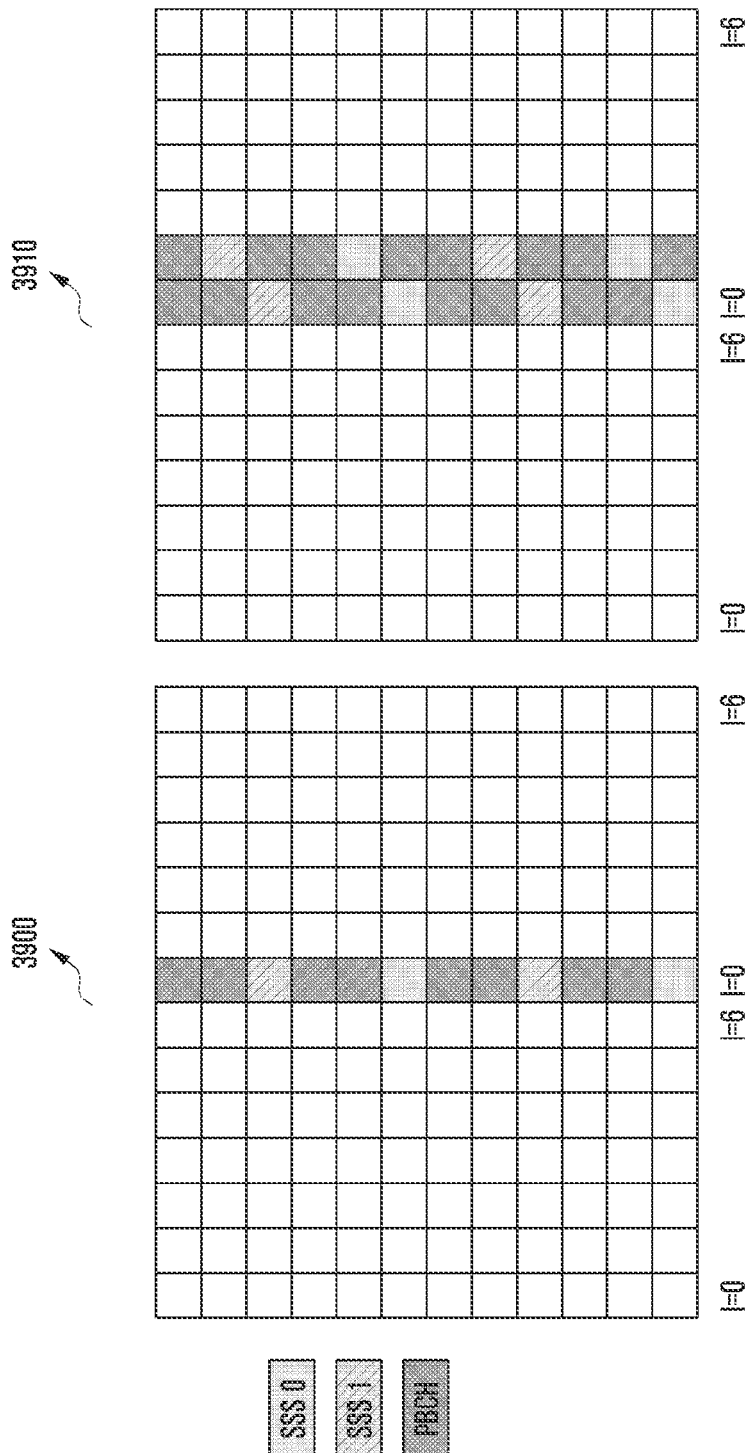
FIG. 39 is a diagram showing another structure of a synchronization signal and PBCH in terms of time-frequency in an NR system proposed in the present disclosure.

FIG. 39 is a diagram showing another structure of a synchronization signal and a PBCH in terms of time-frequency in an NR system proposed in the present disclosure. As in 3900 and 3910, an SSS may be distributed to the region of a PBCH and transmitted. 3900 shows an example in which when the PBCH is transmitted in one OFDM symbol in terms of time, the SSS of a resource divided in terms of frequency is matched with two antenna ports. 3910 shows an example in which when the PBCH is transmitted in two OFDM symbols in terms of time, the SSS of a resource divided in terms of time-frequency is matched with two antenna ports. In an NR system, if a PBCH bandwidth is widened, a PBCH and an SSS may be multiplexed in terms of frequency as described above by taking into consideration that a minimum support bandwidth may be greater than 1.4 MHz.

Figure 40:
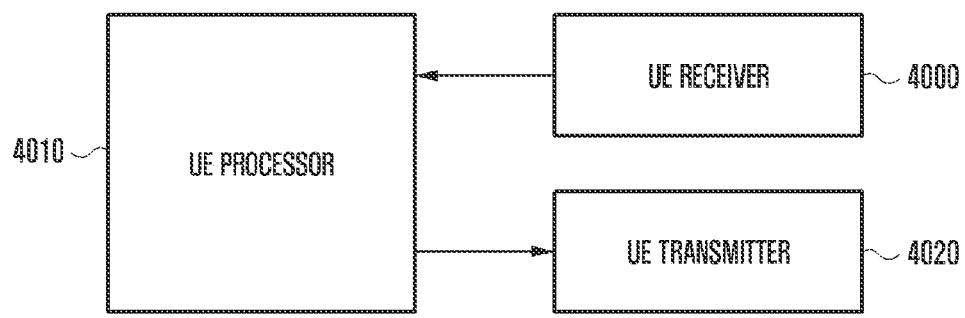
FIGS. 40 and 41 are block diagrams showing the configuration of a terminal and a base station in order to perform the embodiments of the present disclosure.
Figure 41:
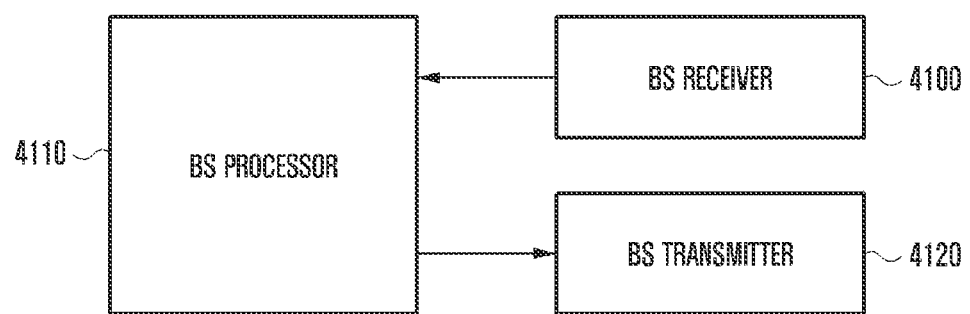

FIGS. 40 and 41 are block diagrams showing the configuration of a UE and a BS in order to perform the embodiments of the present disclosure. Transmission and reception methods of a BS and UE for performing an operation of transmitting and receiving synchronization signals have been described from the (3-1) embodiment to the (3-5) embodiment. In order to perform the methods, the receivers, processors and transmitters of the BS and the UE need to operate according to each embodiment.

FIG. 40 is a block diagram showing the internal structure of a UE according to an embodiment of the present disclosure. As shown in FIG. 40, the UE of the present disclosure may include a UE receiver 4000, a UE transmitter 4020 and a UE processor 4010. In an embodiment of the present disclosure, the UE receiver 4000 and the UE transmitter 4020 may be collectively called a transceiver unit. The transceiver unit may transmit and receive signals to and from a BS. The signal may include control information and data. To this end, the transceiver unit may include an RF transmitter configured to up-convert and amplify the frequency of a transmitted signal and an RF receiver configured to perform low-noise amplification on a received signal and to down-convert the frequency. Furthermore, the transceiver unit may receive a signal through a radio channel and output it to the UE processor 4010, and may transmit a signal output by the UE processor 4010 through a radio channel.

The UE processor 4010 may control a series of processes so that the UE operates according to the embodiment of the present disclosure. For example, the UE processor may control the UE receiver 4000 to receive a synchronization signal from a BS. The UE processor 4000 may control to analyze a matching relation between a synchronization signal and an antenna port as in the (3-1) embodiment. Furthermore, a channel estimation performance improvement method as in the (3-2) embodiment and a measurement method as in the (3-3) embodiment may be applied to the UE processor.

FIG. 41 is a block diagram showing the internal structure of a BS according to an embodiment of the present disclosure. As shown in FIG. 41, the BS of the present disclosure may include a BS receiver 4100, a BS transmitter 4120 and a BS processor 4110. In an embodiment of the present disclosure, the BS receiver 4100 and the BS transmitter 4120 may be collectively called a transceiver unit. The transceiver unit may transmit and receive signals to and from a UE. The signal may include control information and data. To this end, the transceiver unit may include an RF transmitter configured to up-convert and amplify the frequency of a transmitted signal and an RF receiver configured to perform low-noise amplification on a received signal and to down-convert the frequency. Furthermore, the transceiver unit may receive a signal through a radio channel and output it to the BS processor 4100, and may transmit a signal output by the BS processor 4110 through a radio channel.

The BS processor 4110 may control a series of processes so that the BS operates according to the embodiment of the present disclosure. For example, the BS processor 4110 may control a signaling operation for DL transmit power using a synchronization signal as in the (3-4) embodiment. Thereafter, the BS transmitter 4120 delivers information about the DL power transmission to a UE.

Meanwhile, the embodiments of the present disclosure disclosed in this specification and drawings have proposed given examples in order to easily describe the technical contents of the present disclosure and to help understanding of the present disclosure, but are not intended to limit the scope of the present disclosure. That is, it is evident to a person having ordinary skill in the art to which the present disclosure pertains that other modified examples based on the technical spirit of the present disclosure are possible. Furthermore, the embodiments may be combined, if necessary, and may operate. For example, some of the (3-1) embodiment, (3-2) embodiment, (3-3) embodiment, (3-4) embodiment and (3-5) embodiment of the present disclosure may be combined, and a BS and a UE may operate. Furthermore, the embodiments have been proposed based on an FDD LTE system, but other modified examples based on the technical spirit of the embodiments may be implemented with respect to other systems, such as a TDD LTE system, 5G and an NR system.

Fourth Embodiment

A wireless communication system deviates from the provision of the initial voice-oriented service and evolves into a wideband wireless communication system providing a packet data service of high speed and high quality, for example, communication standards, such as high speed packet access (HSPA) of 3GPP, long term evolution (LTE) or evolved universal terrestrial radio access (E-UTRA), LTE-Advanced (LTE-A), high rate packet data (HRPD) of 3GPP2, a ultra mobile broadband (UMB) and 802.16e of IEEE. Furthermore, a communication standard of 5G or new radio (NR) is produced as a 5G wireless communication system.

As described above, in a wireless communication system including 5G, at least one service of an enhanced mobile broadband (eMBB), massive machine type communications (mMTC) and ultra-reliable and low-latency communications (URLLC) may be provided by a UE. The services may be provided to the same UE during the same time-space period. In the present embodiment, eMBB may be a service aimed at high-speed transmission of high capacity data, mMTC may be a service aimed at the minimization of UE power consumption and the access of multiple UEs, and URLLC may be a service aimed at high reliability and low latency transmission, but are not limited thereto. The three services are major scenarios in a system, such as 5G or new radio or next radio (NR) after the LTE system or LTE. In the present embodiment, a coexistence method of eMBB and URLLC or a coexistence method of mMTC and URLLC and an apparatus using the same are described.

When the situation in which a BS has to schedule data corresponding to the eMBB service with respect to a UE in a given transmission time interval (TTI) and has to transmit URLLC data in the TTI occurs, the BS may not transmit some of the eMBB data in a frequency band in which the eMBB data has already been scheduled and transmitted, but may transmit generated URLLC data in the frequency band. A UE for which the eMBB has been scheduled and a UE for which URLLC has been scheduled may be the same UE or different UEs. In such a case, a possibility that eMBB data may be damaged because some of eMBB data that has already been scheduled and transmitted is not transmitted rises.

Accordingly, in this case, a method of processing a signal received by a UE for which eMBB has been scheduled or a UE for which URLLC has been scheduled and a signal reception method need to be provided. In the present embodiment, if information according to eMBB and URLLC is scheduled by sharing some of or a full frequency band or if information according to mMTC and URLLC is scheduled at the same time or if information according to mMTC and eMBB is scheduled at the same time or if information according to eMBB and URLLC and mMTC is scheduled at the same time, a coexistence method between heterogeneous services in which information according to the services may be transmitted is described.

Hereinafter, embodiments of the present disclosure are described in detail with reference to the accompanying drawings. Furthermore, in describing the present disclosure, a detailed description of a related known function or configuration will be omitted if it is deemed to make the gist of the present disclosure unnecessarily vague. Furthermore, terms to be described hereunder have been defined by taking into consideration functions in the present disclosure, and may be different depending on a user, an operator's intention or practice. Accordingly, each term should be defined based on contents over the entire specification. Hereinafter, a base station is the subject that performs resource assignment on a UE, and may be at least one of an eNode B, a Node B, a gNB, a BS, a radio access unit, a BS controller and a node in a network. A terminal may include a user equipment (UE), a mobile station (MS), a cellular phone, a smartphone, a computer and a multimedia system capable of performing a communication function. In the present disclosure, downlink (DL) is a radio transmission path of a signal transmitted from a BS to a UE, and uplink (UL) means a radio transmission path of a signal transmitted from a UE to a BS.

Furthermore, embodiments of the present disclosure are described below by taking an LTE or LTE-A system as an example, but the embodiments of the present disclosure may be applied to other communication systems having a similar technical background or channel form. For example, a 5G mobile communication technology (new radio (NR)) being developed after LTE-A may be included in other communication systems. Furthermore, the embodiments of the present disclosure may also be applied to other communication systems through some modification without greatly departing from the range of the present disclosure based on a determination of a person who has skilled technical knowledge.

An LTE system, that is, a representative example of a wideband wireless communication system, adopts an orthogonal frequency division multiplexing (OFDM) scheme in DL and adopts a single carrier frequency division multiple access (SC-FDMA) scheme in UL. The multi-access scheme is a method of distinguishing between data or control information of users by assigning or operating time-frequency resources in which data or control information will be transmitted for each user so that the time-frequency resources do not overlap, that is, so that orthogonality is established.

The LTE system adopts a hybrid automatic repeat request (HARQ) scheme of retransmitting corresponding data in a physical layer when a decoding failure occurs in initial transmission. According to the HARQ scheme, when a receiver does not precisely decode data, the receiver transmits information (negative acknowledgement (NACK)), notifying a transmitter of the decode failure, to the transmitter so that the transmitter can retransmit the corresponding data in the physical layer. The receiver combines the data retransmitted by the transmitter with the data whose decoding has previously failed, thereby increasing data reception performance. Furthermore, when the receiver accurately decodes data, the receiver transmits information (acknowledgement (ACK)), notifying the transmitter of a decoding success, to the transmitter so that the transmitter can transmit new data.

Figure 42:
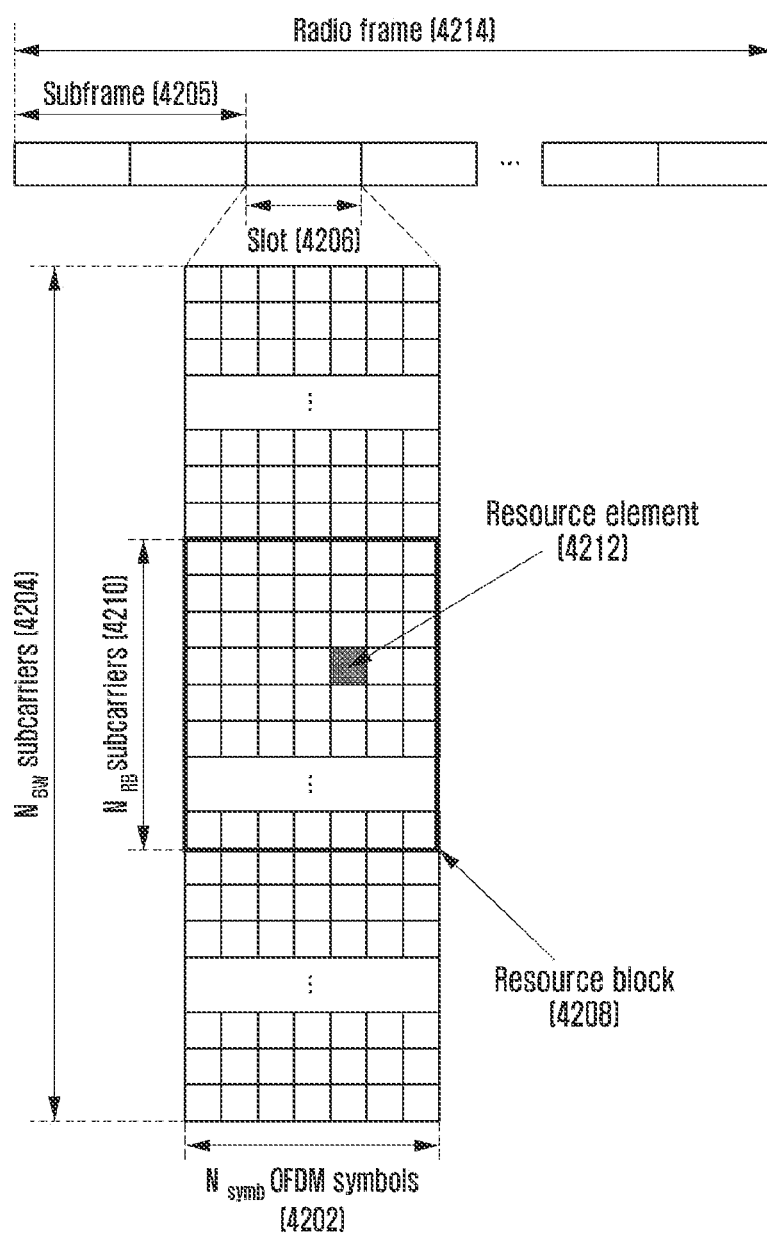
FIG. 42 is a diagram showing a basic structure of a time-frequency domain, that is, a downlink radio resource region, in the LTE system or a similar system thereof.

FIG. 42 is a diagram showing a basic structure of a time-frequency domain, that is, a downlink radio resource region, in the LTE system or a similar system thereof.

Referring to FIG. 42, a horizontal axis indicates a time domain, and a vertical axis indicates a frequency domain A minimum transmission unit in the time domain is an OFDM symbol. $N_{symb}$ OFDM symbols 4202 gather to configure one slot 4206, and two slots gather to configure one subframe 4205. The length of the slot is 0.5 ms, and the length of the subframe is 1.0 ms. Furthermore, a radio frame 4214 is a time domain period having 10 subframes. A minimum transmission unit in the frequency domain is a subcarrier. The bandwidth of a full system transmission bandwidth includes a total of $N_{BW}$ subcarriers 4204. However, such a detailed numeral value may be variably applied.

In the time-frequency domain, a basic unit of a resource is a resource element (RE) 4212, and may be indicated by an OFDM symbol index and a subcarrier index. A resource block (RB) or a physical resource block (PRB) 4208 may be defined by the $N_{symb}$ contiguous OFDM symbols 4202 in the time domain and $N_{RB}$ contiguous subcarriers 4210 in the frequency domain. Accordingly, in one slot, one RB 4208 may include $N_{symb} \times N_{RB}$ REs 4212. In general, a minimum allocation unit of data in the frequency domain is an RB. In general, in the LTE system, the $N_{symb}=7$, $N_{RB}=12$, and $N_{BW}$ may be proportional to the bandwidth of a system transmission bandwidth.

A data rate increases in proportion to the number of RBs scheduled for a UE. 6 transport bandwidths may be defined, and an LTE system may operate based on the 6 transport bandwidths. In the case of a frequency division duplex (FDD) system operating by dividing DL and UL based on a frequency, a DL transmission bandwidth and an UL transmission bandwidth may be different. A channel bandwidth indicates an RF bandwidth corresponding to a system transmission bandwidth. Table 41 shows a corresponding relation between a system transmission bandwidth and a channel bandwidth defined in the LTE system. For example, an LTE system having a 10 MHz channel bandwidth may include a transmission bandwidth having 50 RBs.

TABLE 41

| Channel bandwidth BW.sub.Channel [MHz] | 1.4 | 3 | 5 | 10 | 15 | 20 |
|---|---|---|---|---|---|---|
| Transmission bandwidth configuration N.sub.RB | 6 | 15 | 25 | 50 | 75 | 100 |

DL control information may be transmitted within the first N OFDM symbols within a subframe. In an embodiment, in general, N={1, 2, 3}. Accordingly, the N value may be variably applied to each subframe depending on the amount of control information to be transmitted in a current subframe. The transmitted control information may include a control channel transmission duration indicator indicating that the control information is transmitted in how many OFDM symbols, scheduling information about DL data or UL data, and information about HARQ ACK/NACK.

In the LTE system, scheduling information about DL data or UL data is delivered from a BS a UE through DL control information (DCI). Uplink (UL) refers to a radio link through which a UE transmits data or a control signal a BS. Downlink (DL) refers to a radio link through which a BS transmits data or a control signal to a UE. The DCI is defined in several formats. A given DCI format is applied depending on whether DCI is scheduling information about UL data (UL grant) or scheduling information about DL data (DL grant), whether DCI is compact DCI in which the size of control information is small, whether spatial multiplexing using multiple antennas is applied to data, and whether DCI is for power control. For example, a DCI format 1, that is, scheduling control information about DL data, is configured to include at least the following control information.

Resource assignment type 0/1 flag: provide notification of whether a resource assignment scheme is type 0 or type 1. According to Type 0, a resource is assigned in a resource block group (RBG) unit by applying a bitmap scheme. In the LTE system, a basic unit of scheduling is a resource block (RB) represented as a time and frequency domain resource, and an RBG includes a plurality of RBs and becomes a basic unit of scheduling in the type 0 scheme. In Type 1, a given RB is assigned within an RBG.

Resource block assignment: provide notification of an RB assigned for data transmission. A represent resource is determined according to a system bandwidth and a resource assignment scheme.

Modulation and coding scheme (MCS): provide notification of a modulation scheme used for data transmission and the size of a transport block, that is, data to be transmitted.

HARQ process number: provide notification of a process number of an HARQ.

New data indicator: provide notification of whether data transmission is HARQ initial transmission or retransmission.

Redundancy version: provide notification of a redundancy version of an HARQ.

Transmit power control (TPC) command for PUCCH for physical UL control channel (PUCCH): indicate a transmit power control command for a PUCCH, that is, an UL control channel.

The DCI may be transmitted on a physical downlink control channel (PDCCH) or an enhanced PDCCH (EPDCCH), that is, a physical downlink control channel, through a channel coding and modulation process. Hereinafter, PDCCH transmission or EPDCCH transmission may be understood as PDCCH or DCI transmission on an EPDCCH.

In general, the DCI is independently scrambled into a given radio network temporary identifier (RNTI or a UE identifier) with respect to each UE, a cyclic repetition check (CRC) bit is added to the DCI, and the DCI is channel-coded, configured in an independent PDCCH and transmitted. In the time domain, a PDCCH is mapped and transmitted during a control channel transmission duration. A frequency domain mapping position of a PDCCH is determined by the identifier (ID) of each UE, and may be spread into a full system transmission bandwidth and transmitted.

DL data may be transmitted on a physical downlink shared channel (PDSCH), that is, a physical downlink data transmission channel A PDSCH may be transmitted after the control channel transmission duration. Scheduling information, such as a detailed mapping position and a modulation scheme in the frequency domain, is determined based on DCI transmitted through the PDCCH. Hereinafter, PDSCH transmission may be understood as DL data transmission on a PDSCH.

A BS notifies a UE of a modulation scheme applied to DL data on a PDSCH to be transmitted to the UE and the size of data (transport block size (TBS)) to be transmitted through an MCS of control information that configures the DCI. In an embodiment, the MCS may have 5 bits or bits smaller than the 5 bits. The TBS corresponds to a size before channel coding for error correction is applied to a data transport block (TB) to be transmitted by a BS.

A modulation scheme supported in the LTE system includes quadrature phase shift keying (QPSK), 16 quadrature amplitude modulation (QAM), and 64QAM, and the modulation orders ($Q_m$) of the modulation schemes correspond to 2, 4 and 6, respectively. That is, 2 bits per symbol may be transmitted in the case of QPSK modulation. 4 bits per symbol may be transmitted in the case of 16QAM modulation. 6 bits per symbol may be transmitted in the case of 64QAM modulation. Furthermore, 256 QAM or more modulation schemes may also be used depending on a system modification.

Figure 43:
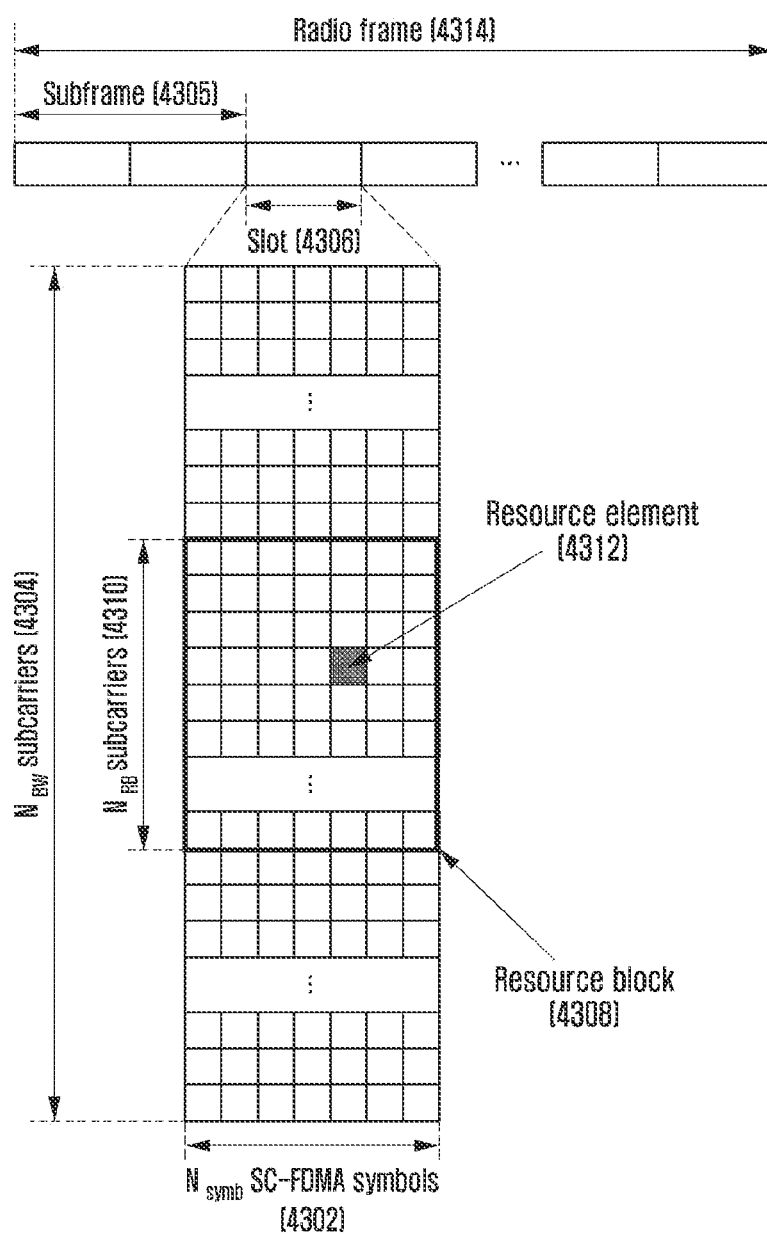
FIG. 43 is a diagram showing a basic structure of a time-frequency domain, that is, an uplink radio resource region of the LTE and LTE-A systems.

FIG. 43 is a diagram showing a basic structure of a time-frequency domain, that is, an uplink radio resource region of LTE and LTE-A systems.

Referring to FIG. 43, a horizontal axis indicates a time domain, and a vertical axis indicates a frequency domain A minimum transmission unit in the time domain is an SC-FDMA symbol 4302. $N_{symb}$ SC-FDMA symbols may gather to configure one slot 4306. Furthermore, two slots may gather to configure one subframe 4305. A minimum transmission unit in the frequency domain is a subcarrier. A full system transmission bandwidth 4304 includes a total of $N_{BW}$ subcarriers. $N_{BW}$ may have a value proportional to a system transmission bandwidth.

A basic unit of a resource in the time-frequency domain is a resource element (RE) 4312, and may be defined by an SC-FDMA symbol index and a subcarrier index. A resource block (RB) 4308 may be defined by $N_{symb}$ contiguous SC-FDMA symbols in the time domain and $N_{RB}$ contiguous subcarriers in the frequency domain. Accordingly, one RB includes $N_{symb} \times N_{RB}$ REs. In general, a minimum transmission unit of data or control information is an RB unit. A PUCCH is mapped to a frequency domain corresponding to 1 RB and transmitted during 1 subframe.

In the LTE system, a timing relation between a PDSCH, that is, a downlink data transmission physical channel, or a PDCCH, that is, a downlink control physical channel including semi-persistent scheduling release (SPS release), or/and a PUCCH, that is, an uplink control physical channel in which HARQ ACK/NACK information corresponding to an enhanced PDCCH (EPDCCH) is transmitted, or a PUSCH, that is, an uplink data transmission physical channel, may be defined. For example, in an LTE system operating according to frequency division duplex (FDD), HARQ ACK/NACK information corresponding to a PDSCH transmitted in an (n−4)-th subframe or a PDCCH and/or EPDCCH including SPS release may be transmitted as a PUCCH or PUSCH in an n-th subframe.

Hereinafter, PDCCH or EPDCCH transmission and reception may be understood as DL control information (DCI) transmission and reception on a PDCCH or EPDCCH. PDSCH transmission and reception may be understood as DL transmission and reception on a PDSCH. PUCCH transmission and reception may be understood as UL control information (UCI) transmission and reception on a PUCCH. PUSCH transmission and reception may be understood UL data transmission and reception on a PUSCH.

In the LTE system, a DL HARQ adopts an asynchronous HARQ scheme whose data retransmission timing has not been fixed. That is, when a BS receives feedback for HARQ NACK from a UE with respect to initial transmission data transmitted by the BS, the BS freely determines transmission timing of retransmission data according to a scheduling operation. The UE may buffer data determined to be an error as a result of decoding on received data for an HARQ operation, and then perform combining with next retransmitted data.

When a UE receives a PDSCH including DL data transmitted by a BS in a subframe n, the UE transmits UL control information, including HARQ ACK or NACK of the DL data, to the BS through a PUCCH or PUSCH in a subframe n+k. In this case, the k may be differently defined depending on an FDD or time division duplex (TDD) of an LTE system and a subframe configuration thereof. For example, in the case of the FDD LTE system, the k is fixed to 4. In contrast, in the case of the TDD LTE system, the k may be different depending on a subframe configuration and a subframe number. Furthermore, when data transmission through a plurality of carriers is performed, the value of k may be differently applied depending on a TDD configuration of each carrier.

In the LTE system, unlike a DL HARQ, an UL HARQ adopts a synchronization HARQ scheme whose data transmission timing has been fixed. That is, an UL/DL timing relation between a physical uplink shared channel (PUSCH) and a PDCCH ahead of the PUSCH and a physical hybrid indicator channel (PHICH), that is, a physical channel in which DL HARQ ACK/NACK information corresponding to the PUSCH is transmitted may be determined according to the following rule.

When a UE receives a PDCCH including UL scheduling information transmitted by a BS or a PHICH in which DL HARQ ACK/NACK information is transmitted in a subframe n, the UE transmits UL data corresponding to the information through a PUSCH in a subframe n+k. In this case, the k may be differently defined depending on whether FDD or TDD is applied to an LTE system and a configuration thereof. For example, in the case of an FDD LTE system, the k may be fixed to 4. Meanwhile, in the case of a TDD LTE system, the k may be different depending on a subframe configuration and a subframe number. Furthermore, when data is transmitted through a plurality of carriers, the value of k may be differently applied depending on a TDD configuration of each carrier.

Furthermore, a UE receives a PHICH, including information related to DL HARQ ACK/NACK information, from a BS in a subframe i. The PHICH corresponds to a PUSCH transmitted by the UE in a subframe i-k. In this case, the k may be differently defined depending on an FDD or TDD of an LTE system and a configuration thereof. For example, in the case of the FDD LTE system, the k is fixed to 4. Meanwhile, in the case of the TDD LTE system, the k may be different depending on a subframe configuration and a subframe number. Furthermore, when data is transmitted through a plurality of carriers, the value of k may be differently applied depending on a TDD configuration of each carrier.

The wireless communication system has been illustrated based on an LTE system, but the contents of the present disclosure are not limited to the LTE system and may be applied to various wireless communication systems, such as NR and a 5G system. Furthermore, if the embodiment is applied to other wireless communication systems, the k value may be changed and applied to a system using a scheme corresponding to FDD.

Figure 44:
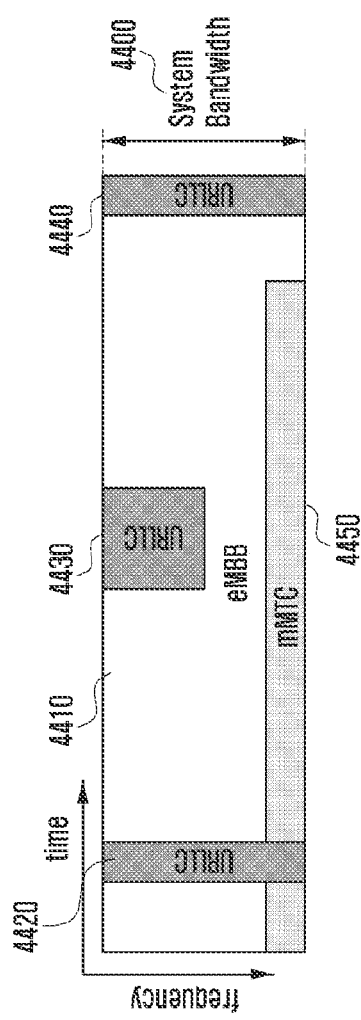
FIGS. 44 and 45 are diagrams showing the state in which eMBB, URLLC and mMTC data, that is, services considered in a 5G or NR system, have been assigned in a frequency-time resource.
Figure 45:
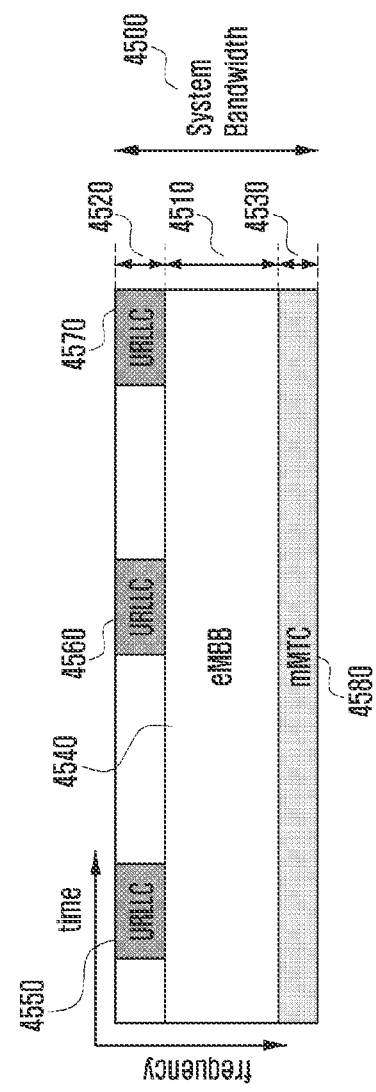

FIGS. 44 and 45 are diagrams showing the state in which data for an enhanced mobile broadband (eMBB), ultra-reliable and low-latency communications (URLLC) and massive machine type communications (mMTC), that is, services considered in a 5G or NR system, have been assigned in a frequency-time resource.

FIGS. 44 and 45 show schemes in which a frequency and time resource has been assigned for information transmission in respective systems.

First, FIG. 44 shows the state in which data for an eMBB, URLLC and mMTC has been assigned in a full system frequency band 4400. If URLLC data 4420, 4430 and 4440 is generated and thus to be transmitted while eMBB 4410 and mMTC 4450 are allocated and transmitted in a given frequency band, portions to which the eMBB 4410 and mMTC 4450 have already been assigned may be reserved, or the URLLC data 4420, 4430 and 4440 may be transmitted without eMBB and mMTC transmission. Since it is important to reduce latency 0 time in the URLLC during the service, the URLLC data 4420, 4430 and 4440 may be assigned to part of the resource 4410 to which the eMBB has been assigned and may be transmitted. If URLLC is additionally assigned to a resource to which eMBB has been assigned and transmitted, eMBB data may not be transmitted in a duplicated frequency-time resource. Accordingly, transmission performance of the eMBB data may be reduced. That is, in the above case, an eMBB data transmission failure attributable to the URLLC allocation may occur.

In FIG. 45, subbands 4510, 4520 and 4530 divided from a full system frequency band 4500 may be used to transmit services and data. Information related to the subband configuration may be previously determined. Such information may be transmitted from a BS to a UE through higher layer signaling. Alternatively, information related to the subband may be randomly divided by a BS or network node, and services may be provided to a UE without the transmission of separate subband configuration information. FIG. 45 shows the state in which the subband 4510 is used for eMBB data transmission, the subband 4520 is used for URLLC data transmission and the subband 4530 is used for mMTC data transmission.

In the entire embodiment, the length of a transmission time interval (TTI) used for URLLC transmission may be shorter than a TTI length used for eMBB or mMTC transmission. Furthermore, URLLC and a response of related information may be transmitted faster than eMBB or mMTC. Accordingly, information can be transmitted and received with low latency.

In the following description, an eMBB service is called a first type service and data for eMBB is called first type data. The first type service or the first type data is not limited to the eMBB, but may correspond to a case where high-speed data transmission is required or wideband transmission is performed. Furthermore, an URLLC service is called a second type service, and data for URLLC is called second type data. The second type service or the second type data is not limited to the URLLC, but may correspond to a case where low latency time is required, a case where high reliability transmission is necessary or other systems that require both low latency time and high reliability at the same time. Furthermore, an mMTC service is called a third type service, and data for mMTC is called third type data. The third type service or third type data is not limited to the mMTC, but may correspond to a case where low-speed transmission or wide coverage or low power transmission is required. Furthermore, in describing embodiments, the first type service may be understood to include or not include the third type service.

The structure of a physical channel used for each type in order to transmit the three services or data may be different. For example, at least one of the length of a TTI, an allocation unit of a frequency resource, the structure of a control channel, and a mapping method of data may be different depending on each type.

The three services and three data have been described above, but more types of services and data corresponding to the services may be present. Even in this case, the contents of the present disclosure may be applied.

In order to describe the method and apparatus proposed in the present embodiment, terms called a physical channel and signal in a conventional LTE or LTE-A system may be used. However, the contents of the present disclosure may be applied to a wireless communication system other than the LTE and LTE-A systems.

The present embodiment proposes a detailed method of defining transmission and reception operations of a UE and BS for the first type, second type and third type service or data transmission and operating UEs for which services or data of different types are scheduled together within the same system, as described above. In the present disclosure, first type, second type and third type UEs indicate UEs for which the first type, second type and third type service or data have been scheduled, respectively. In an embodiment, the first type UE, the second type UE and third type UE may be the same UE or different UEs.

Hereinafter, in the present embodiment, at least one of an UL scheduling grant signal and a DL data signal is called a first signal. Furthermore, in the present disclosure, at least one of an UL data signal for an UL scheduling grant and HARQ ACK/NACK information for a DL data signal is called a second signal. In the present embodiment, a signal that belongs to signals transmitted from a BS to a UE and expects a response from the UE may become a first signal. A response signal of a UE corresponding to a first signal may be a second signal. Furthermore, in the present embodiment, a service type of the first signal may be at least one of an eMBB, URLLC and mMTC, and the second signal may also correspond to at least one of the services.

Hereinafter, in the present embodiment, the TTI length of the first signal is a time value related to first signal transmission, and may indicate the length of time when the first signal is transmitted. Furthermore, in the present disclosure, the TTI length of the second signal is a time value related to second signal transmission and may indicate the length of time when the second signal is transmitted. The TTI length of the third signal is a time value related to third signal transmission and may indicate the length of time when the third signal is transmitted. Furthermore, in the present disclosure, second signal transmission and reception timing is information about when a UE transmits the second signal and when a BS receives the second signal.

The contents of the present disclosure may be applied to FDD and TDD systems.

Hereinafter, in the present disclosure, higher layer signaling is a method of delivering a signal from a BS to a UE using a physical downlink data channel or delivering a signal from a UE to a BS using a physical uplink data channel, and may be referred to as RRC signaling or PDCP signaling or a MAC control element (MAC CE).

Figure 46:
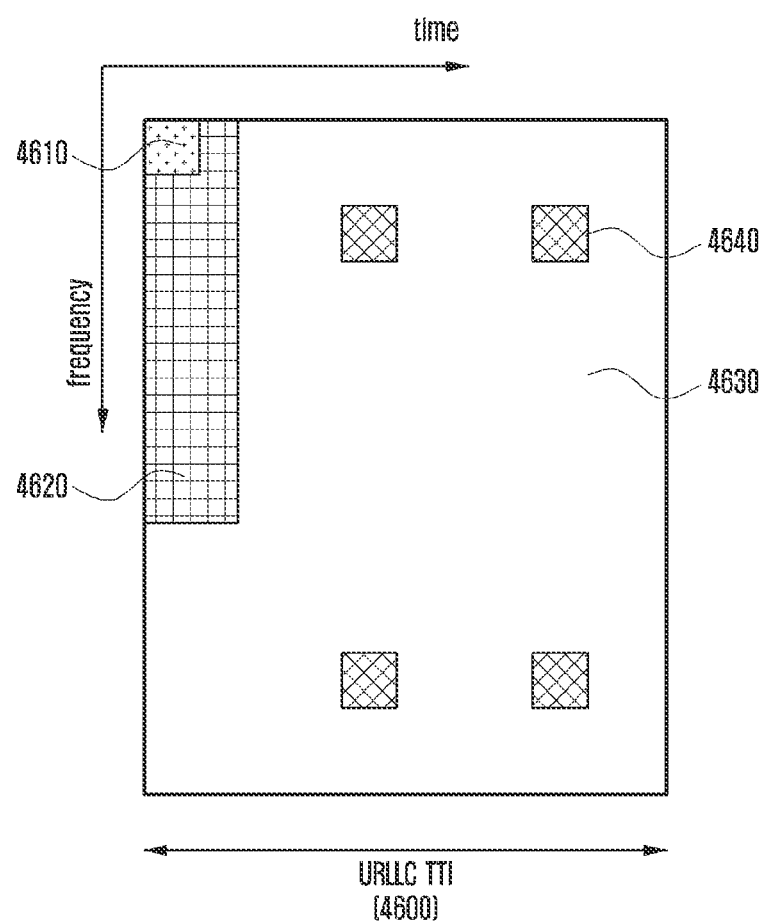
FIG. 46 is a diagram showing a resource to which data occurrence indicator information for URLLC has been mapped.

FIG. 46 is a diagram showing a resource to which data occurrence indicator information for URLLC has been mapped.

FIG. 46 shows a method of delivering an indicator indicating that a second type service has occurred for a given UE in the situation in which data 4630 for a second type service is delivered. In this case, the indicator is information present only when the second type service occurs, and is not configured when the corresponding service does not occur. Furthermore, the indicator may be used as an indicator to notify a UE using a first type service of whether a second type service has occurred. Furthermore, the indicator may be used as information examined (checked) by UEs, supporting a second type service, in order to receive the corresponding service. Furthermore, the indicator may be used as information examined by UEs that require channel estimation using a scheme, such as a channel state information reference signal (CSI-RS).

The indicator may be called various terms, such as a second type service indicator, a second type service arrival indicator, a second type service notification indicator and a second type service occurrence indicator. Furthermore, the second type service indicator may be used as an indicator to provide notification of whether a collision against a first type service occurs for UEs using the first type service or UEs from which channel measurement has been requested. In addition, the indicator may be used as a kind of resource assignment indicator to notify UEs of whether a second type service has arrived.

A method of delivering the indicator basically includes three types. In the first method, the indictor may be notified using a preamble 4610, such as a Zadoff-Chu sequence. In this case, the position of the corresponding preamble 4610 may be present within a region including control information 4620 for a second type service or may be present within the data information 4630 for a second type service or may be present in a region other than the corresponding region. When a preamble providing notification of the occurrence of a second type service is present in a corresponding preamble position, a UE and a BS may determine that the data 4630 for a second type service has occurred in a predefined region. One or more pieces of information about the position of a corresponding preamble are configured in the time axis and frequency axis. Furthermore, in order to determine data occurrence information for a second type service, a UE may check only preamble information in one position or may have to check preamble information in two positions or more using a different method.

In the second method, the indicator may be present in the form of a DL control information indicator within the control information 4620 for a second type service. In this case, a BS configures the indicator in a resource region position that may be identified by all of UEs or given UE groups. All of UEs or UEs belonging to corresponding given UE groups identify whether a second type service has occurred through corresponding resource region search. The indicator information includes information providing notification of whether a second type service has occurred, and may include the positions of frequency or time resource regions of data in which a corresponding service is delivered. Furthermore, cyclic redundancy check (CRC) bit is added to the indicator information in order to improve decoding performance. The CRC information is scrambled and transmitted like an RNTI (e.g., URLLC-RNTI) for a second type service for UEs that fully or partially support the second type service. The UEs that fully or partially support the second type service identify whether the corresponding indicator information is for the UEs using the RNTI for the second type service. Such a DL control information indicator may be DCI.

Finally, the third method is a method for a UE to identify whether a second type service has occurred by identifying a demodulation reference signal (DMRS) or a configurable cell-specific reference signal (CCRS) transmitted for corresponding data demodulation in a resource region 4640 in which the signals are configured when data for the second type service is delivered. A BS and a UE configure data region candidates for a predefined second type service. The UE identifies that a second type service occurs in a corresponding region by measuring the reference signal 4640 or cell-specific reference signal 4640 for data demodulation that may be present in a corresponding data region. The positions of the reference signals may be present in two or more resource regions. The UE may determine whether the second type service has occurred by identifying only one of corresponding resource regions or some or all of two or more regions.

Figure 47:
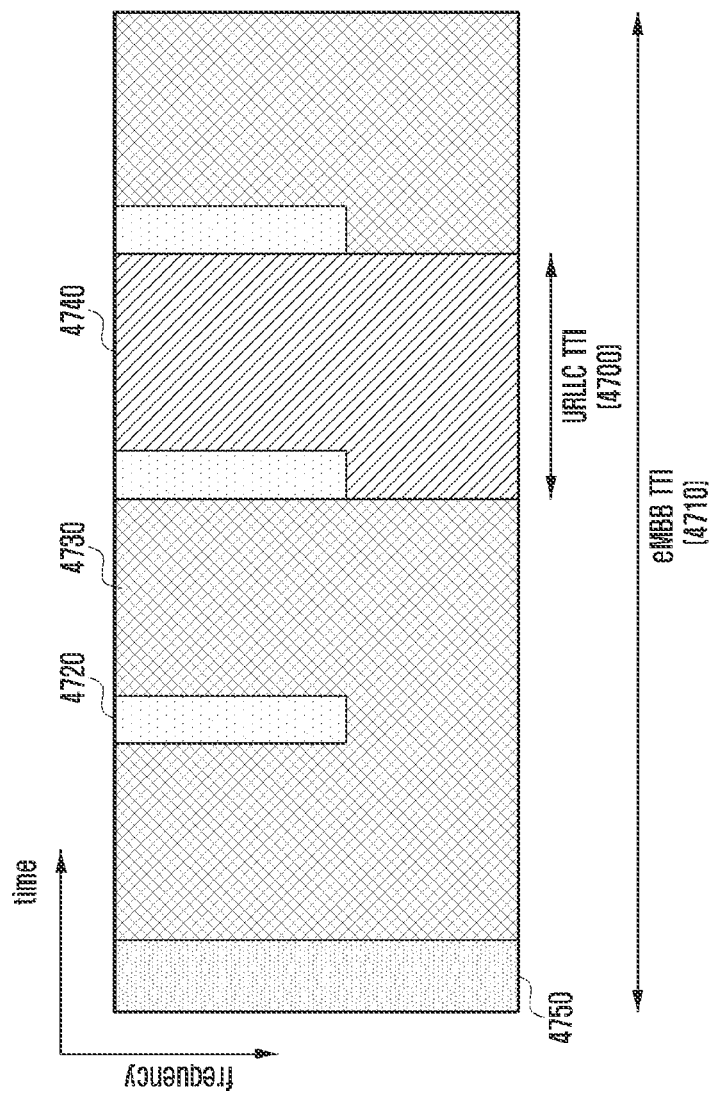
FIG. 47 is a diagram showing the state in which data for eMBB and URLLC has been assigned along with corresponding control information.

FIG. 47 is a diagram showing the state in which data for eMBB and URLLC has been assigned along with corresponding control information.

FIG. 47 shows the situation in which data 4730 for a first type service and 4740 data for a second type service are present at the same time. In this case, control information for the second type service may also be included in control information 4750 for the service of a corresponding first type. Furthermore, control information 4720 for the second type service is a resource region configured when the second type service occurs. That is, if a second type service does not occur, the corresponding region is maintained as a resource region for data for a first type service. In contrast, when a second type service occurs, control information for the second type service and data for the second type service are transmitted together in DL on the resource region for the corresponding control information 4720 and the data resource region 4740 indicated in the corresponding region.

In this case, a second type service occurrence indicator may be present in a period 4700 in which a corresponding second type service is transmitted according to a method, such as a preamble, a DL control information indicator or/and a reference signal described in FIG. 46 or may be included in a first transmission duration 4710 after the second type service occurs and transmitted in the form of a DL control information indicator in the control information 4750 for a first type. For example, a UE may identify the second type service occurrence indicator in the following two situations. The first is to identify the second type service occurrence indicator in the period 4710 in which data for the first type service has been transmitted. The second is to identify, by the UE, the second type service occurrence indicator in a resource configured to estimate a CSI-RS for a periodic or aperiodic channel measurement report from a BS or a corresponding mobile communication system. In addition to the two situations, the UE may identify the second type service occurrence indicator in the situation in which the UE is provided with a given service from a BS.

The process has been taken into consideration when a first type service and a second type service are DL. In contrast, when the data 4730 for a first type service is UL and a second type service is DL, a UE receives the control information 4750 for a first type service and transmits the data 14730 for the first type service to a BS. In this case, in order to identify whether the data for the second type service occurs as DL through the second type service indicator 4720, the UE needs to stop UL transmission in control information or a preamble or a reference signal region in which the second type service indicator 4720 may be included and to identify corresponding indicator information. In this case, it is assumed that in order to prevent damage to UL data for the first type service of the UE, control information regions in which the second type service indicator has been included is not included an UL data region for the first type service from the beginning.

Furthermore, it is necessary to configure the resource region for the second type service indicator 4720 into which the time taken to switch from an UL operation of a UE to a DL operation or switch from DL to an UL operation is taken into consideration. Furthermore, since there are UEs supporting only DL or UL transmission in a full frequency band in the same time, the size of a frequency resource region for the second type service indicator 4720 needs to be the same as that of the control information resource region 4520 and data resource region 4730 for a first type service when the first type data 4730 is UL.

When data for a second type service occurs through a second type service indicator, UEs stop first type UL data transmission if data for a corresponding second type service is for them, and receives DL data for the second type service. If the data for the corresponding second type service is not for the UEs, the UEs stop first type UL data transmission in a data region assigned for the second type service. In this case, a data resource region configuration for the second type service needs to be differently considered depending on whether DL transmission or UL transmission is performed after the data resource region for the second type service is terminated. After the data resource region for the second type service is terminated, when UL data occurs, a guard period (GP) into which the UL data has taken into consideration needs to be configured along with the data resource region for the second type service. In contrast, after the data resource region for the second type service is terminated, when DL data occurs, the data resource region for the second type service has only to be configured without taking a guard period into consideration. A BS and a UE do not need to deliver explicit information because they are aware of second type service occurrence timing and the data resource region for the second type service through the second type service indicator.

Various UE categories may be present depending on whether a UE supports a first type service or a second type service. Table 42 is a table in which UE categories have been arranged.

TABLE 42

TABLE-US-00042 Category Description First group UE Support first type service and second type service Second group UE Support first type service and limited support for first type service (e.g., detect whether it occurs) Third group UE Support first type service As described above, UEs (third group UEs) supporting only a first type service may be present in Table 42. A corresponding UE may identify only the control region 4750 for a first type service and may be requested to perform channel estimation in the remaining region other than a resource region in which a second type service may occur. Second, a UE (second group UE) supporting a first type service and supporting a second type service until the occurrence of the second type service is identified may be present. The corresponding UE identifies the control region 4750 for a first type service, and may detect whether the second type service has occurred according to a method of indicating whether the second type service has occurred using a preamble, a DL control information indicator and a reference signal described in FIG. 46. That is, the corresponding UE is a UE incapable of data demodulation and decoding for a second type service and capable of detecting only whether a second type service has occurred. Third, there may be a UE (first group UE) supporting a first type service and a second type service. The corresponding UE can demodulate and decode both data for a first type service and data for a second type service. Accordingly, the corresponding UE identifies whether a first type service or a second type service is present by identifying the region 4750 including control information for the first type service and the region 4720 including control information for the second type service. Furthermore, the UE identifies a second type service occurrence indicator.

The UE category cannot be changed or may be semi-statically changed by a BS or a UE itself depending on a UE function. Furthermore, the UE category is not limited to the first type service and the second type service and may include a combination of other given services. For example, the first group UE may be configured as a UE capable of supporting all of the first type service, the second type service and the third type service at the same time.

Figure 48:
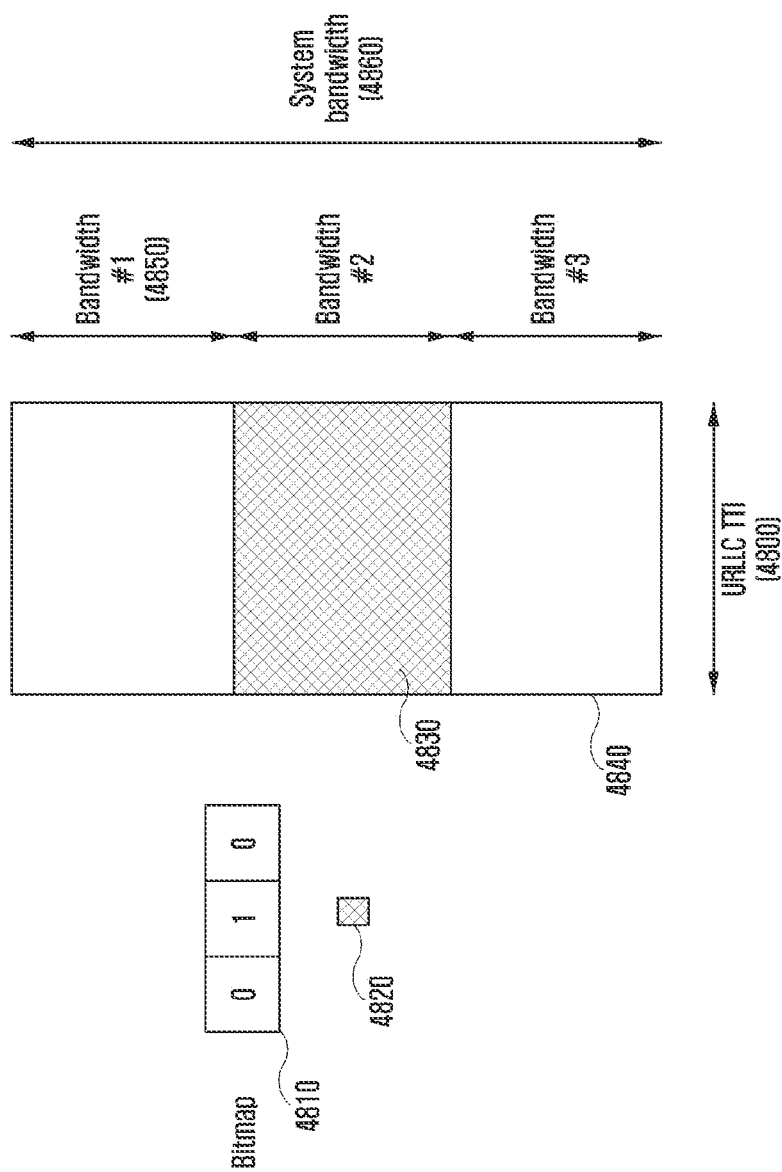
FIG. 48 is a diagram showing a method of delivering frequency domain information to which data for URLLC has been assigned.

FIG. 48 is a diagram showing a method of delivering frequency domain information to which data for URLLC has been assigned. FIG. 48 shows a method of providing notification of a second type service in a frequency resource viewpoint. In the situation in which some or all of some partial resource 4850 of the entire frequency resource 4860 in which a second type service can be supported is available as data for the second type service, a second type service indicator 4820 may provide notification of a data occurrence position for the second type service using a bitmap 4810 method. FIG. 48 shows a case where bitmap information is set to 010 and data for a second type service is positioned in a frequency period #2 4830.

In addition to the corresponding bitmap method, the position of data for a second type service may be notified through a combination of various numbers. Furthermore, in FIG. 48, the number of frequency periods 4850 has been illustrated as being 3, but may be set smaller than or greater than 3. Furthermore, in FIG. 48, frequency periods have been configured to not overlap, but may be configured in a form in which some frequency period overlap. For example, a frequency period #1 and a frequency period #2 may overlap in some frequency domain. In this case, the second type service indicator 4820 notifies UEs of whether a second type service has occurred using a bitmap 4810 by taking into consideration a corresponding frequency period regardless of the overlap situation.

Figure 49:
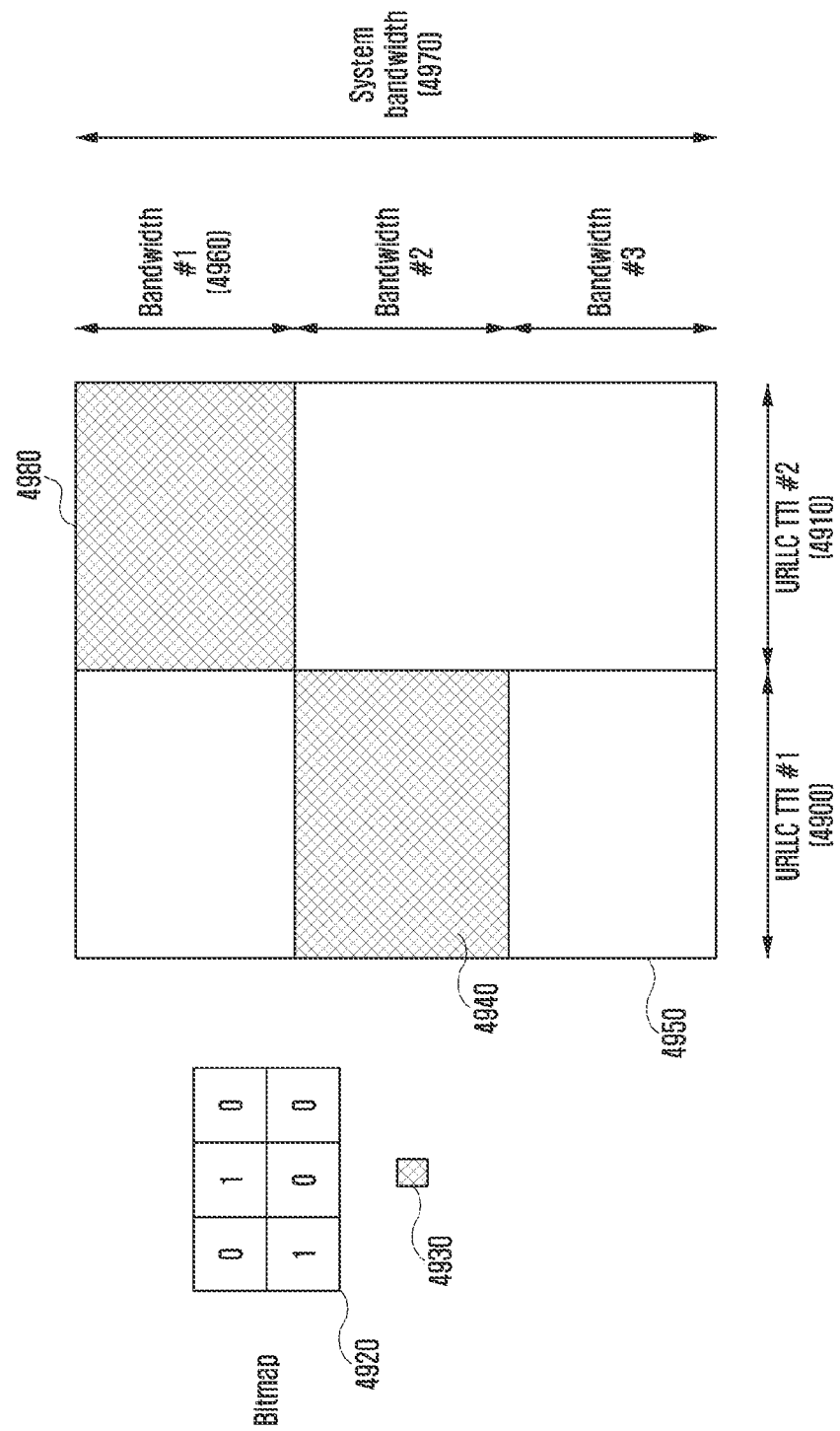
FIG. 49 is a diagram showing a method of delivering frequency and time domain information to which data for URLLC has been assigned.

FIG. 49 is a diagram showing a method of delivering frequency and time domain information to which data for URLLC has been assigned.

FIG. 49 shows a method of providing notification of a second type service in a frequency and time resource viewpoint. Some resource 4960 of the entire frequency resource 4970 in which a second type service may be supported is used as a data region for the second type service. Some of or the entire region may be selected. Furthermore, some resource 4900 or 4910 of all of the time resources 4900 and 4910 in which a second type service may be supported may be selected as a data region for a second type service. A second type service indicator 4930 may provide notification of a data occurrence position for a second type service in the time and frequency axes using a bitmap 4920 method. In FIG. 49, bitmap information is set to 010-100. In this case, 010 provides notification that data for the second type service is positioned in the time period #1 and a frequency period #2 4940. Furthermore, 100 provides notification that data for the second type service is positioned in a time period #2 and a frequency period #1 4980. In addition to the corresponding bitmap method, the position of data for the second type service may be notified through a combination of various numbers.

Furthermore, in FIG. 49, the number of frequency periods 4960 has been illustrated as being 3, but may be set smaller than or greater than 3. Furthermore, in FIG. 49, the frequency periods have been configured to not overlap, but some frequency periods may be configured in an overlap form. Furthermore, in FIG. 49, the two time periods have been configured, but time periods greater than 2 may be configured. Furthermore, in FIG. 49, the time periods have been configured to not overlap, but some time periods may be configured in an overlap form.

Figure 50:
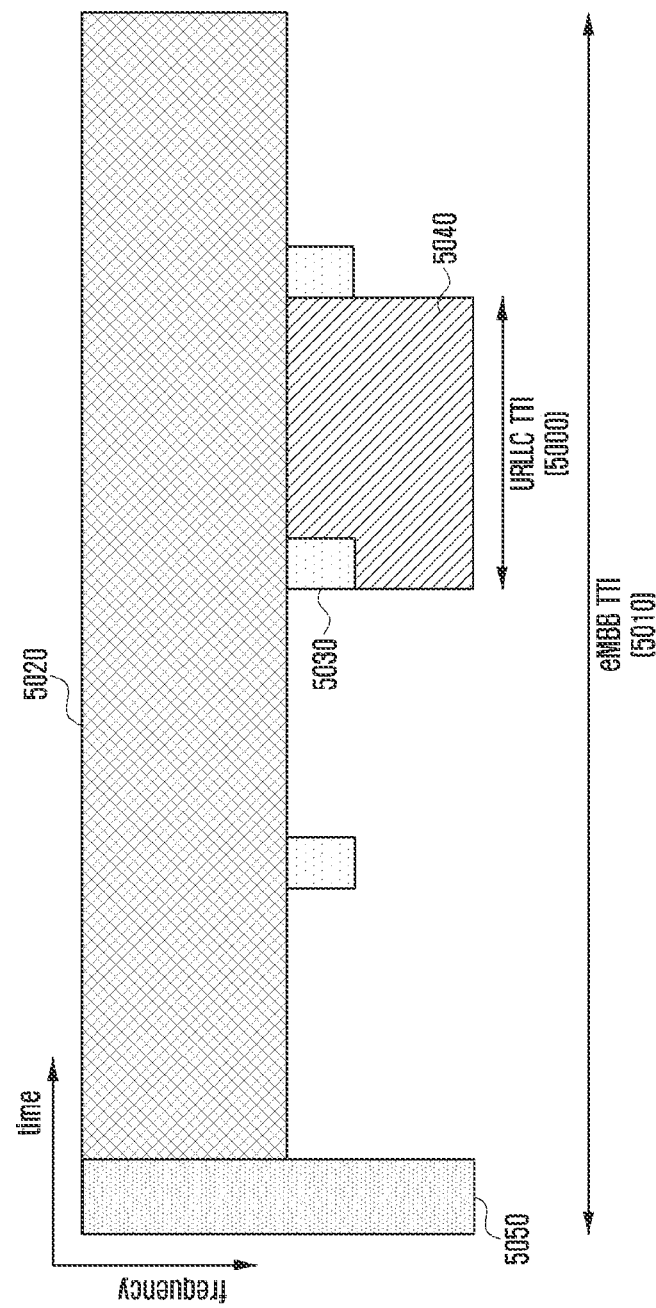
FIG. 50 is a diagram showing the state in which data for eMBB and URLLC has been assigned along with corresponding control information.

FIG. 50 is a diagram showing the state in which data for eMBB and URLLC has been assigned along with corresponding control information.

FIG. 50 shows the state in which data 5020 for a first type service and data 5040 for a second type service have been assigned together. FIG. 50 corresponds to a case where the data for a first type service and the data for a second type service do not overlap. In this case, a second type service indicator 5030 is not used as a second type occurrence indicator for UEs using a first type service. That is, the UEs using a first type service may search for or not search for the second type occurrence indicator that does not affect the first type service depending on whether they support a second type service. Furthermore, regardless of UEs using a first type service, UEs supporting a second type service identify whether data for a second type service is present by identifying a corresponding second type service indicator 5030.

Furthermore, a UE supporting a first type service may search for the second type service indicator 5030 while receiving the data 5020 for a first type service. In such a case, the second type service indicator 5030 is for the reception of data for a second type service that does not affect data for a first type service. Furthermore, the second type service indicator may also be included in a control region 5050 for a first type service.

Figure 51:
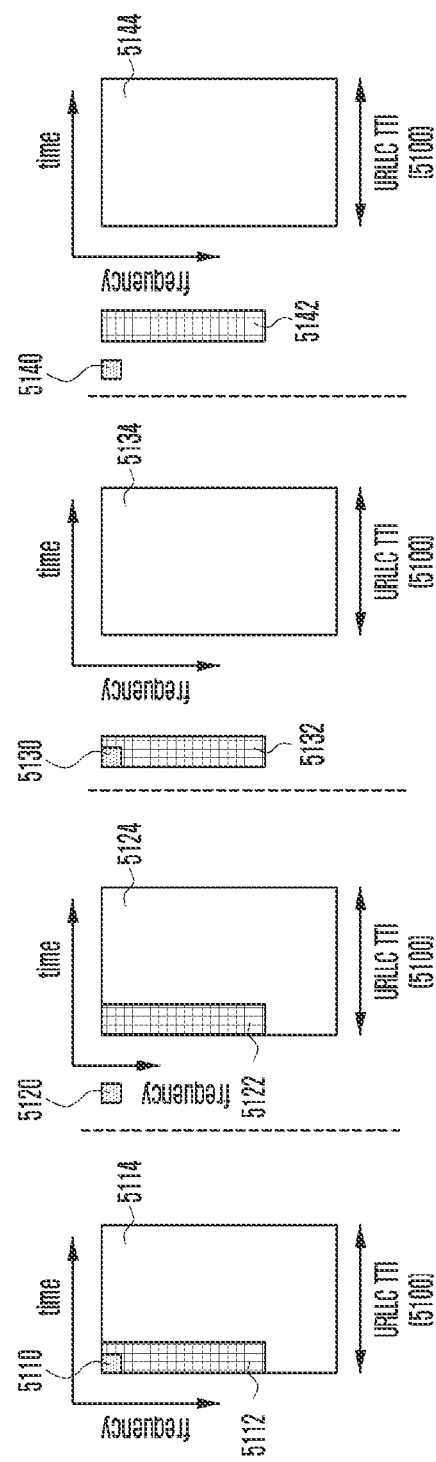
FIG. 51 is a diagram showing a position relation between data for URLLC, corresponding control information, and an indicator providing notification of the position of the corresponding control information.

FIG. 51 is a diagram showing a position relation between data for URLLC, corresponding control information, and an indicator providing notification of the position of the corresponding control information.

FIG. 51 shows a relation between a data region 5114, 5124, 5134, 5144 for a second type service, a control region 5112, 5122, 5132, 5142, and a region 5110, 5120, 5130, 5140 in which second type indicator information has been positioned.

First, the second type indicator 5110 may be included in a second type transmission duration 5100, such as the data region 5114 for a second type service and the control region 5112. Alternatively, second, the second type service indicator 5120 may not be present in the second type transmission duration 5100 to which the control region 5122 for a second type service and the data region 5124 belong. That is, the second type service indicator 5120 may be present at timing ahead of or behind the second type transmission duration 5100. Alternatively, third, the second type service indicator 5130 may be present in the same time and frequency as the control region 5132 for a second type service. The corresponding control region may be present in a transmission duration different from the data region 5134 for a second type service. Furthermore, fourth, the second type service indicator 5140 and the control region 5142 for a second type service may be present in different time axes or different frequency axes or in different time and frequency axis regions, and are also present in a transmission duration different from the data region 5144 for a second type service.

Figure 52:
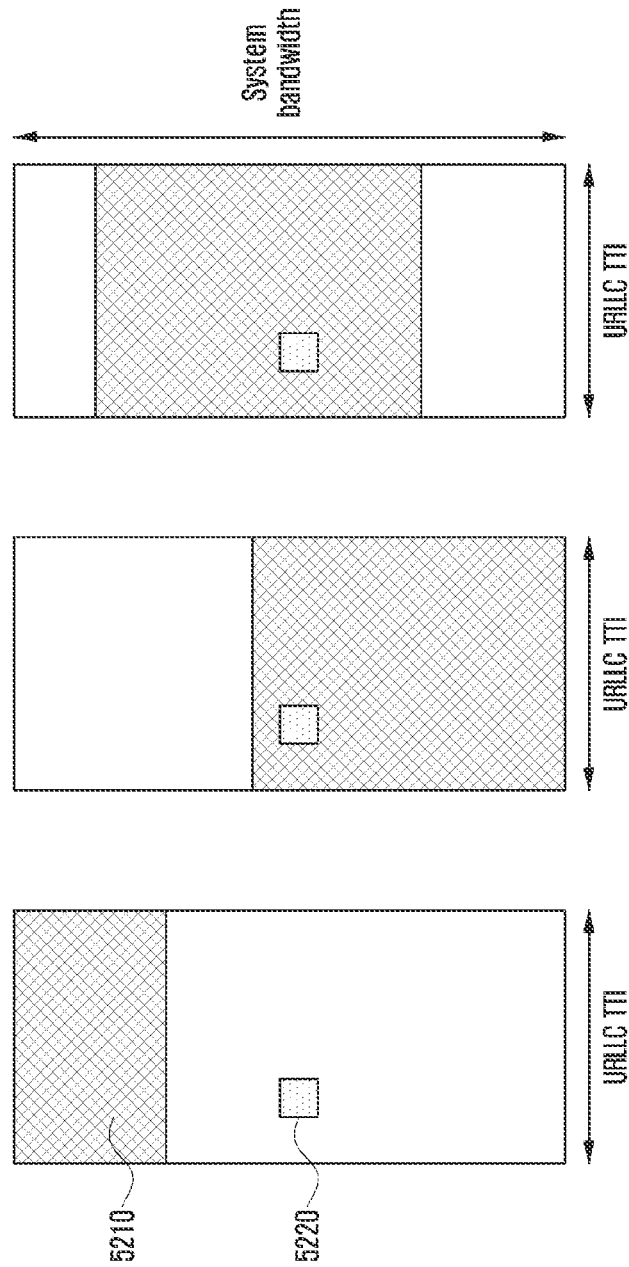
FIG. 52 is a diagram showing a position relation between data for URLLC and an indicator providing notification of a corresponding position.

FIG. 52 is a diagram showing a position relation between data for URLLC and an indicator providing notification of a corresponding position.

According to FIG. 52, a second type service indicator 5220 may be always positioned in the same one frequency axis regardless of the position of data 5210 for a second type service. Furthermore, UEs may be notified of a frequency domain in which the data for a second type service has been positioned through the second type service indicator. Alternatively, frequency and time domains in which the data for a second type service has been positioned may be notified at the same time through the second type service indicator.

Figure 53:
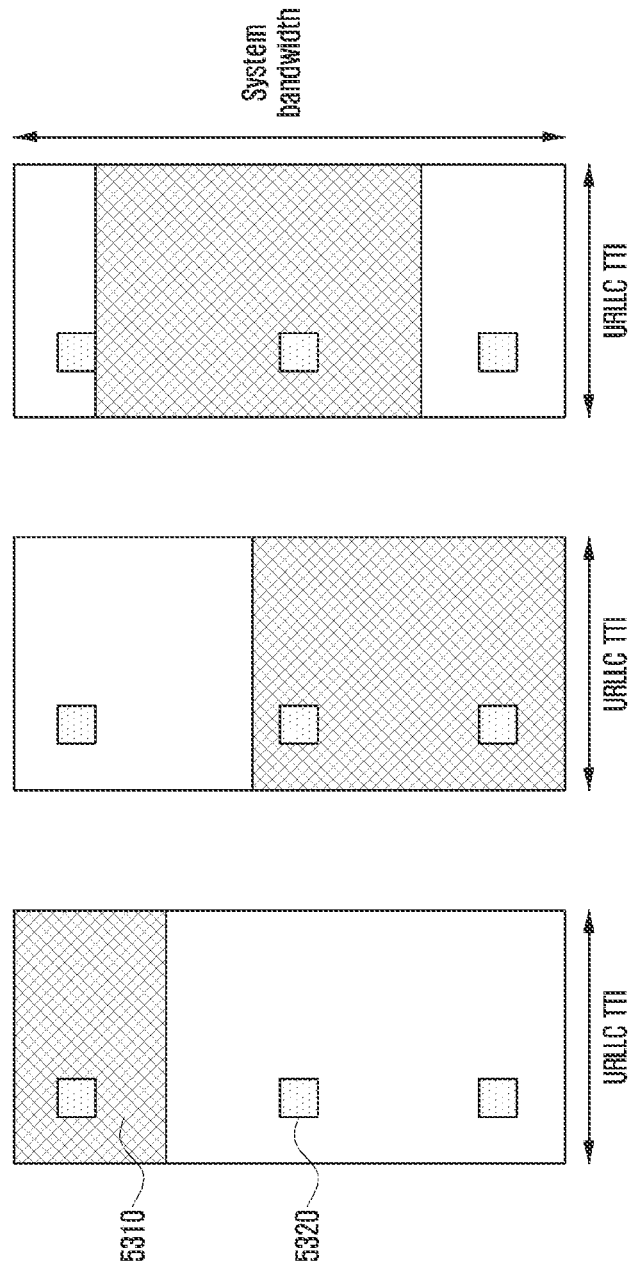
FIG. 53 is a diagram showing a position relation between data for URLLC and an indicator providing notification of a corresponding position in the frequency aspect.

FIG. 53 is a diagram showing a position relation between data for URLLC and an indicator providing notification of a corresponding position in the frequency aspect.

According to FIG. 53, a second type service indicator 5320 is positioned in a given one or several frequencies that are always fixed or semi-statically changed regardless of the position of data 5310 for a second type service. Furthermore, UEs may be notified of a frequency domain in which the data for a second type service has been positioned through the second type service indicator. Alternatively, frequency and time domains in which the data for a second type service has been positioned may be notified at the same time through the second type service indicator. In this case, a UE can be aware of the position of a data region for a second type service only when it identifies only one of second type indicators or some or all of the second type indicators.

In this case, a method of identifying some or all of the second type indicators may be used when a corresponding indicator is not identified based on a piece of information only. That is, a frequency diversity effect can be obtained by disposing the second type indicator information in several frequency axes at one piece of timing in order to increase reception reliability for the second type indicator.

Figure 54:
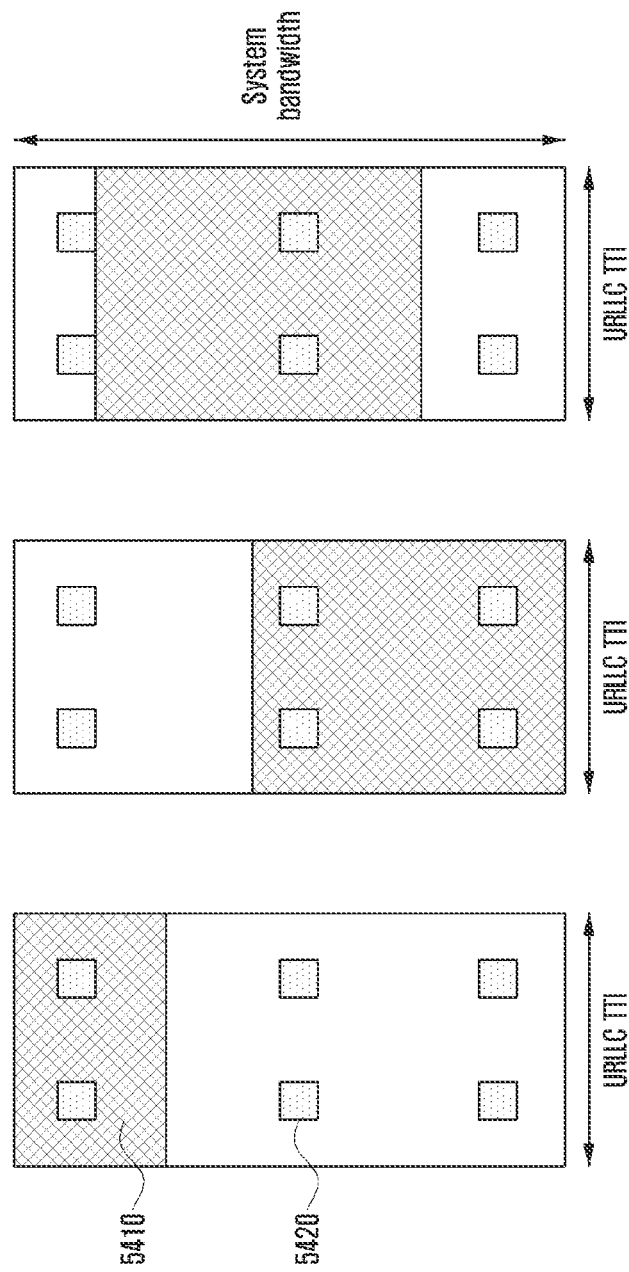
FIG. 54 is a diagram showing a position relation between data for URLLC and an indicator providing notification of a corresponding position in the frequency and time aspects.

FIG. 54 is a diagram showing a position relation between data for URLLC and an indicator providing notification of a corresponding position in the frequency and time aspects.

According to FIG. 54, second type service indicators 5420 are positioned in several frequency axes and several time axes that are always fixed regardless of the position of data 5410 for a second type service. Furthermore, UEs are notified of a frequency domain in which the data for a second type service has been positioned through the second type service indicator. Alternatively, UEs may be notified of frequency and time domains in which the data for a second type service has been positioned at the same time through the second type service indicator.

In this case, a UE may be aware of the position of a data region for the second type service by identifying only one of the second type indicators or some or all of the second type indicators. In this case, several pieces of second type indicator information may be positioned in the frequency axis or the time axis or in the two axis viewpoints. Accordingly, the UE can obtain a frequency or time diversity effect upon reception for the second type service indicator.

Figure 55:
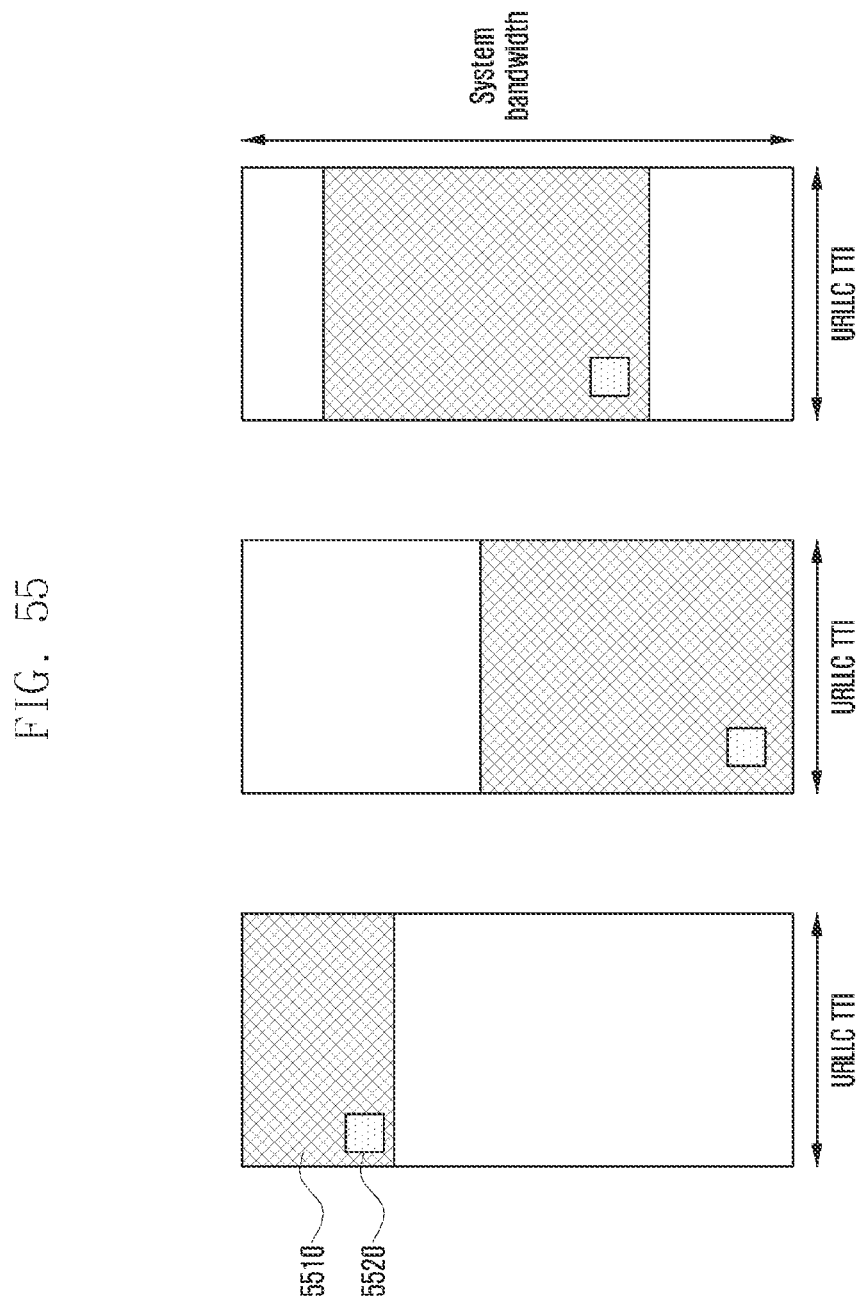
FIG. 55 is a diagram showing a position relation between data for URLLC and an indicator providing notification of a corresponding position.

FIG. 55 is a diagram showing a position relation between data for URLLC and an indicator providing notification of a corresponding position.

According to FIG. 55, a second type service indicator 5520 may be positioned at one of the same time and frequency domains in a data region depending on the position of data 5510 for a second type service. Furthermore, UEs are notified of a frequency domain in which the data for a second type service has been positioned through the second type service indicator. Alternatively, UEs may be notified of frequency and time domains in which the data for a second type service has been positioned at the same time through the second type service indicator. A UE may infer a data region for the second type service through the region in which the second type service indicator has been positioned.

FIG. 56 is a diagram showing a position relation between data for URLLC and an indicator providing notification of a corresponding position in the frequency and time aspects.

According to FIG. 56, second type service indicators 5610 may be positioned at several places of the same time and frequency domains in a data region depending on the position of data 5620 for a second type service. Furthermore, UEs are notified of a frequency domain in which the data for a second type service has been positioned through the second type service indicators. Alternatively, UEs may be notified of frequency and time domains in which the data for a second type service has been positioned at the same time through the second type service indicator. A UE may infer a data region for the second type service through the region in which the second type service indicator has been positioned. Alternatively, a UE may identify the position of the data region for the second type service by identifying one or some or all of the second type service indicators positioned at several places.

Figure 57A:
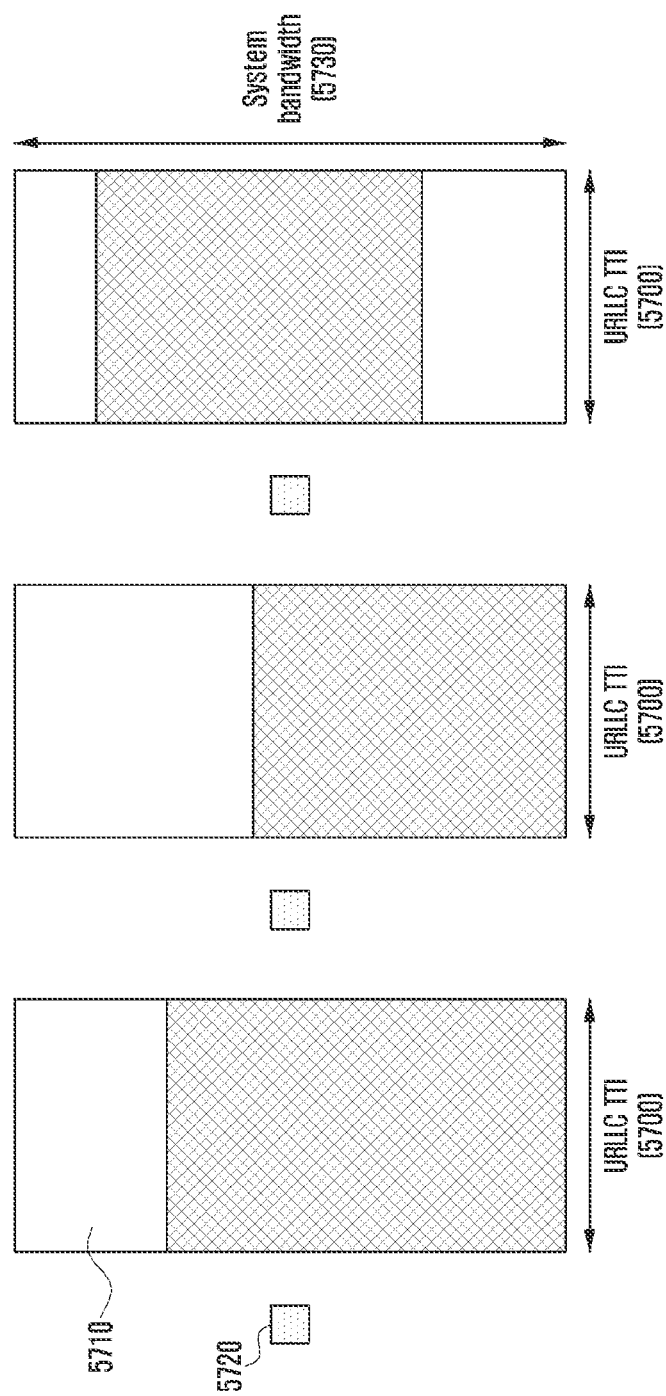
FIG. 57A is a diagram showing a position relation between data for URLLC and an indicator providing notification of a corresponding position.

FIG. 57A is a diagram showing a position relation between data for URLLC and an indicator providing notification of a corresponding position.

According to FIG. 57A, a second type service indicator 5720 may be positioned at several places of different time and frequency domains depending on the position of data 5710 for a second type service. Furthermore, UEs are notified of a frequency domain in which the data for a second type service has been positioned through the second type service indicator. Alternatively, UEs may be notified of frequency and time domains in which the data for a second type service has been positioned at the same time through the second type service indicator. A UE may infer a data region for the second type indicator through the region in which the second type service indicator has been positioned. Alternatively, a UE may identify the position of a data region for the second type service by identifying the second type service indicator placed at one place. Alternatively, a UE may identify the position of a data region for the second type service by identifying one or some or all of second type service indicators positioned at several places.

Figure 57B:
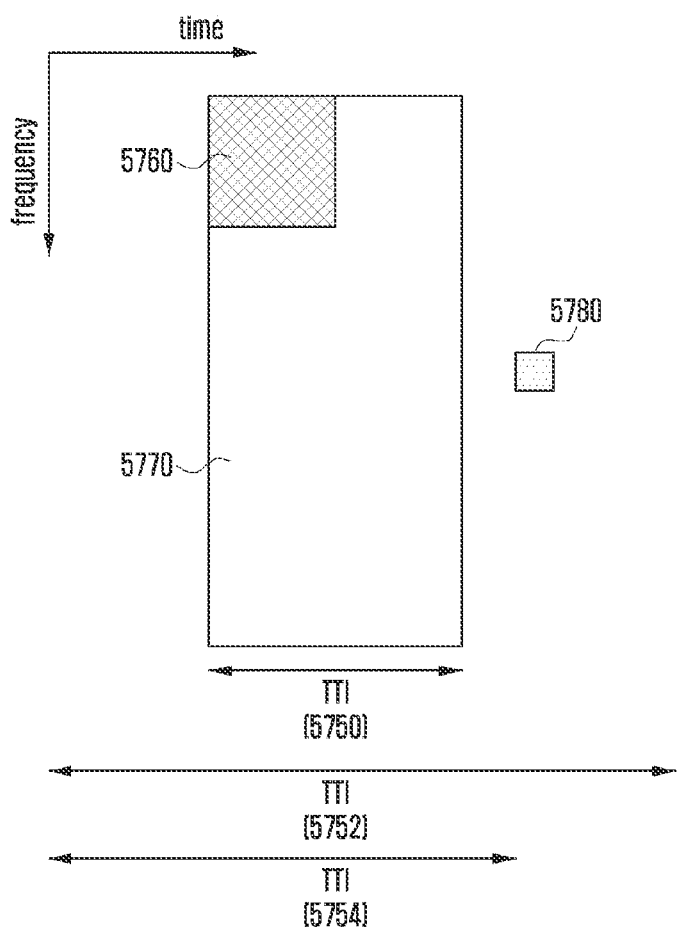
FIG. 57B is a diagram showing a position relation between data for eMBB, data for URLLC and an indicator providing notification of corresponding positions.

FIG. 57B is a diagram showing a position relation between data for eMBB, data for URLLC and an indicator providing notification of corresponding positions.

According to FIG. 57B, a second type service indicator 5780 may be delivered to a UE supporting a first type service after a second type service occurs. In this case, the second type service indicator may be transmitted to the UE as DL control information through a UE-common or UE group-common or UE-specific control channel. The second type service indicator delivers frequency and time resource information in which the second type service has occurred to the UE supporting the first type service. If the first service has been received (5754) or is received (5752), the UE supporting the first type service may determine that data for the first service has not been actually transmitted in a given frequency or time resource region in which the UE had received data or receives data among data regions for the first service through the second type service occurrence indicator 5780. Accordingly, the UE may not store only data information, corresponding to time and frequency domains indicated in the second type service occurrence indicator or a partially corresponding code block group or code blocks, in its buffer. Alternatively, the UE may newly attempt data decoding other than the data information corresponding to the time and frequency domains indicated in the second type service occurrence indicator.

A method for the second type service occurrence indicator to provide notification of time information includes a method of providing notification of time information by indicating the index of symbols within a slot or a symbol group in which two or more symbols have been bound using a bitmap. A method for the second type service occurrence indicator to provide notification of frequency information includes a method of providing notification of a given frequency bandwidth part, providing notification of a value set as a physical resource block unit, or notifying a UE of the range of an offset based on a synchronization signal frequency band or (center frequency) value used when the UE is initially accessed.

DL control information including the second type service occurrence indicator may be transmitted every slot unit or transmitted in a two or more slot unit period. Furthermore, with respect to a given slot in which the slot is used for UL only, DL control information including a corresponding second type service occurrence indicator is not transmitted. Time or frequency information indicated by the second type service occurrence indicator may not always be identical with a data resource region in which an actual second type service has occurred. The range of time or frequency information indicated by the second type service occurrence indicator may be greater than a data resource region in which an actual second type service has occurred.

Information indicated by the second type service occurrence indicator may be time and frequency information in which a second type service has occurred with respect to a period corresponding to a right-before one (or two or more) slot(s) in which control information including the indicator has been transmitted. Control information including the second type service occurrence indicator has been scrambled as a separate RNTI. When a UE is successful in detecting corresponding control information through descrambling based on a corresponding RNTI, it determines that a second type service occurrence indicator is present.

If one or two or more slot(s) are given as UL by a system information block (SIB) or higher layer signaling, such a RRC signaling or a MAC CE, or a standard right before DL control information including the second type service occurrence indicator is transmitted (or if N or more UL periods are present in all of OFDM symbols configuring one slot or if a DL period is present only in initial 1.about.N OFDM symbols based on one slot), information indicated by a corresponding second type service occurrence indicator may be for one or two or more slots light before a slot always fixed as UL according to higher layer signaling or a standard.

Alternatively, the second type service occurrence indicator may include information about the most recent one or two or more valid DL slots. The definition of the valid DL slot means a slot in which the number of DL OFDM symbols satisfies a given threshold value. When a UE receives the second type service occurrence indicator, the UE determines that time or frequency information provided by the corresponding indicator includes information about the most recent one or two or more valid DL slots.

Alternatively, if a right-before or two or more slot(s) has been given as UL by an SIB or higher layer signaling, such as RRC or a MAC CE, or a standard (or if N UL periods are present in all of OFDM symbols configuring one slot or if a DL period is present in initial 1.about.N OFDM symbol only based on one slot), control information including a corresponding second type service occurrence indicator may not be transmitted. Accordingly, a UE does not search a slot satisfying the criterion for the second type service occurrence indicator.

In the present disclosure, the second type service occurrence indicator may be substituted with a term, such as preemption indication or puncturing indication or HARQ buffer flushing out indication or HARQ combining indication.

Furthermore, if DL data for a first type service has been scheduled in a UE through a slot aggregation, the UE may receive the second type service occurrence indicator within a data scheduling period configured as a slot set. Alternatively, if DL data for a first type service has been scheduled in a UE, the UE may receive the second type service occurrence indicator within a data scheduling period configured as a slot set.

Furthermore, after the UE receives the second type service occurrence indicator, the UE may transmit HARQ ACK feedback by incorporating the second type service occurrence indicator into data for a first type service which has already been received (5754) or is received (5752). In this case, additionally, HARQ ACK feedback timing may be reconfigured or maintained.

Furthermore, if a numerology for a time or frequency provided by the second type service occurrence indicator and a numerology applied to data for a first type service which has been actually received (5754) or is received (5752) by a UE are different, the UE determines a data region for the first type service based on a numerology indicated in the second type service occurrence indicator. For example, if the numerology of time and frequency information notified by the second type service occurrence indicator is 15 kHz based on subcarrier spacing, but a UE has actually received data for a first type service at subcarrier spacing of 30 kHz, the above operation may be applied. The UE determines a numerology applied to a time or frequency provided by the second type service occurrence indicator by mapping the numerology to a numerology applied to data for a first type service that has been actually received or is received by the UE. If the mapping of different numerologies has not been absolutely performed fully or if different numerologies have been partially mapped to a physical resource region for data for a first type service, the UE assumes that they are fully mapped and performs an operation. Specifically, if the second type service occurrence indicator indicates a resource at a 30 kHz subcarrier spacing, the resource is not fully mapped to the resource of a 15 kHz subcarrier spacing because the length of three symbols of 30 kHz subcarrier spacing in the time axis is the same as the length of 1.5 symbol of the 15 kHz subcarrier spacing. In such a case, it may be assumed that the resource indicated by the indicator also includes 0.5 symbol of the 15 kHz subcarrier spacing.

If DL control information including the second type service occurrence indicator is transmitted to UEs performing a first type service through a UE-common (or UE-specific or common) control channel, a slot indicated by the corresponding second type service occurrence indicator may indicate a given time and frequency band within the most recent DL slot or a recent DL slot(s).

If DL control information including the second type service occurrence indicator is transmitted to UEs that has performed or performs information processing related to a resource in which data for a first type service is transmitted through a UE-common (or UE-specific or common) control channel, the corresponding second type service occurrence indicator may include contents indicative of a given slot. For example, if a second type service has occurred in a slot(s) prior to an N-th slot based on timing when control information including a corresponding indicator has been transmitted, a UE(s) performing information processing on a resource for data for a first type service may be notified of a frequency and time resource region in which the second type service has occurred.

Furthermore, if a DL data resource has been scheduled in a UE for given slot duration or mini-slot duration (e.g., N-K' to N-K"-th slot (or mini-slot) duration), the UE may search for DL control information including a second type service occurrence indicator transmitted in an N-th slot. Furthermore, if a DL data resource has not been scheduled in a UE for given slot duration or mini-slot duration (e.g., N-K' to N-K"-th slot (or mini-slot) duration), the UE may not search for DL control information including a second type service occurrence indicator transmitted in an N-th slot.

Figure 58:
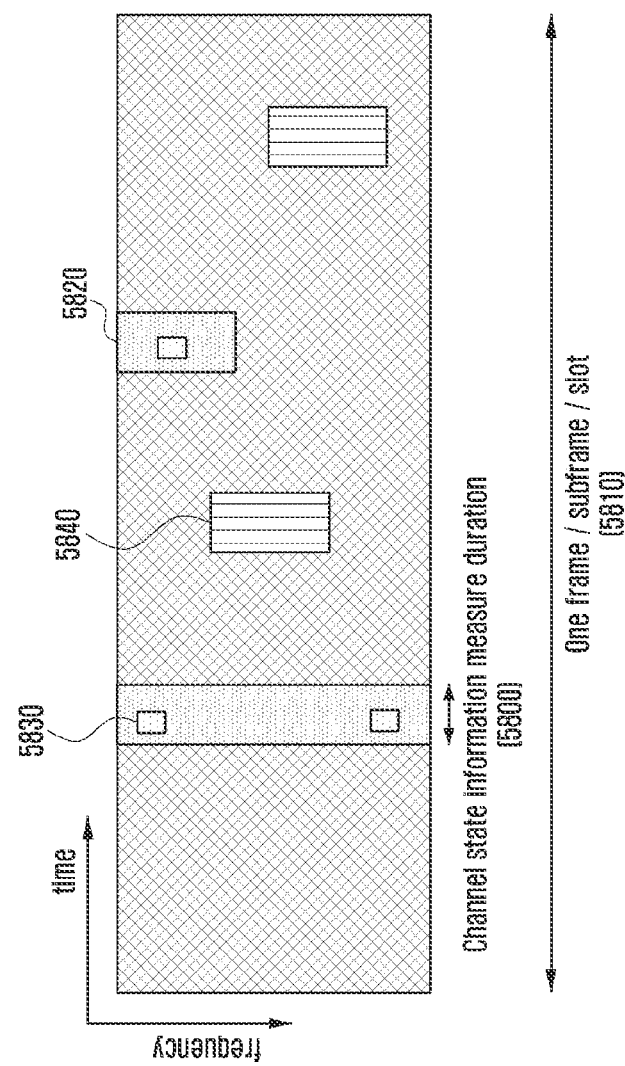
FIG. 58 is a diagram showing a relation between data indicators for URLLC in channel measure duration.

FIG. 58 is a diagram showing a relation between data indicators for URLLC in channel measure duration.

A UE may perform channel measurement 5840 in the remaining resources other than the duration 5820 in which a second type service indicator 5830 may occur in the situation in which channel measurement in channel measure duration 5800 has been requested by a BS. The second type service indicator may overlap the corresponding channel measure duration fully or partially in the time or frequency axis viewpoint. Alternatively, one or several second type service indicators may be positioned in the corresponding channel measure duration. The UE may perform channel measurement during channel measure duration in which one second type service indicator or a specific number of second type service indicators or less have been positioned. For example, the UE may perform channel measurement in the channel measure duration 5820 overlapping one second type service indicator.

Figure 59:
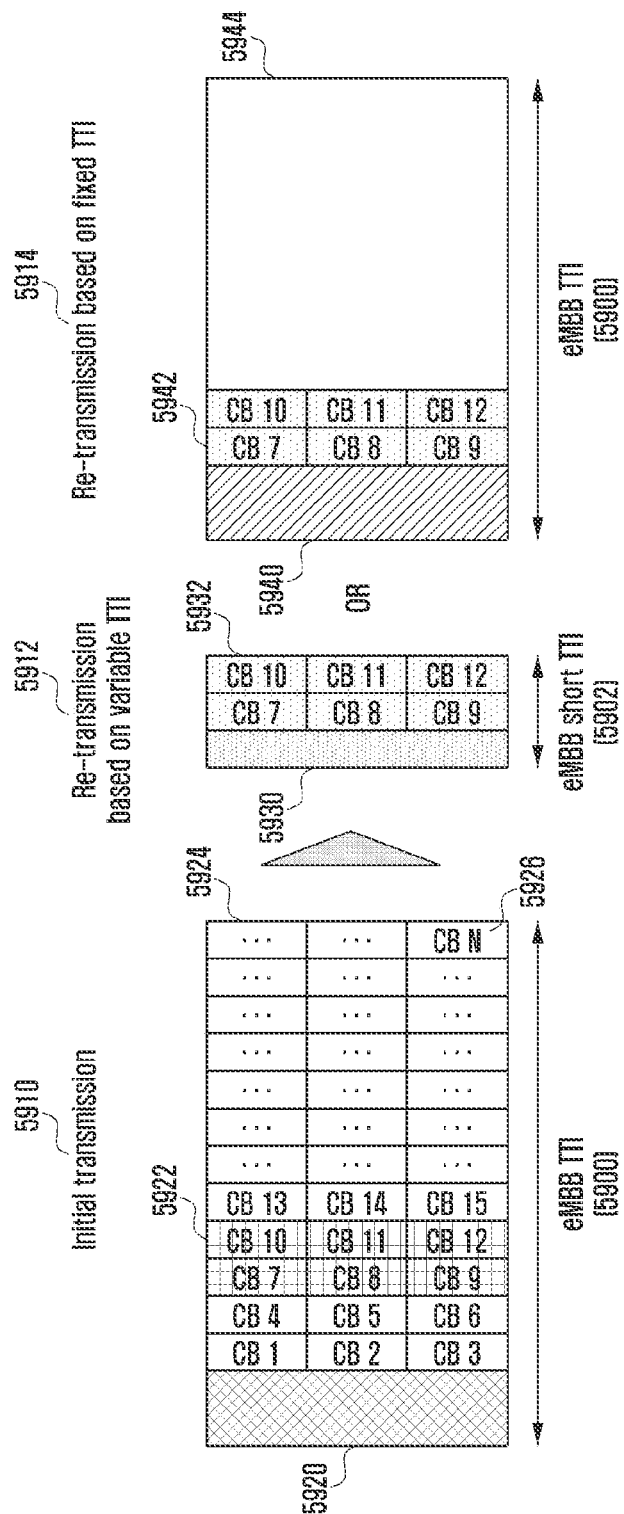
FIG. 59 is a diagram showing a retransmission method of eMBB data.

FIG. 59 is a diagram showing a retransmission method of eMBB data. FIG. 59 shows a method for a corresponding BS to retransmit (5912, 5914) some damaged data 5932 for a first type service because data 5922 for a second type service occurs when the BS performs data transmission 5924 for the first type service.

First, the BS may initially transmit one or two or more transport blocks 5924 including N code blocks 5926 in corresponding first type service transmission duration 5900. In this case, the transmission of some code blocks 5922 for some first type services is impossible due to the occurrence of the second type service. In this situation, when a UE notifies the BS that the decoding and demodulation of the first type data has failed due to the first type code block part not transmitted due to the second type data, the BS may retransmit (5912) the corresponding part only through short transmission duration 5902 or may retransmit (5914) the corresponding part through the transmission duration 5900 having the same length as the initial transmission, including next new information present in a buffer.

The number of corresponding code blocks is not limited to 3 per one OFDM symbol as in FIG. 59, and may have various numbers depending on a system situation within the range that does not exceed a transmission duration length supporting the first type service. Furthermore, one code block may be present in one OFDM symbol or multiple OFDM symbols. If initial transmission occurs in a k-th subframe, retransmission is performed according to a method using the short transmission duration 5902 in a (k+n)-th subframe or a method using the same transmission duration 5900 as the initial transmission. Furthermore, in addition, retransmission may be possible using the lengths of various types of transmission duration according to the same method.

(4-1) Embodiment

Figure 60:
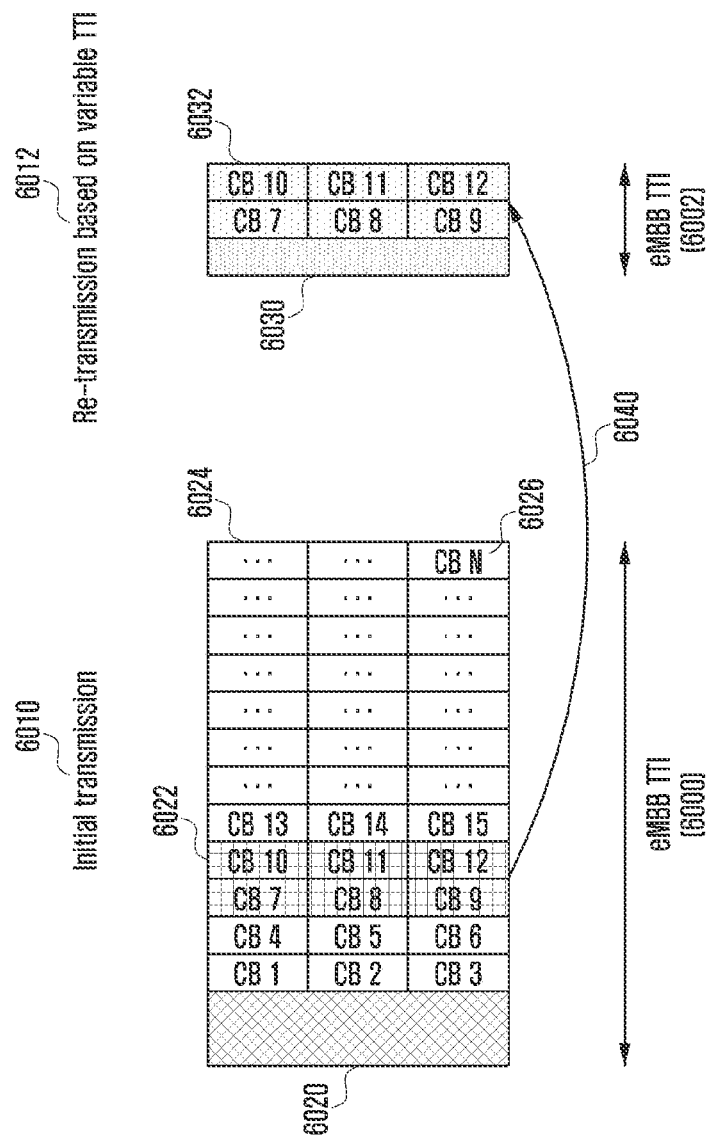
FIG. 60 is a diagram showing soft combining of initially transmitted and retransmitted eMBB data according to a (4-1) embodiment.

FIG. 60 is a diagram showing soft combining of initially transmitted and retransmitted eMBB data according to a (4-1) embodiment. The (4-1) embodiment relates to a method of soft combining initially transmitted eMBB data and retransmitted eMBB data when different types of eMBB transmission duration are used.

FIG. 60 shows that some of an initially transmitted transport block 6024 has been damaged due to data 6022 for a second type service. Specifically, code blocks 7 to 12 of code blocks configuring a transport block for a first type service have been damaged, and a total number of code block 6026 configuring the transport block for the first type service is N. One code block may be present in one OFDM symbol or multiple OFDM symbols. Unlike transmission duration, assuming that retransmission duration may support short transmission duration 6002, in the retransmission duration, the retransmission of only the damaged data 6022 for the first type service may be performed when initial transmission is performed. In this case, control information 6030 related to the retransmission for the first type service may have the same configuration as control information 6020 related to the initial transmission for the first type service or may have information different from the control information 6020.

Furthermore, the control information 6030 related to the retransmission for the first type service may include a retransmission data indicator configured as a 1-bit or multiple bits. The retransmission indicator may provide notification that the some data 6022 for the first type service is retransmission 6040 for the damaged data region in the initial transmission as a 1-bit in a subsequent retransmission operation because both the BS and the UE are aware that the some data 6022 is damaged due to the second type service. For example, if the retransmission indicator consists of a 1-bit, when the value is 1, this means that only the first type data damaged due to the second type service is transmitted. When the value is 0, this may mean that all of the first type data transport blocks transmitted in the initial transmission are transmitted again. Alternatively, a toggle method of a new data indicator (NDI) used in the existing LTE system may be applied. However, in a conventional technology, if NDI toggle does not occur, all of transport blocks transmitted in initial transmission are retransmitted. According to the (4-1) embodiment, however, it may be seen that if NDI toggle does not occur, a BS retransmits only data for a first type service not transmitted due to a second type service, and a UE can be aware that only the data for the first type service not transmitted due to the second type service in retransmission duration is retransmitted.

The retransmission indicator is a variable generated for the retransmission support of a first type service when a second type service occurs. If a second type service does not occur, the retransmission indicator is not present. If only first type data 6032 damaged due to a second type service is retransmitted, the retransmission may be performed when a UE cannot demodulate and decode only the damaged data 6032 for the second type service when the UE performs initial transmission for the first type service, the UE separately receives (6040) only the code blocks 6032 failed upon some initial transmission again in the retransmission in the state in which all of the remaining code blocks other than the data 6022 for the second type service can be demodulated and decoded when initial transmission is performed, thereby enabling the demodulation and decoding of a transport block.

(4-2) Embodiment

Figure 61:
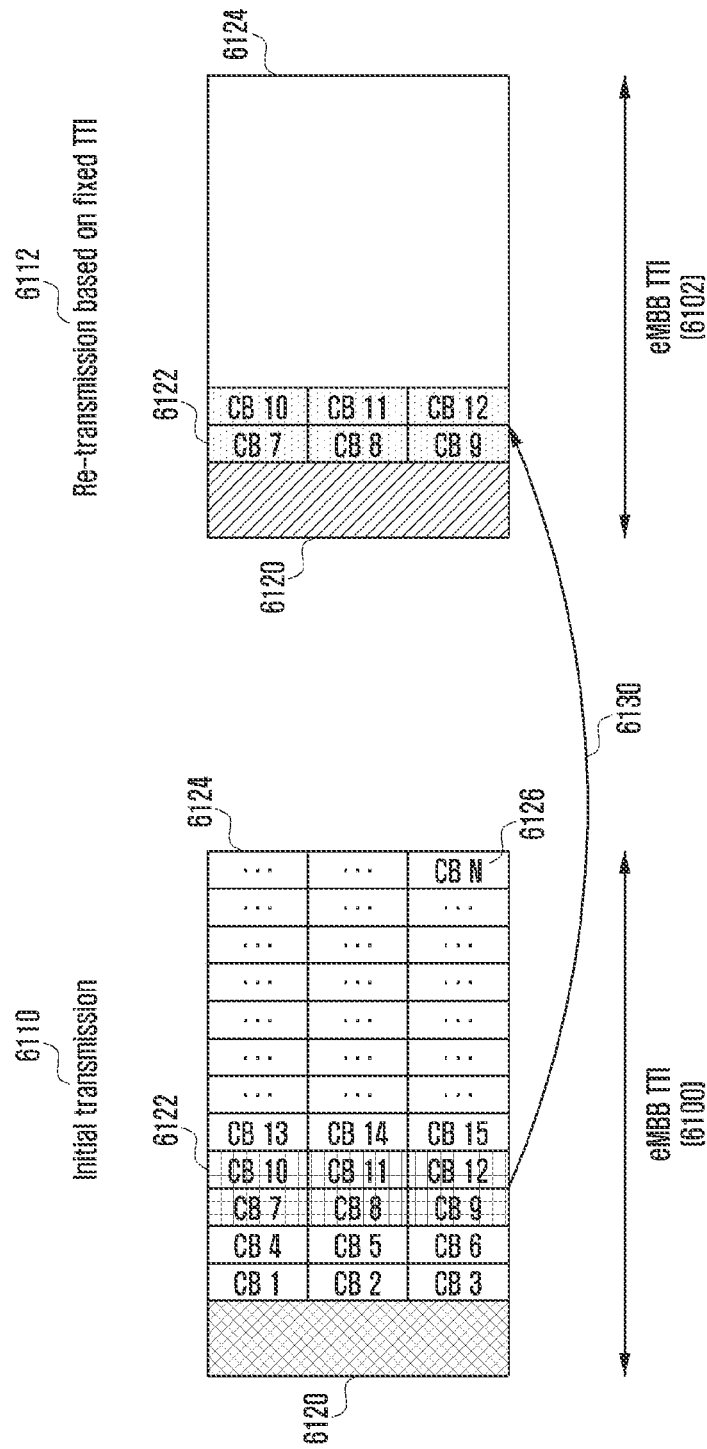
FIG. 61 is a diagram showing soft combining of initially transmitted and retransmitted eMBB data according to a (4-2) embodiment.

FIG. 61 is a diagram showing soft combining of initially transmitted and retransmitted eMBB data according to a (4-2) embodiment. The (4-2) embodiment proposes a soft combining method of initially transmitted and retransmitted eMBB data when the same transmission duration for eMBB is used.

FIG. 61 shows that some of initially transmitted transport blocks 6124 has been damaged due to data 6122 for a second type service 6122. Specifically, code blocks 7 to 12 of code blocks configuring a transport block for a first type service have been damaged. A total number of code blocks 6126 configuring the transport block for the first type service is N. One code block may be present in one OFDM symbol or multiple OFDM symbols. Assuming that retransmission duration supports the same transmission duration 6100 as transmission duration, in the retransmission duration, the damaged data 6122 for the first type service may be retransmitted along with new data 6124 for the first type service in initial transmission.

In this case, control information 6120 related to the retransmission for the first type service may have the same configuration as the control information 6120 related to the initial transmission for the first type service or may have information different from the control information 6120 related to the initial transmission. Furthermore, the control information 6120 related to the retransmission for the first type service may include a retransmission data indicator configured as a 1-bit and resource region configuration information for a new data transmission indicator 4/18. The corresponding retransmission indicator may provide notification that the retransmission of some data 4/06 for the first type service is retransmission 6130 for the data region damaged in the initial transmission using a 1-bit in a subsequent retransmission operation because both a BS and a UE are aware that the some data 4/06 for the first type service is damaged due to the second type service. For example, if the retransmission indicator consists of a 1-bit, when the value is 1, this means that only the first type data damaged due to the second type service is transmitted. When the value is 0, this means that all of the first type data transport blocks are transmitted again in initial transmission. For another example, if a new data transmission indicator consists of a 1-bit, when the value is 1 or toggled according to an NDI scheme as in the LTE system, the retransmission of the first type data damaged due to the second type service and the transmission of new data are combined and transmitted as in retransmission 6112 in the situation in which the retransmission indicator value is 1. Furthermore, when the retransmission indicator value is 0, the new data transmission indicator value cannot become 1. The retransmission indicator is a variable generated for the retransmission support of a first type service when a second type service occurs. When a second type service does not occur, the retransmission indicator is not present.

Furthermore, if the size of a resource region used for retransmission in resource region configuration information for new data is different from the size of a resource region used for initial transmission, the position of the start resource of the corresponding region may be explicitly notified through control information. Furthermore, if the size of a resource region used for retransmission in resource region configuration information for new data is the same as the size of a resource region used for initial transmission, the position of the start resource of the corresponding region may be configured in such a manner that the resource region 6122 for the retransmission is first assigned from the start part of a data region (without a need to explicitly notify a UE of the position) and the region 6124 for the new data is then assigned. Inversely, the position of the start resource may be configured in such a manner that the region 6124 for the new data is first assigned and the resource region 6120 for the retransmission is then assigned.

If only the first type data 6122 damaged due to the second type service is retransmitted, the retransmission may be performed when a UE cannot demodulate and decode only the damaged data 6122 for the second type service when performing initial transmission for the first type service.

The UE can demodulate and decode a transport block by separately receiving only the code blocks 6122 failed in some initial transmission again along with the new data 4/18 for the first type in the retransmission in the state in which the UE can demodulate and decode all of the remaining code blocks other than the data 6122 for the second type service in the initial transmission. The UE performs the retransmission 6130 of the data 6122 damaged in the initial transmission and the reception of the new data 6124 for the first type in retransmission duration for the first type.

(4-3) Embodiment

Figure 62:
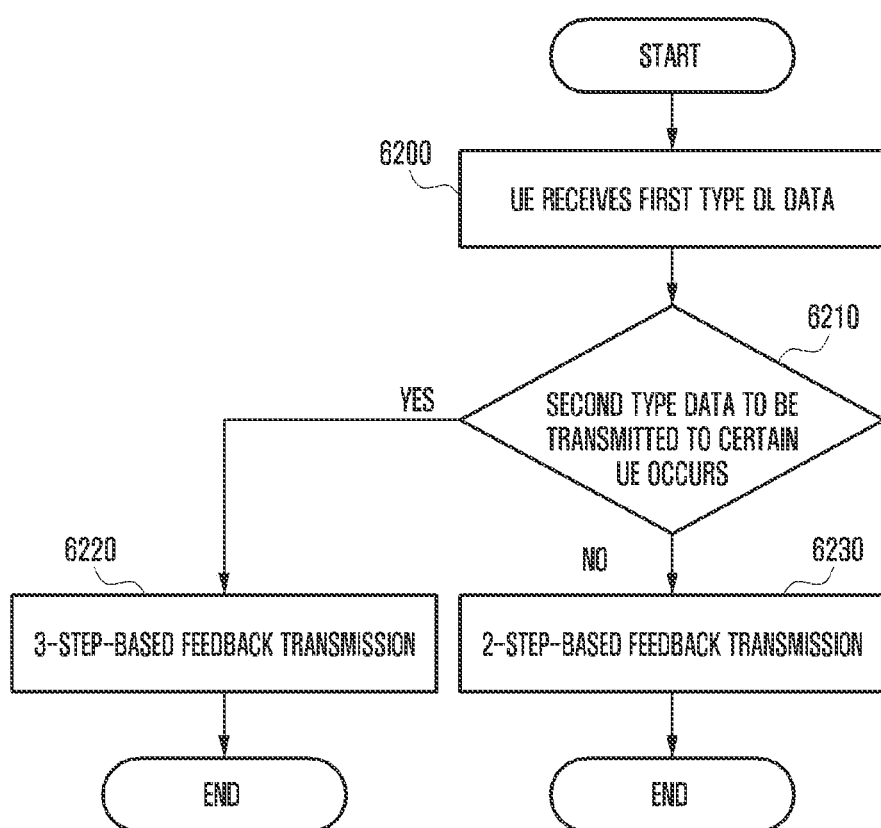
FIG. 62 is a diagram showing an operation of a base station or a terminal according to a (4-3) embodiment.

FIG. 62 is a diagram showing an operation of a BS or a UE according to a (4-3) embodiment. The (4-3) embodiment provides a feedback operation of a BS or a UE depending on whether second type data has occurred.

In FIG. 62, when the UE receives first type data (6200), the UE determines whether second type data has occurred (6210), and transmits feedback information to the BS using another feedback method based on a result of the determination. If the second type data has occurred, the UE performs 3-step-based feedback information transmission to the BS (6220). In this case, the corresponding feedback information is divided into a total of three cases of a first type data reception success, a first type data reception failure, and a reception failure of only some data of the first type corresponding to a second type data resource region. The reception failure of only some data of the first type corresponding to the second type data resource region may be considered to be a reception success of the remaining first type data other than the second type data resource region. If the second type data has not occurred, the UE performs 2-step-based feedback information transmission to the BS (6230). In this case, the corresponding feedback information is divided into two types of a first type data reception success and a first type data reception failure.

(4-4) Embodiment

Figure 63:
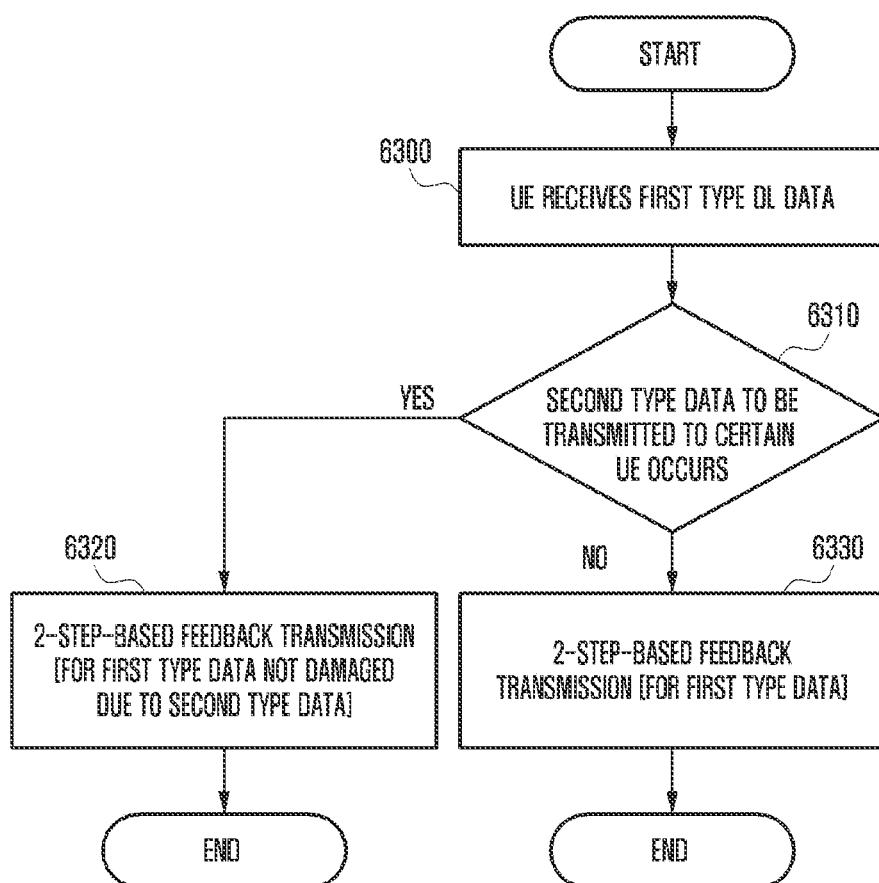
FIG. 63 is a diagram showing an operation of a base station or a terminal according to a (4-4) embodiment.

FIG. 63 is a diagram showing an operation of a BS or a UE according to a (4-4) embodiment. The (4-4) embodiment provides an operation of a BS or a UE depending on whether second type data has occurred.

In FIG. 63, when the UE receives first type data (6300), the UE determines whether the second type data has occurred (6310) d. If the second type data has occurred, the UE transmits 2-step-based feedback information (6320). The 2-step feedback information indicates a demodulation and decoding success or failure for the remaining first type data other than first type data damaged due to the second type data. In a feedback process, the first type data damaged due to the second type is excluded from a feedback target. If the second type data has not occurred, the UE transmits 2-step-based feedback information to the BS (6330). In this case, the corresponding feedback information indicates a first type data reception success and a first type data reception failure.

(4-5) Embodiment

Figure 64:
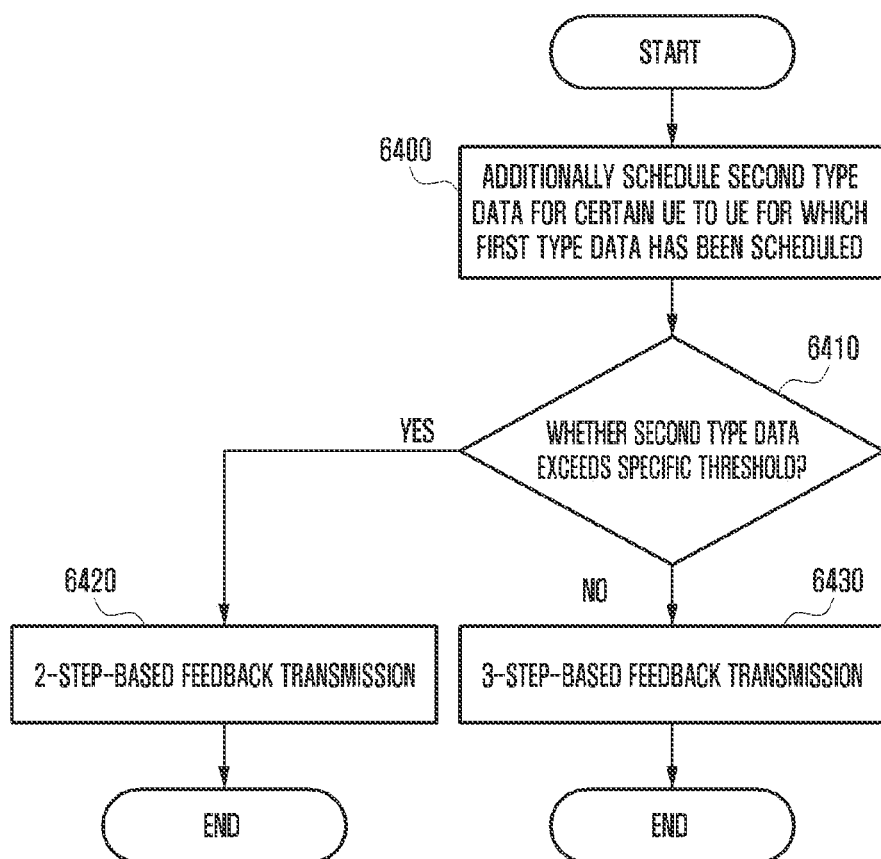
FIG. 64 is a diagram showing an operation of a base station or a terminal according to a (4-5) embodiment.

FIG. 64 is a diagram showing an operation of a BS or a UE according to a (4-5) embodiment. The (4-5) embodiment provides an operation for a BS or a UE to determine whether first type data decoding is possible due to the occurrence of second type data.

FIG. 64 shows a method for a UE receiving a first type service to determine a data resource region size for a second type service and to adaptively transmit feedback to a BS. If first type data has been scheduled, the BS schedules second type data in a resource in which the first type data has been scheduled (6400). A corresponding UE that receives the data identifies resource region information, occupied by the data for the second type service within a first type service resource region, based on information, such as modulation and encryption used to generate the data for the first type service, and determines whether the occupied resource region exceeds a given threshold value (6410). In this case, a different feedback method is used depending on whether the resource region occupied by the data for the second type service exceeds given threshold ratio of a resource region occupied by the data for the first type service. If the resource region occupied by the second type service data is greater than the given threshold, the UE transmits 2-step-based feedback information to the BS (6420). In this case, the corresponding feedback information is divided into a first type data-partial reception failure corresponding to a second type data resource region and a first type data reception failure. If the resource region occupied by the second type service data is smaller than the given threshold, the UE transmits 3-step-based feedback information to the BS (6430). In this case, the corresponding feedback information is divided into three types, such as a first type data reception success, a first type data reception failure, and a first type partial-data reception failure corresponding to the second type data resource region. The first type partial-data reception failure corresponding to the second type data resource region may be considered to be a reception success of the remaining first type data except the second type data resource region.

(4-6) Embodiment

Figure 65:
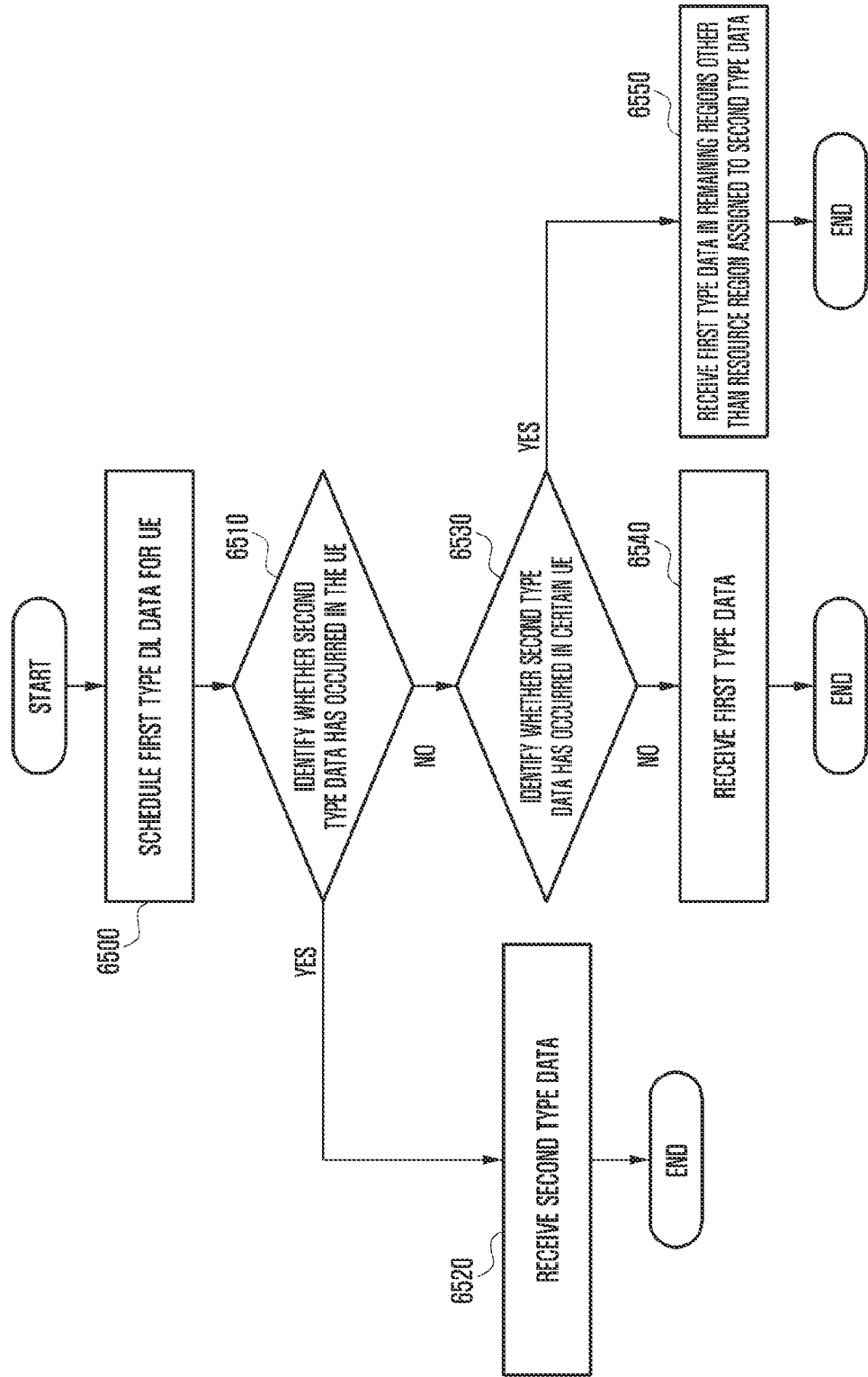
FIG. 65 is a diagram showing a terminal operation according to a (4-6) embodiment.

FIG. 65 is a diagram showing a UE operation according to a (4-6) embodiment. The (4-6) embodiment provides a UE operation for identifying the subject that generates second type data. Specifically, there is provided a method of identifying whether a second type service has occurred in the situation in which a UE capable of supporting a first type service and a second type service receives the first type service.

First type service data is scheduled in the UE (6500). The UE identifies whether second type data corresponding thereto has occurred through control region information for a second type service (6510). If second type data for the corresponding UE does not occur, the UE identifies a second type service occurrence indicator that may be configured for a given UE other than the UE (6530). When second type data for the corresponding UE occurs, the UE receives the second type data in a corresponding configured resource region (6520). If, as a result of the identification of the second type service occurrence indicator, second type data for given different UE has occurred, the UE receives first type data in the remaining resource regions other than a resource region assigned to the second type data (6550). Alternatively, if, a result of the identification of the second type service occurrence indicator, second type data for given different UE has not occurred, the UE receives the existing first type data (6540).

(4-7) Embodiment

Figure 66:
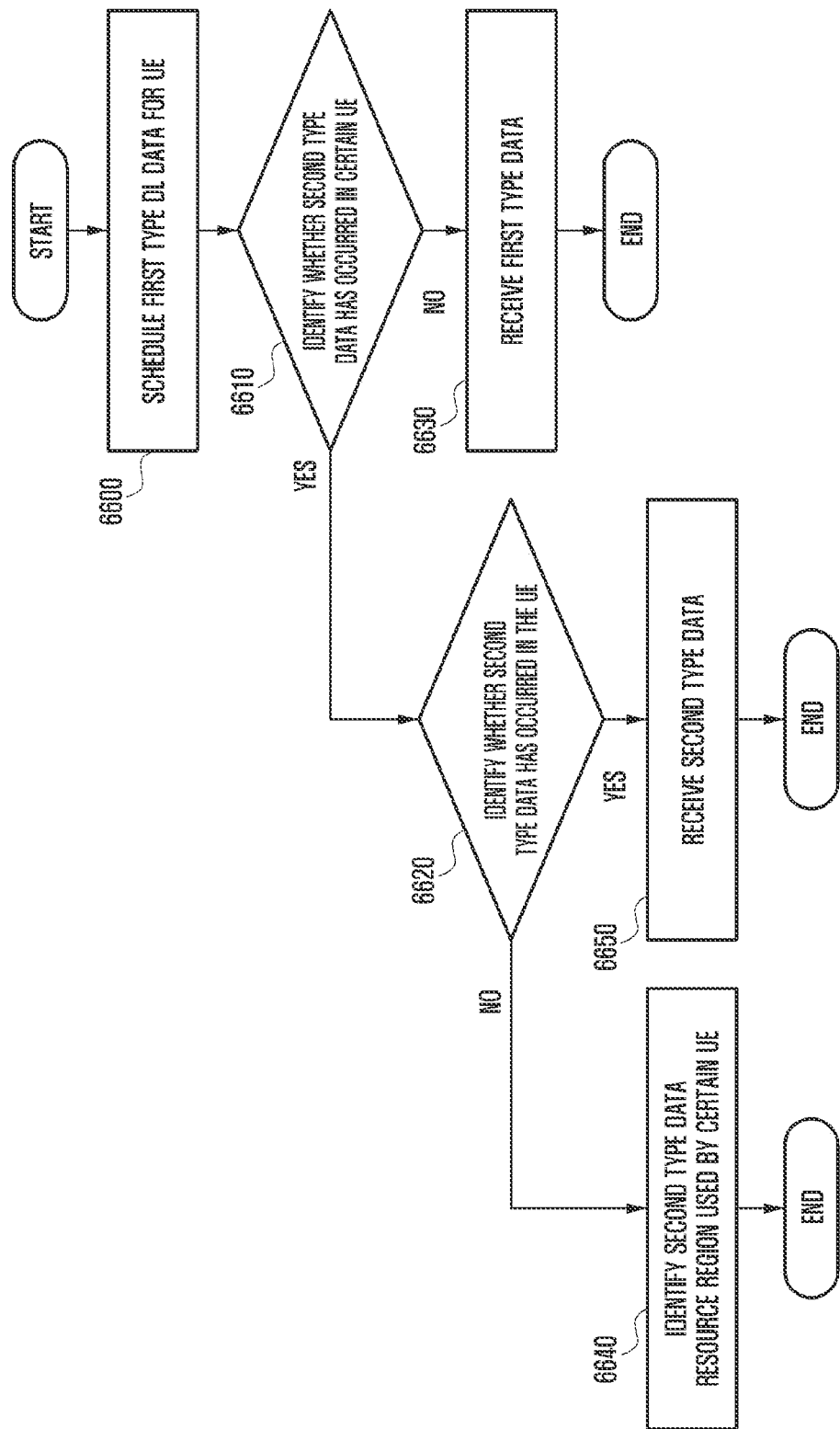
FIG. 66 is a diagram showing a terminal operation according to a (4-7) embodiment.

FIG. 66 is a diagram showing a UE operation according to a (4-7) embodiment. The (4-7) embodiment provides a UE operation for identifying the subject that has generated second type data. Specifically, the method is a method of identifying whether second type service has occurred in the situation in which a UE capable of supporting both a first type service and a second type service receives the first type service.

First type service data is scheduled in the UE (6600). The UE identifies whether data for a second type service occurring in a given UE has occurred by identifying a second type service indicator (6610). If, as a result of the identification, the second type data for the given UE has not occurred, the UE continues to receive first type data being received by the UE (6630). Alternatively, when second type data for the given UE occurs, the UE identifies whether second type data therefor has occurred (6620). When the second type data for the UE occurs, the UE receives the second type data in the region to which the second type data has been assigned instead of the first type data (6650). If the second type data has not been assigned to the UE, the UE determines that a corresponding second type data resource region is used for other UEs (6640).

Alternatively, a UE which supports a first type service and does not support a second type service, but can detect whether a second type service is present may identify whether second type data for a given UE occurs (6610). When the second type data occurs, the UE determines a corresponding region to be a data resource region used by the given UE (6640) without identifying whether second type data therefor occurs (6620).

(4-8) Embodiment

Figure 67:
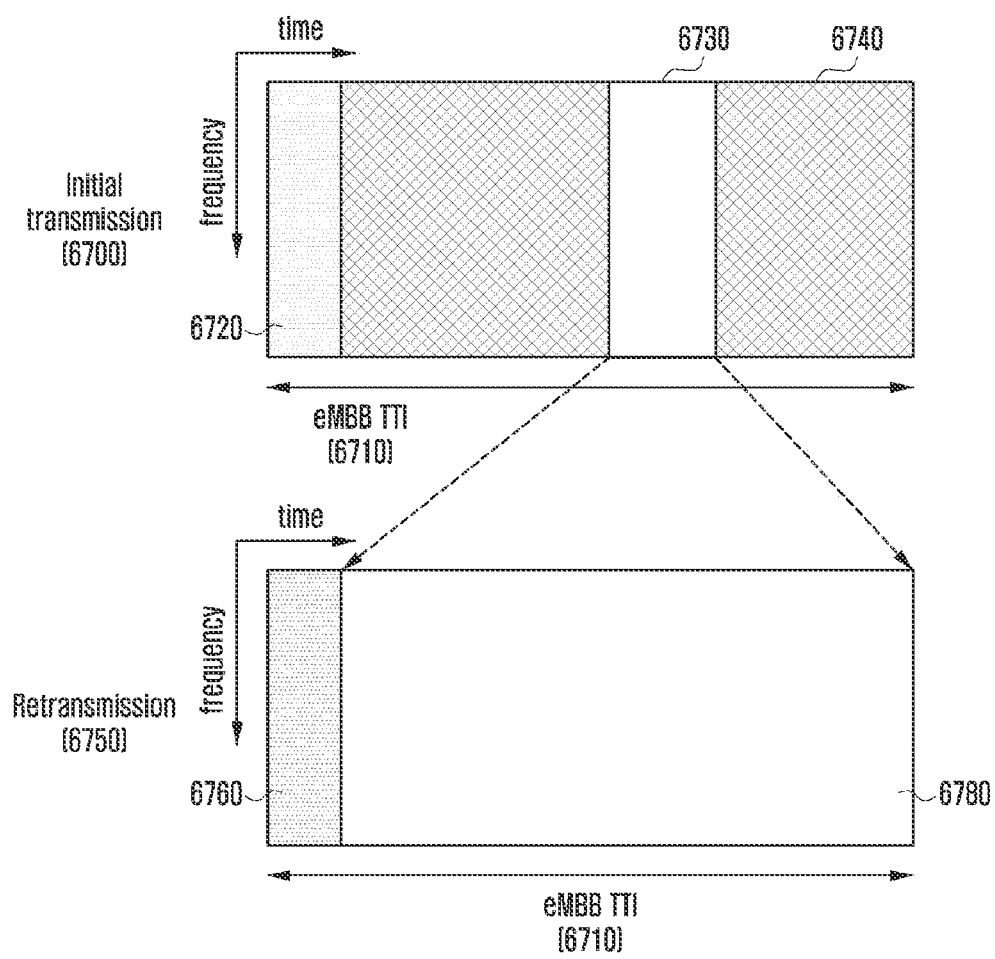
FIG. 67 is a diagram showing an initial transmission and retransmission operation of a base station and terminal according to a (4-8) embodiment.

FIG. 67 is a diagram showing an initial transmission and retransmission operation of a BS and UE according to a (4-8) embodiment. The (4-8) embodiment provides BS and UE operations for the initial transmission and retransmission of first type data according to the occurrence of second type data.

Upon initial transmission, a BS transmits control information 6720 and data 6740 for a first type service to a UE supporting the first type service during first type transmission duration 6710. At this time, when a second type service occurs, the BS does not transmit a first type service region 6730 identical with a data region for the corresponding second type service to the UE. After the UE receives first type data, when the UE reports only a reception failure for first type data not transmitted due to second type data to the BS or when the UE reports a reception success for the remaining first type data regions not damaged due to second type data to the BS, the BS transmits only the first type data damaged due to the corresponding second type data to the UE when performing retransmission.

In this case, the size of code blocks applied to retransmission and information related to related decoding and demodulation are included in a control region 6760 for the first type retransmission. The code block size of the damaged first type data are previously known to the BS and the UE, and thus the BS may notify the UE of the code block size using given indicator information (e.g., a modulation and coding scheme (MCS) index) or a special transport block size (TBS) index. The UE may infer the corresponding code block size and the related demodulation and decoding information by identifying indicator information in the control region for the first type data. Alternatively, the BS may generate a new code block table for the retransmission of the data damaged due to the second type data, and may directly notify the UE of the new code block table in control information of the control region.

(4-9) Embodiment

Figure 68:
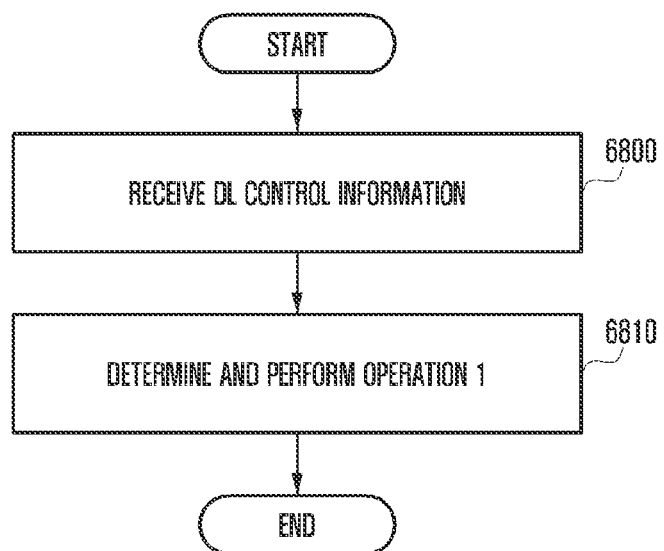
FIG. 68 is a block diagram showing a terminal operation according to a (4-9) embodiment.

FIG. 68 is a block diagram showing a UE operation according to a (4-9) embodiment.

According to FIG. 68, the UE receives DL control information through a UE-common DL control channel or a UE group DL-common control channel or a UE-specific DL control channel (6800). The DL control information includes information about a second type service occurrence indicator. After the DL control information is received, the UE operates according to one of the following operations or a combination of some of them (6810). This is called operation 1.

First, if a numerology applied to a time or frequency resource included in the second type service occurrence indicator information and the numerology of a corresponding data physical channel to which data information for a first type service that had been received or is received by an actual UE has been mapping are different, the UE interprets a data physical channel resource region for the first type service based on the numerology used for the second type service occurrence indicator information. The type of numerology may correspond to at least one of a TTI, subcarrier spacing, and an OFDM symbol length.

Second, if information about a frequency is included in the second type service occurrence indicator information, the information may provide notification of an offset (or the range of an offset) based on one value (a given frequency value within a center frequency or a corresponding frequency) of frequency bands in which a synchronization signal (e.g., a primary synchronization signal (PSS) and/or a secondary synchronization signal (SSS)) for initial access is transmitted. If a given frequency value at which the synchronization signal is transmitted is "a", frequency band information included in the second type service occurrence indicator information may provide notification of the range of a resource using two values of offsets "b" and "c" like [a+b] to [a+c], or may provide notification of a frequency range (duration) value "c" based on one offset "b" and an offset "b" thereof like [a+b−c/2] to [a+b+c/2].

Alternatively, a frequency resource may be notified based on one (or two or more) frequency value(s) of frequency bands in which the second type service occurrence indicator is transmitted.

Alternatively, a frequency resource may be notified based on one (or two or more) frequency value(s) of frequency bands of a UE-common or UE group-common or cell-common control channel (or control resource set) in which control information including the second type service occurrence indicator is transmitted.

Third, when a UE receives DL control information including the second type service occurrence indicator information, the UE may determine that frequency and time information indicated by the corresponding information is for the recent one (or two or more) valid DL slots temporally before the UE receives the control information. The definition of the valid DL slot means a case where k or more OFDM symbols are used as DL within one slot.

Fourth, if the transmission period of the second type service occurrence indicator is configured in a k slot unit, a UE may determine that a time or frequency resource included in the second type service occurrence indicator provide notification of a resource region in which second type service data of k slot duration has occurred. A time or frequency, that is, information provided by the second type service occurrence indicator, or a combination thereof may vary depending on the k value. For example, if the indicator information is fixed to n bits regardless of the k value, the number of OFDM symbols within a slot notified by one bit information of the n bits maybe different depending on the k value. Furthermore, if k<d, (n−a) bits of the n bits provides frequency-related information, and a bits provides time-related information. If k>d, all of the n bits may be set to provide time-related information. That is, some of bits may indicate information of a time unit in a frequency unit or may be changed depending on the k value. Alternatively, the size of control information including the second type service occurrence indicator information may be changed depending on the k value. For example, as the k value increases, the size of the control information may increase.

Fifth, a UE may perform an operation of discarding all of code blocks corresponding to a frequency and time resource, indicated in the second service occurrence indicator, from a UE buffer, discarding code blocks that belong to all of code blocks at least partially corresponding to a frequency and time resource and on which demodulation and/or decoding has failed or only some of the code blocks from a UE buffer (or not storing them in the UE buffer), or discarding only information corresponding to a frequency and time resource from a UE buffer (or not storing them in the UE buffer).

Sixth, a slot value indicated in the second service occurrence indicator is based on a slot having the most recent valid DL data channel. For example, if a slot right before a slot in which the second service occurrence indicator has been transmitted is a slot configured as only UL, a slot indicated by the second service occurrence indicator refers to a slot right before a slot configured as only UL.

Alternatively, a slot value indicated in the second service occurrence indicator is defined based on a slot in which the indicator has been transmitted. The slot value may have a positive value or a negative value. A separate indicator of a 1 bit may be configured or a given bit combination may indicate a positive value or a negative value as a criterion to distinguish between the positive value and the negative value. The second service occurrence indicator indicative of a positive value may be used to indicate a physical channel resource configured in a time or frequency unit reserved for a future service. A UE determines that some data information configured as a time or frequency domain has not been transmitted due to the occurrence of a second service in a slot indicated by a second service occurrence indicator or some data information configured as a time or frequency domain has not been transmitted due to the occurrence of a reserved resource or has been rate-matched by avoiding this resource using a value included in the second service occurrence indicator.

A given field within DL control information for the second service occurrence indicator may be shared with a field dynamically providing notification of a reservation resource. Information about two resources may be notified through a given slot index bit field. That is, a second service occurrence indicator and a reservation resource may be indicated using the same field. A given value within the field may provide notification that the field means which value of the second service occurrence indicator and the reservation resource. A UE may distinguish between a second service occurrence indicator and a reservation resource occurrence indicator based on a given field value within DL control information. If a slot value indicated within given DL control information is after timing (or slot) in which the DL control information is transmitted, the UE performs rate-matching or puncturing on a DL data time or frequency resource region indicated along with the corresponding slot value.

Alternatively, if a slot value indicated within given DL control information is after timing (or slot) in which the DL control information is transmitted, a UE performs puncturing on a DL data time or frequency resource region indicated along with the corresponding slot value, and performs decoding on code blocks related to the punctured region again (or discards only the punctured resource region from a UE buffer).

(4-10) Embodiment

Figure 69A:
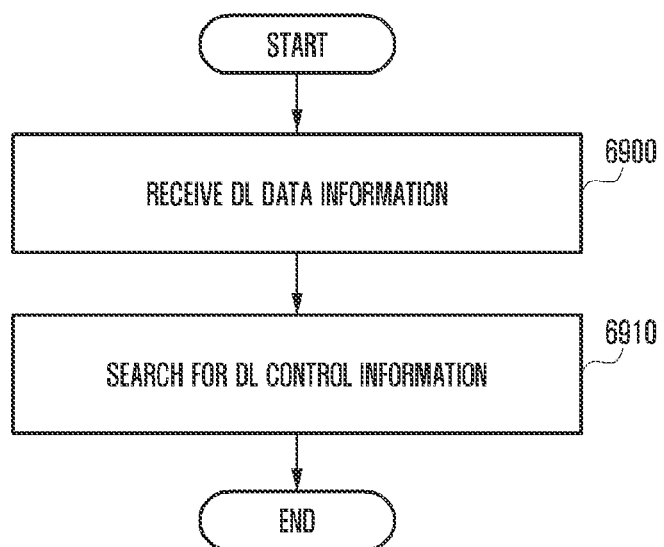
FIGS. 69A, 69B and 69C are block diagrams showing a terminal operation according to a (4-10) embodiment.
Figure 69B:
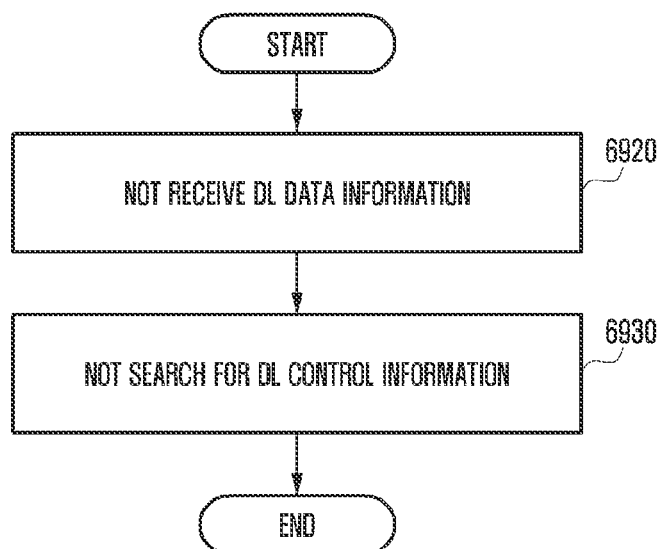
Figure 69C:
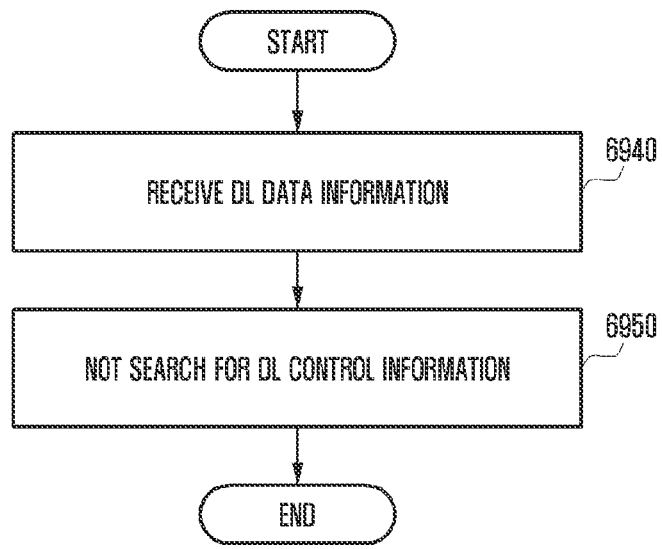

FIGS. 69A, 69B and 69C are block diagrams showing a UE operation according to a (4-10) embodiment.

According to FIG. 69A, a UE receives DL data information in a DL data physical channel through DL control information (6900). When the DL data information has been received or is receiving (or if it is not related to whether the DL data information is decoded) or when the decoding of the DL data information fails, the UE performs DL control information search through a UE group-common DL control channel or a cell-common DL control channel or a UE-specific DL control channel in which DL control information including second type service indicator information is transmitted during one or two or more given periods (6910). The DL control channel in which the DL control information is transmitted may be previously configured through UE-specific or cell-common higher layer signaling or may be configured through UE-specific or cell-common L1 signaling (may be interchangeably used with physical layer signaling). The control information may be based on a given RNTI or may have a given DL control information format. Alternatively, a given DL control channel in which the DL control information is transmitted may be configured.

According to FIG. 69B, if a UE does not receive DL data information through DL control information (or DL if a data grant is not present, if a given slot includes only UL symbols, if the number of UL symbols within a given slot is a given threshold or more, if the number of DL symbols within a given slot is a given threshold or less, if a DL symbol within a given slot is used for only DL control information, if there is no channel in which DL data information is transmitted, or if the number of symbols of a channel in which DL data information is transmitted is a specific number or less) (6920), the UE does not perform DL control information search through a UE group-common DL control channel or a cell-common DL control channel or a UE-specific DL control channel in which DL control information including a second type service indicator information is transmitted during a given period (or until DL data information is received)(6930).

Alternatively, according to FIG. 69A, a UE receives DL data information in a DL data physical channel through DL control information (6900). If DL data transmission duration in which the scheduled DL data information is transmitted is a given threshold (symbol or symbol group unit) value or more (e.g., DL data scheduling allocation to transmission duration including N or more symbols), the UE performs DL control information search through a UE group-common DL control channel or a cell-common DL control channel or a UE-specific DL control channel in which DL control information including a second type service indicator information is transmitted during one or two or more given periods (6910). The DL control channel in which the DL control information is transmitted may be previously configured through UE-specific or cell-common higher layer signaling or may be configured through UE-specific or cell-common L1 signaling. The control information may be based on a given RNTI or may have a given DL control information format. Alternatively, a given DL control channel in which the DL control information is transmitted may be configured.

According to FIG. 69C, a UE receives DL data information in a DL data physical channel through DL control information (6940). If DL data transmission duration in which the scheduled DL data information is transmitted is a given threshold (symbol or symbol group unit) value or less (e.g., DL data scheduling allocation to transmission duration including N symbols or less), the UE does not perform search through a UE group-common DL control channel or a cell-common DL control channel or a UE-specific DL control channel in which DL information including second type service indicator information is transmitted during a given period (or until DL data information is received) (6950).

If the most recently transmitted valid DL slot is an (n–k)-th slot, a UE does not search for control information, including a second type service occurrence indicator, in an n-th slot. Alternatively, when a UE does not receive DL data for (n–1) to (n–k)-th slot duration, the UE does not search for control information including the second type service occurrence indicator. To not perform search means that the UE omits corresponding control information search in a UE-common or cell-common or UE group-common DL control channel including the control information or does not apply an RNTI used to detect the control information when the RNTI is descrambled. Alternatively, if a UE performs DL data reception during (n–1) to (n–k)-th slot duration, the UE searches for control information including the second type service occurrence indicator. The control information search means that a given RNTI is used to detect the control information in a UE-common or cell-common or UE group DL control channel in which control information including the indicator is delivered.

Alphabetical letters "a" to "z" written in the present disclosure mean integer values.

A slot described in the present disclosure is a time unit transmitted from a BS to a UE. One slot includes 14 OFDM symbols or includes 7 OFDM symbols.

Furthermore, the second type service occurrence indicator described in the present disclosure may be used as a term called preemption indication or a preemption indicator. An object of the indicator is to provide notification that transmission has not been actually performed in some of data resources scheduled for a UE as DL or UL.

Furthermore, the indicator may include a field indicative of a given slot value and a field configured in a frequency or time unit within a corresponding slot. Furthermore, only one of the two fields may be present. An example of the frequency unit may be a frequency band unit configured by a given BS. An example of the time unit may be one given OFDM symbol or several units. A method of indicating the given slot value may include providing notification of a system frame number (SFN) or providing notification of a slot value based on timing when the indicator is transmitted.

Furthermore, the indicator may provide notification of only the slot value or provide notification of a discontiguous or contiguous symbol period within a slot included in the slot value. A method of providing notification of the discontiguous symbol period may include notifying a symbol in which the second type service has occurred or a combination of the symbols using a bitmap form having a bit value for each symbol.

Furthermore, the indicator provides notification that a second type service has occurred in a given period including one or two or more symbols within the slot value by indicating the start symbol and end symbol (or period) of a resource corresponding to a second type service.

Furthermore, the indicator may be transmitted while UEs influenced due to a second type service receive their data or may be transmitted after the transmission is completed.

Furthermore, if the indicator is transmitted to several UE groups, a group may be dynamically configured so that the indicator is transmitted to only UEs influenced due to a second type service.

Furthermore, after a UE receives the indicator, the UE may implicitly (or dynamically) reconfigure and transmit an HARQ-ACK feedback resource for its DL data information influenced due to the occurrence of a second type service. The reconfiguration may be performed before the UE actually uses the HARQ-ACK feedback resource for the DL data information. A method of configuring the reconfigured resource may include (implicitly) changing a resource based on the existing HARQ-ACK resource or newly receiving an HARQ-ACK resource allocated by a BS.

Figure 70:
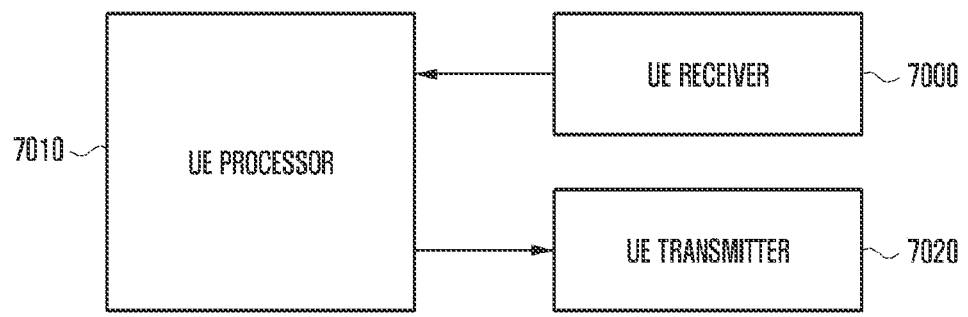
FIG. 70 is a block diagram showing the configuration of a terminal capable of performing the present embodiment.

FIG. 70 is a block diagram showing the configuration of a UE capable of performing the present embodiment.

Referring to FIG. 70, the UE of the present disclosure may include a UE receiver 7000, a UE transmitter 7020 and a UE processor 7010. The UE receiver 7000 and the UE transmitter 7020 may be collectively called a transceiver unit in the present embodiment. The transceiver unit may transmit and receive signals to and from a BS. The signal may include control information and data. To this end, the transceiver unit may include an RF transmitter configured to up-convert and amplify the frequency of a transmitted signal and an RF receiver configured to perform low-noise amplification on a received signal and to down-convert the frequency. Furthermore, the transceiver unit may receive a signal through a radio channel, may output it to the UE processor 7010, and may transmit a signal output by the UE processor 7010 through a radio channel.

The UE processor 7010 may control a series of processes so that the UE can operate according to the aforementioned embodiment. For example, the UE processor 7010 may control the UE receiver 7000 to receive a signal, including transmission timing information about a second type occurrence indicator, from a BS, and may control to interpret the transmission timing of the second type occurrence indicator. Thereafter, the UE transmitter 7020 may transmit feedback at the timing when first type data is received through the second type occurrence indicator.

Figure 71:
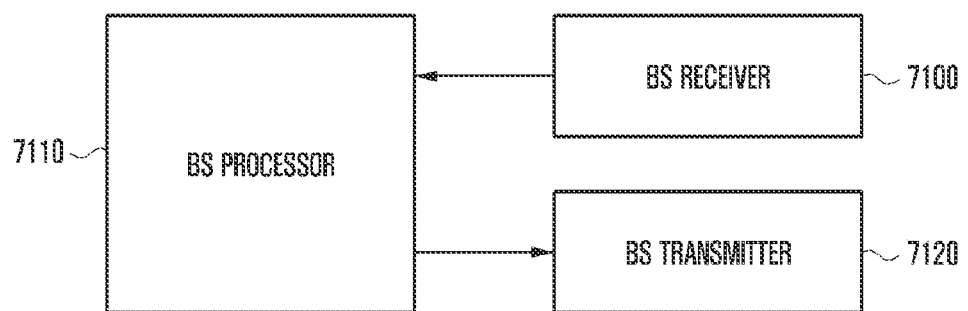
FIG. 71 is a block diagram showing the configuration of a base station capable of performing the present embodiment.

FIG. 71 is a block diagram showing the configuration of a BS capable of performing the present embodiment.

Referring to FIG. 71, the BS of the present disclosure may include at least one of a BS receiver 7100, a BS transmitter 7120 and a BS processor 7110. The BS receiver 7100 and the BS transmitter 7120 may be collectively called a transceiver unit in the present embodiment. The transceiver unit may transmit and receive signals to and from a UE. The signal may include control information and data. To this end, the transceiver unit may include an RF transmitter configured to up-convert and amplify the frequency of a transmitted signal and an RF receiver configured to perform low-noise amplification on a received signal and to down-convert the frequency. Furthermore, the transceiver unit may receive a signal through a radio channel, may transmit it to the BS processor 7110, and may transmit a signal output by the BS processor 7110 through a radio channel.

The BS processor 7110 may control a series of processes so that the BS can operate according to the aforementioned embodiment. For example, the BS processor 7110 may control to determine the transmission timing of a second type occurrence indicator and to generate transmission timing information about a second type occurrence indicator to be delivered to a UE. Thereafter, the BS transmitter 7120 may deliver the timing information to the UE. The BS receiver 7100 may receive a feedback response to a first type occurrence indicator at the timing.

Furthermore, according to one embodiment of the present disclosure, the BS processor 7110 may control to generate DCI or a preamble including transmission timing information about the second type occurrence indicator or to include transmission timing information in reference signal information. In this case, the DCI or the preamble or the reference signal information may include the second signal transmission timing information.

Meanwhile, the embodiments of the present disclosure disclosed in this specification and drawings have proposed given examples in order to easily describe the technical contents of the present disclosure and to help understanding of the present disclosure, but are not intended to limit the range of the present disclosure. That is, it is evident to a person having ordinary skill in the art to which the present disclosure pertains that other modifications based on the technical spirit of the present disclosure are possible. Furthermore, the embodiments may be combined, if necessary. For example, some of the (4-1) embodiment, (4-2) embodiment and (4-3) embodiment of the present disclosure may be combined, and a BS and a UE may operate based on them. Furthermore, the embodiments have been proposed based on an NR system, but other modifications based on the technical spirit of the embodiment may be applied to other systems, such as an FDD or TDD LTE system.

Furthermore, the preferred embodiments of the present disclosure have been disclosed in this specification and drawings. Although specific terms have been used, they are used in common meanings in order to easily describe the technical contents of the present disclosure and to help understanding of the present disclosure, but are not intended to limit the scope of the present disclosure. It is evident to a person having ordinary skill in the art to which the present disclosure pertains that other modified examples based on the technical spirit of the present disclosure are possible in addition to the disclosed embodiments.

What is claimed is:

1. A method performed by a user equipment (UE) in a communication system, the method comprising:
    receiving, from a base station, information on an energy per resource element (EPRE) associated with a synchronization signal via higher layer signaling;
    receiving, from the base station, the synchronization signal comprising a primary synchronization signal (PSS) and a secondary synchronization signal (SSS);
    receiving, from the base station, a broadcast channel; and
    transmitting, to the base station, reference signal received power (RSRP) for the synchronization signal,
    wherein one antenna port is defined for the synchronization signal, and
    wherein an EPRE associated with at least one physical channel including the broadcast channel is same as the EPRE associated with the synchronization signal.

2. The method of claim 1, wherein Doppler spread and delay spread of the synchronization signal are associated with the at least one physical channel including the broadcast channel.

3. The method of claim 1, wherein the one antenna port of the synchronization signal is identical to an antenna port of the broadcast channel.

4. A method performed by a base station in a communication system, the method comprising:
    transmitting, to a user equipment (UE), information on an energy per resource element (EPRE) associated with a synchronization signal via higher layer signaling;
    transmitting, to the UE, the synchronization signal comprising a primary synchronization signal (PSS) and a secondary synchronization signal (SSS);
    transmitting, to the UE, a broadcast channel; and
    receiving, from the UE, reference signal received power (RSRP) for the synchronization signal;
    wherein one antenna port is defined for the synchronization signal, and
    wherein an EPRE associated with at least one physical channel including the broadcast channel is same as the EPRE associated with the synchronization signal.

5. The method of claim 4, wherein Doppler spread and delay spread of the synchronization signal are associated with the at least one physical channel including the broadcast channel.

6. The method of claim 4, wherein the one antenna port of the synchronization signal is identical to an antenna port of the broadcast channel.

7. A user equipment (UE) in a communication system, the UE comprising:
    a transceiver; and
    a controller configured to:
        receive, from a base station, information on an energy per resource element (EPRE) associated with a synchronization signal via higher layer signaling,
        receive, from the base station, the synchronization signal comprising a primary synchronization signal (PSS) and a secondary synchronization signal (SSS),
        receive, from the base station, a broadcast channel, and
        transmit, to the base station, reference signal received power (RSRP) for the synchronization signal,
    wherein one antenna port is defined for the synchronization signal, and
    wherein an EPRE associated with at least one physical channel including the broadcast channel is same as the EPRE associated with the synchronization signal.

8. The UE of claim 7, wherein Doppler spread and delay spread of the synchronization signal are associated with the at least one physical channel including the broadcast channel.

9. The UE of claim 7, wherein the one antenna port of the synchronization signal is identical to an antenna port of the broadcast channel.

10. A base station in a communication system, the method comprising:
    a transceiver; and
    a controller configured to:
        transmit, to a user equipment (UE), information on an energy per resource element (EPRE) associated with a synchronization signal via higher layer signaling,
        transmit, to the UE, the synchronization signal comprising a primary synchronization signal (PSS) and a secondary synchronization signal (SSS),
        transmit, to the UE, a broadcast channel, and
        receive, from the UE, reference signal received power (RSRP) for the synchronization signal,
    wherein one antenna port is defined for the synchronization signal, and
    wherein an EPRE associated with at least one physical channel including the broadcast channel is same as the EPRE associated with the synchronization signal.

11. The base station of claim 10, wherein Doppler spread and delay spread of the synchronization signal are associated with the at least one physical channel including the broadcast channel.

12. The base station of claim 10, wherein the one antenna port of the synchronization signal is identical to an antenna port of the broadcast channel.

* * * * *